(12) United States Patent
Han et al.

(10) Patent No.: US 11,197,027 B2
(45) Date of Patent: Dec. 7, 2021

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Chung Dean Han, Singapore (SG); Pongsak Lasang, Singapore (SG); Chi Wang, Singapore (SG); Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/142,794

(22) Filed: Jan. 6, 2021

(65) Prior Publication Data
US 2021/0127136 A1    Apr. 29, 2021

Related U.S. Application Data

(63) Continuation of application No. PCT/JP2019/027401, filed on Jul. 10, 2019.
(Continued)

(51) Int. Cl.
*H04N 19/597* (2014.01)
*H04N 19/70* (2014.01)
*G06T 9/00* (2006.01)

(52) U.S. Cl.
CPC .......... *H04N 19/597* (2014.11); *H04N 19/70* (2014.11)

(58) Field of Classification Search
None
See application file for complete search history.

(56) References Cited

U.S. PATENT DOCUMENTS 6,577,310 B1 *   6/2003   Kim ...................... G06T 9/001
                                                    345/420
2014/0375638 A1   12/2014   Tomaru et al.

FOREIGN PATENT DOCUMENTS

| CA | 3005713 | 6/2017 |
| EP | 3792875 | 3/2021 |
| WO | 2014/020663 | 2/2014 |

OTHER PUBLICATIONS

International Search Report (ISR) dated Aug. 13, 2019 in International (PCT) Application No. PCT/JP2019/027401.
(Continued)

*Primary Examiner* — Christopher Braniff
(74) *Attorney, Agent, or Firm* — Wenderoth, Lind & Ponack, L.L.P.

(57) ABSTRACT

A three-dimensional data encoding method includes: generating a bitstream by encoding subspaces included in a current space in which three-dimensional points are included. The bitstream includes encoded data respectively corresponding to the subspaces. In the generating of the bitstream, a list of information about the subspaces is stored in first control information included in the bitstream. The subspaces are respectively associated with identifiers assigned to the subspaces, and the first control information is common to the encoded data. Each of the identifiers assigned to the subspaces respectively corresponding to the encoded data is stored in a header of a corresponding one of the encoded data.

4 Claims, 103 Drawing Sheets

Related U.S. Application Data

(60) Provisional application No. 62/697,598, filed on Jul. 13, 2018.

(56) References Cited

OTHER PUBLICATIONS

Gerdan, G. P. and Deakin, R. E., "Transforming Cartesian Coordinates X, Y, Z to Geographical Coordinates φ, λ, h", The Australian Surveyor, vol. 44, No. 1, pp. 55-63, Jun. 1999.
Extended European Search Report dated Jul. 21, 2021 in corresponding European Patent Application No. 19834420.2.
"First idea on Systems technologies for Point Cloud Coding", ISO/IEC JTC1/SC29/WG11, MPEG2018/wl7675, Apr. 2018.
"Technologies Under Consideration for Carriage of Point Cloud Data", ISO/IEC JTC1/SC29/WG11, MPEG2018/N18414, Mar. 2019.

\* cited by examiner

GOS INDEX NUMBER (ENCODING ORDER)

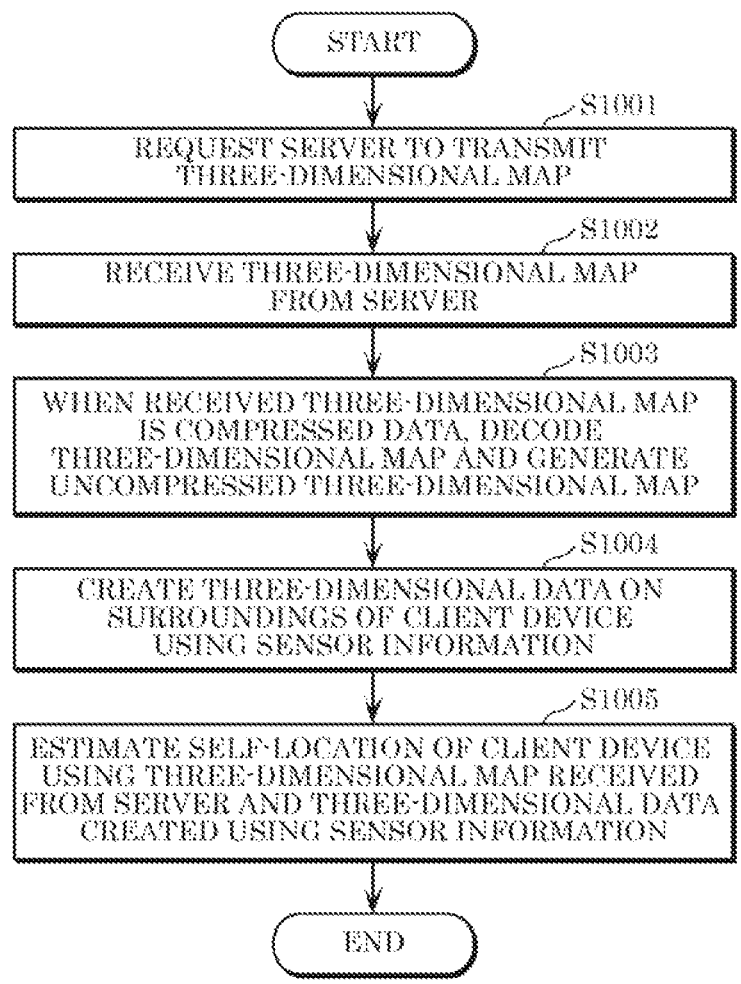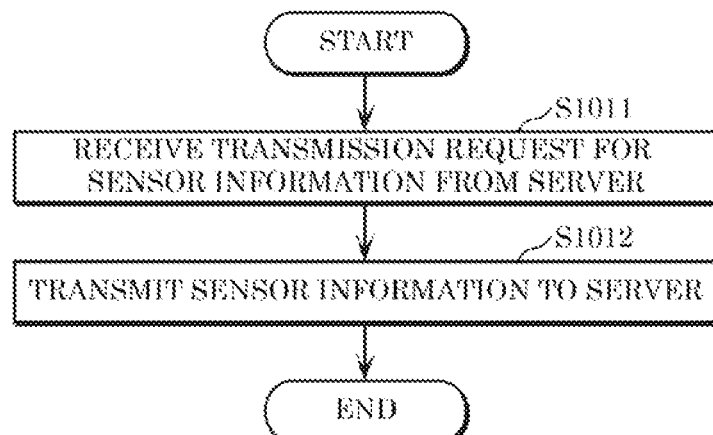

FIG. 41

A : BIT SEQUENCE WHEN SCANNING NODES AND LEAVES BREADTH-FIRST : 10010000 10000001 00000010 leaf1 leaf2 leaf3

B : BIT SEQUENCE WHEN SCANNING NODES AND LEAVES DEPTH-FIRST : 10010000 10000001 leaf1 leaf2 00000010 leaf3

FIG. 50

```
sub_map_header() {
...
NumOfPoint
sub_coordinate_x
sub_coordinate_y
sub_coordinate_z
...
sub_map_data()
...
} sub_map_data() {
...
for (i=0; i<NumOfPoint; i++) {
  diff_x[i]
  diff_y[i]
  diff_z[i]
}
...
}
```

FIG. 52

```
sub_map_header() {
...
coding_type
If (coding_type == non_octree)
{
 NumOfPoint
 sub_coordinate_x
 sub_coordinate_y
 sub_coordinate_z
}
else if (coding_type==octree) {
{
 octree_info()
}
...
sub_map_data()
...
} sub_map_data() {
...
if (coding_type==non_octree)
{
 for (i=0; i<NumOfPoint; i++) {
  diff_x[i]
  diff_y[i]
  diff_z[i]
 }
 else (coding_type==octree) {
  octree_data()
 }
 ...
}
```

FIG. 62

```
volume_header() {
...
coding_type
If (coding_type == non_octree)
{
 NumOfPoint
 sub_coordinate_x
 sub_coordinate_y
 sub_coordinate_z
}
 else if (coding_type==octree) {
 {
  octree_info()
 }
...
 volume_data()
...
} volume_data() {
...
 if (coding_type==non_octree)
 {
  for (i=0; i<NumOfPoint; i++) {
   diff_x[i]
   diff_y[i]
   diff_z[i]
  }
  else (coding_type==octree) {
   octree_data()
  }
  ...
}
```

FIG. 76
```
pc_header() {
...
num_sub_pc
for (i=0; i<num_sub_pc; i++)
   numPoint[i]
   coding_type[i]
   data_sub_cloud[i]()
}
data_sub_cloud() {
if (coding_type == 00)
{
  coding_type_00_data
}
else if (coding_type == 01)
{
  coding_type_01_data
}
...
end_of_data
}
```
FIG. 77
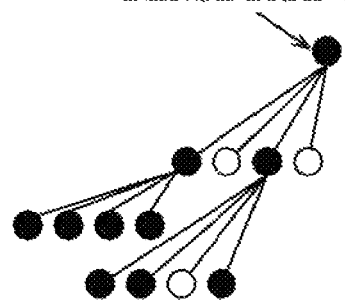
DENSE BRANCH
FIG. 78
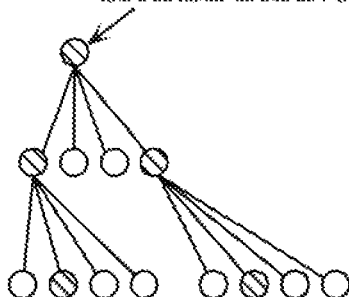
SPARSE BRANCH

FIG. 82

```
pc_header() {
...
num_sub_pc
for (i=0; i<num_sub_pc; i++)
  layer_id[i]
  branch_id[i]
    numPoint[i]
  coding_type[i]
  data_sub_cloud[i]()
} data_sub_cloud() { if (coding_type == 00)
  {
    coding_type_00_data
  }
  else if (coding_type == 01)
  {
    coding_type_01_data
  }
  ...
  end_of_data
}
```

```
pc_header () {
...
octree_scan_order
...
}
```

```
pc_header () {
...
limit_refer_flag
...
}
```

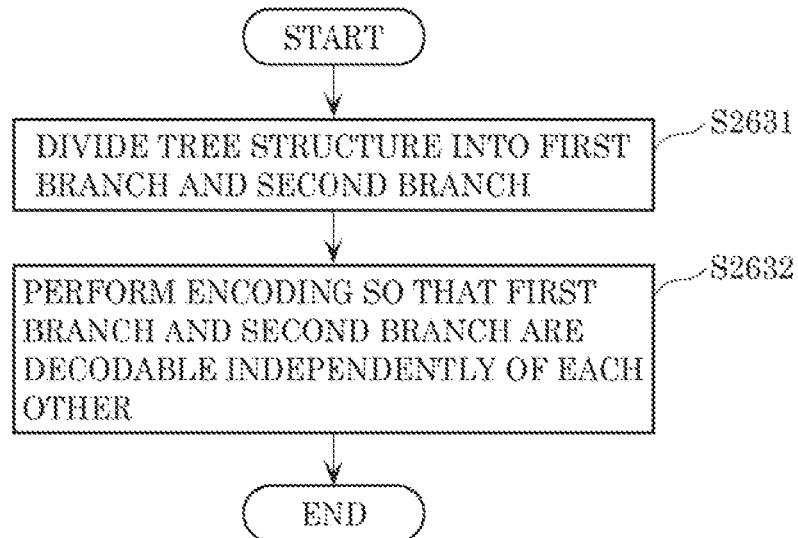
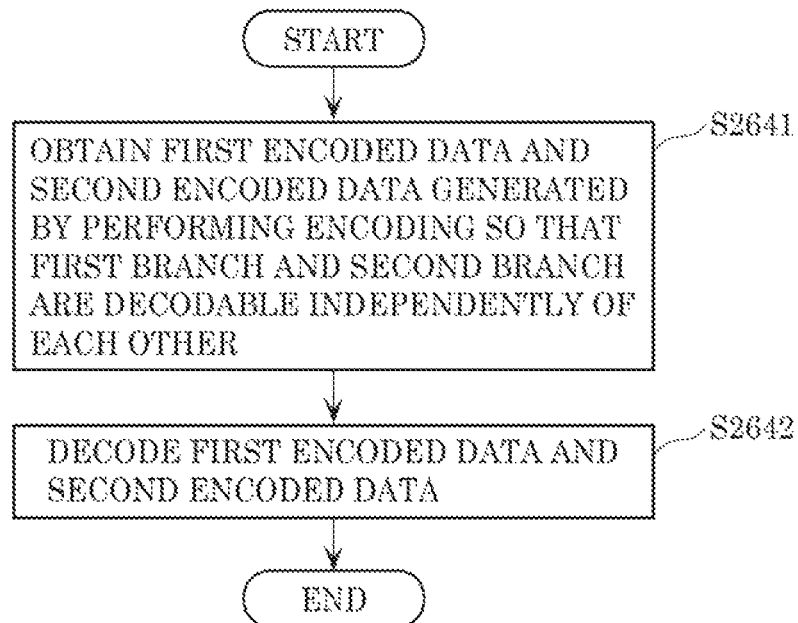

|  | WHOLE | 1/20 |
|---|---|---|
| MEMORY | 2000 MB | 100 MB |
| REQUIRED ACTUAL TIME | 132 s | 6.6 s |
| CURRENT DECODING TIME | 149.92 s | 0.80 s |
| DISTANCE | 2200 m | 220 m |

FIG. 139

| INPUT | 3 | 7 | 0 | 3 | 4 | 7 | 7 | 2 | 4 | 0 | 2 | 2 | 7 | 3 | 7 | 5 |
|---|---|---|---|---|---|---|---|---|---|---|---|---|---|---|---|---|
| OCTREE COUNTER | 0 | 1 | 2 | 3 | 4 | 5 | 6 | 7 | | | | | | | | |
| RESULT | 0 | 0 | 2 | 2 | 2 | 3 | 3 | 3 | 4 | 4 | 5 | 7 | 7 | 7 | 7 | 7 |

FIG. 141
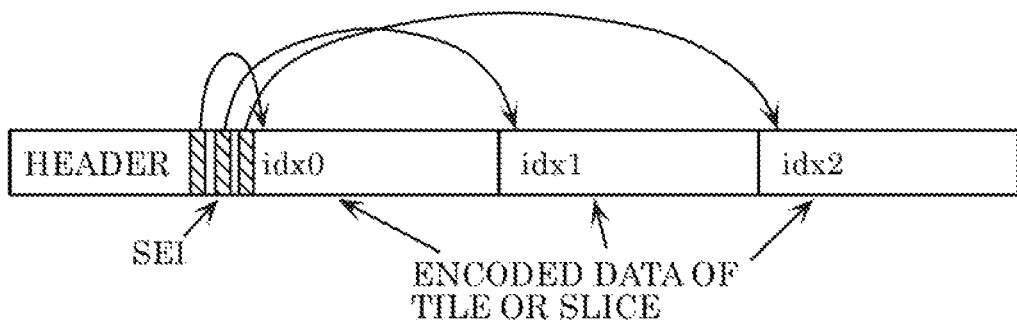
FIG. 142
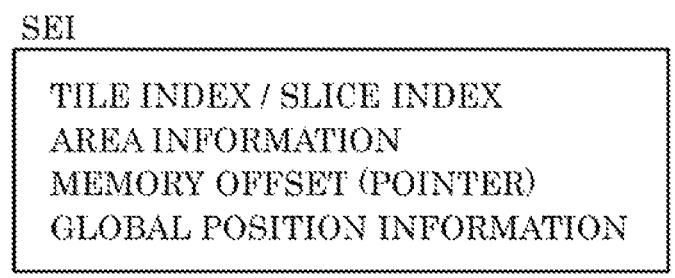
FIG. 143
```
Tile_Slice_Information_SEI{
for(Tile idx or Slice idx)
   Area Information(idx)
   Memory offset pointer(idx)
   Global position information(idx)
   other information(idx)
}
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2019/027401 filed on Jul. 10, 2019, claiming the benefit of priority of U.S. Provisional Patent Application No. 62/697,598 filed on Jul. 13, 2018, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point group in a three-dimensional space. In the point cloud scheme, the positions and colors of a point group are stored. While point cloud is expected to be a mainstream method of representing three-dimensional data, a massive amount of data of a point group necessitates compression of the amount of three-dimensional data by encoding for accumulation and transmission, as in the case of a two-dimensional moving picture (examples include MPEG-4 AVC and HEVC standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle is known (for example, see Patent Literature (PTL 1: International Publication WO 2014/020663).

SUMMARY

In encoding and decoding of three-dimensional data, it has been desired to reduce the amounts of processing performed by three-dimensional data decoding devices.

The present disclosure has an object to provide a three-dimensional data encoding method, a three-dimensional data decoding method, a three-dimensional data encoding device, or a three-dimensional data decoding device which enables reduction in the amount of processing performed by a three-dimensional data decoding device.

A three-dimensional data encoding method according to an aspect of the present disclosure includes generating a bitstream by encoding a plurality of subspaces included in a current space in which a plurality of three-dimensional points are included, the bitstream including a plurality of encoded data respectively corresponding to the plurality of subspaces. In the generating of the bitstream: a list of information about the plurality of subspaces is stored in first control information included in the bitstream, the plurality of subspaces being respectively associated with a plurality of identifiers assigned to the plurality of subspaces, the first control information being common to the plurality of encoded data; and each of the plurality of identifiers assigned to the plurality of subspaces respectively corresponding to the plurality of encoded data is stored in a header of a corresponding one of the plurality of encoded data.

A three-dimensional data decoding method according to an aspect of the present disclosure includes decoding a bitstream including a plurality of encoded data respectively corresponding to a plurality of subspaces included in a current space in which a plurality of three-dimensional points are included, the bitstream being obtained by encoding the plurality of subspaces. In the decoding of the bitstream: a current subspace to be decoded among the plurality of subspaces is determined; and encoded data of the current subspace is obtained using (i) a list of information about the plurality of subspaces respectively associated with a plurality of identifiers, and (ii) the plurality of identifiers, the list of information being included in first control information common to the plurality of encoded data, the first control information being included in the bitstream, each of the plurality of identifiers being included in a header of corresponding encoded data included in the plurality of encoded data and being assigned to the subspace corresponding to the corresponding encoded data.

The present disclosure has an object to provide a three-dimensional data encoding method, a three-dimensional data decoding method, a three-dimensional data encoding device, or a three-dimensional data decoding device which enables reduction in the amount of processing performed by a three-dimensional data decoding device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 31 is a flowchart of a three-dimensional data creation process performed by the client device according to Embodiment 6;

FIG. 32 is a flowchart of a sensor information transmission process performed by the client device according to Embodiment 6;

FIG. 41 is a diagram showing an example of bit sequences of the volume according to Embodiment 7;

FIG. 50 is a diagram showing an example syntax of a submap according to Embodiment 8;

FIG. 52 is a diagram showing an example syntax of a submap according to Embodiment 8;

FIG. 62 is a diagram showing an example syntax of a volume according to Embodiment 8;

FIG. 76 is a diagram illustrating an example of a syntax according to Embodiment 9;

FIG. 77 is a diagram illustrating an example of a dense branch according to Embodiment 9;

FIG. 78 is a diagram illustrating an example of a sparse branch according to Embodiment 9;

FIG. 82 is a diagram illustrating an example of a syntax according to the variation of Embodiment 9;

FIG. 108 is a flowchart of a three-dimensional data encoding process according to Embodiment 11;

FIG. 109 is a flowchart of a three-dimensional data decoding process according to Embodiment 11;

FIG. 119 is a diagram illustrating tile regions to be obtained by the car according to Embodiment 12;

FIG. 120 is a diagram illustrating an example of three-dimensional data according to Embodiment 12;

FIG. 121 is a diagram illustrating an example of data of a slice according to Embodiment 12;

FIG. 122 is a diagram illustrating an example of data of a slice according to Embodiment 12;

FIG. 123 is a diagram illustrating an example of data of a slice according to Embodiment 12;

FIG. 124 is a diagram illustrating an example of tiles according to Embodiment 12;

FIG. 125 is a diagram illustrating an example of tiles of an octree according to Embodiment 12;

FIG. 126 is a diagram illustrating an example of a bitstream according to Embodiment 12;

FIG. 127 is a diagram illustrating an example of a tile table according to Embodiment 12;

FIG. 128 is a diagram illustrating an example of a tile table according to Embodiment 12;

FIG. 129 is a diagram illustrating an example of a tile table according to Embodiment 12;

FIG. 130 is a diagram illustrating an example of a tile table according to Embodiment 12;

Figure 131:
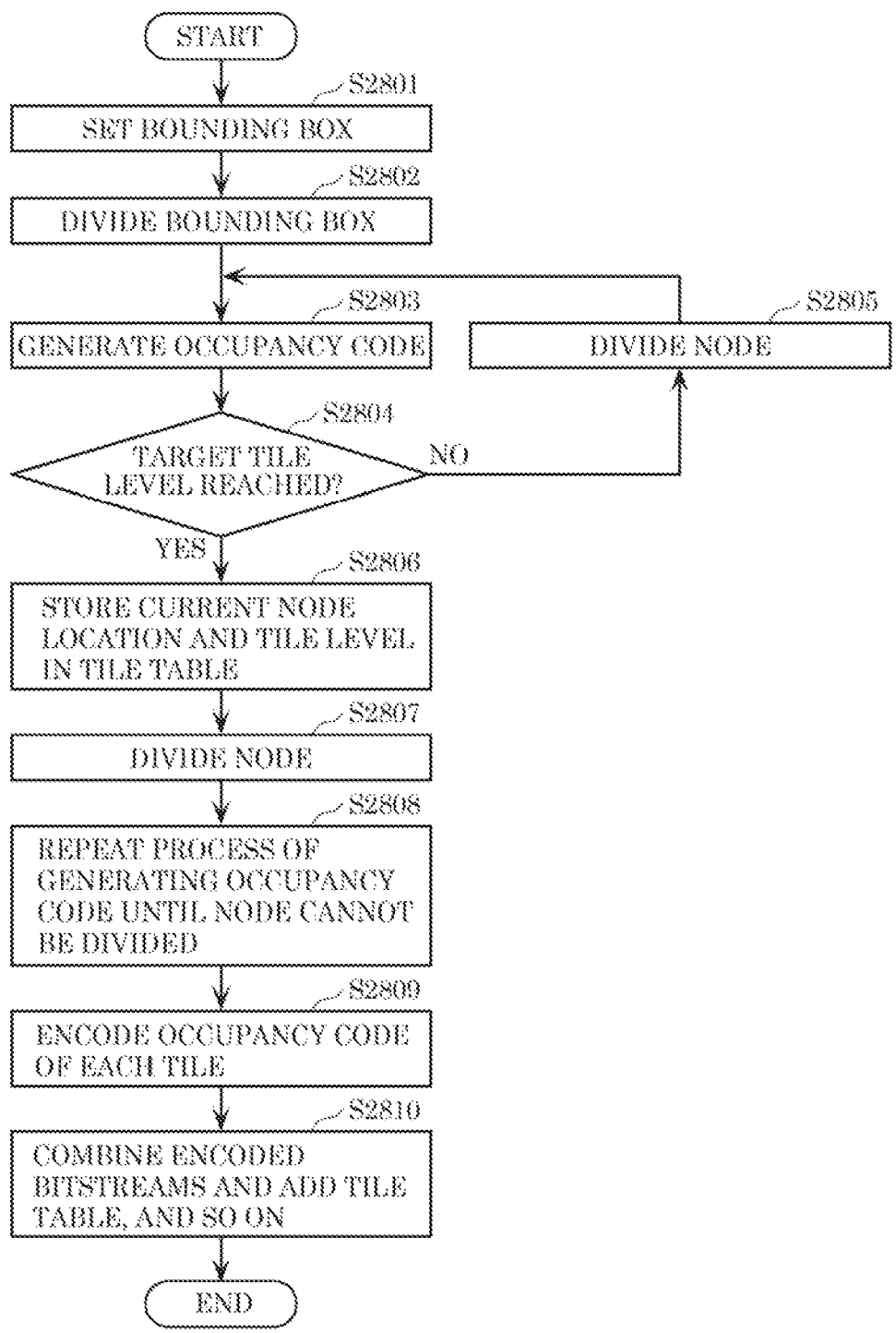
Figure 132:
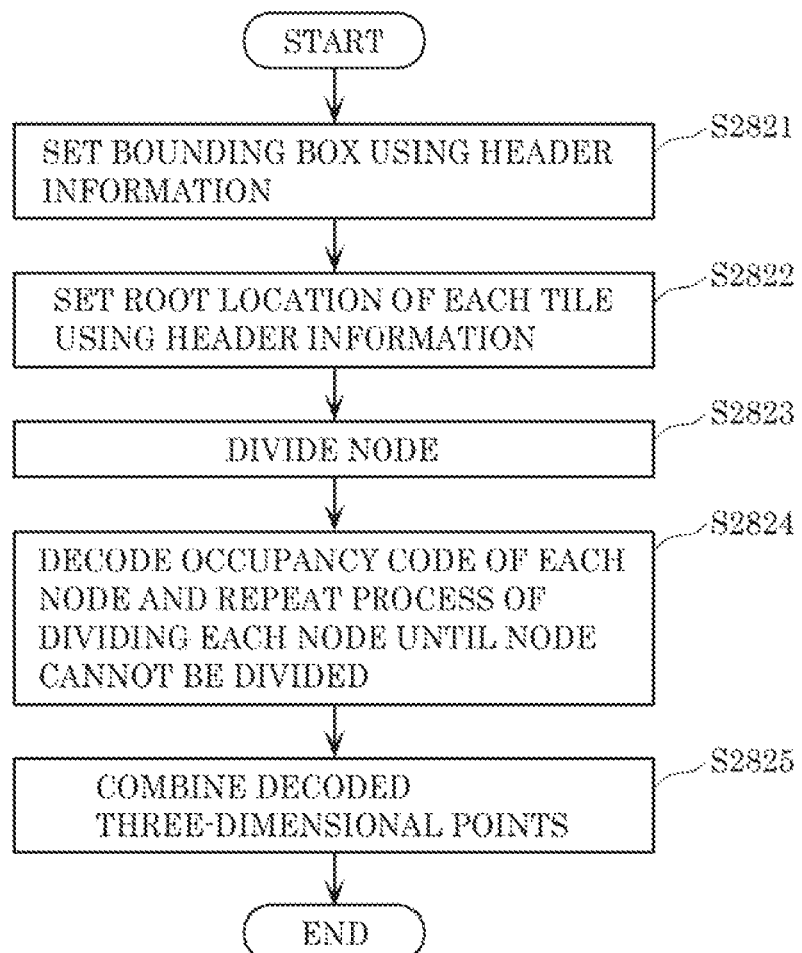
Figure 133:
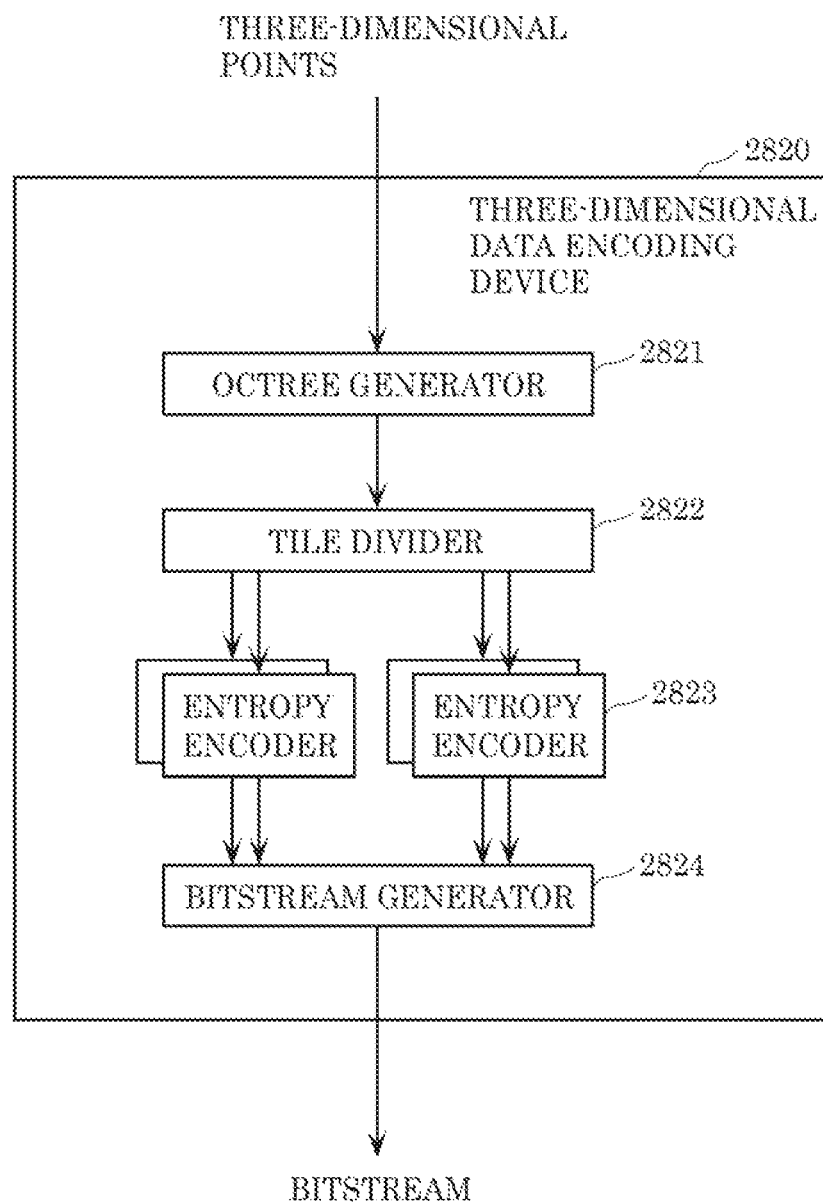
Figure 134:
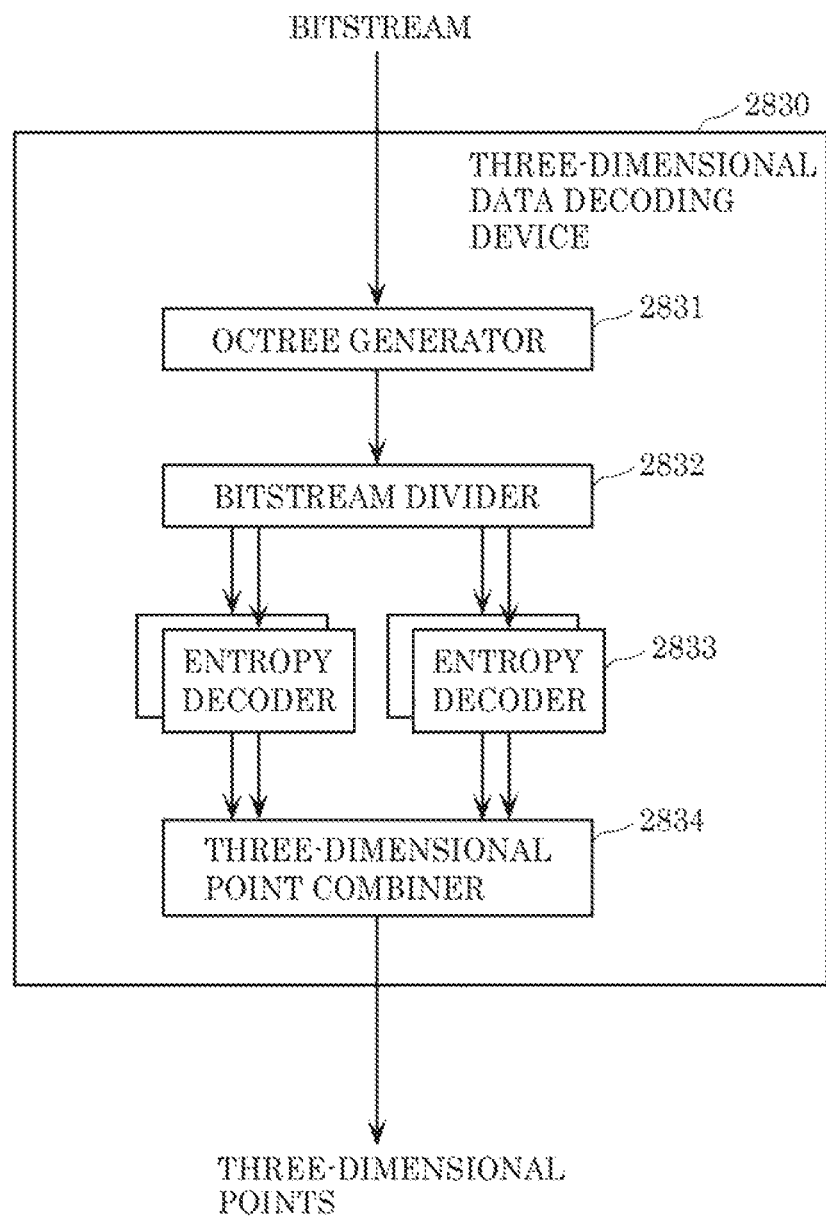
Figure 135:
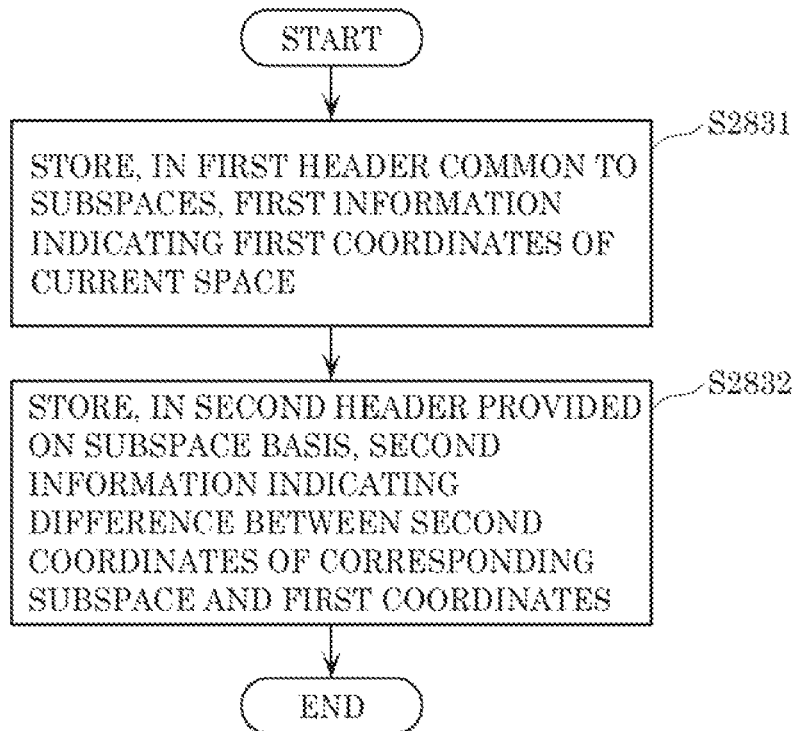
Figure 136:
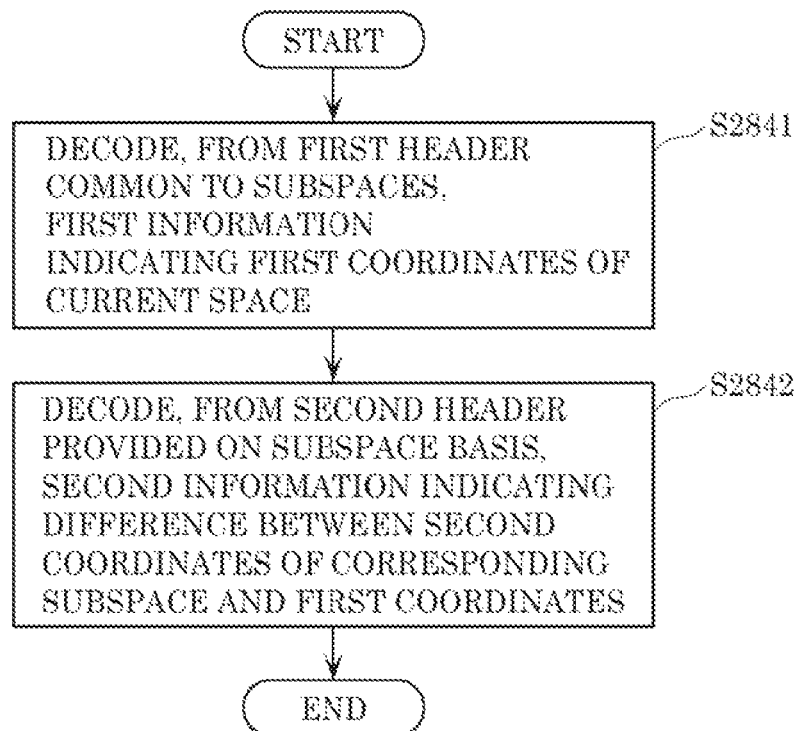
Figures 137, 138:
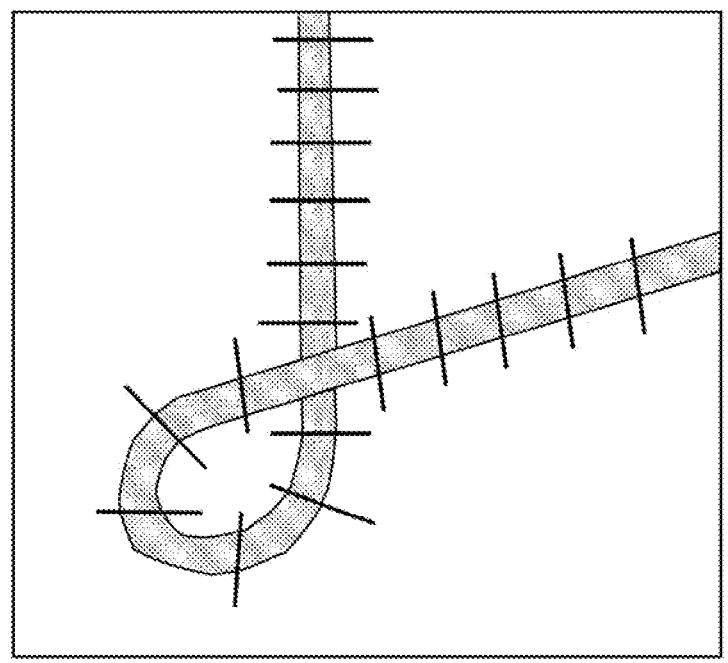
Figure 140:
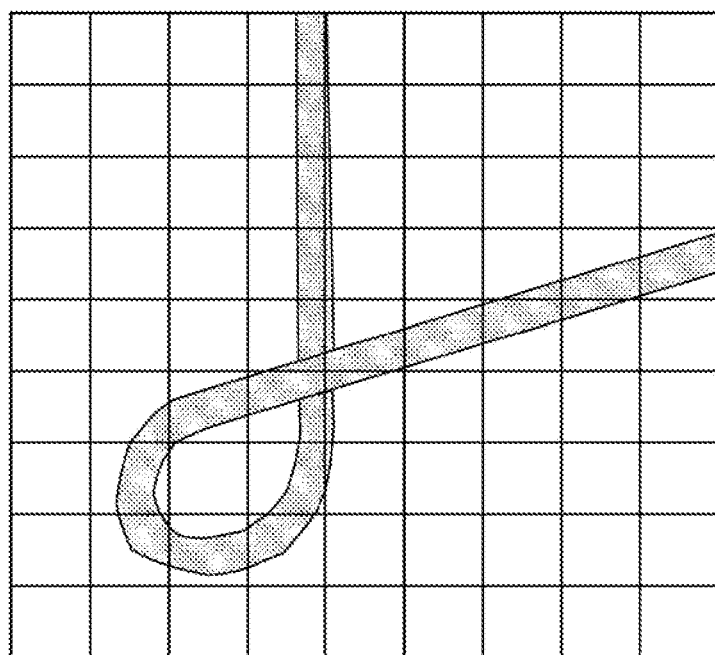
Figure 144:
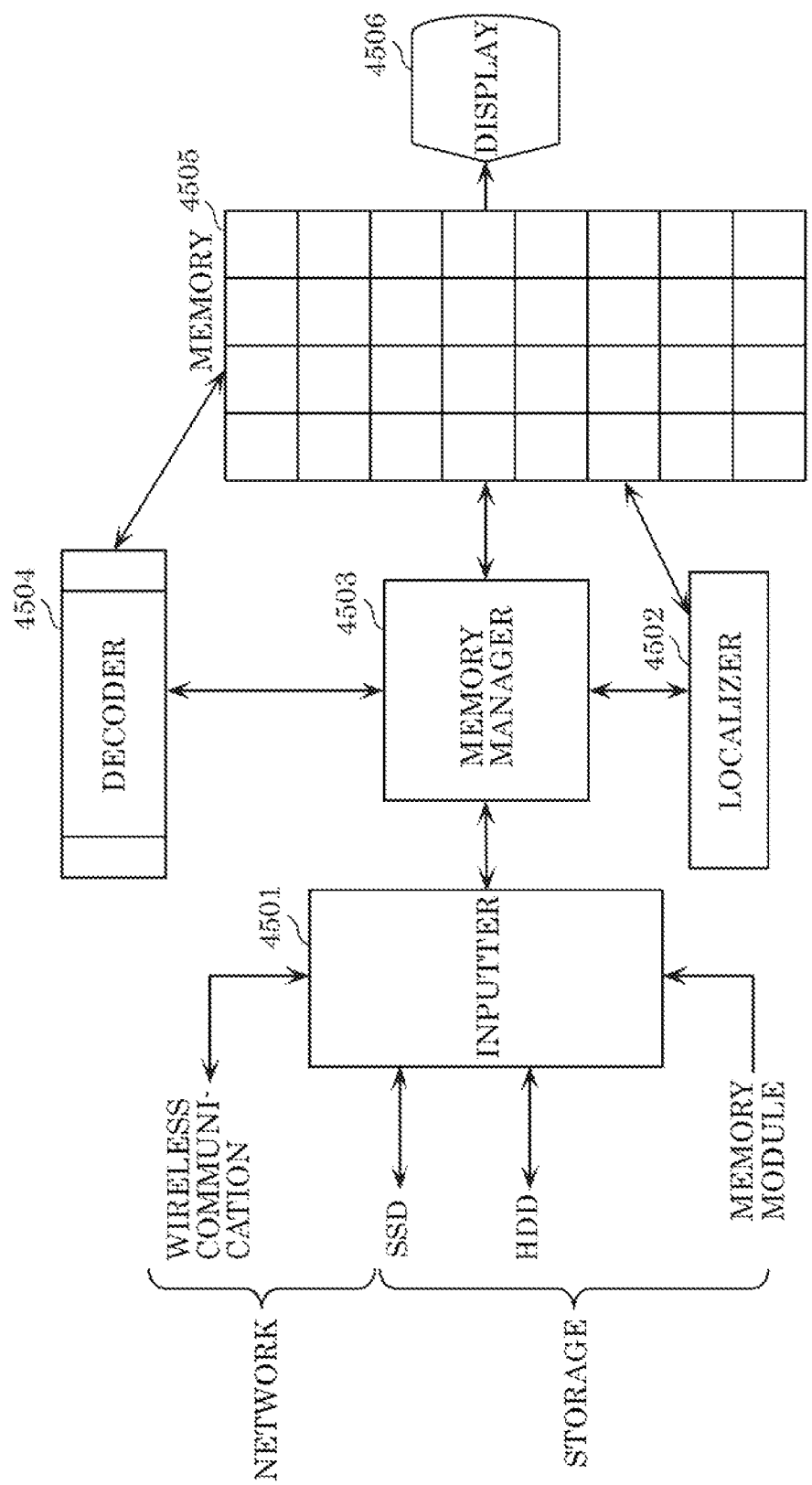
Figures 145, 146:
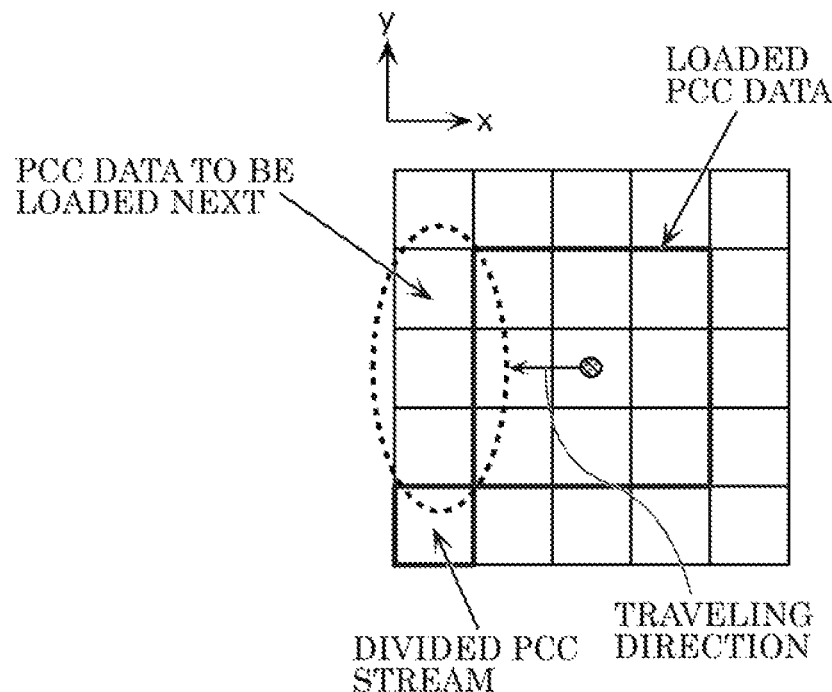
Figure 147:
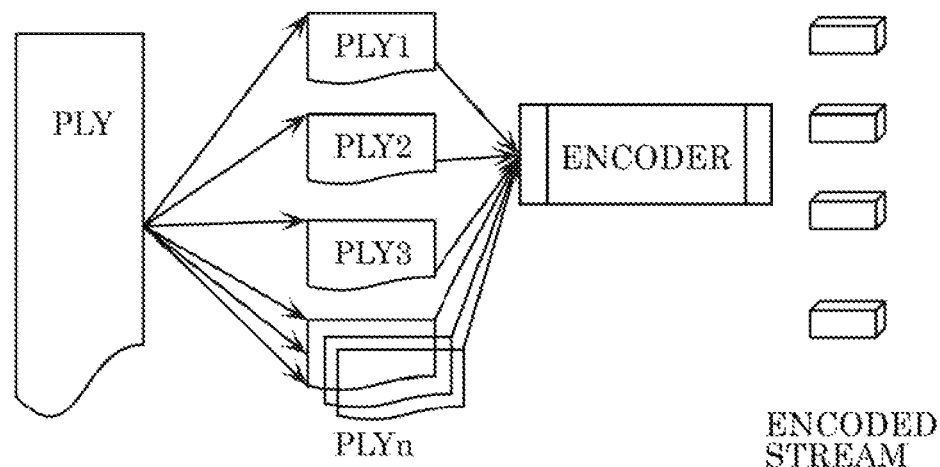
Figure 148:
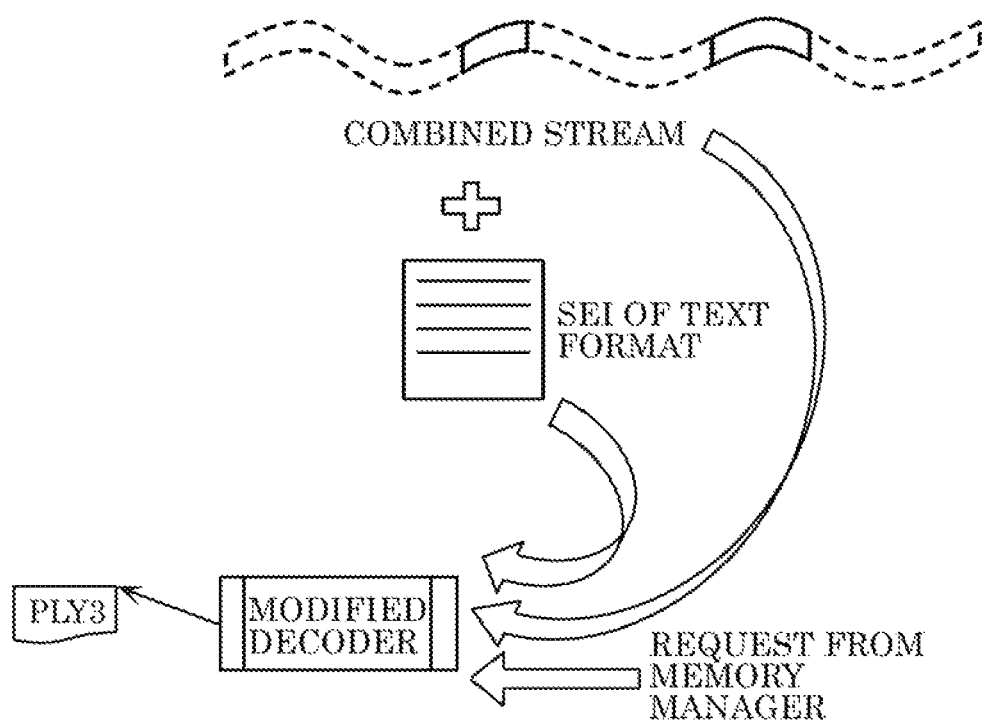
Figure 149:
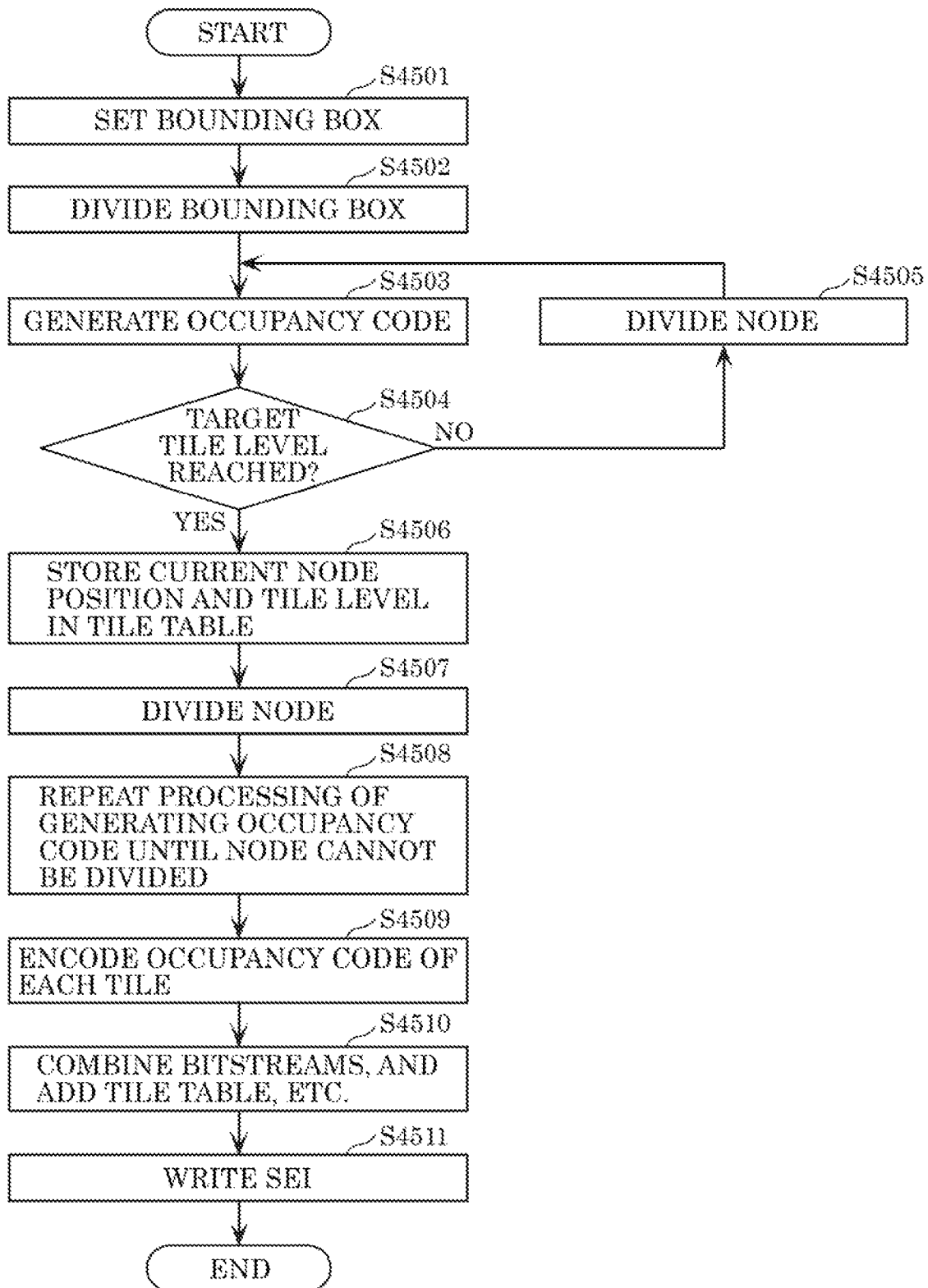
Figure 150:
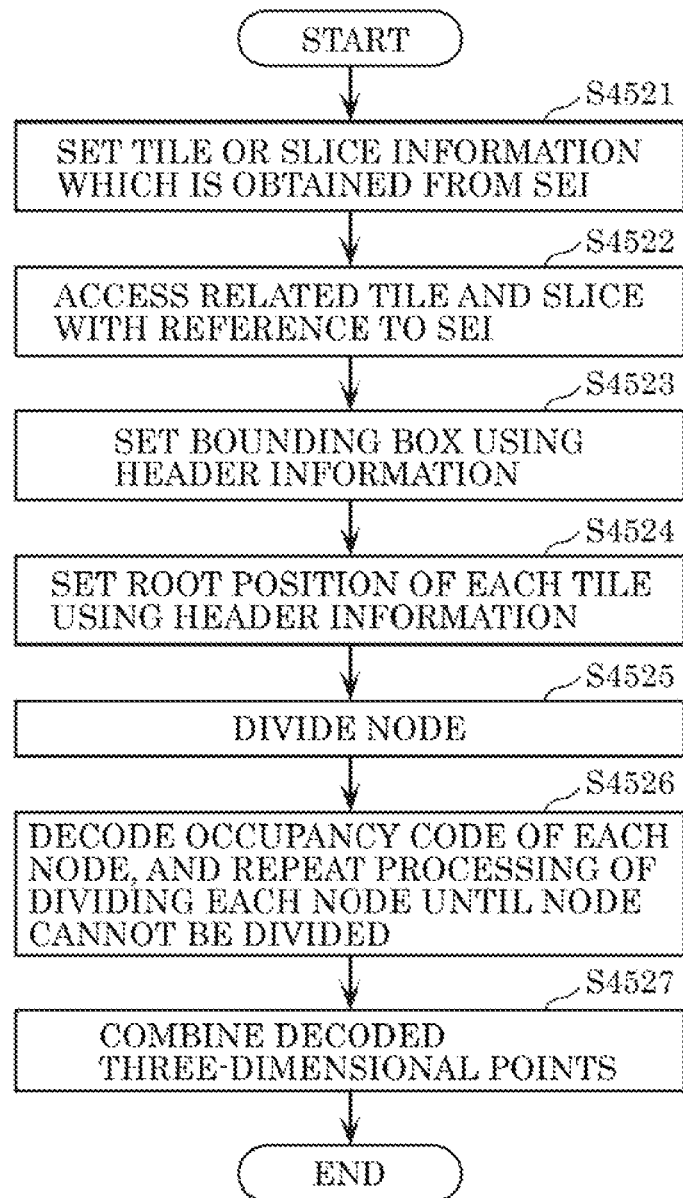
Figure 151:
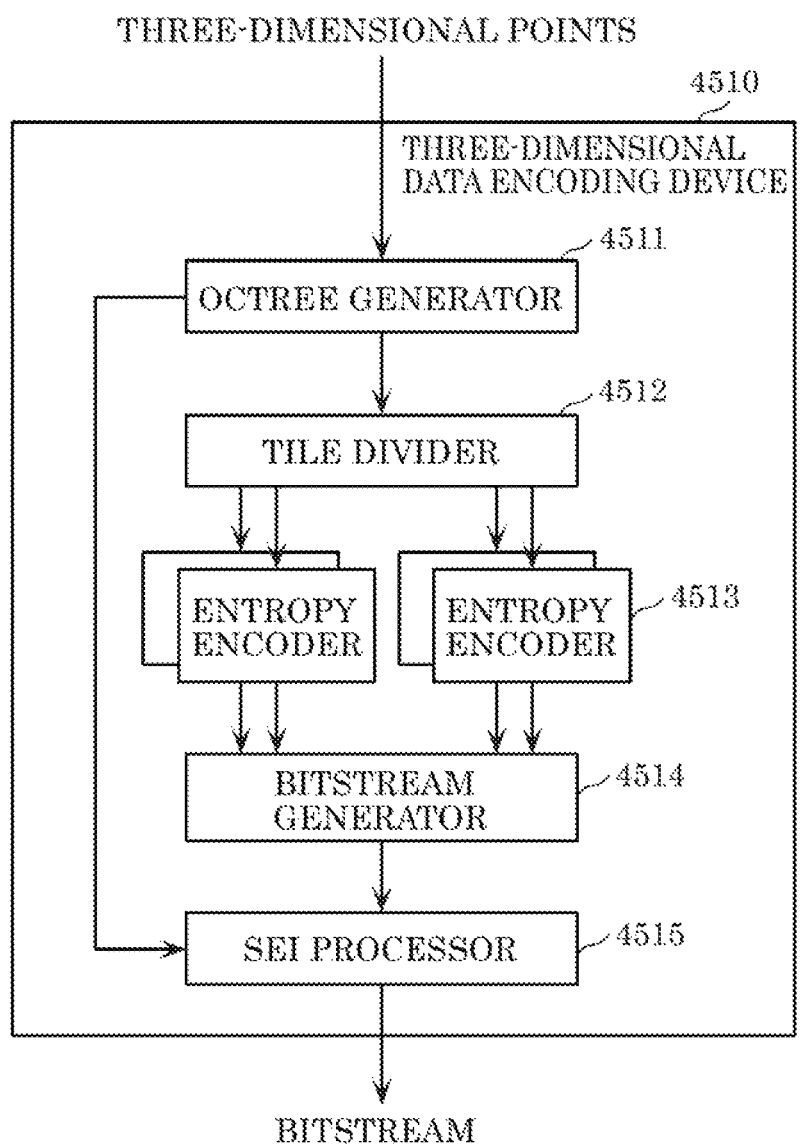
Figure 152:
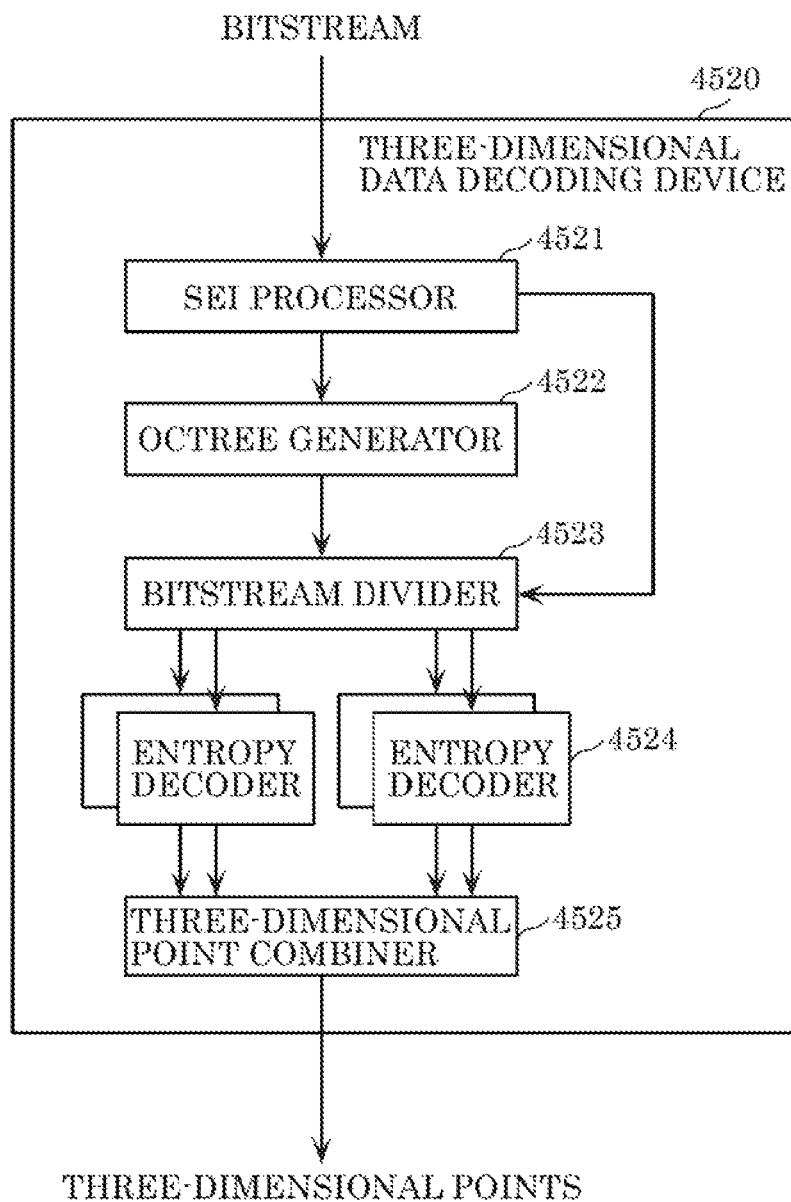
Figure 153:
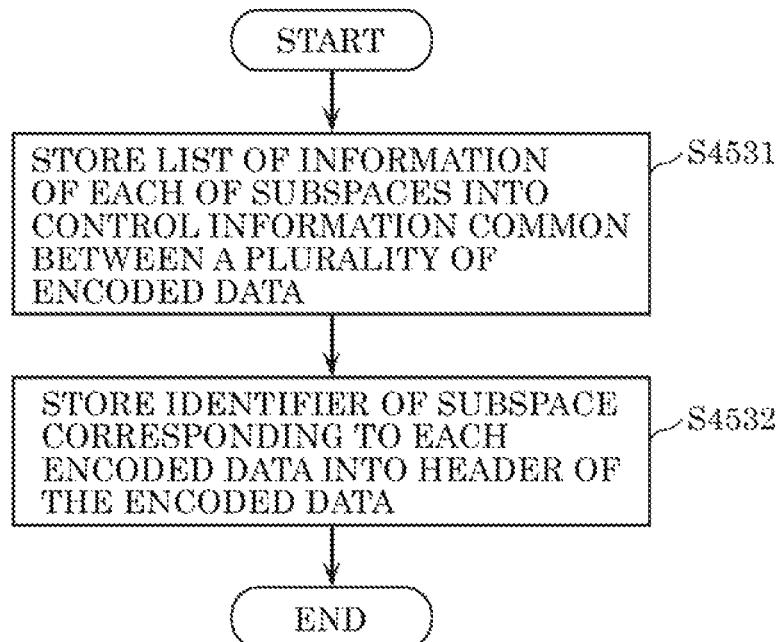
Figure 154:
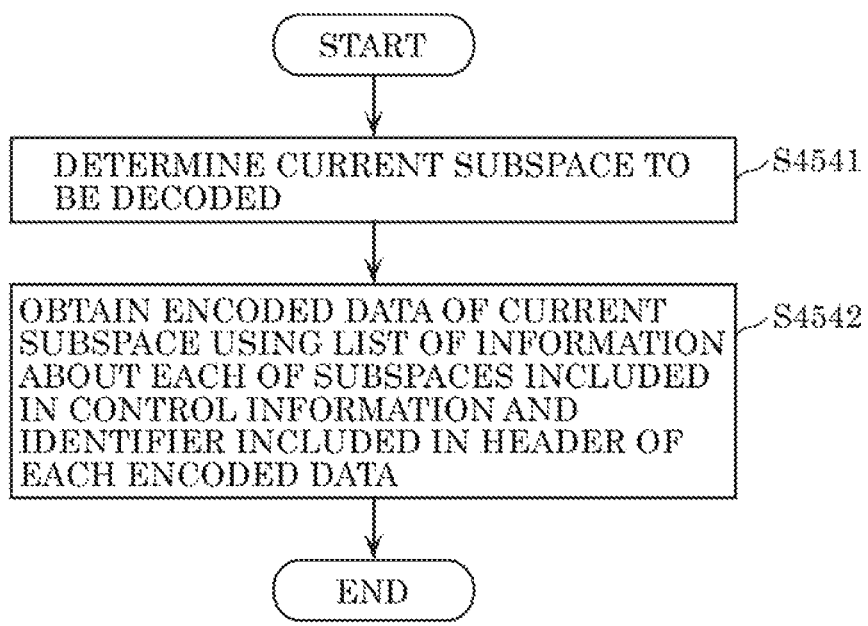

FIG. 131 is a flowchart of a three-dimensional data encoding process according to Embodiment 12;

FIG. 132 is a flowchart of a three-dimensional data decoding process according to Embodiment 12;

FIG. 133 is a block diagram of a three-dimensional data encoding device according to Embodiment 12;

FIG. 134 is a block diagram of a three-dimensional data decoding device according to Embodiment 12;

FIG. 135 is a flowchart of a three-dimensional data encoding process according to Embodiment 12;

FIG. 136 is a flowchart of a three-dimensional data decoding process according to Embodiment 12;

FIG. 137 is a diagram indicating a memory capacity, required actual time, current decoding time, and a current distance in the case where slice or tile division according to Embodiment 13 is performed, and a memory capacity, required actual time, current decoding time, and a current distance in the opposite case where the slice or tile division is not performed;

FIG. 138 is a diagram illustrating an example of tile or slice division according to Embodiment 13;

FIG. 139 is a diagram illustrating an example of a method of sorting counts in octree division according to Embodiment 13;

FIG. 140 is a diagram illustrating an example of tile or slice division according to Embodiment 13;

FIG. 141 is a diagram illustrating a structural example of a bitstream according to Embodiment 13;

FIG. 142 is a diagram illustrating a structural example of SEI according to Embodiment 13;

FIG. 143 is a diagram illustrating a syntax example of SEI according to Embodiment 13;

FIG. 144 is a diagram of a three-dimensional data decoding device according to Embodiment 13;

FIG. 145 is a diagram for illustrating an operation of obtaining tile or slice data according to Embodiment 13;

FIG. 146 is a diagram for illustrating an operation of obtaining tile or slice data according to Embodiment 13;

FIG. 147 is a diagram illustrating a test operation of SEI according to Embodiment 13;

FIG. 148 is a diagram illustrating a test operation of SEI according to Embodiment 13;

FIG. 149 is a flowchart of a three-dimensional data encoding process according to Embodiment 13;

FIG. 150 is a flowchart of a three-dimensional data decoding process according to Embodiment 13;

FIG. 151 is a block diagram of a three-dimensional data encoding device according to Embodiment 13;

FIG. 152 is a block diagram of a three-dimensional data decoding device according to Embodiment 13;

FIG. 153 is a flowchart of a three-dimensional data encoding process according to Embodiment 13; and FIG. 154 is a flowchart of a three-dimensional data decoding process according to Embodiment 13.

DETAILED DESCRIPTION OF THE EMBODIMENTS

A three-dimensional data encoding method according to an aspect of the present disclosure includes generating a bitstream by encoding a plurality of subspaces included in a current space in which a plurality of three-dimensional points are included, the bitstream including a plurality of encoded data respectively corresponding to the plurality of subspaces. In the generating of the bitstream: a list of information about the plurality of subspaces is stored in first control information included in the bitstream, the plurality of subspaces being respectively associated with a plurality of identifiers assigned to the plurality of subspaces, the first control information being common to the plurality of encoded data; and each of the plurality of identifiers assigned to the plurality of subspaces respectively corresponding to the plurality of encoded data is stored in a header of a corresponding one of the plurality of encoded data.

In this way, the three-dimensional data decoding device is capable of obtaining the desired encoded data with reference to (i) the list of information which is stored in the first control information and is about the plurality of subspaces respectively associated with the plurality of identifiers each stored in the header of the corresponding one of the plurality of encoded data and (ii) the plurality of identifiers when decoding the bitstream generated using the three-dimensional data encoding method. Accordingly, it is possible to reduce the amount of processing performed by the three-dimensional data decoding device.

For example, the first control information may be disposed ahead of the plurality of encoded data in the bitstream.

For example, the list may include position information of each of the plurality of subspaces.

For example, the list may include size information of each of the plurality of subspaces.

For example, the three-dimensional data encoding method may further include converting the first control information into second control information in accordance with a protocol supported by a system which is a transmission destination of the bitstream.

In this way, the three-dimensional data encoding method enables conversion of control information in accordance with the protocol supported by the transmission destination of the bitstream.

For example, the second control information may be a table for making random access in accordance with the protocol.

For example, the second control information may be an mdat box or a track box in ISO Base Media File Format (ISOMBFF).

A three-dimensional data decoding method according to an aspect of the present disclosure includes decoding a bitstream including a plurality of encoded data respectively corresponding to a plurality of subspaces included in a current space in which a plurality of three-dimensional points are included, the bitstream being obtained by encoding the plurality of subspaces. In the decoding of the bitstream: a current subspace to be decoded among the plurality of subspaces is determined; and encoded data of the current subspace is obtained using (i) a list of information about the plurality of subspaces respectively associated with a plurality of identifiers, and (ii) the plurality of identifiers, the list of information being included in first control information common to the plurality of encoded data, the first control information being included in the bitstream, each of the plurality of identifiers being included in a header of corresponding encoded data included in the plurality of encoded data and being assigned to the subspace corresponding to the corresponding encoded data.

In this way, the three-dimensional data decoding method is capable obtaining the desired encoded data with reference to (i) the list of information which is stored in the first control information and is about the plurality of subspaces respectively associated with the identifiers each stored in the header of the corresponding one of the plurality of encoded data and (ii) the plurality of identifiers. Accordingly it is possible to reduce the amount of processing performed by the three-dimensional data decoding device.

For example, the first control information may be disposed ahead of the plurality of encoded data in the bitstream.

For example, the list may include position information of each of the plurality of subspaces.

For example, the list may include size information of each of the plurality of subspaces.

In addition, a three-dimensional data encoding device according to an aspect of the present disclosure is a three-dimensional data encoder which encodes a plurality of three-dimensional points each including attribute information. The three-dimensional data encoder includes processor and memory. Using the memory, the processor generates a bitstream by encoding a plurality of subspaces included in a current space in which a plurality of three-dimensional points are included, the bitstream including a plurality of encoded data respectively corresponding to the plurality of subspaces; and when generating the bitstream: stores a list of information about the plurality of subspaces into first control information included in the bitstream, the plurality of subspaces being respectively associated with a plurality of identifiers assigned to the plurality of subspaces, the first control information being common to the plurality of encoded data; and stores each of the plurality of identifiers assigned to the plurality of subspaces respectively corresponding to the plurality of encoded data into a header of a corresponding one of the plurality of encoded data.

In this way, the three-dimensional data decoding device is capable of obtaining the desired encoded data with reference to (i) the list of information which is stored in the first control information and is about the plurality of subspaces respectively associated with the plurality of identifiers each stored in the header of the corresponding one of the plurality of encoded data and (ii) the plurality of identifiers when decoding the bitstream generated by the three-dimensional data encoding device. Accordingly, it is possible to reduce the amount of processing performed by the three-dimensional data decoding device.

A three-dimensional data decoding device according to an aspect of the present disclosure a three-dimensional data decoder which decodes a plurality of three-dimensional points each including attribute information. The three-dimensional data decoder includes processor and memory. Using the memory the processor decodes a bitstream including a plurality of encoded data respectively corresponding to a plurality of subspaces included in a current space in which a plurality of three-dimensional points are included, the bitstream being obtained by encoding the plurality of subspaces; and when decoding the bitstream: determines a current subspace to be decoded among the plurality of subspaces; and obtains encoded data of the current subspace using (i) a list of information about the plurality of subspaces respectively associated with a plurality of identifiers, and (ii) the plurality of identifiers, the list of information being included in first control information common to the plurality of encoded data, the first control information being included in the bitstream, each of the plurality of identifiers being included in a header of corresponding encoded data included in the plurality of encoded data and being assigned to the subspace corresponding to the corresponding encoded data.

In this way, the three-dimensional data decoding method is capable obtaining the desired encoded data with reference to (i) the list of information which is stored in the first control information and about the plurality of subspaces respectively associated with the identifiers each stored in the header of the corresponding one of the plurality of encoded data and (ii) the plurality of identifiers. Accordingly, it is possible to reduce the amount of processing performed by the three-dimensional data decoding device.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

Figure 1:
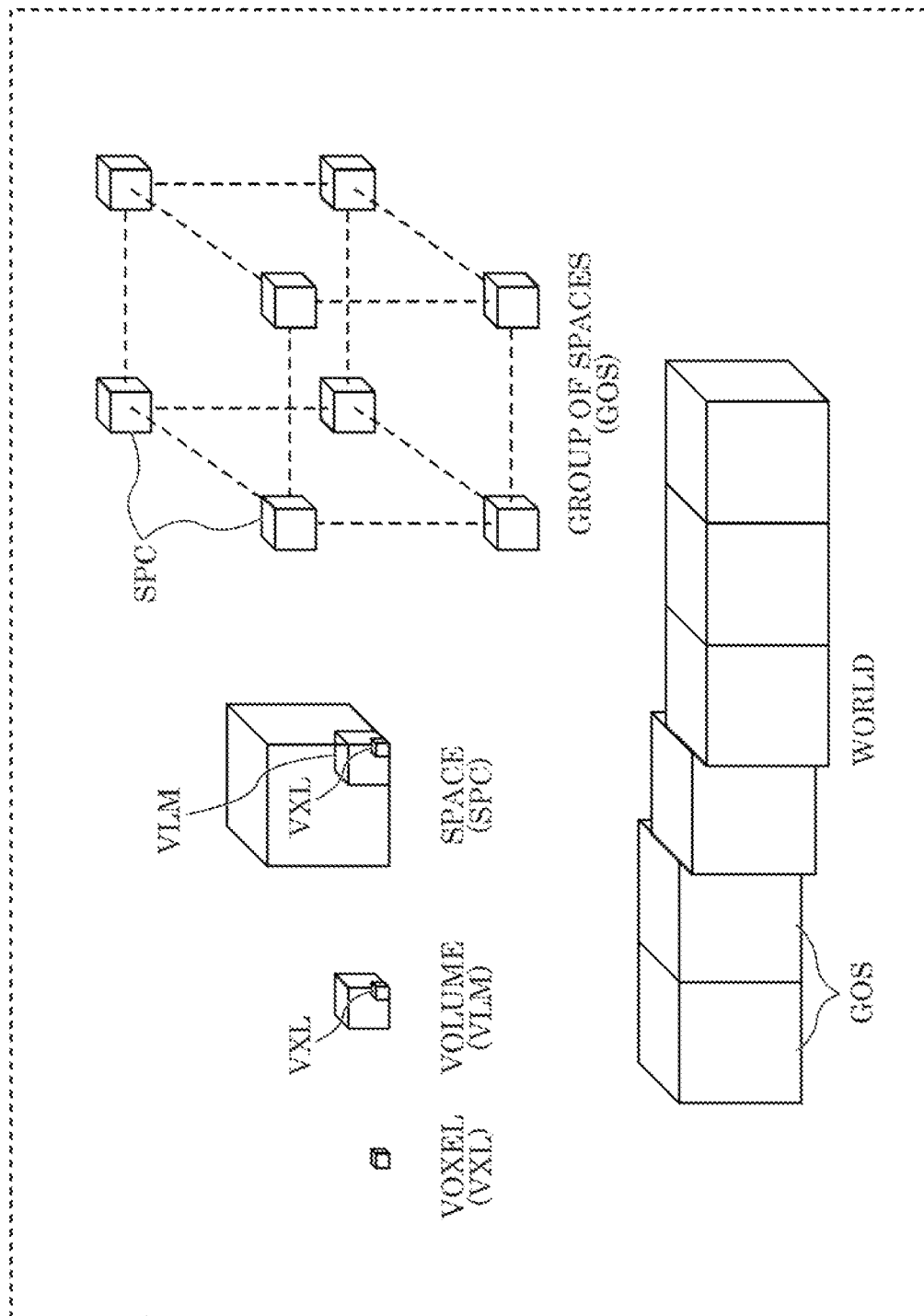
FIG. 1 is a diagram showing the structure of encoded three-dimensional data according to Embodiment 1.

First, the data structure of encoded three-dimensional data (hereinafter also referred to as encoded data) according to the present embodiment will be described. FIG. 1 is a diagram showing the structure of encoded three-dimensional data according to the present embodiment.

In the present embodiment, a three-dimensional space is divided into spaces (SPCs), which correspond to pictures in moving picture encoding, and the three-dimensional data is encoded on a SPC-by-SPC basis. Each SPC is further divided into volumes (VLMs), which correspond to macroblocks, etc. in moving picture encoding, and predictions and transforms are performed on a VLM-by-VLM basis. Each volume includes a plurality of voxels (VXLs), each being a minimum unit in which position coordinates are associated. Note that prediction is a process of generating predictive three-dimensional data analogous to a current processing unit by referring to another processing unit, and encoding a differential between the predictive three-dimensional data and the current processing unit, as in the case of predictions performed on two-dimensional images. Such prediction includes not only spatial prediction in which another prediction unit corresponding to the same time is referred to, but also temporal prediction in which a prediction unit corresponding to a different time is referred to.

When encoding a three-dimensional space represented by point group data such as a point cloud, for example, the three-dimensional data encoding device (hereinafter also referred to as the encoding device) encodes the points in the point group or points included in the respective voxels in a collective manner, in accordance with a voxel size. Finer voxels enable a highly-precise representation of the three-dimensional shape of a point group, while larger voxels enable a rough representation of the three-dimensional shape of a point group.

Note that the following describes the case where three-dimensional data is a point cloud, but three-dimensional data is not limited to a point cloud, and thus three-dimensional data of any format may be employed.

Also note that voxels with a hierarchical structure may be used. In such a case, when the hierarchy includes n levels, whether a sampling point is included in the n-lth level or lower levels (levels below the n-th level) may be sequentially indicated. For example, when only the n-th level is decoded, and the n-lth level or lower levels include a sampling point, the n-th level can be decoded on the assumption that a sampling point is included at the center of a voxel in the n-th level.

Also, the encoding device obtains point group data, using, for example, a distance sensor, a stereo camera, a monocular camera, a gyroscope sensor, or an inertial sensor.

As in the case of moving picture encoding, each SPC is classified into one of at least the three prediction structures that include: intra SPC (I-SPC), which is individually decodable; predictive SPC (P-SPC) capable of only a unidirectional reference; and bidirectional SPC (B-SPC) capable of bidirectional references. Each SPC includes two types of time information: decoding time and display time.

Furthermore, as shown in FIG. 1, a processing unit that includes a plurality of SPCs is a group of spaces (GOS), which is a random access unit. Also, a processing unit that includes a plurality of GOSs is a world (WLD).

The spatial region occupied by each world is associated with an absolute position on earth, by use of, for example, GPS, or latitude and longitude information. Such position information is stored as meta-information. Note that meta-information may be included in encoded data, or may be transmitted separately from the encoded data.

Also, inside a GOS, all SPCs may be three-dimensionally adjacent to one another, or there may be a SPC that is not three-dimensionally adjacent to another SPC.

Note that the following also describes processes such as encoding, decoding, and reference to be performed on three-dimensional data included in processing units such as GOS, SPC, and VLM, simply as performing encoding/to encode, decoding/to decode, referring to, etc. on a processing unit. Also note that three-dimensional data included in a processing unit includes, for example, at least one pair of a spatial position such as three-dimensional coordinates and an attribute value such as color information.

Next, the prediction structures among SPCs in a GOS will be described. A plurality of SPCs in the same GOS or a plurality of VLMs in the same SPC occupy mutually different spaces, while having the same time information (the decoding time and the display time).

A SPC in a GOS that comes first in the decoding order is an I-SPC. GOSs come in two types: closed GOS and open GOS. A closed GOS is a GOS in which all SPCs in the GOS are decodable when decoding starts from the first I-SPC. Meanwhile, an open GOS is a GOS in which a different GOS is referred to in one or more SPCs preceding the first I-SPC in the GOS in the display time, and thus cannot be singly decoded.

Note that in the case of encoded data of map information, for example, a WLD is sometimes decoded in the backward direction, which is opposite to the encoding order, and thus backward reproduction is difficult when GOSs are interdependent. In such a case, a closed GOS is basically used.

Each GOS has a layer structure in height direction, and SPCs are sequentially encoded or decoded from SPCs in the bottom layer.

Figure 2:
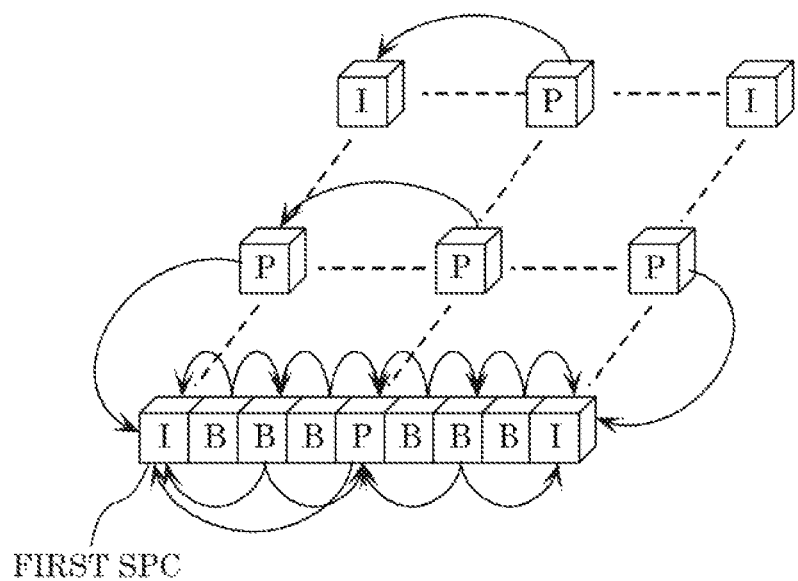
FIG. 2 is a diagram showing an example of prediction structures among SPCs that belong to the lowermost layer in a GOS according to Embodiment 1.
Figure 3:
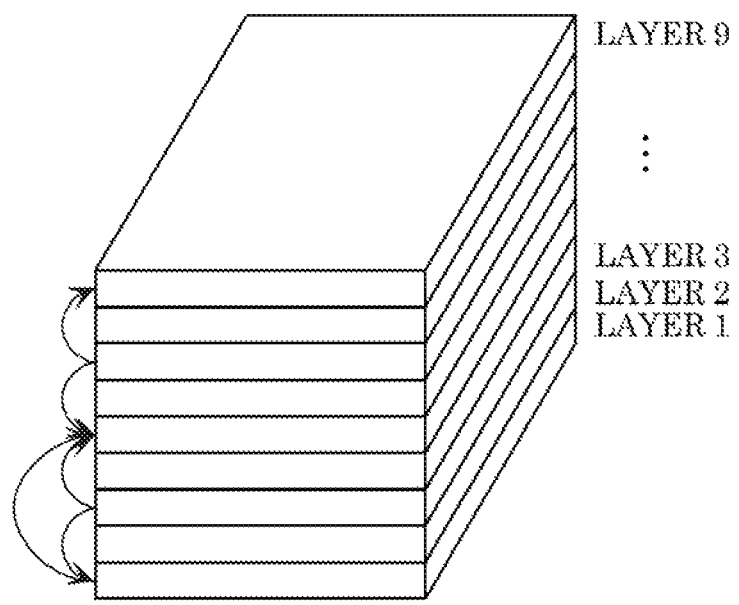
FIG. 3 is a diagram showing an example of prediction structures among layers according to Embodiment 1.

FIG. 2 is a diagram showing an example of prediction structures among SPCs that belong to the lowermost layer in a GOS. FIG. 3 is a diagram showing an example of prediction structures among layers.

A GOS includes at least one I-SPC. Of the objects in a three-dimensional space, such as a person, an animal, a car, a bicycle, a signal, and a building serving as a landmark, a small-sized object is especially effective when encoded as an I-SPC. When decoding a GOS at a low throughput or at a high speed, for example, the three-dimensional data decoding device (hereinafter also referred to as the decoding device) decodes only I-SPC(s) in the GOS.

The encoding device may also change the encoding interval or the appearance frequency of I-SPCs, depending on the degree of sparseness and denseness of the objects in a WLD.

In the structure shown in FIG. 3, the encoding device or the decoding device encodes or decodes a plurality of layers sequentially from the bottom layer (layer 1). This increases the priority of data on the ground and its vicinity, which involve a larger amount of information, when, for example, a self-driving car is concerned.

Regarding encoded data used for a drone, for example, encoding or decoding may be performed sequentially from SPCs in the top layer in a GOS in height direction.

The encoding device or the decoding device may also encode or decode a plurality of layers in a manner that the decoding device can have a rough grasp of a GOS first, and then the resolution is gradually increased. The encoding device or the decoding device may perform encoding or decoding in the order of layers 3, 8, 1, 9 . . . , for example.

Next, the handling of static objects and dynamic objects will be described.

A three-dimensional space includes scenes or still objects such as a building and a road (hereinafter collectively referred to as static objects), and objects with motion such as a car and a person (hereinafter collectively referred to as dynamic objects). Object detection is separately performed by, for example, extracting keypoints from point cloud data, or from video of a camera such as a stereo camera. In this description, an example method of encoding a dynamic object will be described.

A first method is a method in which a static object and a dynamic object are encoded without distinction. A second method is a method in which a distinction is made between a static object and a dynamic object on the basis of identification information.

For example, a GOS is used as an identification unit. In such a case, a distinction is made between a GOS that includes SPCs constituting a static object and a GOS that includes SPCs constituting a dynamic object, on the basis of identification information stored in the encoded data or stored separately from the encoded data.

Alternatively, a SPC may be used as an identification unit. In such a case, a distinction is made between a SPC that includes VLMs constituting a static object and a SPC that includes VLMs constituting a dynamic object, on the basis of the identification information thus described.

Alternatively, a VLM or a VXL may be used as an identification unit. In such a case, a distinction is made between a VLM or a VXL that includes a static object and a VLM or a VXL that includes a dynamic object, on the basis of the identification information thus described.

The encoding device may also encode a dynamic object as at least one VLM or SPC, and may encode a VLM or a SPC including a static object and a SPC including a dynamic object as mutually different GOSs. When the GOS size is variable depending on the size of a dynamic object, the encoding device separately stores the GOS size as meta-information.

The encoding device may also encode a static object and a dynamic object separately from each other, and may superimpose the dynamic object onto a world constituted by static objects. In such a case, the dynamic object is constituted by at least one SPC, and each SPC is associated with at least one SPC constituting the static object onto which the each SPC is to be superimposed. Note that a dynamic object may be represented not by SPC(s) but by at least one VLM or VXL.

The encoding device may also encode a static object and a dynamic object as mutually different streams.

The encoding device may also generate a GOS that includes at least one SPC constituting a dynamic object. The encoding device may further set the size of a GOS including a dynamic object (GOS_M) and the size of a GOS including a static object corresponding to the spatial region of GOS_M at the same size (such that the same spatial region is occupied). This enables superimposition to be performed on a GOS-by-GOS basis.

SPC(s) included in another encoded GOS may be referred to in a P-SPC or a B-SPC constituting a dynamic object. In the case where the position of a dynamic object temporally changes, and the same dynamic object is encoded as an object in a GOS corresponding to a different time, referring to SPC(s) across GOSs is effective in terms of compression rate.

The first method and the second method may be selected in accordance with the intended use of encoded data. When encoded three-dimensional data is used as a map, for example, a dynamic object is desired to be separated, and thus the encoding device uses the second method. Meanwhile, the encoding device uses the first method when the separation of a dynamic object is not required such as in the case where three-dimensional data of an event such as a concert and a sports event is encoded.

The decoding time and the display time of a GOS or a SPC are storable in encoded data or as meta-information. All static objects may have the same time information. In such a case, the decoding device may determine the actual decoding time and display time. Alternatively a different value may be assigned to each OS or SPC as the decoding time, and the same value may be assigned as the display time. Furthermore, as in the case of the decoder model in moving picture encoding such as Hypothetical Reference Decoder (HRD) compliant with HEVC, a model may be employed that ensures that a decoder can perform decoding without fail by having a buffer of a predetermined size and by reading a bitstream at a predetermined bit rate in accordance with the decoding times.

Figure 4:
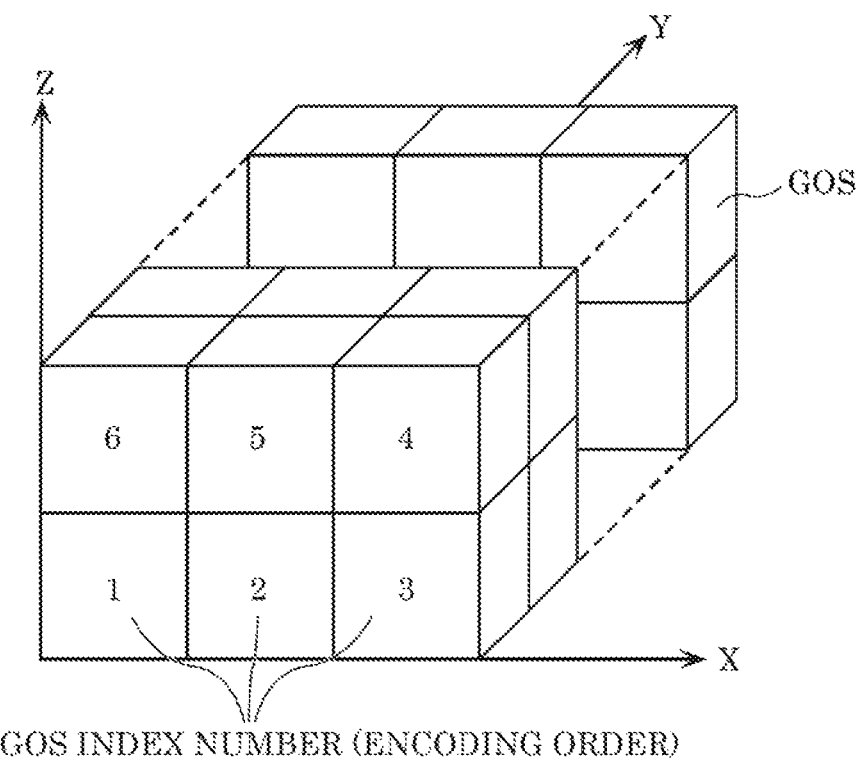
FIG. 4 is a diagram showing an example order of encoding GOSs according to Embodiment 1.

Next, the topology of GOSs in a world will be described. The coordinates of the three-dimensional space in a world are represented by the three coordinate axes (x axis, y axis, and z axis) that are orthogonal to one another. A predetermined rule set for the encoding order of GOSs enables encoding to be performed such that spatially adjacent GOSs are contiguous in the encoded data. In an example shown in FIG. 4, for example, GOSs in the x and z planes are successively encoded. After the completion of encoding all GOSs in certain x and z planes, the value of the y axis is updated. Stated differently the world expands in the y axis direction as the encoding progresses. The GOS index numbers are set in accordance with the encoding order.

Here, the three-dimensional spaces in the respective worlds are previously associated one-to-one with absolute geographical coordinates such as GPS coordinates or latitude/longitude coordinates. Alternatively, each three-dimensional space may be represented as a position relative to a previously set reference position. The directions of the x axis, the y axis, and the z axis in the three-dimensional space are represented by directional vectors that are determined on the basis of the latitudes and the longitudes, etc. Such directional vectors are stored together with the encoded data as meta-information.

GOSs have a fixed size, and the encoding device stores such size as meta-information. The GOS size may be changed depending on, for example, whether it is an urban area or not, or whether it is inside or outside of a room. Stated differently, the GOS size may be changed in accordance with the amount or the attributes of objects with information values. Alternatively, in the same world, the encoding device may adaptively change the GOS size or the interval between I-SPCs in GOSs in accordance with the object density, etc. For example, the encoding device sets the GOS size to smaller and the interval between I-SPCs in GOSs to shorter, as the object density is higher.

Figure 5:
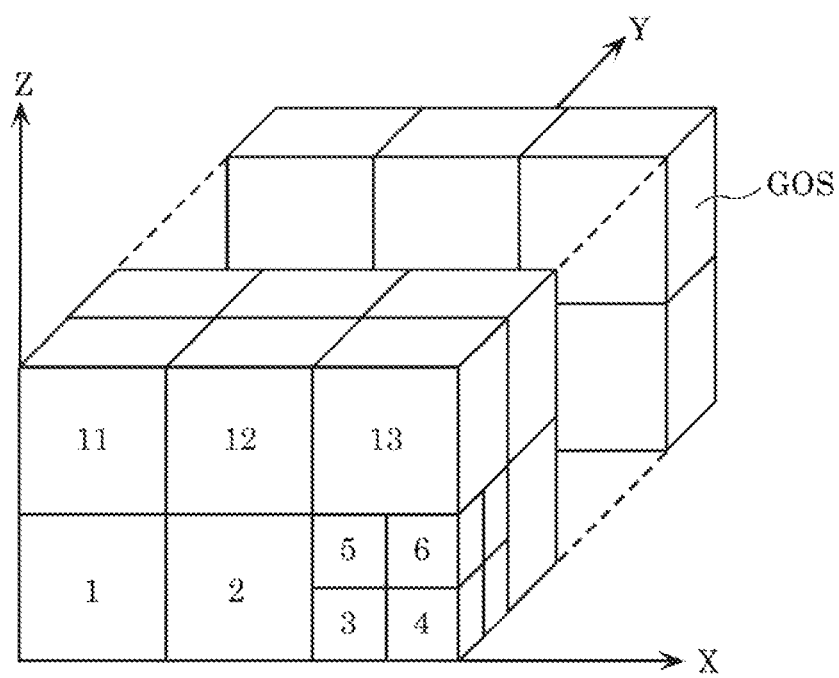
FIG. 5 is a diagram showing an example order of encoding GOSs according to Embodiment 1.

In an example shown in FIG. 5, to enable random access with a finer granularity, a GOS with a high object density is partitioned into the regions of the third to tenth GOSs. Note that the seventh to tenth GOSs are located behind the third to sixth GOSs.

Figure 6:
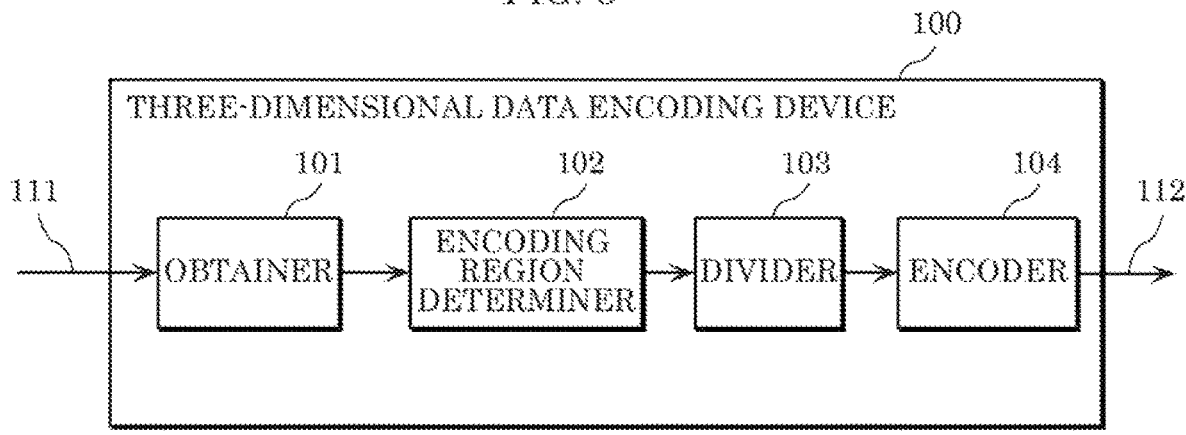
FIG. 6 is a block diagram of a three-dimensional data encoding device according to Embodiment 1.
Figure 7:
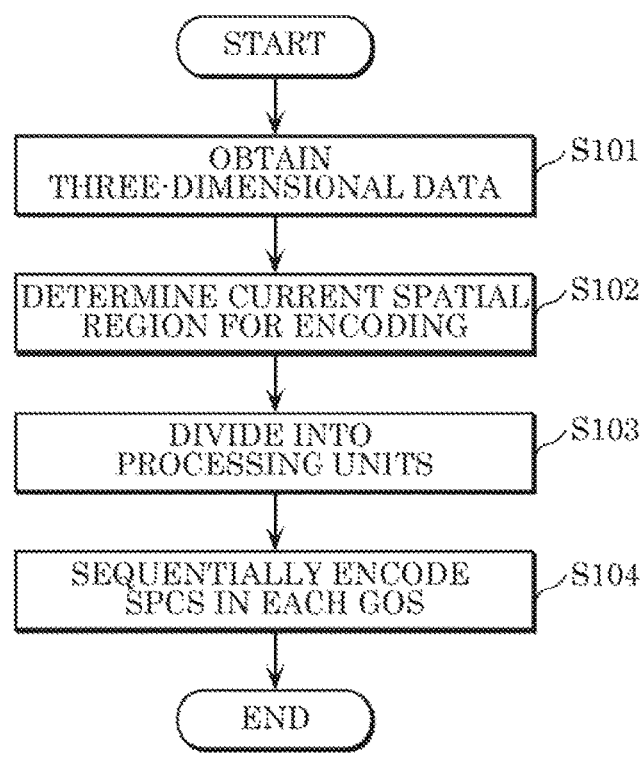
FIG. 7 is a flowchart of encoding processes according to Embodiment 1.

Next, the structure and the operation flow of the three-dimensional data encoding device according to the present embodiment will be described. FIG. 6 is a block diagram of three-dimensional data encoding device 100 according to the present embodiment. FIG. 7 is a flowchart of an example operation performed by three-dimensional data encoding device 100.

Three-dimensional data encoding device 100 shown in FIG. 6 encodes three-dimensional data 111, thereby generating encoded three-dimensional data 112. Such three-dimensional data encoding device 100 includes obtainer 101, encoding region determiner 102, divider 103, and encoder 104.

As shown in FIG. 7, first, obtainer 101 obtains three-dimensional data 111, which is point group data (S101).

Next, encoding region determiner 102 determines a current region for encoding from among spatial regions corresponding to the obtained point group data (S102). For example, in accordance with the position of a user or a vehicle, encoding region determiner 102 determines, as the current region, a spatial region around such position.

Next, divider 103 divides the point group data included in the current region into processing units. The processing units here means units such as GOSs and SPCs described above. The current region here corresponds to, for example, a world described above. More specifically, divider 103 divides the point group data into processing units on the basis of a predetermined GOS size, or the presence/absence/size of a dynamic object (S103). Divider 103 further determines the starting position of the SPC that comes first in the encoding order in each GOS.

Next, encoder 104 sequentially encodes a plurality of SPCs in each GOS, thereby generating encoded three-dimensional data 112 (S104).

Note that although an example is described here in which the current region is divided into GOSs and SPCs, after which each GOS is encoded, the processing steps are not limited to this order. For example, steps may be employed in which the structure of a single GOS is determined, which is followed by the encoding of such GOS, and then the structure of the subsequent GOS is determined.

As thus described, three-dimensional data encoding device 100 encodes three-dimensional data 111, thereby generating encoded three-dimensional data 112. More specifically, three-dimensional data encoding device 100 divides three-dimensional data into first processing units (GOSs), each being a random access unit and being associated with three-dimensional coordinates, divides each of the first processing units (GOSs) into second processing units (SPCs), and divides each of the second processing units (SPCs) into third processing units (VLMs). Each of the third processing units (VLMs) includes at least one voxel (VXL), which is the minimum unit in which position information is associated.

Next, three-dimensional data encoding device 100 encodes each of the first processing units (GOSs), thereby generating encoded three-dimensional data 112. More specifically, three-dimensional data encoding device 100 encodes each of the second processing units (SPCs) in each of the first processing units (GOSs). Three-dimensional data encoding device 100 further encodes each of the third processing units (VLMs) in each of the second processing units (SPCs).

When a current first processing unit (GOS) is a closed GOS, for example, three-dimensional data encoding device 100 encodes a current second processing unit (SPC) included in such current first processing unit (GOS) by referring to another second processing unit (SPC) included in the current first processing unit (GOS). Stated differently three-dimensional data encoding device 100 refers to no second processing unit (SPC) included in a first processing unit (GOS) that is different from the current first processing unit (GOS).

Meanwhile, when a current first processing unit (GOS) is an open GOS, three-dimensional data encoding device 100 encodes a current second processing unit (SPC) included in such current first processing unit (GOS) by referring to another second processing unit (SPC) included in the current first processing unit (GOS) or a second processing unit (SPC) included in a first processing unit (GOS) that is different from the current first processing unit (GOS).

Also, three-dimensional data encoding device 100 selects, as the type of a current second processing unit (SPC), one of the following: a first type (I-SPC) in which another second processing unit (SPC) is not referred to; a second type (P-SPC) in which another single second processing unit (SPC) is referred to; and a third type in which other two second processing units (SPC) are referred to. Three-dimensional data encoding device 100 encodes the current second processing unit (SPC) in accordance with the selected type.

Figure 8:
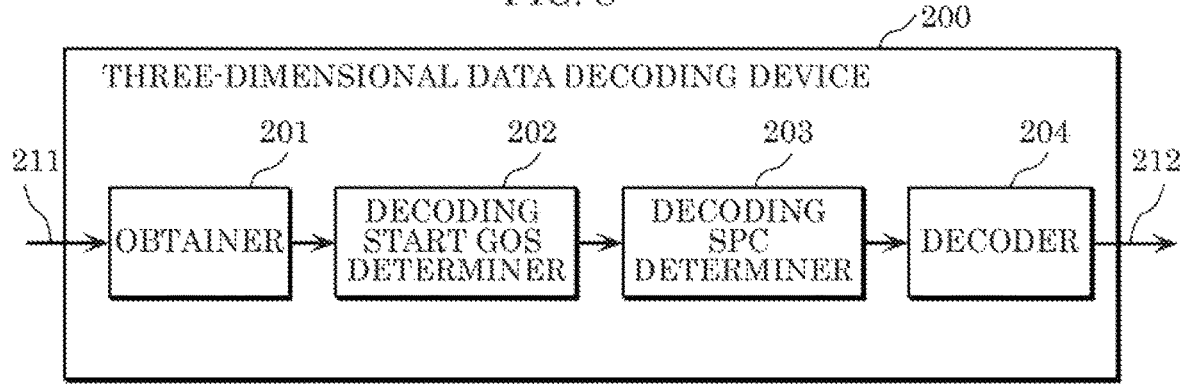
FIG. 8 is a block diagram of a three-dimensional data decoding device according to Embodiment 1.
Figures 9, 10:
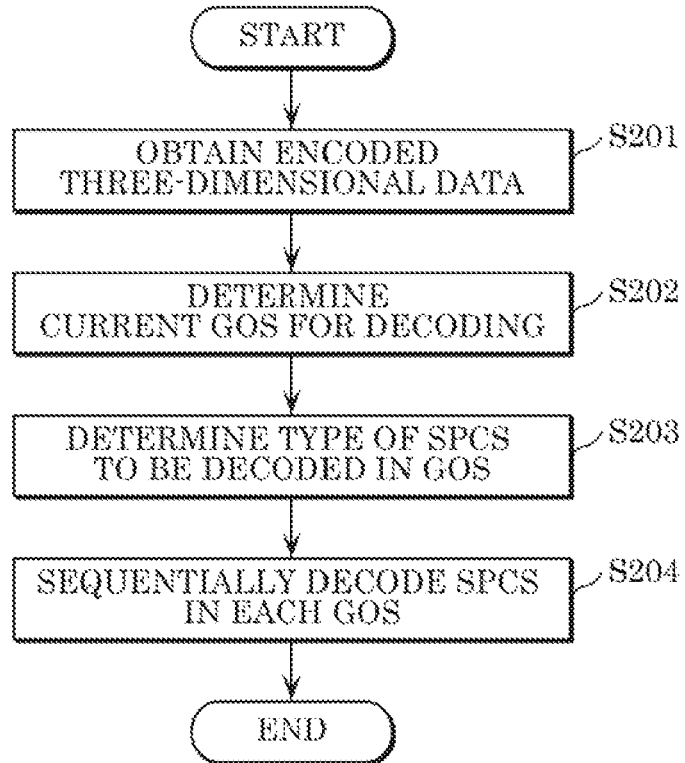
FIG. 9 is a flowchart of decoding processes according to Embodiment 1.
FIG. 10 is a diagram showing an example of meta information according to Embodiment 1.

Next, the structure and the operation flow of the three-dimensional data decoding device according to the present embodiment will be described. FIG. 8 is a block diagram of three-dimensional data decoding device 200 according to the present embodiment. FIG. 9 is a flowchart of an example operation performed by three-dimensional data decoding device 200.

Three-dimensional data decoding device 200 shown in FIG. 8 decodes encoded three-dimensional data 211, thereby generating decoded three-dimensional data 212. Encoded three-dimensional data 211 here is, for example, encoded three-dimensional data 112 generated by three-dimensional data encoding device 100. Such three-dimensional data decoding device 200 includes obtainer 201, decoding start GOS determiner 202, decoding SPC determiner 203, and decoder 204.

First, obtainer 201 obtains encoded three-dimensional data 211 (S201). Next, decoding start GOS determiner 202 determines a current GOS for decoding (S202). More specifically, decoding start GOS determiner 202 refers to meta-information stored in encoded three-dimensional data 211 or stored separately from the encoded three-dimensional data to determine, as the current GOS, a GOS that includes a SPC corresponding to the spatial position, the object, or the time from which decoding is to start.

Next, decoding SPC determiner 203 determines the type(s) (I, P, and/or B) of SPCs to be decoded in the GOS (S203). For example, decoding SPC determiner 203 determines whether to (1) decode only I-SPC(s), (2) to decode I-SPC(s) and P-SPCs, or (3) to decode SPCs of all types. Note that the present step may not be performed, when the type(s) of SPCs to be decoded are previously determined such as when all SPCs are previously determined to be decoded.

Next, decoder 204 obtains an address location within encoded three-dimensional data 211 from which a SPC that comes first in the GOS in the decoding order (the same as the encoding order) starts. Decoder 204 obtains the encoded data of the first SPC from the address location, and sequentially decodes the SPCs from such first SPC (S204). Note that the address location is stored in the meta-information, etc.

Three-dimensional data decoding device 200 decodes decoded three-dimensional data 212 as thus described. More specifically, three-dimensional data decoding device 200 decodes each encoded three-dimensional data 211 of the first processing units (GOSs), each being a random access unit and being associated with three-dimensional coordinates, thereby generating decoded three-dimensional data 212 of the first processing units (GOSs). Even more specifically, three-dimensional data decoding device 200 decodes each of the second processing units (SPCs) in each of the first processing units (GOSs). Three-dimensional data decoding device 200 further decodes each of the third processing units (VLMs) in each of the second processing units (SPCs).

The following describes meta-information for random access. Such meta-information is generated by three-dimensional data encoding device 100, and included in encoded three-dimensional data 112 (211).

In the conventional random access for a two-dimensional moving picture, decoding starts from the first frame in a random access unit that is close to a specified time. Meanwhile, in addition to times, random access to spaces (coordinates, objects, etc.) is assumed to be performed in a world.

To enable random access to at least three elements of coordinates, objects, and times, tables are prepared that associate the respective elements with the GOS index numbers. Furthermore, the GOS index numbers are associated with the addresses of the respective first I-SPCs in the GOSs. FIG. is a diagram showing example tables included in the meta-information. Note that not all the tables shown in FIG. 10 are required to be used, and thus at least one of the tables is used.

The following describes an example in which random access is performed from coordinates as a starting point. To access the coordinates (x2, y2, and z2), the coordinates-GOS table is first referred to, which indicates that the point corresponding to the coordinates (x2, y2, and z2) is included in the second GOS. Next, the GOS-address table is referred to, which indicates that the address of the first I-SPC in the second GOS is addr(2). As such, decoder 204 obtains data from this address to start decoding.

Note that the addresses may either be logical addresses or physical addresses of an HDD or a memory. Alternatively, information that identifies file segments may be used instead of addresses. File segments are, for example, units obtained by segmenting at least one GOS, etc.

When an object spans across a plurality of GOSs, the object-GOS table may show a plurality of GOSs to which such object belongs. When such plurality of GOSs are closed GOSs, the encoding device and the decoding device can perform encoding or decoding in parallel. Meanwhile, when such plurality of GOSs are open GOSs, a higher compression efficiency is achieved by the plurality of GOSs referring to each other.

Example objects include a person, an animal, a car, a bicycle, a signal, and a building serving as a landmark. For example, three-dimensional data encoding device 100 extracts keypoints specific to an object from a three-dimensional point cloud, etc., when encoding a world, and detects the object on the basis of such keypoints to set the detected object as a random access point.

As thus described, three-dimensional data encoding device 100 generates first information indicating a plurality of first processing units (GOSs) and the three-dimensional coordinates associated with the respective first processing units (GOSs). Encoded three-dimensional data 112 (211) includes such first information. The first information further indicates at least one of objects, times, and data storage locations that are associated with the respective first processing units (GOSs).

Three-dimensional data decoding device 200 obtains the first information from encoded three-dimensional data 211. Using such first information, three-dimensional data decoding device 200 identifies encoded three-dimensional data 211 of the first processing unit that corresponds to the specified three-dimensional coordinates, object, or time, and decodes encoded three-dimensional data 211.

The following describes an example of other meta-information. In addition to the meta-information for random access, three-dimensional data encoding device 100 may also generate and store meta-information as described below, and three-dimensional data decoding device 200 may use such meta-information at the time of decoding.

When three-dimensional data is used as map information, for example, a profile is defined in accordance with the intended use, and information indicating such profile may be included in meta-information. For example, a profile is defined for an urban or a suburban area, or for a flying object, and the maximum or minimum size, etc. of a world, a SPC or a VLM, etc. is defined in each profile. For example, more detailed information is required for an urban area than for a suburban area, and thus the minimum VLM size is set to small.

The meta-information may include tag values indicating object types. Each of such tag values is associated with VLMs, SPCs, or GOSs that constitute an object. For example, a tag value may be set for each object type in a manner, for example, that the tag value "0" indicates "person." the tag value "1" indicates "car" and the tag value "2" indicates "signal". Alternatively, when an object type is hard to judge, or such judgment is not required, a tag value may be used that indicates the size or the attribute indicating, for example, whether an object is a dynamic object or a static object.

The meta-information may also include information indicating a range of the spatial region occupied by a world.

The meta-information may also store the SPC or VXL size as header information common to the whole stream of the encoded data or to a plurality of SPCs, such as SPCs in a GOS.

The meta-information may also include identification information on a distance sensor or a camera that has been used to generate a point cloud, or information indicating the positional accuracy of a point group in the point cloud.

The meta-information may also include information indicating whether a world is made only of static objects or includes a dynamic object.

The following describes variations of the present embodiment.

The encoding device or the decoding device may encode or decode two or more mutually different SPCs or GOSs in parallel. GOSs to be encoded or decoded in parallel can be determined on the basis of meta-information, etc. indicating the spatial positions of the GOSs.

When three-dimensional data is used as a spatial map for use by a car or a flying object, etc. in traveling, or for creation of such a spatial map, for example, the encoding device or the decoding device may encode or decode GOSs or SPCs included in a space that is identified on the basis of GPS information, the route information, the zoom magnification, etc.

The decoding device may also start decoding sequentially from a space that is close to the self-location or the traveling route. The encoding device or the decoding device may give a lower priority to a space distant from the self-location or the traveling route than the priority of a nearby space to encode or decode such distant place. To "give a lower priority" means here, for example, to lower the priority in the processing sequence, to decrease the resolution (to apply decimation in the processing), or to lower the image quality (to increase the encoding efficiency by, for example, setting the quantization step to larger).

When decoding encoded data that is hierarchically encoded in a space, the decoding device may decode only the bottom layer in the hierarchy.

The decoding device may also start decoding preferentially from the bottom layer of the hierarchy in accordance with the zoom magnification or the intended use of the map.

For self-location estimation or object recognition, etc. involved in the self-driving of a car or a robot, the encoding device or the decoding device may encode or decode regions at a lower resolution, except for a region that is lower than or at a specified height from the ground (the region to be recognized).

The encoding device may also encode point clouds representing the spatial shapes of a room interior and a room exterior separately. For example, the separation of a GOS representing a room interior (interior GOS) and a GOS representing a room exterior (exterior GOS) enables the decoding device to select a GOS to be decoded in accordance with a viewpoint location, when using the encoded data.

The encoding device may also encode an interior GOS and an exterior GOS having close coordinates so that such GOSs come adjacent to each other in an encoded stream. For example, the encoding device associates the identifiers of such GOSs with each other, and stores information indicating the associated identifiers into the meta-information that is stored in the encoded stream or stored separately. This enables the decoding device to refer to the information in the meta-information to identify an interior GOS and an exterior GOS having close coordinates.

The encoding device may also change the GOS size or the SPC size depending on whether a GOS is an interior GOS or an exterior GOS. For example, the encoding device sets the size of an interior GOS to smaller than the size of an exterior GOS. The encoding device may also change the accuracy of extracting keypoints from a point cloud, or the accuracy of detecting objects, for example, depending on whether a GOS is an interior GOS or an exterior GOS.

The encoding device may also add, to encoded data, information by which the decoding device displays objects with a distinction between a dynamic object and a static object. This enables the decoding device to display a dynamic object together with, for example, a red box or letters for explanation. Note that the decoding device may display only a red box or letters for explanation, instead of a dynamic object. The decoding device may also display more particular object types. For example, a red box may be used for a car, and a yellow box may be used for a person.

The encoding device or the decoding device may also determine whether to encode or decode a dynamic object and a static object as a different SPC or GOS, in accordance with, for example, the appearance frequency of dynamic objects or a ratio between static objects and dynamic objects. For example, when the appearance frequency or the ratio of dynamic objects exceeds a threshold, a SPC or a GOS including a mixture of a dynamic object and a static object is accepted, while when the appearance frequency or the ratio of dynamic objects is below a threshold, a SPC or GOS including a mixture of a dynamic object and a static object is unaccepted.

When detecting a dynamic object not from a point cloud but from two-dimensional image information of a camera, the encoding device may separately obtain information for identifying a detection result (box or letters) and the object position, and encode these items of information as part of the encoded three-dimensional data. In such a case, the decoding device superimposes auxiliary information (box or letters) indicating the dynamic object onto a resultant of decoding a static object to display it.

The encoding device may also change the sparseness and denseness of VXLs or VLMs in a SPC in accordance with the degree of complexity of the shape of a static object. For example, the encoding device sets VXLs or VLMs at a higher density as the shape of a static object is more complex. The encoding device may further determine a quantization step, etc. for quantizing spatial positions or color information in accordance with the sparseness and denseness of VXLs or VLMs. For example, the encoding device sets the quantization step to smaller as the density of VXLs or VLMs is higher.

As described above, the encoding device or the decoding device according to the present embodiment encodes or decodes a space on a SPC-by-SPC basis that includes coordinate information.

Furthermore, the encoding device and the decoding device perform encoding or decoding on a volume-by-volume basis in a SPC. Each volume includes a voxel, which is the minimum unit in which position information is associated.

Also, using a table that associates the respective elements of spatial information including coordinates, objects, and times with GOSs or using a table that associates these elements with each other, the encoding device and the decoding device associate any ones of the elements with each other to perform encoding or decoding. The decoding device uses the values of the selected elements to determine the coordinates, and identifies a volume, a voxel, or a SPC from such coordinates to decode a SPC including such volume or voxel, or the identified SPC.

Furthermore, the encoding device determines a volume, a voxel, or a SPC that is selectable in accordance with the elements, through extraction of keypoints and object recognition, and encodes the determined volume, voxel, or SPC, as a volume, a voxel, or a SPC to which random access is possible.

SPCs are classified into three types: I-SPC that is singly encodable or decodable; P-SPC that is encoded or decoded by referring to any one of the processed SPCs; and B-SPC that is encoded or decoded by referring to any two of the processed SPCs.

At least one volume corresponds to a static object or a dynamic object. A SPC including a static object and a SPC including a dynamic object are encoded or decoded as mutually different GOSs. Stated differently, a SPC including a static object and a SPC including a dynamic object are assigned to different GOSs.

Dynamic objects are encoded or decoded on an object-by-object basis, and are associated with at least one SPC including a static object. Stated differently, a plurality of dynamic objects are individually encoded, and the obtained encoded data of the dynamic objects is associated with a SPC including a static object.

The encoding device and the decoding device give an increased priority to I-SPC(s) in a GOS to perform encoding or decoding. For example, the encoding device performs encoding in a manner that prevents the degradation of I-SPCs (in a manner that enables the original three-dimensional data to be reproduced with a higher fidelity after decoded). The decoding device decodes, for example, only I-SPCs.

The encoding device may change the frequency of using I-SPCs depending on the sparseness and denseness or the number (amount) of the objects in a world to perform encoding. Stated differently, the encoding device changes the frequency of selecting I-SPCs depending on the number or the sparseness and denseness of the objects included in the three-dimensional data. For example, the encoding device uses I-SPCs at a higher frequency as the density of the objects in a world is higher.

The encoding device also sets random access points on a GOS-by-GOS basis, and stores information indicating the spatial regions corresponding to the GOSs into the header information.

The encoding device uses, for example, a default value as the spatial size of a GOS. Note that the encoding device may change the GOS size depending on the number (amount) or the sparseness and denseness of objects or dynamic objects. For example, the encoding device sets the spatial size of a GOS to smaller as the density of objects or dynamic objects is higher or the number of objects or dynamic objects is greater.

Also, each SPC or volume includes a keypoint group that is derived by use of information obtained by a sensor such as a depth sensor, a gyroscope sensor, or a camera sensor. The coordinates of the keypoints are set at the central positions of the respective voxels. Furthermore, finer voxels enable highly accurate position information.

The keypoint group is derived by use of a plurality of pictures. A plurality of pictures include at least two types of time information: the actual time information and the same time information common to a plurality of pictures that are associated with SPCs (for example, the encoding time used for rate control, etc.).

Also, encoding or decoding is performed on a GOS-by-GOS basis that includes at least one SPC.

The encoding device and the decoding device predict P-SPCs or B-SPCs in a current GOS by referring to SPCs in a processed GOS.

Alternatively the encoding device and the decoding device predict P-SPCs or B-SPCs in a current GOS, using the processed SPCs in the current GOS, without referring to a different GOS.

Furthermore, the encoding device and the decoding device transmit or receive an encoded stream on a world-by-world basis that includes at least one GOS.

Also, a GOS has a layer structure in one direction at least in a world, and the encoding device and the decoding device start encoding or decoding from the bottom layer. For example, a random accessible GOS belongs to the lowermost layer. A GOS that belongs to the same layer or a lower layer is referred to in a GOS that belongs to an upper layer. Stated differently, a GOS is spatially divided in a predetermined direction in advance to have a plurality of layers, each including at least one SPC. The encoding device and the decoding device encode or decode each SPC by referring to a SPC included in the same layer as the each SPC or a SPC included in a layer lower than that of the each SPC.

Also, the encoding device and the decoding device successively encode or decode GOSs on a world-by-world basis that includes such GOSs. In so doing, the encoding device and the decoding device write or read out information indicating the order (direction) of encoding or decoding as metadata. Stated differently, the encoded data includes information indicating the order of encoding a plurality of GOSs.

The encoding device and the decoding device also encode or decode mutually different two or more SPCs or GOSs in parallel.

Furthermore, the encoding device and the decoding device encode or decode the spatial information (coordinates, size, etc.) on a SPC or a GOS.

The encoding device and the decoding device encode or decode SPCs or GOSs included in an identified space that is identified on the basis of external information on the self-location or/and region size, such as GPS information, route information, or magnification.

The encoding device or the decoding device gives a lower priority to a space distant from the self-location than the priority of a nearby space to perform encoding or decoding.

The encoding device sets a direction at one of the directions in a world, in accordance with the magnification or the intended use, to encode a GOS having a layer structure in such direction. Also, the decoding device decodes a GOS having a layer structure in one of the directions in a world that has been set in accordance with the magnification or the intended use, preferentially from the bottom layer.

The encoding device changes the accuracy of extracting keypoints, the accuracy of recognizing objects, or the size of spatial regions, etc. included in a SPC, depending on whether an object is an interior object or an exterior object. Note that the encoding device and the decoding device encode or decode an interior GOS and an exterior GOS having close coordinates in a manner that these GOSs come adjacent to each other in a world, and associate their identifiers with each other for encoding and decoding.

Embodiment 2

When using encoded data of a point cloud in an actual device or service, it is desirable that necessary information be transmitted/received in accordance with the intended use to reduce the network bandwidth. However, there has been no such functionality in the structure of encoding three-dimensional data, nor an encoding method therefor.

The present embodiment describes a three-dimensional data encoding method and a three-dimensional data encoding device for providing the functionality of transmitting/receiving only necessary information in encoded data of a three-dimensional point cloud in accordance with the intended use, as well as a three-dimensional data decoding method and a three-dimensional data decoding device for decoding such encoded data.

Figure 11:
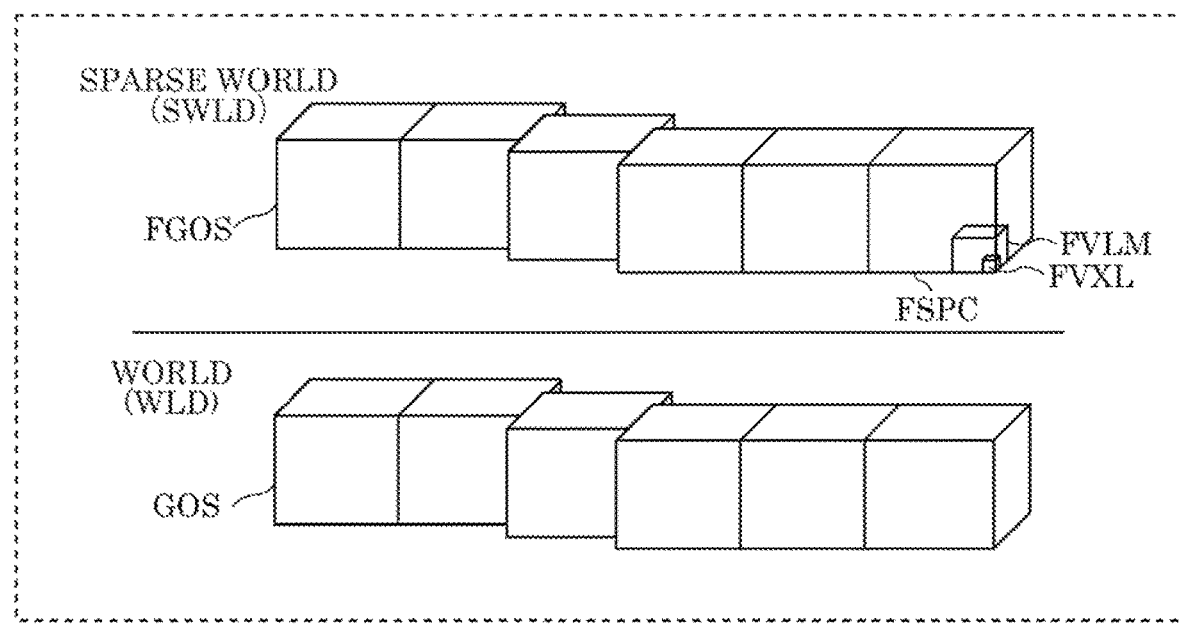
FIG. 11 is a diagram showing an example structure of a SWLD according to Embodiment 2.

A voxel (VXL) with a feature greater than or equal to a given amount is defined as a feature voxel (FVXL), and a world (WLD) constituted by FVXLs is defined as a sparse world (SWLD). FIG. 11 is a diagram showing example structures of a sparse world and a world. A SWLD includes: FGOSs, each being a GOS constituted by FVXLs; FSPCs, each being a SPC constituted by FVXLs; and FVLMs, each being a VLM constituted by FVXLs. The data structure and prediction structure of a FGOS, a FSPC, and a FVLM may be the same as those of a GOS, a SPC, and a VLM.

A feature represents the three-dimensional position information on a VXL or the visible-light information on the position of a VXL. A large number of features are detected especially at a corner, an edge, etc. of a three-dimensional object. More specifically, such a feature is a three-dimensional feature or a visible-light feature as described below, but may be any feature that represents the position, luminance, or color information, etc. on a VXL.

Used as three-dimensional features are signature of histograms of orientations (SHOT) features, point feature histograms (PFH) features, or point pair feature (PPF) features.

SHOT features are obtained by dividing the periphery of a VXL, and calculating an inner product of the reference point and the normal vector of each divided region to represent the calculation result as a histogram. SHOT features are characterized by a large number of dimensions and high-level feature representation.

PFH features are obtained by selecting a large number of two point pairs in the vicinity of a VXL, and calculating the normal vector, etc. from each two point pair to represent the calculation result as a histogram. PFH features are histogram features, and thus are characterized by robustness against a certain extent of disturbance and also high-level feature representation.

PPF features are obtained by using a normal vector, etc. for each two points of VXLs. PPF features, for which all VXLs are used, has robustness against occlusion.

Used as visible-light features are scale-invariant feature transform (SIFT), speeded up robust features (SURF), or histogram of oriented gradients (HOG), etc. that use information on an image such as luminance gradient information.

A SWLD is generated by calculating the above-described features of the respective VXLs in a WLD to extract FVXLs. Here, the SWLD may be updated every time the WLD is updated, or may be regularly updated after the elapse of a certain period of time, regardless of the timing at which the WLD is updated.

A SWLD may be generated for each type of features. For example, different SWLDs may be generated for the respective types of features, such as SWLD1 based on SHOT features and SWLD2 based on SIFT features so that SWLDs are selectively used in accordance with the intended use. Also, the calculated feature of each FVXL may be held in each FVXL as feature information.

Next, the usage of a sparse world (SWLD) will be described. A SWLD includes only feature voxels (FVXLs), and thus its data size is smaller in general than that of a WLD that includes all VXLs.

In an application that utilizes features for a certain purpose, the use of information on a SWLD instead of a WLD reduces the time required to read data from a hard disk, as well as the bandwidth and the time required for data transfer over a network. For example, a WLD and a SWLD are held in a server as map information so that map information to be sent is selected between the WLD and the SWLD in accordance with a request from a client. This reduces the network bandwidth and the time required for data transfer. More specific examples will be described below.

Figure 12:
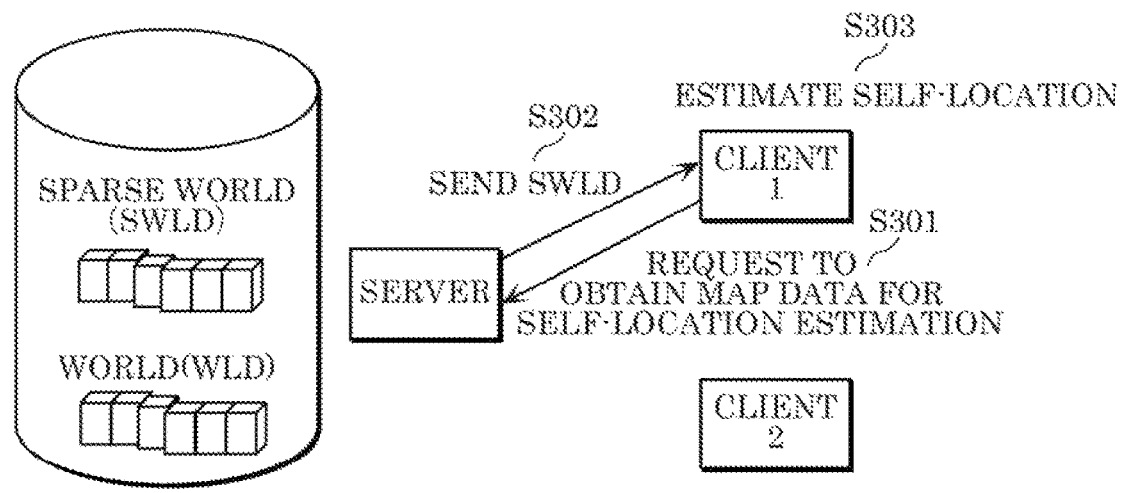
FIG. 12 is a diagram showing example operations performed by a server and a client according to Embodiment 2.
Figure 13:
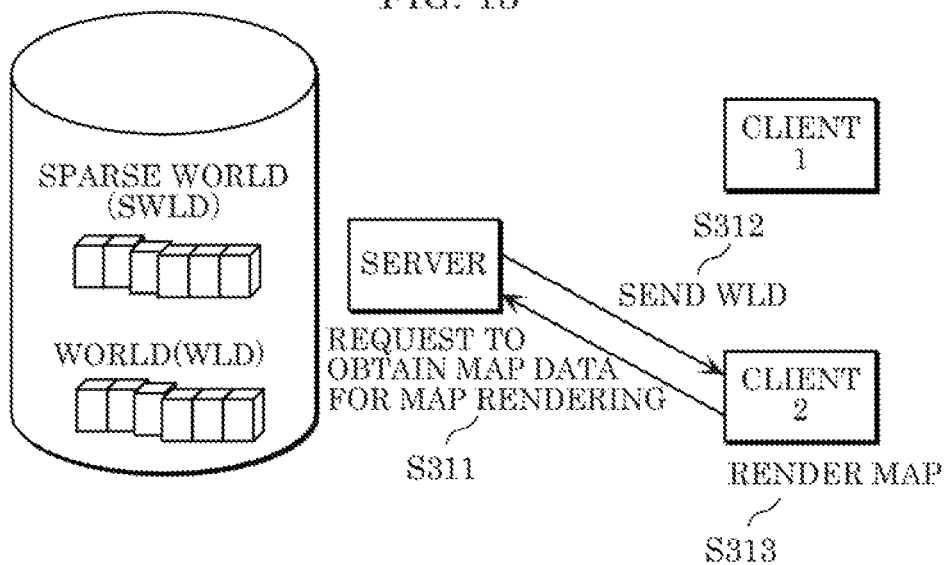
FIG. 13 is a diagram showing example operations performed by the server and a client according to Embodiment 2.

FIG. 12 and FIG. 13 are diagrams showing usage examples of a SWLD and a WLD. As FIG. 12 shows, when client 1, which is a vehicle-mounted device, requires map information to use it for self-location determination, client 1 sends to a server a request for obtaining map data for self-location estimation (S301). The server sends to client 1 the SWLD in response to the obtainment request (S302). Client 1 uses the received SWLD to determine the self-location (S303). In so doing, client 1 obtains VXL information on the periphery of client 1 through various means including a distance sensor such as a rangefinder, as well as a stereo camera and a combination of a plurality of monocular cameras. Client 1 then estimates the self-location information from the obtained VXL information and the SWLD. Here, the self-location information includes three-dimensional position information, orientation, etc. of client 1.

As FIG. 13 shows, when client 2, which is a vehicle-mounted device, requires map information to use it for rendering a map such as a three-dimensional map, client 2 sends to the server a request for obtaining map data for map rendering (S311). The server sends to client 2 the WLD in response to the obtainment request (S312). Client 2 uses the received WLD to render a map (S313). In so doing, client 2 uses, for example, image client 2 has captured by a visible-light camera, etc. and the WLD obtained from the server to create a rendering image, and renders such created image onto a screen of a car navigation system, etc.

As described above, the server sends to a client a SWLD when the features of the respective VXLs are mainly required such as in the case of self-location estimation, and sends to a client a WLD when detailed VXL information is required such as in the case of map rendering. This allows for an efficient sending/receiving of map data.

Note that a client may self-judge which one of a SWLD and a WLD is necessary and request the server to send a SWLD or a WLD. Also, the server may judge which one of a SWLD and a WLD to send in accordance with the status of the client or a network.

Next, a method will be described of switching the sending/receiving between a sparse world (SWLD) and a world (WLD).

Figure 14:
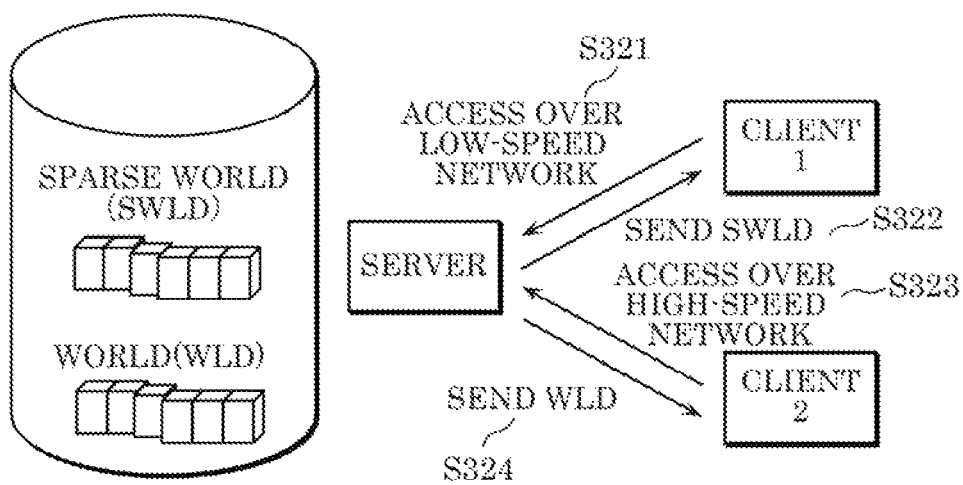
FIG. 14 is a diagram showing example operations performed by the server and the clients according to Embodiment 2.

Whether to receive a WLD or a SWLD may be switched in accordance with the network bandwidth. FIG. 14 is a diagram showing an example operation in such case. For example, when a low-speed network is used that limits the usable network bandwidth, such as in a Long-Term Evolution (LTE) environment, a client accesses the server over a low-speed network (S321), and obtains the SWLD from the server as map information (S322). Meanwhile, when a high-speed network is used that has an adequately broad network bandwidth, such as in a WiFi environment, a client accesses the server over a high-speed network (S323), and obtains the WLD from the server (S324). This enables the client to obtain appropriate map information in accordance with the network bandwidth such client is using.

More specifically, a client receives the SWLD over an LTE network when in outdoors, and obtains the WLD over a WiFi network when in indoors such as in a facility. This enables the client to obtain more detailed map information on indoor environment.

As described above, a client may request for a WLD or a SWLD in accordance with the bandwidth of a network such client is using. Alternatively, the client may send to the server information indicating the bandwidth of a network such client is using, and the server may send to the client data (the WLD or the SWLD) suitable for such client in accordance with the information. Alternatively, the server may identify the network bandwidth the client is using, and send to the client data (the WLD or the SWLD) suitable for such client.

Figure 15:
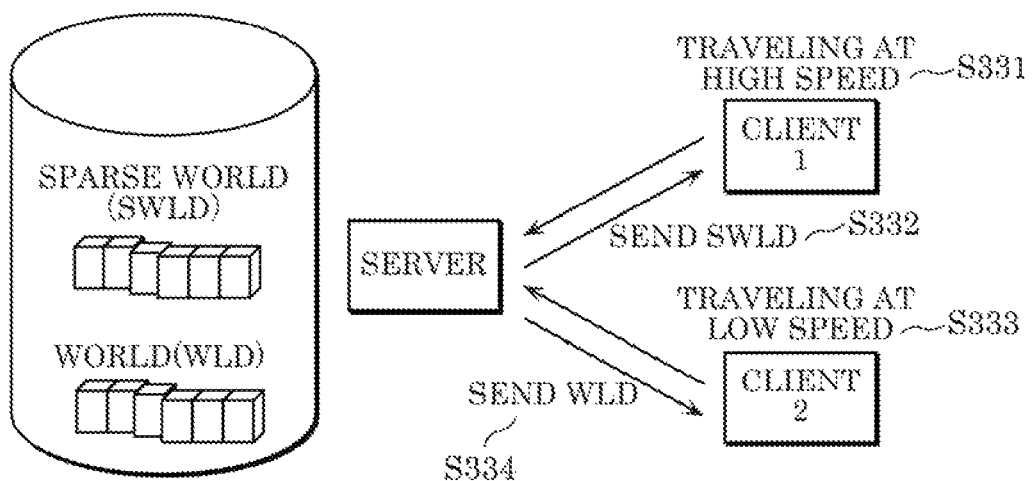
FIG. 15 is a diagram showing example operations performed by the server and the clients according to Embodiment 2.

Also, whether to receive a WLD or a SWLD may be switched in accordance with the speed of traveling. FIG. 15 is a diagram showing an example operation in such case. For example, when traveling at a high speed (S331), a client receives the SWLD from the server (S332). Meanwhile, when traveling at a low speed (S333), the client receives the WLD from the server (S334). This enables the client to obtain map information suitable to the speed, while reducing the network bandwidth. More specifically, when traveling on an expressway, the client receives the SWLD with a small data amount, which enables the update of rough map information at an appropriate speed. Meanwhile, when traveling on a general road, the client receives the WLD, which enables the obtainment of more detailed map information.

As described above, the client may request the server for a WLD or a SWLD in accordance with the traveling speed of such client. Alternatively, the client may send to the server information indicating the traveling speed of such client, and the server may send to the client data (the WLD or the SWLD) suitable to such client in accordance with the information. Alternatively, the server may identify the traveling speed of the client to send data (the WLD or the SWLD) suitable to such client.

Also, the client may obtain, from the server, a SWLD first, from which the client may obtain a WLD of an important region. For example, when obtaining map information, the client first obtains a SWLD for rough map information, from which the client narrows to a region in which features such as buildings, signals, or persons appear at high frequency so that the client can later obtain a WLD of such narrowed region. This enables the client to obtain detailed information on a necessary region, while reducing the amount of data received from the server.

The server may also create from a WLD different SWLDs for the respective objects, and the client may receive SWLDs in accordance with the intended use. This reduces the network bandwidth. For example, the server recognizes persons or cars in a WLD in advance, and creates a SWLD of persons and a SWLD of cars. The client, when wishing to obtain information on persons around the client, receives the SWLD of persons, and when wising to obtain information on cars, receives the SWLD of cars. Such types of SWLDs may be distinguished by information (flag, or type, etc.) added to the header, etc.

Figure 16:
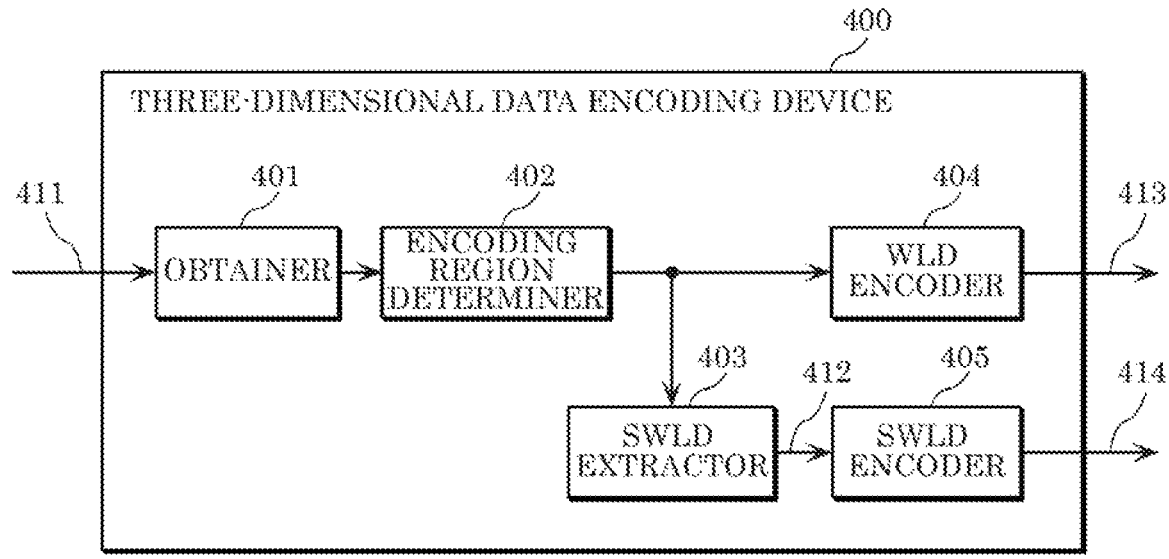
FIG. 16 is a block diagram of a three-dimensional data encoding device according to Embodiment 2.
Figure 17:
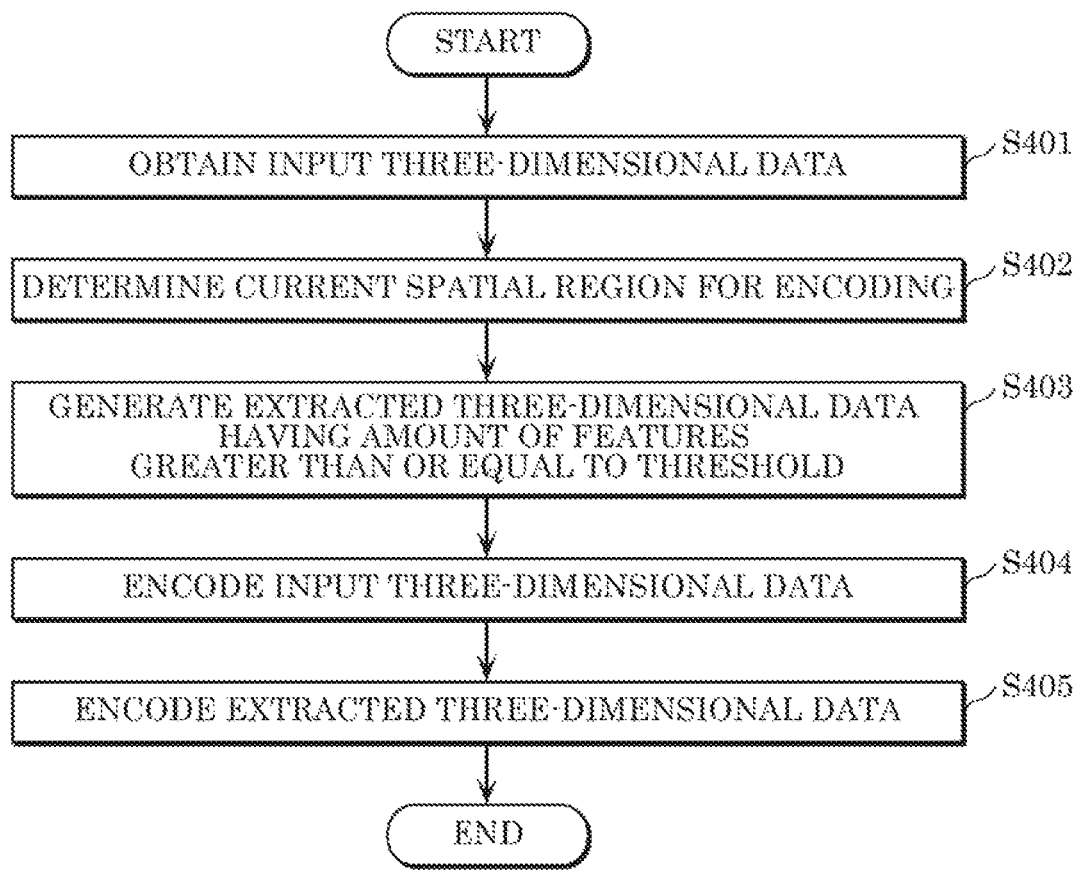
FIG. 17 is a flowchart of encoding processes according to Embodiment 2.

Next, the structure and the operation flow of the three-dimensional data encoding device (e.g., a server) according to the present embodiment will be described. FIG. 16 is a block diagram of three-dimensional data encoding device 400 according to the present embodiment. FIG. 17 is a flowchart of three-dimensional data encoding processes performed by three-dimensional data encoding device 400.

Three-dimensional data encoding device 400 shown in FIG. 16 encodes input three-dimensional data 411, thereby generating encoded three-dimensional data 413 and encoded three-dimensional data 414, each being an encoded stream. Here, encoded three-dimensional data 413 is encoded three-dimensional data corresponding to a WLD, and encoded three-dimensional data 414 is encoded three-dimensional data corresponding to a SWLD. Such three-dimensional data encoding device 400 includes, obtainer 401, encoding region determiner 402, SWLD extractor 403, WLD encoder 404, and SWLD encoder 405.

First, as FIG. 17 shows, obtainer 401 obtains input three-dimensional data 411, which is point group data in a three-dimensional space (S401).

Next, encoding region determiner 402 determines a current spatial region for encoding on the basis of a spatial region in which the point cloud data is present (S402).

Next, SWLD extractor 403 defines the current spatial region as a WLD, and calculates the feature from each VXL included in the WLD. Then, SWLD extractor 403 extracts VXLs having an amount of features greater than or equal to a predetermined threshold, defines the extracted VXLs as FVXLs, and adds such FVXLs to a SWLD, thereby generating extracted three-dimensional data 412 (S403). Stated differently, extracted three-dimensional data 412 having an amount of features greater than or equal to the threshold is extracted from input three-dimensional data 411.

Next, WLD encoder 404 encodes input three-dimensional data 411 corresponding to the WLD, thereby generating encoded three-dimensional data 413 corresponding to the WLD (S404). In so doing, WLD encoder 404 adds to the header of encoded three-dimensional data 413 information that distinguishes that such encoded three-dimensional data 413 is a stream including a WLD.

SWLD encoder 405 encodes extracted three-dimensional data 412 corresponding to the SWLD, thereby generating encoded three-dimensional data 414 corresponding to the SWLD (S405). In so doing, SWLD encoder 405 adds to the header of encoded three-dimensional data 414 information that distinguishes that such encoded three-dimensional data 414 is a stream including a SWLD.

Note that the process of generating encoded three-dimensional data 413 and the process of generating encoded three-dimensional data 414 may be performed in the reverse order. Also note that a part or all of these processes may be performed in parallel.

A parameter "world_type" is defined, for example, as information added to each header of encoded three-dimensional data 413 and encoded three-dimensional data 414. world_type=0 indicates that a stream includes a WLD, and world_type=1 indicates that a stream includes a SWLD. An increased number of values may be further assigned to define a larger number of types, e.g., world_type=2. Also, one of encoded three-dimensional data 413 and encoded three-dimensional data 414 may include a specified flag. For example, encoded three-dimensional data 414 may be assigned with a flag indicating that such stream includes a SWLD. In such a case, the decoding device can distinguish whether such stream is a stream including a WLD or a stream including a SWLD in accordance with the presence/absence of the flag.

Also, an encoding method used by WLD encoder 404 to encode a WLD may be different from an encoding method used by SWLD encoder 405 to encode a SWLD.

For example, data of a SWLD is decimated, and thus can have a lower correlation with the neighboring data than that of a WLD. For this reason, of intra prediction and inter prediction, inter prediction may be more preferentially performed in an encoding method used for a SWLD than in an encoding method used for a WLD.

Also, an encoding method used for a SWLD and an encoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Also, SWLD encoder 405 performs encoding in a manner that encoded three-dimensional data 414 of a SWLD has a smaller data size than the data size of encoded three-dimensional data 413 of a WLD. A SWLD can have a lower inter-data correlation, for example, than that of a WLD as described above. This can lead to a decreased encoding efficiency and thus to encoded three-dimensional data 414 having a larger data size than the data size of encoded three-dimensional data 413 of a WLD. When the data size of the resulting encoded three-dimensional data 414 is larger than the data size of encoded three-dimensional data 413 of a WLD, SWLD encoder 405 performs encoding again to re-generate encoded three-dimensional data 414 having a reduced data size.

For example, SWLD extractor 403 re-generates extracted three-dimensional data 412 having a reduced number of keypoints to be extracted, and SWLD encoder 405 encodes such extracted three-dimensional data 412. Alternatively SWLD encoder 405 may perform more coarse quantization. More coarse quantization is achieved, for example, by rounding the data in the lowermost level in an octree structure described below.

When failing to decrease the data size of encoded three-dimensional data 414 of the SWLD to smaller than the data size of encoded three-dimensional data 413 of the WLD, SWLD encoder 405 may not generate encoded three-dimensional data 414 of the SWLD. Alternatively, encoded three-dimensional data 413 of the WLD may be copied as encoded three-dimensional data 414 of the SWLD. Stated differently encoded three-dimensional data 413 of the WLD may be used as it is as encoded three-dimensional data 414 of the SWLD.

Figure 18:
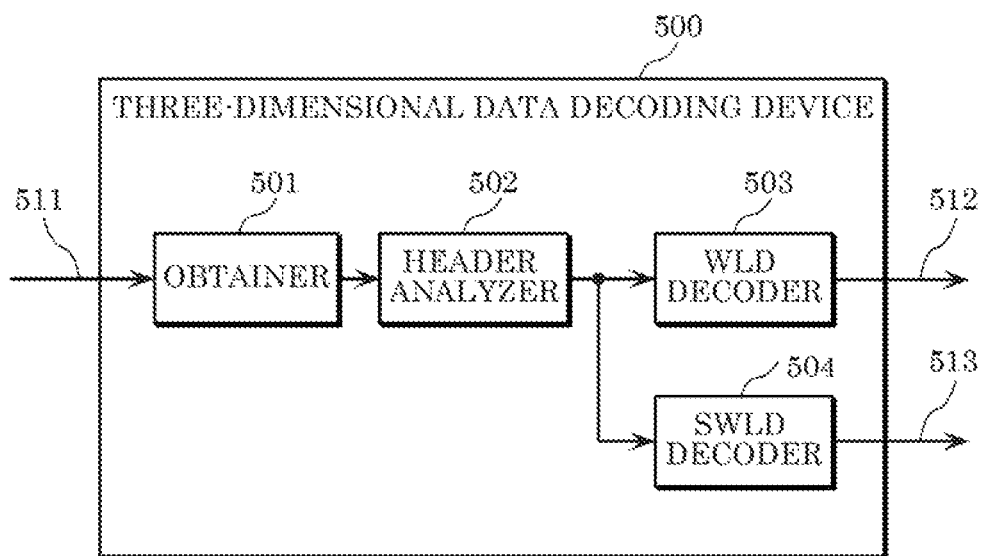
FIG. 18 is a block diagram of a three-dimensional data decoding device according to Embodiment 2.
Figure 19:
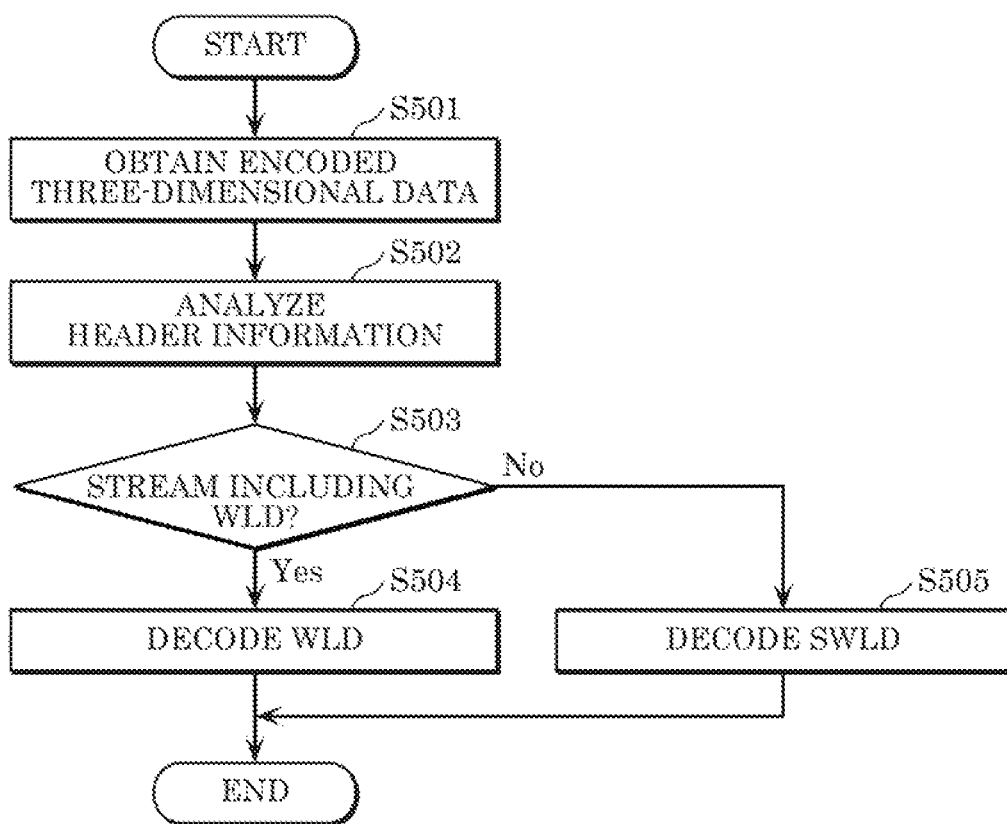
FIG. 19 is a flowchart of decoding processes according to Embodiment 2.

Next, the structure and the operation flow of the three-dimensional data decoding device (e.g., a client) according to the present embodiment will be described. FIG. 18 is a block diagram of three-dimensional data decoding device 500 according to the present embodiment. FIG. 19 is a flowchart of three-dimensional data decoding processes performed by three-dimensional data decoding device 500.

Three-dimensional data decoding device 500 shown in FIG. 18 decodes encoded three-dimensional data 511, thereby generating decoded three-dimensional data 512 or decoded three-dimensional data 513. Encoded three-dimensional data 511 here is, for example, encoded three-dimensional data 413 or encoded three-dimensional data 414 generated by three-dimensional data encoding device 400.

Such three-dimensional data decoding device 500 includes obtainer 501, header analyzer 502, WLD decoder 503, and SWLD decoder 504.

First, as FIG. 19 shows, obtainer 501 obtains encoded three-dimensional data 511 (S501). Next, header analyzer 502 analyzes the header of encoded three-dimensional data 511 to identify whether encoded three-dimensional data 511 is a stream including a WLD or a stream including a SWLD (S502). For example, the above-described parameter world_type is referred to in making such identification.

When encoded three-dimensional data 511 is a stream including a WLD (Yes in S503), WLD decoder 503 decodes encoded three-dimensional data 511, thereby generating decoded three-dimensional data 512 of the WLD (S504).

Meanwhile, when encoded three-dimensional data 511 is a stream including a SWLD (No in S503), SWLD decoder 504 decodes encoded three-dimensional data 511, thereby generating decoded three-dimensional data 513 of the SWLD (S505).

Also, as in the case of the encoding device, a decoding method used by WLD decoder 503 to decode a WLD may be different from a decoding method used by SWLD decoder 504 to decode a SWLD. For example, of intra prediction and inter prediction, inter prediction may be more preferentially performed in a decoding method used for a SWLD than in a decoding method used for a WLD.

Also, a decoding method used for a SWLD and a decoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Figure 20:
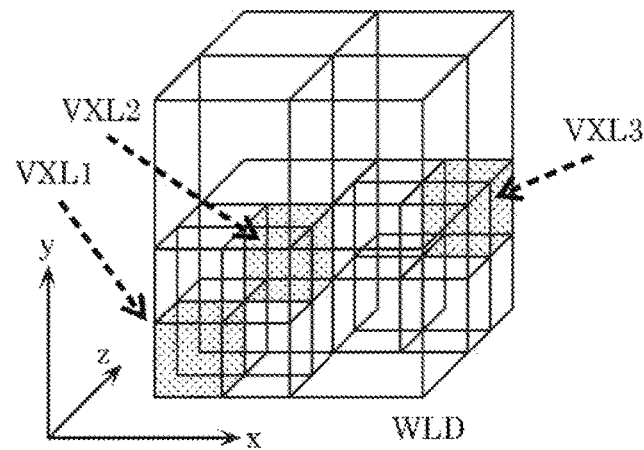
FIG. 20 is a diagram showing an example structure of a WLD according to Embodiment 2.
Figure 21:
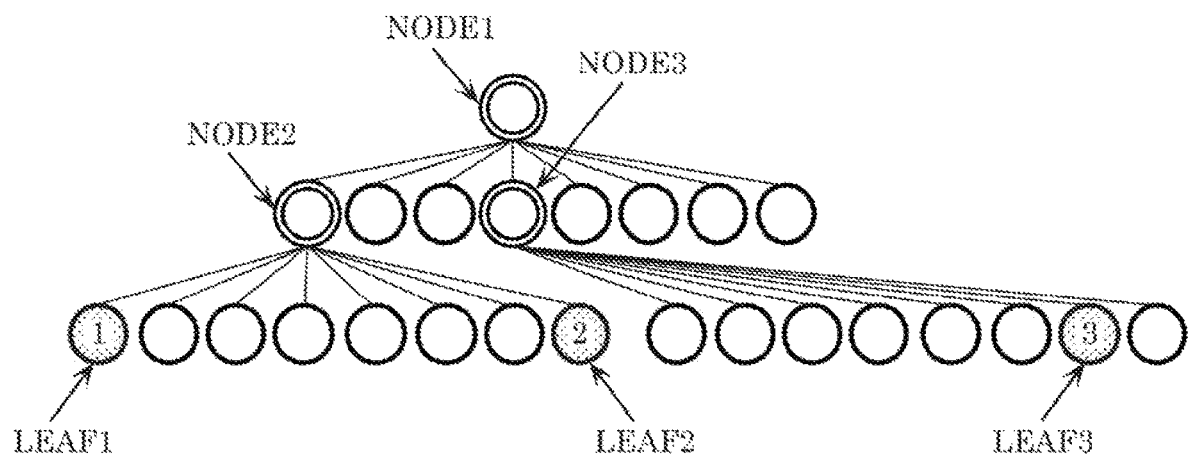
FIG. 21 is a diagram showing an example octree structure of the WLD according to Embodiment 2.

Next, an octree representation will be described, which is a method of representing three-dimensional positions. VXL data included in three-dimensional data is converted into an octree structure before encoded. FIG. 20 is a diagram showing example VXLs in a WLD. FIG. 21 is a diagram showing an octree structure of the WLD shown in FIG. 20. An example shown in FIG. 20 illustrates three VXLs 1 to 3 that include point groups (hereinafter referred to as effective VXLs). As FIG. 21 shows, the octree structure is made of nodes and leaves. Each node has a maximum of eight nodes or leaves. Each leaf has VXL information. Here, of the leaves shown in FIG. 21, leaf 1, leaf 2, and leaf 3 represent VXL1, VXL2, and VXL3 shown in FIG. 20, respectively.

More specifically, each node and each leaf correspond to a three-dimensional position. Node 1 corresponds to the entire block shown in FIG. 20. The block that corresponds to node 1 is divided into eight blocks. Of these eight blocks, blocks including effective VXLs are set as nodes, while the other blocks are set as leaves. Each block that corresponds to a node is further divided into eight nodes or leaves. These processes are repeated by the number of times that is equal to the number of levels in the octree structure. All blocks in the lowermost level are set as leaves.

Figure 22:
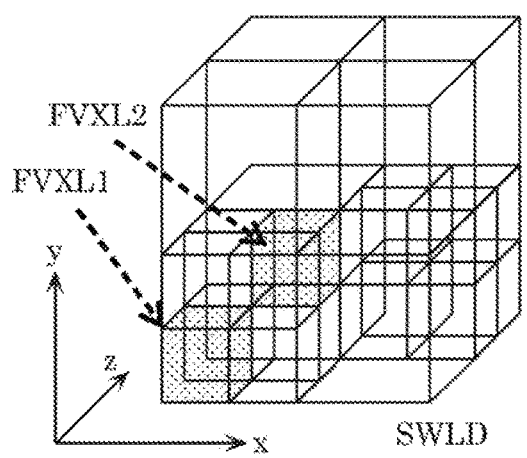
FIG. 22 is a diagram showing an example structure of a SWLD according to Embodiment 2.
Figure 23:
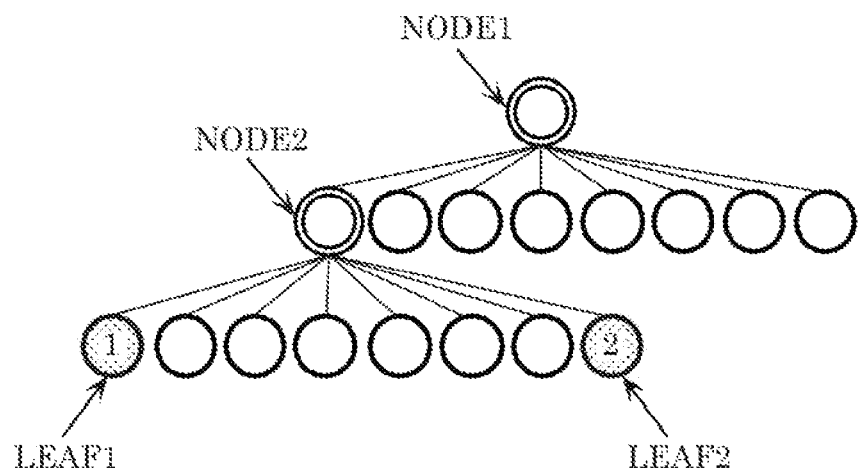
FIG. 23 is a diagram showing an example octree structure of the SWLD according to Embodiment 2.

FIG. 22 is a diagram showing an example SWLD generated from the WLD shown in FIG. 20. VXL1 and VXL2 shown in FIG. 20 are judged as FVXL1 and FVXL2 as a result of feature extraction, and thus are added to the SWLD. Meanwhile, VXL3 is not judged as a FVXL, and thus is not added to the SWLD. FIG. 23 is a diagram showing an octree structure of the SWLD shown in FIG. 22. In the octree structure shown in FIG. 23, leaf 3 corresponding to VXL3 shown in FIG. 21 is deleted. Consequently, node 3 shown in FIG. 21 has lost an effective VXL, and has changed to a leaf. As described above, a SWLD has a smaller number of leaves in general than a WLD does, and thus the encoded three-dimensional data of the SWLD is smaller than the encoded three-dimensional data of the WLD.

The following describes variations of the present embodiment.

For self-location estimation, for example, a client, being a vehicle-mounted device, etc., may receive a SWLD from the server to use such SWLD to estimate the self-location. Meanwhile, for obstacle detection, the client may detect obstacles by use of three-dimensional information on the periphery obtained by such client through various means including a distance sensor such as a rangefinder, as well as a stereo camera and a combination of a plurality of monocular cameras.

In general, a SWLD is less likely to include VXL data on a flat region. As such, the server may hold a subsample world (subWLD) obtained by subsampling a WLD for detection of static obstacles, and send to the client the SWLD and the subWLD. This enables the client to perform self-location estimation and obstacle detection on the client's part, while reducing the network bandwidth.

When the client renders three-dimensional map data at a high speed, map information having a mesh structure is more useful in some cases. As such, the server may generate a mesh from a WLD to hold it beforehand as a mesh world (MWLD). For example, when wishing to perform coarse three-dimensional rendering, the client receives a MWLD, and when wishing to perform detailed three-dimensional rendering, the client receives a WLD. This reduces the network bandwidth.

In the above description, the server sets, as FVXLs, VXLs having an amount of features greater than or equal to the threshold, but the server may calculate FVXLs by a different method. For example, the server may judge that a VXL, a VLM, a SPC, or a GOS that constitutes a signal, or an intersection, etc. as necessary for self-location estimation, driving assist, or self-driving, etc., and incorporate such VXL, VLM, SPC, or GOS into a SWLD as a FVXL, a FVLM, a FSPC, or a FGOS. Such judgment may be made manually. Also, FVXLs, etc. that have been set on the basis of an amount of features may be added to FVXLs, etc. obtained by the above method. Stated differently, SWLD extractor 403 may further extract, from input three-dimensional data 411, data corresponding to an object having a predetermined attribute as extracted three-dimensional data 412.

Also, that a VXL, a VLM, a SPC, or a GOS is necessary for such intended usage may be labeled separately from the features. The server may separately hold, as an upper layer of a SWLD (e.g., a lane world), FVXLs of a signal or an intersection, etc. necessary for self-location estimation, driving assist, or self-driving, etc.

The server may also add an attribute to VXLs in a WLD on a random access basis or on a predetermined unit basis. An attribute, for example, includes information indicating whether VXLs are necessary for self-location estimation, or information indicating whether VXLs are important as traffic information such as a signal, or an intersection, etc. An attribute may also include a correspondence between VXLs and features (intersection, or road, etc.) in lane information (geographic data files (GDF), etc.).

A method as described below may be used to update a WLD or a SWLD.

Update information indicating changes, etc. in a person, a roadwork, or a tree line (for trucks) is uploaded to the server as point groups or meta data. The server updates a WLD on the basis of such uploaded information, and then updates a SWLD by use of the updated WLD.

The client, when detecting a mismatch between the three-dimensional information such client has generated at the time of self-location estimation and the three-dimensional information received from the server, may send to the server the three-dimensional information such client has generated, together with an update notification. In such a case, the server updates the SWLD by use of the WLD. When the SWLD is not to be updated, the server judges that the WLD itself is old.

In the above description, information that distinguishes whether an encoded stream is that of a WLD or a SWLD is added as header information of the encoded stream. However, when there are many types of worlds such as a mesh world and a lane world, information that distinguishes these types of the worlds may be added to header information. Also, when there are many SWLDs with different amounts of features, information that distinguishes the respective SWLDs may be added to header information.

In the above description, a SWLD is constituted by FVXLs, but a SWLD may include VXL that have not been judged as FVXLs. For example, a SWLD may include an adjacent VXL used to calculate the feature of a FVXL. This enables the client to calculate the feature of a FVXL when receiving a SWLD, even in the case where feature information is not added to each FVXL of the SWLD. In such a case, the SWLD may include information that distinguishes whether each VXL is a FVXL or a VXL.

As described above, three-dimensional data encoding device 400 extracts, from input three-dimensional data 411 (first three-dimensional data), extracted three-dimensional data 412 (second three-dimensional data) having an amount of a feature greater than or equal to a threshold, and encodes extracted three-dimensional data 412 to generate encoded three-dimensional data 414 (first encoded three-dimensional data).

This three-dimensional data encoding device 400 generates encoded three-dimensional data 414 that is obtained by encoding data having an amount of a feature greater than or equal to the threshold. This reduces the amount of data compared to the case where input three-dimensional data 411 is encoded as it is. Three-dimensional data encoding device 400 is thus capable of reducing the amount of data to be transmitted.

Three-dimensional data encoding device 400 further encodes input three-dimensional data 411 to generate encoded three-dimensional data 413 (second encoded three-dimensional data).

This three-dimensional data encoding device 400 enables selective transmission of encoded three-dimensional data 413 and encoded three-dimensional data 414, in accordance, for example, with the intended use, etc.

Also, extracted three-dimensional data 412 is encoded by a first encoding method, and input three-dimensional data 411 is encoded by a second encoding method different from the first encoding method.

This three-dimensional data encoding device 400 enables the use of an encoding method suitable for each of input three-dimensional data 411 and extracted three-dimensional data 412.

Also, of intra prediction and inter prediction, the inter prediction is more preferentially performed in the first encoding method than in the second encoding method.

This three-dimensional data encoding device 400 enables inter prediction to be more preferentially performed on extracted three-dimensional data 412 in which adjacent data items are likely to have low correlation.

Also, the first encoding method and the second encoding method represent three-dimensional positions differently. For example, the second encoding method represents three-dimensional positions by octree, and the first encoding method represents three-dimensional positions by three-dimensional coordinates.

This three-dimensional data encoding device 400 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Stated differently, such identifier indicates whether the encoded three-dimensional data is encoded three-dimensional data 413 of a WLD or encoded three-dimensional data 414 of a SWLD.

This enables the decoding device to readily judge whether the obtained encoded three-dimensional data is encoded three-dimensional data 413 or encoded three-dimensional data 414.

Also, three-dimensional data encoding device 400 encodes extracted three-dimensional data 412 in a manner that encoded three-dimensional data 414 has a smaller data amount than a data amount of encoded three-dimensional data 413.

This three-dimensional data encoding device 400 enables encoded three-dimensional data 414 to have a smaller data amount than the data amount of encoded three-dimensional data 413.

Also, three-dimensional data encoding device 400 further extracts data corresponding to an object having a predetermined attribute from input three-dimensional data 411 as extracted three-dimensional data 412. The object having a predetermined attribute is, for example, an object necessary for self-location estimation, driving assist, or self-driving, etc., or more specifically, a signal, an intersection, etc.

This three-dimensional data encoding device 400 is capable of generating encoded three-dimensional data 414 that includes data required by the decoding device.

Also, three-dimensional data encoding device 400 (server) further sends, to a client, one of encoded three-dimensional data 413 and encoded three-dimensional data 414 in accordance with a status of the client.

This three-dimensional data encoding device 400 is capable of sending appropriate data in accordance with the status of the client.

Also, the status of the client includes one of a communication condition (e.g., network bandwidth) of the client and a traveling speed of the client.

Also, three-dimensional data encoding device 400 further sends, to a client, one of encoded three-dimensional data 413 and encoded three-dimensional data 414 in accordance with a request from the client.

This three-dimensional data encoding device 400 is capable of sending appropriate data in accordance with the request from the client.

Also, three-dimensional data decoding device 500 according to the present embodiment decodes encoded three-dimensional data 413 or encoded three-dimensional data 414 generated by three-dimensional data encoding device 400 described above.

Stated differently, three-dimensional data decoding device 500 decodes, by a first decoding method, encoded three-dimensional data 414 obtained by encoding extracted three-dimensional data 412 having an amount of a feature greater than or equal to a threshold, extracted three-dimensional data 412 having been extracted from input three-dimensional data 411. Three-dimensional data decoding device 500 also decodes, by a second decoding method, encoded three-dimensional data 413 obtained by encoding input three-dimensional data 411, the second decoding method being different from the first decoding method.

This three-dimensional data decoding device 500 enables selective reception of encoded three-dimensional data 414 obtained by encoding data having an amount of a feature greater than or equal to the threshold and encoded three-dimensional data 413, in accordance, for example, with the intended use, etc. Three-dimensional data decoding device 500 is thus capable of reducing the amount of data to be transmitted. Such three-dimensional data decoding device 500 further enables the use of a decoding method suitable for each of input three-dimensional data 411 and extracted three-dimensional data 412.

Also, of intra prediction and inter prediction, the inter prediction is more preferentially performed in the first decoding method than in the second decoding method.

This three-dimensional data decoding device 500 enables inter prediction to be more preferentially performed on the extracted three-dimensional data in which adjacent data items are likely to have low correlation.

Also, the first decoding method and the second decoding method represent three-dimensional positions differently. For example, the second decoding method represents three-dimensional positions by octree, and the first decoding method represents three-dimensional positions by three-dimensional coordinates.

This three-dimensional data decoding device 500 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Three-dimensional data decoding device 500 refers to such identifier in identifying between encoded three-dimensional data 413 and encoded three-dimensional data 414.

This three-dimensional data decoding device 500 is capable of readily judging whether the obtained encoded three-dimensional data is encoded three-dimensional data 413 or encoded three-dimensional data 414.

Three-dimensional data decoding device 500 further notifies a server of a status of the client (three-dimensional data decoding device 500). Three-dimensional data decoding device 500 receives one of encoded three-dimensional data 413 and encoded three-dimensional data 414 from the server, in accordance with the status of the client.

This three-dimensional data decoding device 500 is capable of receiving appropriate data in accordance with the status of the client.

Also, the status of the client includes one of a communication condition (e.g., network bandwidth) of the client and a traveling speed of the client.

Three-dimensional data decoding device 500 further makes a request of the server for one of encoded three-dimensional data 413 and encoded three-dimensional data 414, and receives one of encoded three-dimensional data 413 and encoded three-dimensional data 414 from the server, in accordance with the request.

This three-dimensional data decoding device 500 is capable of receiving appropriate data in accordance with the intended use.

Embodiment 3

The present embodiment will describe a method of transmitting/receiving three-dimensional data between vehicles. For example, the three-dimensional data is transmitted/received between the own vehicle and the nearby vehicle.

Figure 24:
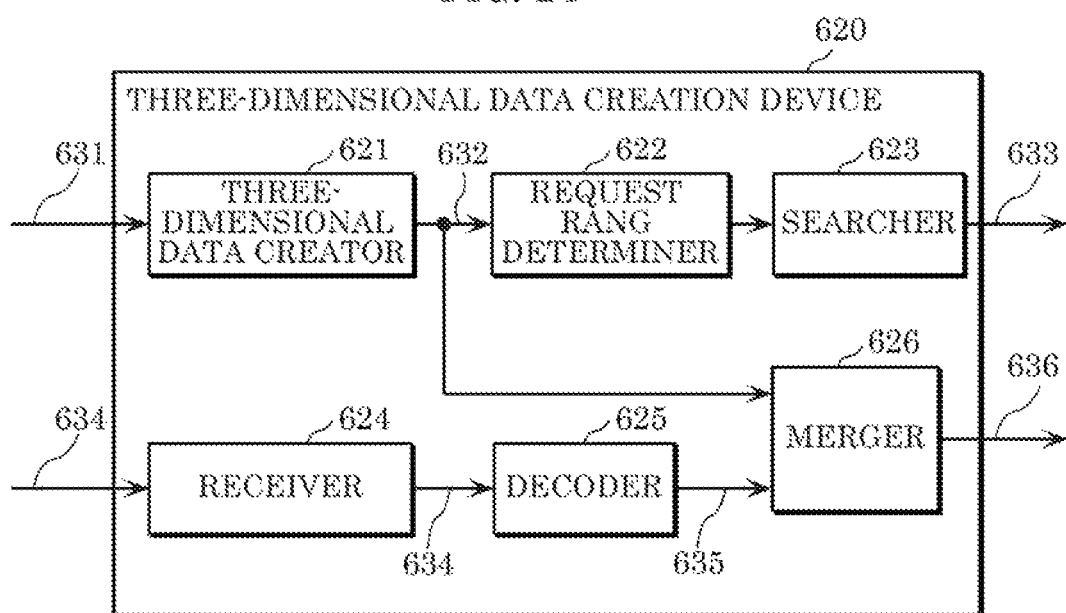
FIG. 24 is a block diagram of a three-dimensional data creation device according to Embodiment 3.

FIG. 24 is a block diagram of three-dimensional data creation device 620 according to the present embodiment. Such three-dimensional data creation device 620, which is included, for example, in the own vehicle, mergers first three-dimensional data 632 created by three-dimensional data creation device 620 with the received second three-dimensional data 635, thereby creating third three-dimensional data 636 having a higher density.

Such three-dimensional data creation device 620 includes three-dimensional data creator 621, request range determiner 622, searcher 623, receiver 624, decoder 625, and merger 626.

First, three-dimensional data creator 621 creates first three-dimensional data 632 by use of sensor information 631 detected by the sensor included in the own vehicle. Next, request range determiner 622 determines a request range, which is the range of a three-dimensional space, the data on which is insufficient in the created first three-dimensional data 632.

Next, searcher 623 searches for the nearby vehicle having the three-dimensional data of the request range, and sends request range information 633 indicating the request range to nearby vehicle 601 having been searched out (S623). Next, receiver 624 receives encoded three-dimensional data 634, which is an encoded stream of the request range, from nearby vehicle 601 (S624). Note that searcher 623 may indiscriminately send requests to all vehicles included in a specified range to receive encoded three-dimensional data 634 from a vehicle that has responded to the request. Searcher 623 may send a request not only to vehicles but also to an object such as a signal and a sign, and receive encoded three-dimensional data 634 from the object.

Next, decoder 625 decodes the received encoded three-dimensional data 634, thereby obtaining second three-dimensional data 635. Next, merger 626 merges first three-dimensional data 632 with second three-dimensional data 635, thereby creating three-dimensional data 636 having a higher density.

Figure 25:
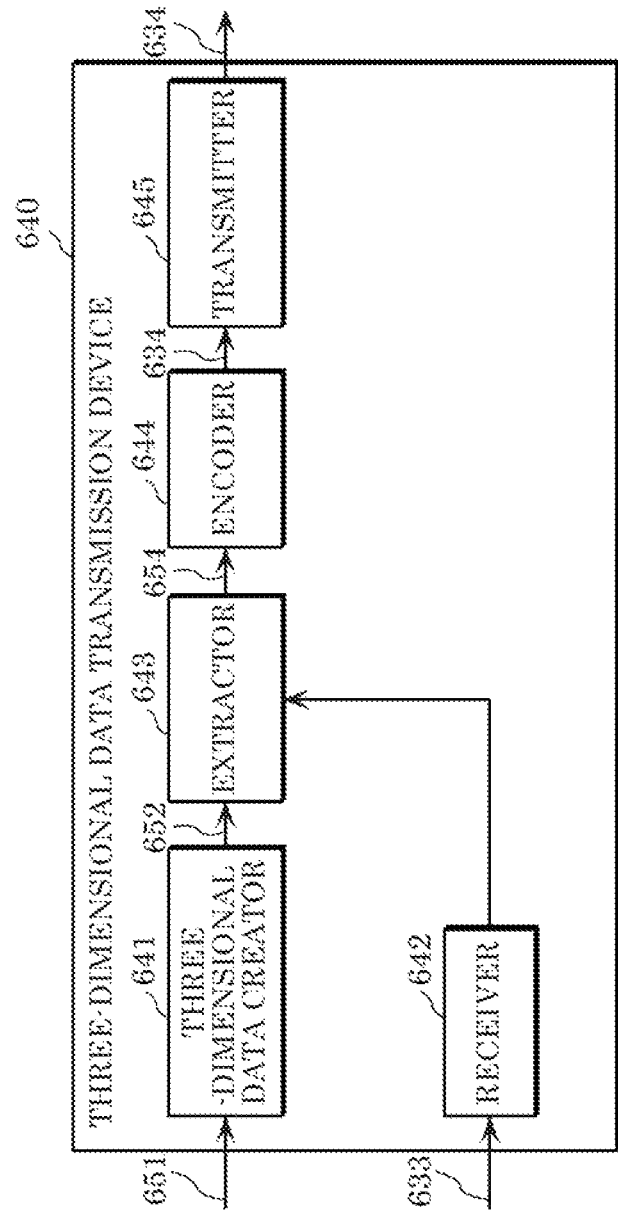
FIG. 25 is a block diagram of a three-dimensional data transmission device according to Embodiment 3.

Next, the structure and operations of three-dimensional data transmission device 640 according to the present embodiment will be described. FIG. 25 is a block diagram of three-dimensional data transmission device 640.

Three-dimensional data transmission device 640 is included, for example, in the above-described nearby vehicle. Three-dimensional data transmission device 640 processes fifth three-dimensional data 652 created by the nearby vehicle into sixth three-dimensional data 654 requested by the own vehicle, encodes sixth three-dimensional data 654 to generate encoded three-dimensional data 634, and sends encoded three-dimensional data 634 to the own vehicle.

Three-dimensional data transmission device 640 includes three-dimensional data creator 641, receiver 642, extractor 643, encoder 644, and transmitter 645.

First, three-dimensional data creator 641 creates fifth three-dimensional data 652 by use of sensor information 651 detected by the sensor included in the nearby vehicle. Next, receiver 642 receives request range information 633 from the own vehicle.

Next, extractor 643 extracts from fifth three-dimensional data 652 the three-dimensional data of the request range indicated by request range information 633, thereby processing fifth three-dimensional data 652 into sixth three-dimensional data 654. Next, encoder 644 encodes sixth three-dimensional data 654 to generate encoded three-dimensional data 643, which is an encoded stream. Then, transmitter 645 sends encoded three-dimensional data 634 to the own vehicle.

Note that although an example case is described here in which the own vehicle includes three-dimensional data creation device 620 and the nearby vehicle includes three-dimensional data transmission device 640, each of the vehicles may include the functionality of both three-dimensional data creation device 620 and three-dimensional data transmission device 640.

Embodiment 4

The present embodiment describes operations performed in abnormal cases when self-location estimation is performed on the basis of a three-dimensional map.

A three-dimensional map is expected to find its expanded use in self-driving of a vehicle and autonomous movement, etc. of a mobile object such as a robot and a flying object (e.g., a drone). Example means for enabling such autonomous movement include a method in which a mobile object travels in accordance with a three-dimensional map, while estimating its self-location on the map (self-location estimation).

The self-location estimation is enabled by matching a three-dimensional map with three-dimensional information on the surrounding of the own vehicle (hereinafter referred to as self-detected three-dimensional data) obtained by a sensor equipped in the own vehicle, such as a rangefinder (e.g., a LiDAR) and a stereo camera to estimate the location of the own vehicle on the three-dimensional map.

As in the case of an HD map suggested by HERE Technologies, for example, a three-dimensional map may include not only a three-dimensional point cloud, but also two-dimensional map data such as information on the shapes of roads and intersections, or information that changes in real-time such as information on a traffic jam and an accident. A three-dimensional map includes a plurality of layers such as layers of three-dimensional data, two-dimensional data, and meta-data that changes in real-time, from among which the device can obtain or refer to only necessary data.

Point cloud data may be a SWLD as described above, or may include point group data that is different from keypoints. The transmission/reception of point cloud data is basically carried out in one or more random access units.

A method described below is used as a method of matching a three-dimensional map with self-detected three-dimensional data. For example, the device compares the shapes of the point groups in each other's point clouds, and determines that portions having a high degree of similarity among keypoints correspond to the same position. When the three-dimensional map is formed by a SWLD, the device also performs matching by comparing the keypoints that form the SWLD with three-dimensional keypoints extracted from the self-detected three-dimensional data.

Here, to enable highly accurate self-location estimation, the following needs to be satisfied: (A) the three-dimensional map and the self-detected three-dimensional data have been already obtained; and (B) their accuracies satisfy a predetermined requirement. However, one of (A) and (B) cannot be satisfied in abnormal cases such as ones described below.

1. A three-dimensional map is unobtainable over communication.
2. A three-dimensional map is not present, or a three-dimensional map having been obtained is corrupt.
3. A sensor of the own vehicle has trouble, or the accuracy of the generated self-detected three-dimensional data is inadequate due to bad weather.

The following describes operations to cope with such abnormal cases. The following description illustrates an example case of a vehicle, but the method described below is applicable to mobile objects on the whole that are capable of autonomous movement, such as a robot and a drone.

Figure 26:
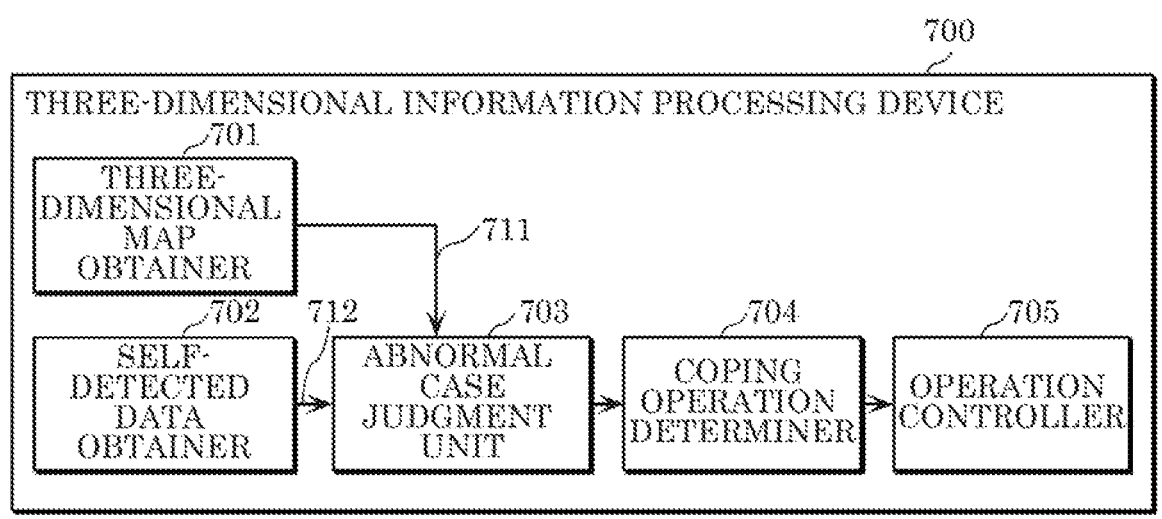
FIG. 26 is a block diagram of a three-dimensional information processing device according to Embodiment 4.

The following describes the structure of the three-dimensional information processing device and its operation according to the present embodiment capable of coping with abnormal cases regarding a three-dimensional map or self-detected three-dimensional data. FIG. 26 is a block diagram of an example structure of three-dimensional information processing device 700 according to the present embodiment.

Three-dimensional information processing device 700 is equipped, for example, in a mobile object such as a car. As shown in FIG. 26, three-dimensional information processing device 700 includes three-dimensional map obtainer 701, self-detected data obtainer 702, abnormal case judgment unit 703, coping operation determiner 704, and operation controller 705.

Note that three-dimensional information processing device 700 may include a non-illustrated two-dimensional or one-dimensional sensor that detects a structural object or a mobile object around the own vehicle, such as a camera capable of obtaining two-dimensional images and a sensor for one-dimensional data utilizing ultrasonic or laser. Three-dimensional information processing device 700 may also include a non-illustrated communication unit that obtains a three-dimensional map over a mobile communication network, such as 4G and 5G, or via inter-vehicle communication or road-to-vehicle communication.

Three-dimensional map obtainer 701 obtains three-dimensional map 711 of the surroundings of the traveling route. For example, three-dimensional map obtainer 701 obtains three-dimensional map 711 over a mobile communication network, or via inter-vehicle communication or road-to-vehicle communication.

Next, self-detected data obtainer 702 obtains self-detected three-dimensional data 712 on the basis of sensor information. For example, self-detected data obtainer 702 generates self-detected three-dimensional data 712 on the basis of the sensor information obtained by a sensor equipped in the own vehicle.

Next, abnormal case judgment unit 703 conducts a predetermined check of at least one of obtained three-dimensional map 711 and self-detected three-dimensional data 712 to detect an abnormal case. Stated differently, abnormal case judgment unit 703 judges whether at least one of obtained three-dimensional map 711 and self-detected three-dimensional data 712 is abnormal.

When the abnormal case is detected, coping operation determiner 704 determines a coping operation to cope with such abnormal case. Next, operation controller 705 controls the operation of each of the processing units necessary to perform the coping operation.

Meanwhile, when no abnormal case is detected, three-dimensional information processing device 700 terminates the process.

Also, three-dimensional information processing device 700 estimates the location of the vehicle equipped with three-dimensional information processing device 700, using three-dimensional map 711 and self-detected three-dimensional data 712. Next, three-dimensional information processing device 700 performs the automatic operation of the vehicle by use of the estimated location of the vehicle.

As described above, three-dimensional information processing device 700 obtains, via a communication channel, map data (three-dimensional map 711) that includes first three-dimensional position information. The first three-dimensional position information includes, for example, a plurality of random access units, each of which is an assembly of at least one subspace and is individually decodable, the at least one subspace having three-dimensional coordinates information and serving as a unit in which each of the plurality of random access units is encoded. The first three-dimensional position information is, for example, data (SWLD) obtained by encoding keypoints, each of which has an amount of a three-dimensional feature greater than or equal to a predetermined threshold.

Three-dimensional information processing device 700 also generates second three-dimensional position information (self-detected three-dimensional data 712) from information detected by a sensor. Three-dimensional information processing device 700 then judges whether one of the first three-dimensional position information and the second three-dimensional position information is abnormal by performing, on one of the first three-dimensional position information and the second three-dimensional position information, a process of judging whether an abnormality is present.

Three-dimensional information processing device 700 determines a coping operation to cope with the abnormality when one of the first three-dimensional position information and the second three-dimensional position information is judged to be abnormal. Three-dimensional information processing device 700 then executes a control that is required to perform the coping operation.

This structure enables three-dimensional information processing device 700 to detect an abnormality regarding one of the first three-dimensional position information and the second three-dimensional position information, and to perform a coping operation therefor.

Embodiment 5

The present embodiment describes a method, etc. of transmitting three-dimensional data to a following vehicle.

Figure 27:
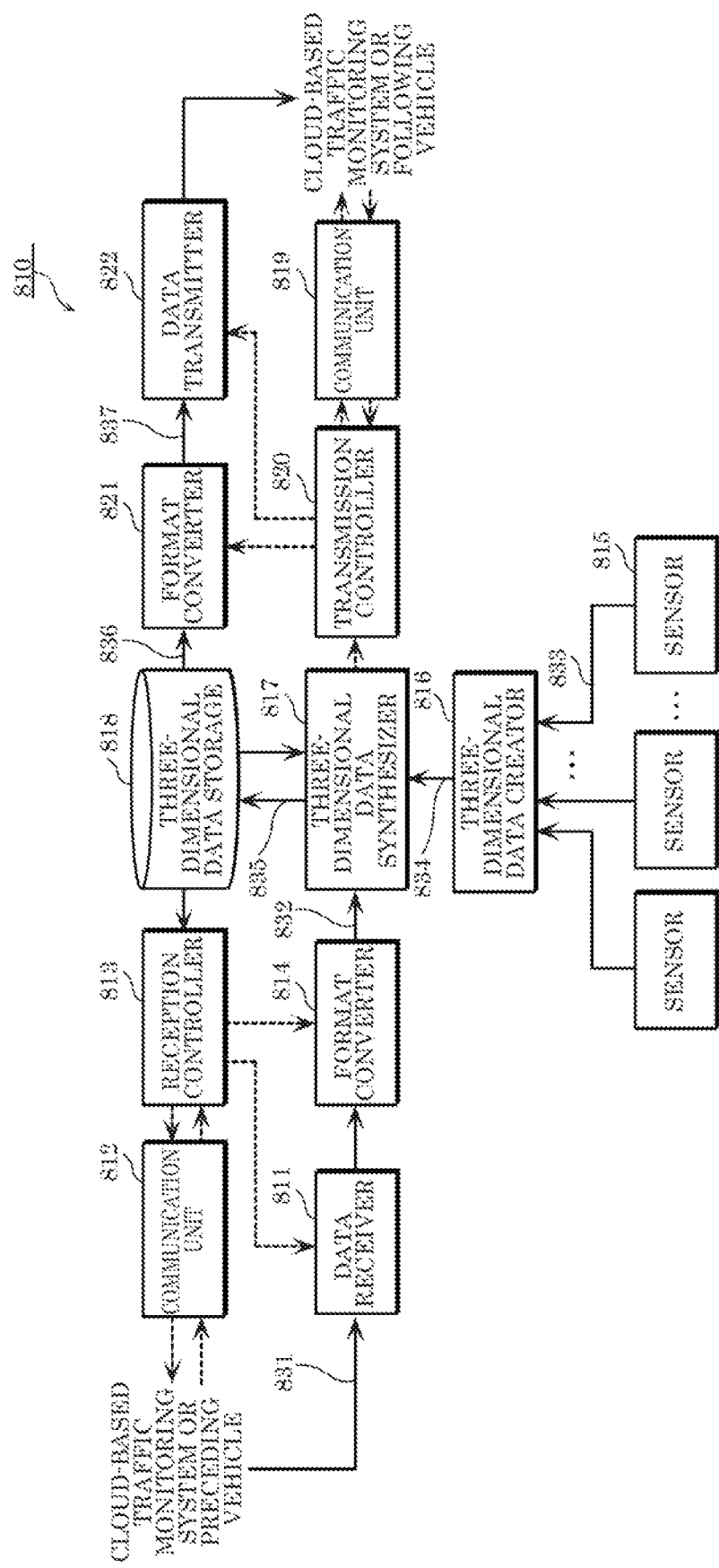
FIG. 27 is a block diagram of a three-dimensional data creation device according to Embodiment 5.

FIG. 27 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Embodiment 6

In embodiment 5, an example is described in which a client device of a vehicle or the like transmits three-dimensional data to another vehicle or a server such as a cloud-based traffic monitoring system. In the present embodiment, a client device transmits sensor information obtained through a sensor to a server or a client device.

Figure 28:
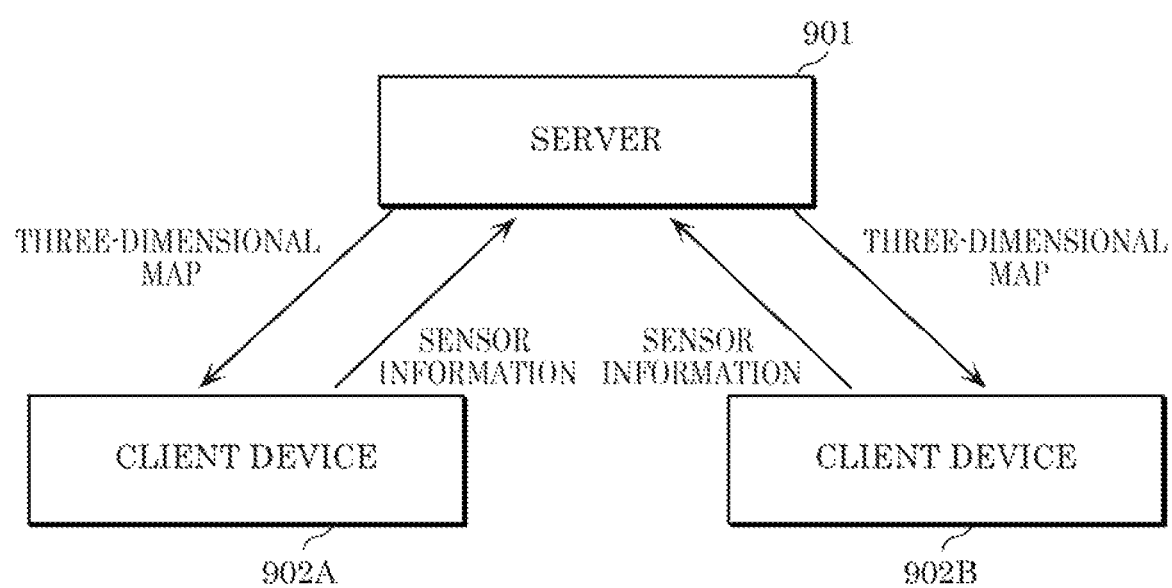
FIG. 28 is a diagram showing a structure of a system according to Embodiment 6.

A structure of a system according to the present embodiment will first be described. FIG. 28 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 29:
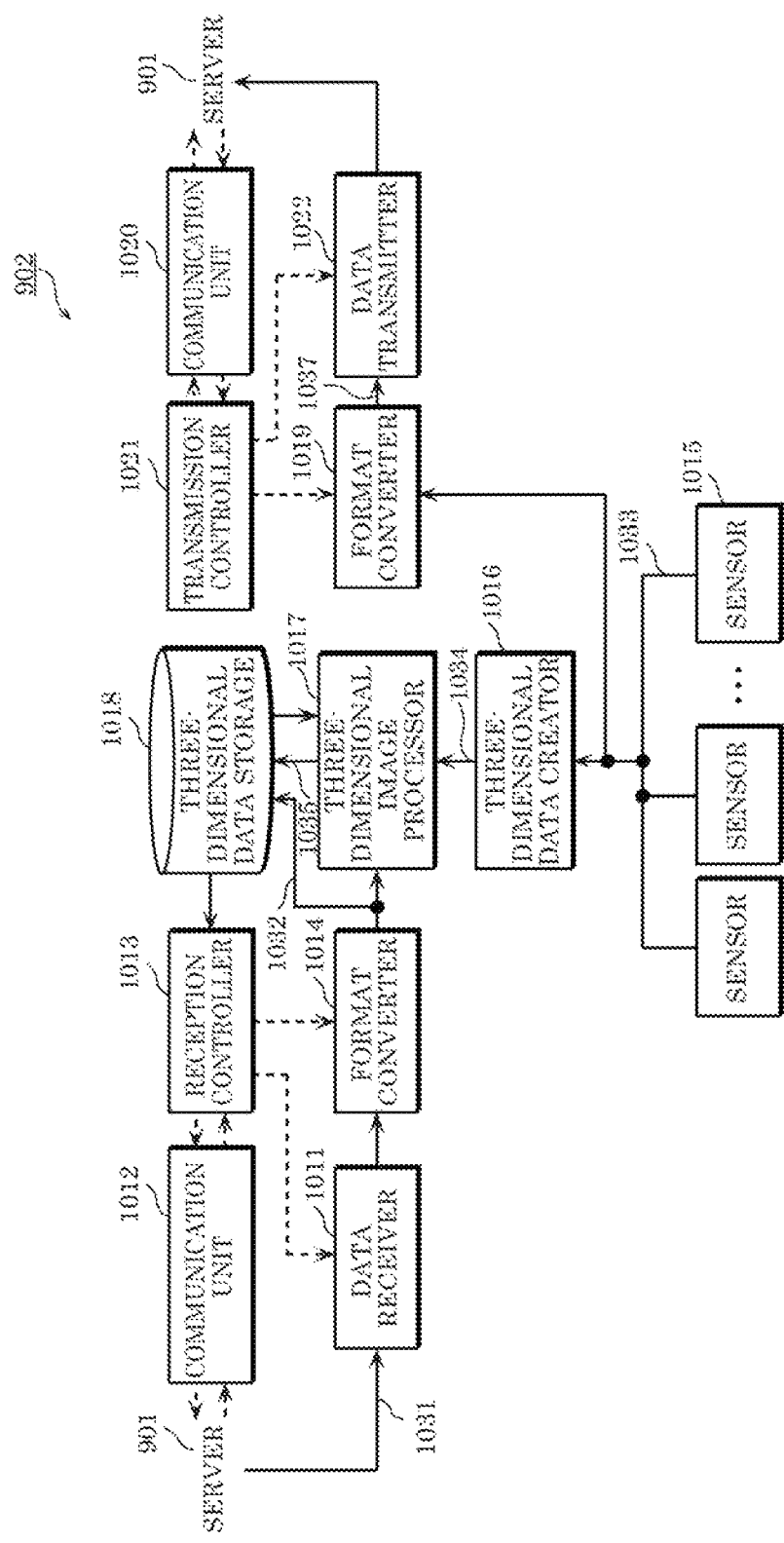
FIG. 29 is a block diagram of a client device according to Embodiment 6.

FIG. 29 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g. transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 815 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 30:
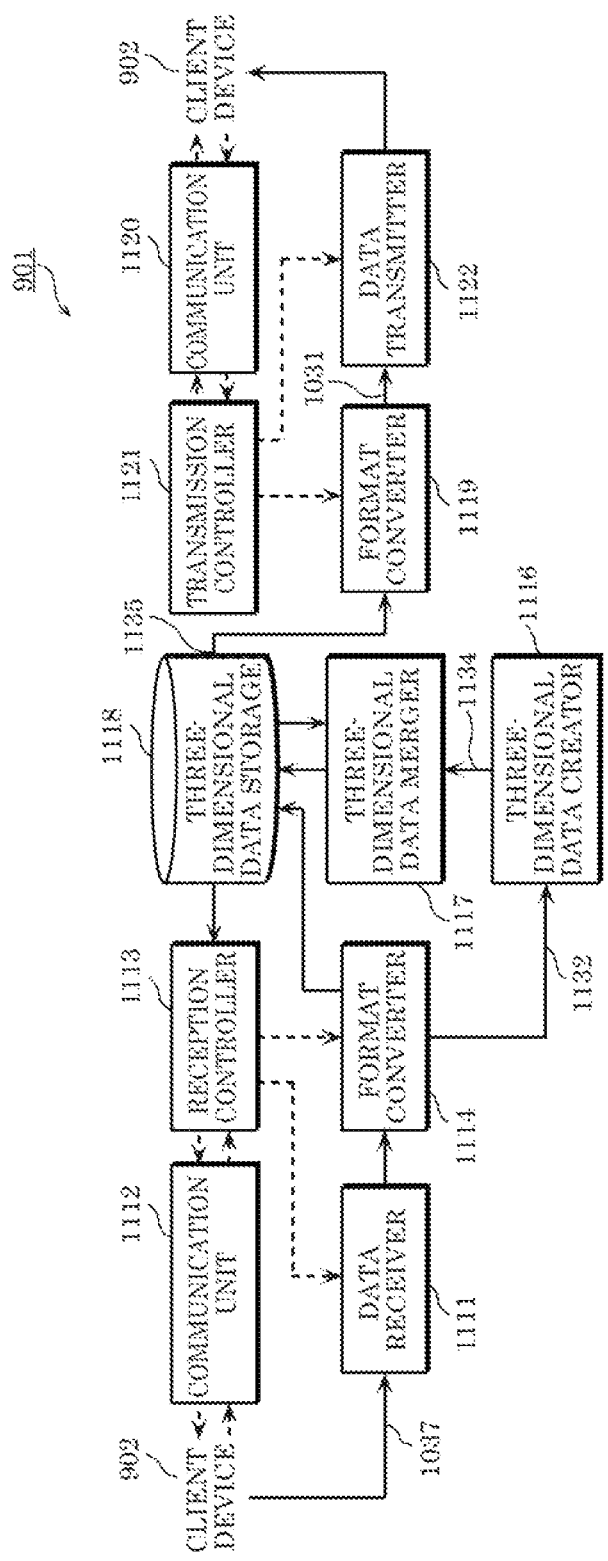
FIG. 30 is a block diagram of a server according to Embodiment 6.

A structure of server 901 will be described next. FIG. 30 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g. transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

An operational flow of client device 902 will be described next. FIG. 31 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

FIG. 32 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 33:
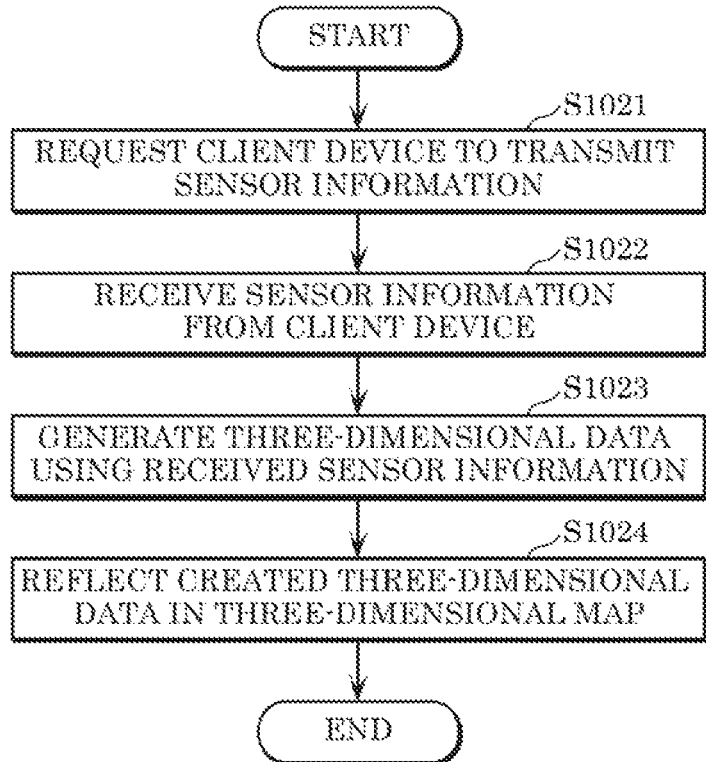
FIG. 33 is a flowchart of a three-dimensional data creation process performed by the server according to Embodiment 6.

An operational flow of server 901 will be described next. FIG. 33 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 34:
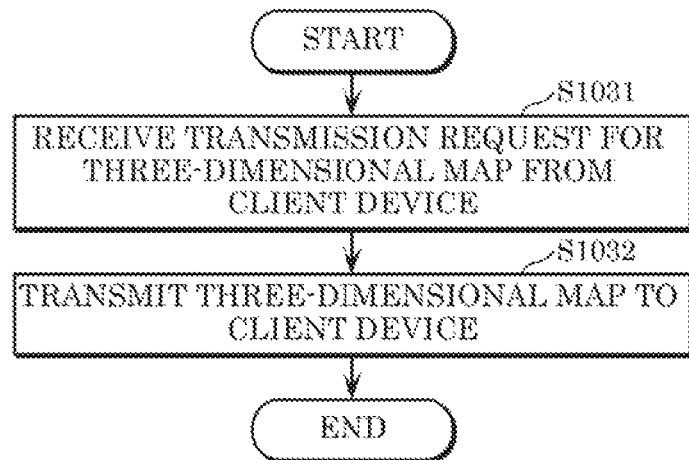
FIG. 34 is a flowchart of a three-dimensional map transmission process performed by the server according to Embodiment 6.

FIG. 34 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

Hereinafter, variations of the present embodiment will be described.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 35:
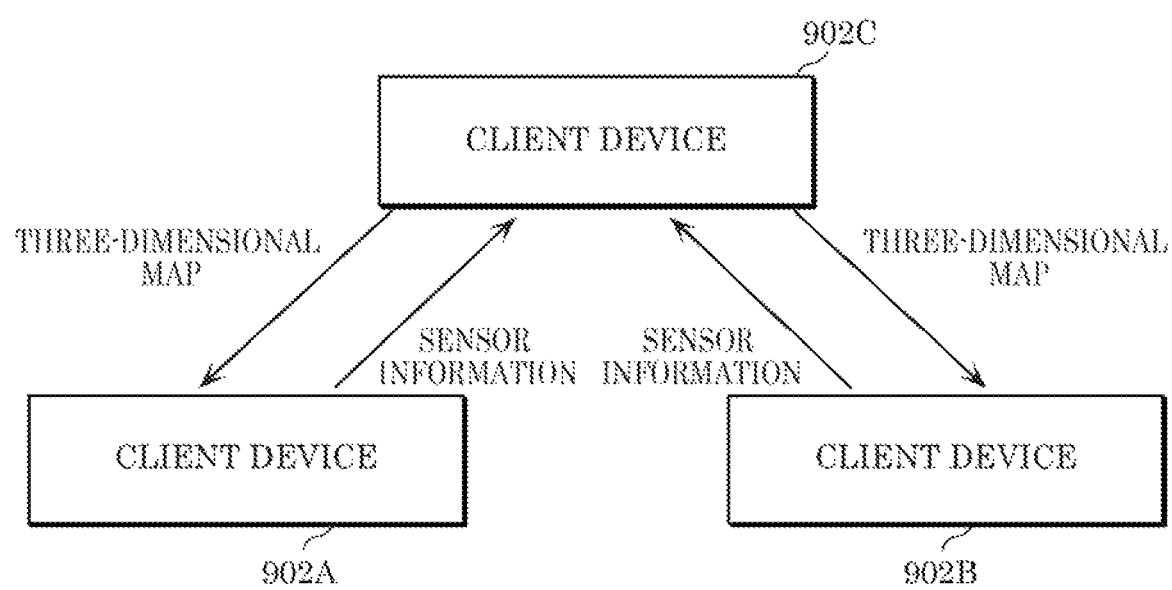
FIG. 35 is a diagram showing a structure of a variation of the system according to Embodiment 6.

Server 901 is not limited to only being a server such as a cloud-based traffic monitoring system, and may also be another (vehicle-mounted) client device. FIG. 35 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 36:
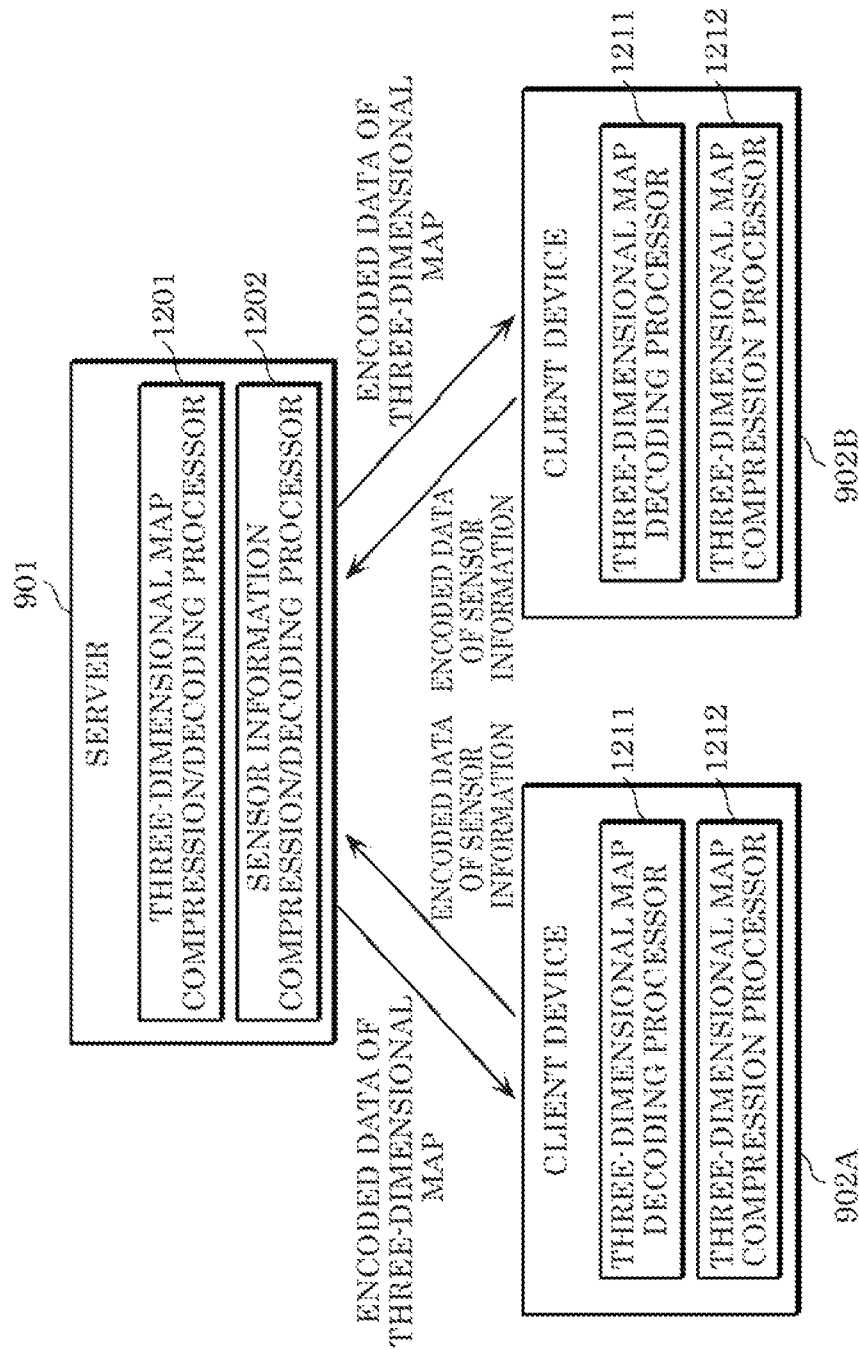
FIG. 36 is a diagram showing a structure of the server and client devices according to Embodiment 6.

FIG. 36 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits obtained sensor information 1033 to server 901 or another mobile object.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1034 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another mobile object 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Embodiment 7

In the present embodiment, three-dimensional data encoding and decoding methods using an inter prediction process will be described.

Figure 37:
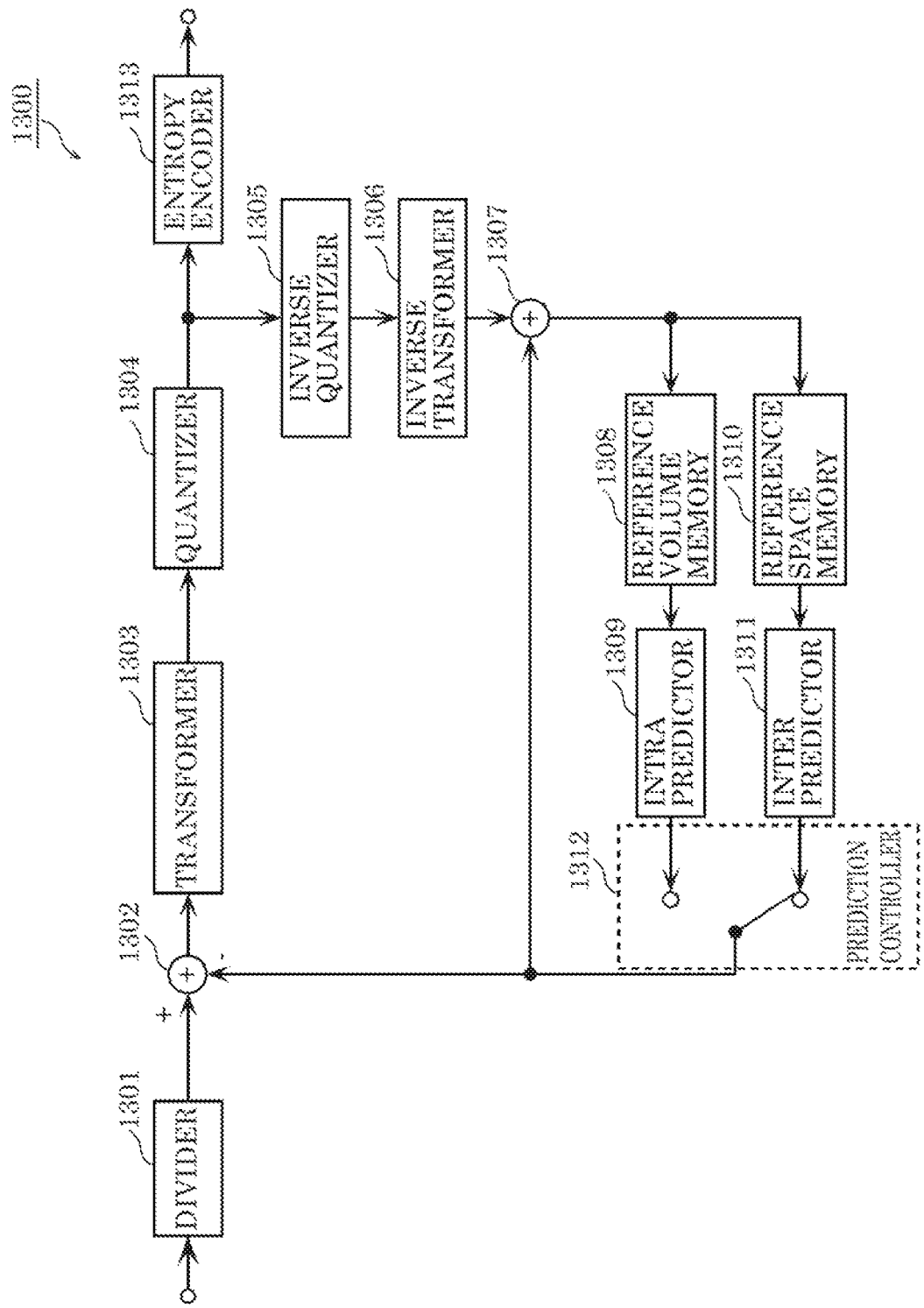
FIG. 37 is a block diagram of a three-dimensional data encoding device according to Embodiment 7.

FIG. 37 is a block diagram of three-dimensional data encoding device 1300 according to the present embodiment. This three-dimensional data encoding device 1300 generates an encoded bitstream (hereinafter, also simply referred to as bitstream) that is an encoded signal, by encoding three-dimensional data. As illustrated in FIG. 37, three-dimensional data encoding device 1300 includes divider 1301, subtractor 1302, transformer 1303, quantizer 1304, inverse quantizer 1305, inverse transformer 1306, adder 1307, reference volume memory 1308, intra predictor 1309, reference space memory 1310, inter predictor 1311, prediction controller 1312, and entropy encoder 1313.

Divider 1301 divides a plurality of volumes (VLMs) that are encoding units of each space (SPC) included in the three-dimensional data. Divider 1301 makes an octree representation (make into an octree) of voxels in each volume. Note that divider 1301 may make the spaces into an octree representation with the spaces having the same size as the volumes. Divider 1301 may also append information (depth information, etc.) necessary for making the octree representation to a header and the like of a bitstream.

Figure 38:
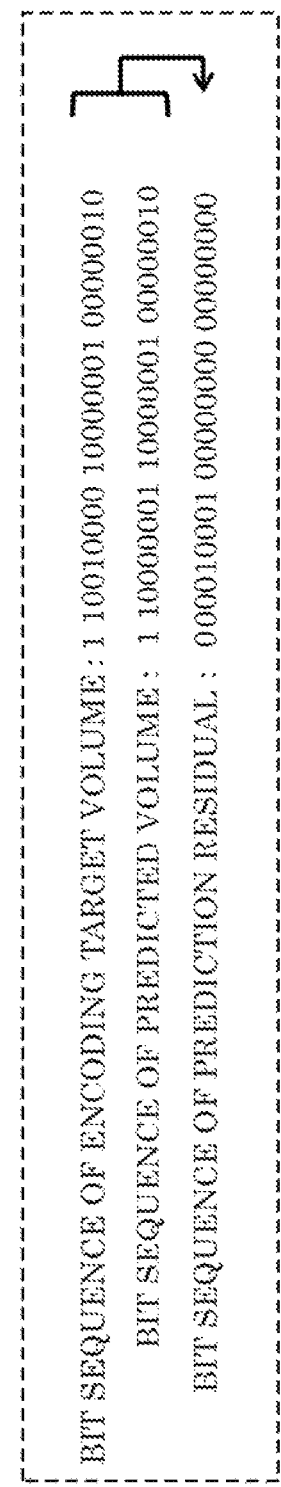
FIG. 38 is a diagram showing an example of a prediction residual according to Embodiment 7.

Subtractor 1302 calculates a difference between a volume (encoding target volume) outputted by divider 1301 and a predicted volume generated through intra prediction or inter prediction, which will be described later, and outputs the calculated difference to transformer 1303 as a prediction residual. FIG. 38 is a diagram showing an example calculation of the prediction residual. Note that bit sequences of the encoding target volume and the predicted volume shown here are, for example, position information indicating positions of three-dimensional points included in the volumes.

Figure 39:
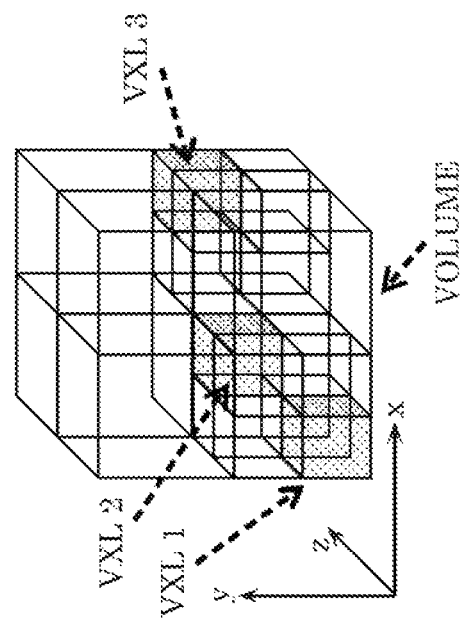
FIG. 39 is a diagram showing an example of a volume according to Embodiment 7.
Figure 40:
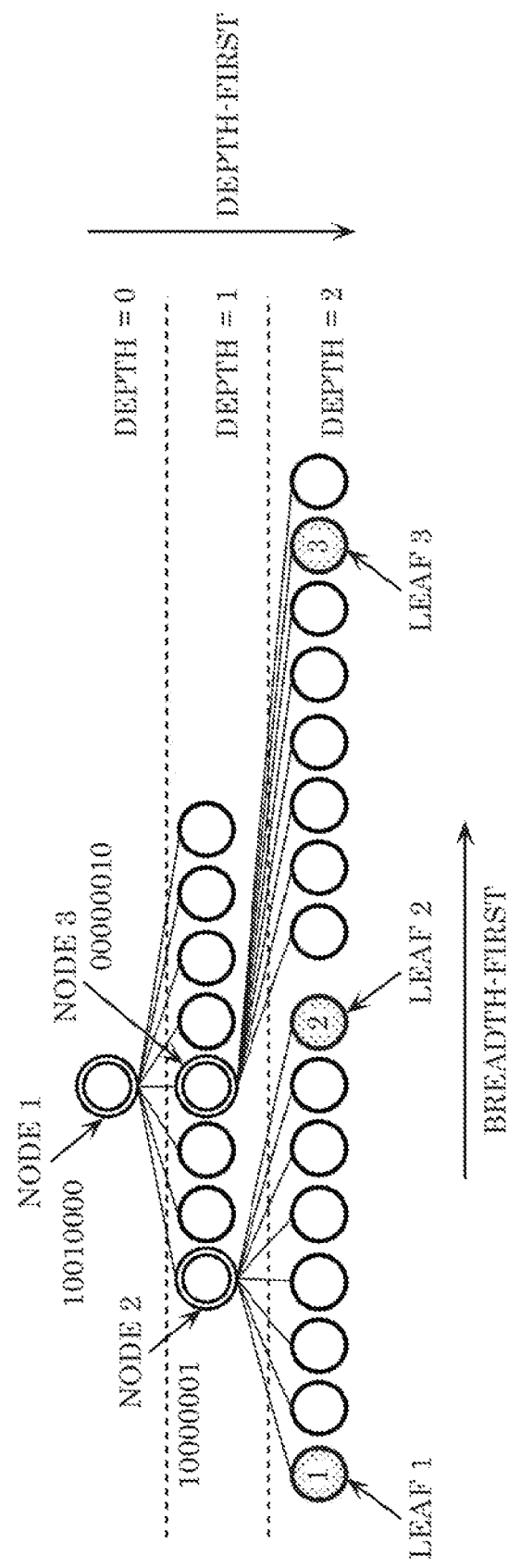
FIG. 40 is a diagram showing an example of an octree representation of the volume according to Embodiment 7.

Hereinafter, a scan order of an octree representation and voxels will be described. A volume is encoded after being converted into an octree structure (made into an octree). The octree structure includes nodes and leaves. Each node has eight nodes or leaves, and each leaf has voxel (VXL) information. FIG. 39 is a diagram showing an example structure of a volume including voxels. FIG. 40 is a diagram showing an example of the volume shown in FIG. 39 having been converted into the octree structure. Among the leaves shown in FIG. 40, leaves 1, 2, and 3 respectively represent VXL 1, VXL 2, and VXL 3, and represent VXLs including a point group (hereinafter, active VXLs).

An octree is represented by for example, binary sequences of 1s and 0s. For example, when giving the nodes or the active VXLs a value of 1 and everything else a value of 0, each node and leaf is assigned with the binary sequence shown in FIG. 40. Thus, this binary sequence is scanned in accordance with a breadth-first or a depth-first scan order. For example, when scanning breadth-first, the binary sequence shown in A of FIG. 41 is obtained. When scanning depth-first, the binary sequence shown in B of FIG. 41 is obtained. The binary sequences obtained through this scanning are encoded through entropy encoding, which reduces an amount of information.

Depth information in the octree representation will be described next. Depth in the octree representation is used in order to control up to how fine a granularity point cloud information included in a volume is stored. Upon setting a great depth, it is possible to reproduce the point cloud information to a more precise level, but an amount of data for representing the nodes and leaves increases. Upon setting a small depth, however, the amount of data decreases, but some information that the point cloud information originally held is lost, since pieces of point cloud information including different positions and different colors are now considered as pieces of point cloud information including the same position and the same color.

Figure 42:
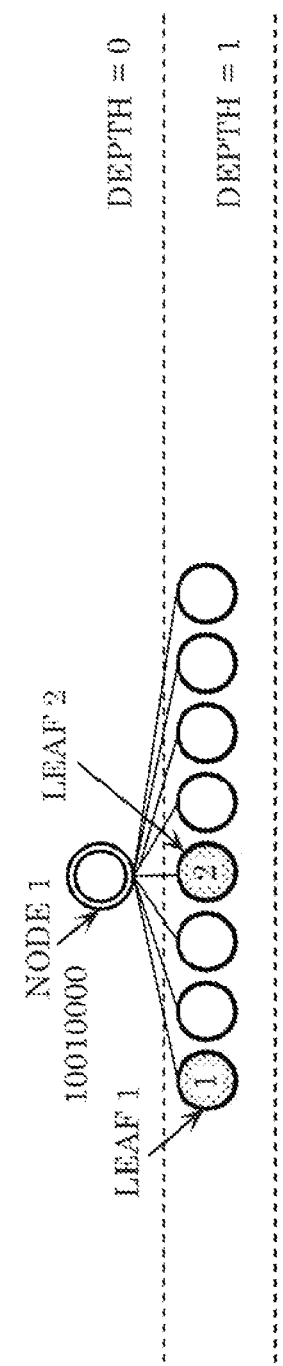
FIG. 42 is a diagram showing an example of an octree representation of a volume according to Embodiment 7.

For example, FIG. 42 is a diagram showing an example in which the octree with a depth of 2 shown in FIG. 40 is represented with a depth of 1. The octree shown in FIG. 42 has a lower amount of data than the octree shown in FIG. 40. In other words, the binarized octree shown in FIG. 42 has a lower bit count than the octree shown in FIG. 40. Leaf 1 and leaf 2 shown in FIG. 40 are represented by leaf 1 shown in FIG. 41. In other words, the information on leaf 1 and leaf 2 being in different positions is lost.

Figure 43:
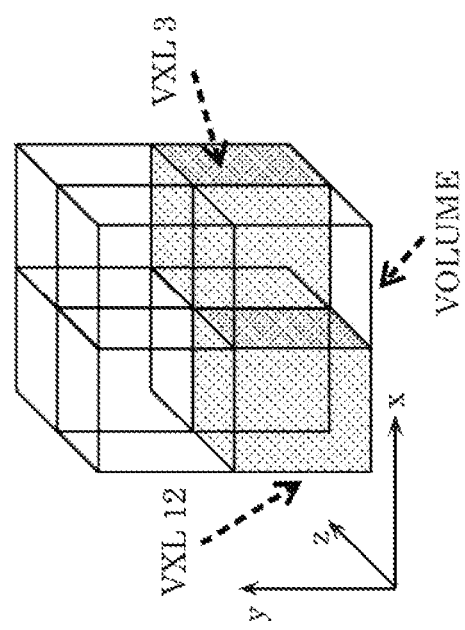
FIG. 43 is a diagram showing an example of the volume according to Embodiment 7.

FIG. 43 is a diagram showing a volume corresponding to the octree shown in FIG. 42. VXL 1 and VXL 2 shown in FIG. 39 correspond to VXL 12 shown in FIG. 43. In this case, three-dimensional data encoding device 1300 generates color information of VXL 12 shown in FIG. 43 using color information of VXL 1 and VXL 2 shown in FIG. 39. For example, three-dimensional data encoding device 1300 calculates an average value, a median, a weighted average value, or the like of the color information of VXL 1 and VXL 2 as the color information of VXL 12. In this manner, three-dimensional data encoding device 1300 may control a reduction of the amount of data by changing the depth of the octree.

Three-dimensional data encoding device 1300 may set the depth information of the octree to units of worlds, units of spaces, or units of volumes. In this case, three-dimensional data encoding device 1300 may append the depth information to header information of the world, header information of the space, or header information of the volume. In all worlds, spaces, and volumes associated with different times, the same value may be used as the depth information. In this case, three-dimensional data encoding device 1300 may append the depth information to header information managing the worlds associated with all times.

When the color information is included in the voxels, transformer 1303 applies frequency transformation, e.g. orthogonal transformation, to a prediction residual of the color information of the voxels in the volume. For example, transformer 1303 creates a one-dimensional array by scanning the prediction residual in a certain scan order. Subsequently, transformer 1303 transforms the one-dimensional array to a frequency domain by applying one-dimensional orthogonal transformation to the created one-dimensional array. With this, when a value of the prediction residual in the volume is similar, a value of a low-frequency component increases and a value of a high-frequency component decreases. As such, it is possible to more efficiently reduce a code amount in quantizer 1304.

Transformer 1303 does not need to use orthogonal transformation in one dimension, but may also use orthogonal transformation in two or more dimensions. For example, transformer 1303 maps the prediction residual to a two-dimensional array in a certain scan order, and applies two-dimensional orthogonal transformation to the obtained two-dimensional array. Transformer 1303 may select an orthogonal transformation method to be used from a plurality of orthogonal transformation methods. In this case, three-dimensional data encoding device 1300 appends, to the bitstream, information indicating which orthogonal transformation method is used. Transformer 1303 may select an orthogonal transformation method to be used from a plurality of orthogonal transformation methods in different dimensions. In this case, three-dimensional data encoding device 1300 appends, to the bitstream, in how many dimensions the orthogonal transformation method is used.

For example, transformer 1303 matches the scan order of the prediction residual to a scan order (breadth-first, depth-first, or the like) in the octree in the volume. This makes it possible to reduce overhead, since information indicating the scan order of the prediction residual does not need to be appended to the bitstream. Transformer 1303 may apply a scan order different from the scan order of the octree. In this case, three-dimensional data encoding device 1300 appends, to the bitstream, information indicating the scan order of the prediction residual. This enables three-dimensional data encoding device 1300 to efficiently encode the prediction residual. Three-dimensional data encoding device 1300 may append, to the bitstream, information (flag, etc.) indicating whether to apply the scan order of the octree, and may also append, to the bitstream, information indicating the scan order of the prediction residual when the scan order of the octree is not applied.

Transformer 1303 does not only transform the prediction residual of the color information, and may also transform other attribute information included in the voxels. For example, transformer 1303 may transform and encode information, such as reflectance information, obtained when obtaining a point cloud through LiDAR and the like.

Transformer 1303 may skip these processes when the spaces do not include attribute information such as color information. Three-dimensional data encoding device 1300 may append, to the bitstream, information (flag) indicating whether to skip the processes of transformer 1303.

Quantizer 1304 generates a quantized coefficient by performing quantization using a quantization control parameter on a frequency component of the prediction residual generated by transformer 1303. With this, the amount of information is further reduced. The generated quantized coefficient is outputted to entropy encoder 1313. Quantizer 1304 may control the quantization control parameter in units of worlds, units of spaces, or units of volumes. In this case, three-dimensional data encoding device 1300 appends the quantization control parameter to each header information and the like. Quantizer 1304 may perform quantization control by changing a weight per frequency component of the prediction residual. For example, quantizer 1304 may precisely quantize a low-frequency component and roughly quantize a high-frequency component. In this case, three-dimensional data encoding device 1300 may append, to a header, a parameter expressing a weight of each frequency component.

Quantizer 1304 may skip these processes when the spaces do not include attribute information such as color information. Three-dimensional data encoding device 1300 may append, to the bitstream, information (flag) indicating whether to skip the processes of quantizer 1304.

Inverse quantizer 1305 generates an inverse quantized coefficient of the prediction residual by performing inverse quantization on the quantized coefficient generated by quantizer 1304 using the quantization control parameter, and outputs the generated inverse quantized coefficient to inverse transformer 1306.

Inverse transformer 1306 generates an inverse transformation-applied prediction residual by applying inverse transformation on the inverse quantized coefficient generated by inverse quantizer 1305. This inverse transformation-applied prediction residual does not need to completely coincide with the prediction residual outputted by transformer 1303, since the inverse transformation-applied prediction residual is a prediction residual that is generated after the quantization.

Adder 1307 adds, to generate a reconstructed volume, (i) the inverse transformation-applied prediction residual generated by inverse transformer 1306 to (ii) a predicted volume that is generated through intra prediction or intra prediction, which will be described later, and is used to generate a pre-quantized prediction residual. This reconstructed volume is stored in reference volume memory 1308 or reference space memory 1310.

Intra predictor 1309 generates a predicted volume of an encoding target volume using attribute information of a neighboring volume stored in reference volume memory 1308. The attribute information includes color information or a reflectance of the voxels. Intra predictor 1309 generates a predicted value of color information or a reflectance of the encoding target volume.

Figure 44:
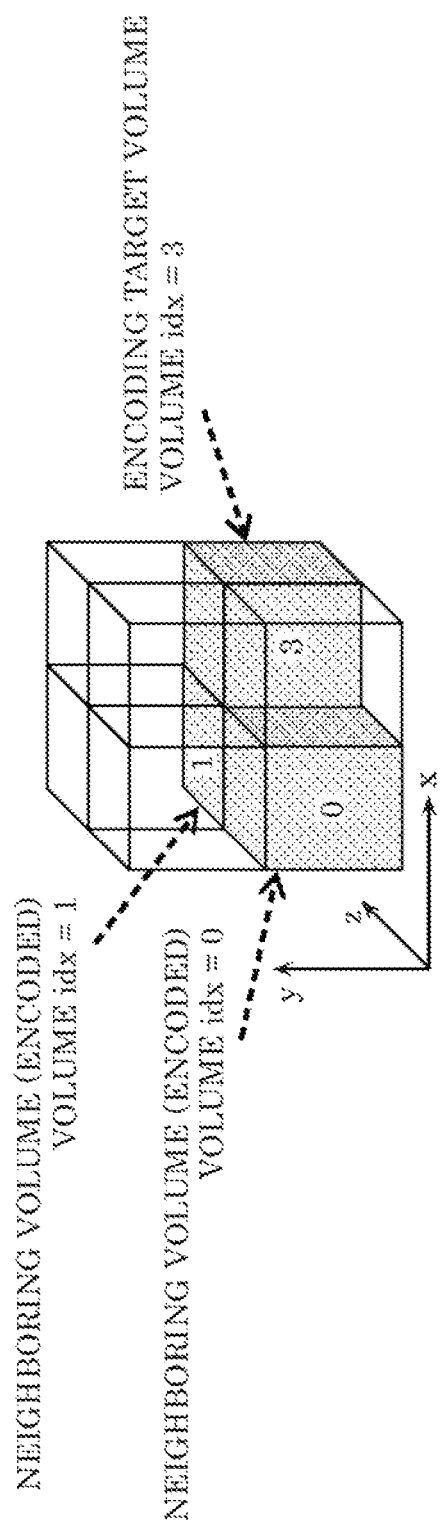
FIG. 44 is a diagram for describing an intra prediction process according to Embodiment 7.

FIG. 44 is a diagram for describing an operation of intra predictor 1309. For example, intra predictor 1309 generates the predicted volume of the encoding target volume (volume idx=3) shown in FIG. 44, using a neighboring volume (volume idx=0). Volume idx here is identifier information that is appended to a volume in a space, and a different value is assigned to each volume. An order of assigning volume idx may be the same as an encoding order, and may also be different from the encoding order. For example, intra predictor 1309 uses an average value of color information of voxels included in volume idx=0, which is a neighboring volume, as the predicted value of the color information of the encoding target volume shown in FIG. 44. In this case, a prediction residual is generated by deducting the predicted value of the color information from the color information of each voxel included in the encoding target volume. The following processes are performed by transformer 1303 and subsequent processors with respect to this prediction residual. In this case, three-dimensional data encoding device 1300 appends, to the bitstream, neighboring volume information and prediction mode information. The neighboring volume information here is information indicating a neighboring volume used in the prediction, and indicates, for example, volume idx of the neighboring volume used in the prediction. The prediction mode information here indicates a mode used to generate the predicted volume. The mode is, for example, an average value mode in which the predicted value is generated using an average value of the voxels in the neighboring volume, or a median mode in which the predicted value is generated using the median of the voxels in the neighboring volume.

Intra predictor 1309 may generate the predicted volume using a plurality of neighboring volumes. For example, in the structure shown in FIG. 44, intra predictor 1309 generates predicted volume 0 using a volume with volume idx=0, and generates predicted volume 1 using a volume with volume idx=1. Intra predictor 1309 then generates an average of predicted volume 0 and predicted volume 1 as a final predicted volume. In this case, three-dimensional data encoding device 1300 may append, to the bitstream, a plurality of volumes idx of a plurality of volumes used to generate the predicted volume.

Embodiment 8

In the present embodiment, a representation means of three-dimensional points (point cloud) in encoding of three-dimensional data will be described.

Figure 45:
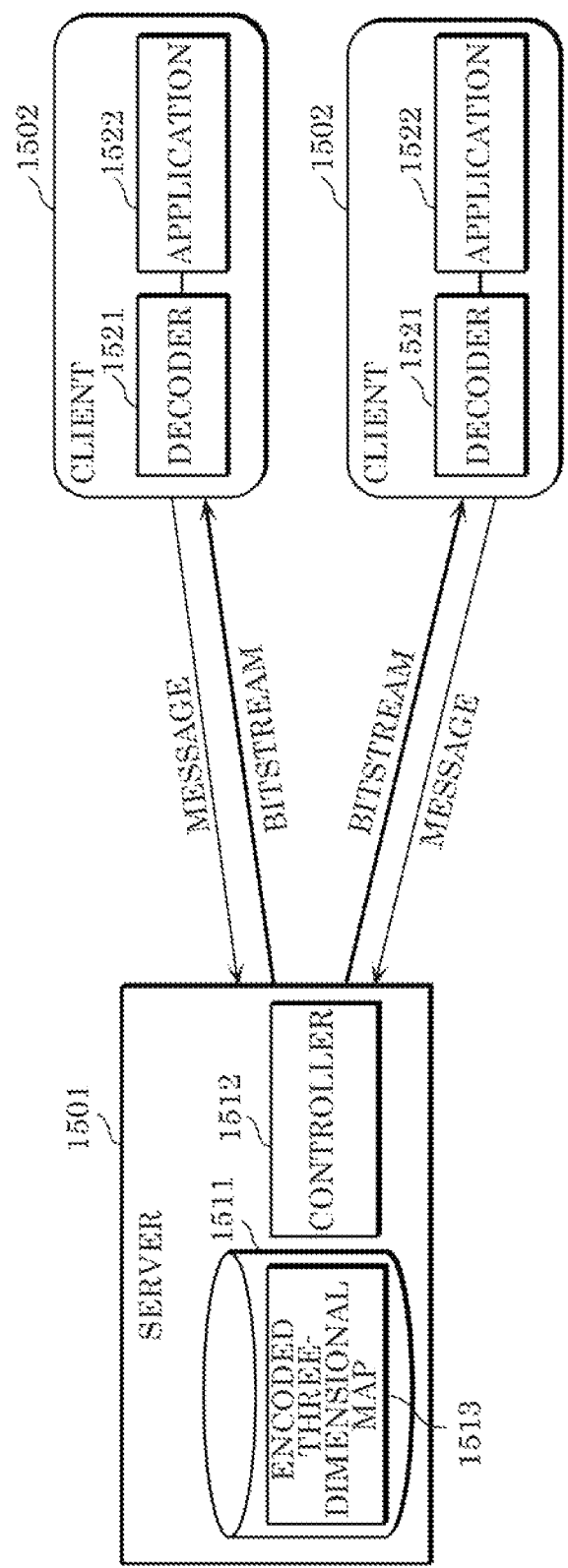
FIG. 45 is a diagram showing a structure of a distribution system according to Embodiment 8.

FIG. 45 is a block diagram showing a structure of a distribution system of three-dimensional data according to the present embodiment. The distribution system shown in FIG. 45 includes server 1501 and a plurality of clients 1502.

Server 1501 includes storage 1511 and controller 1512. Storage 1511 stores encoded three-dimensional map 1513 that is encoded three-dimensional data.

Figure 46:
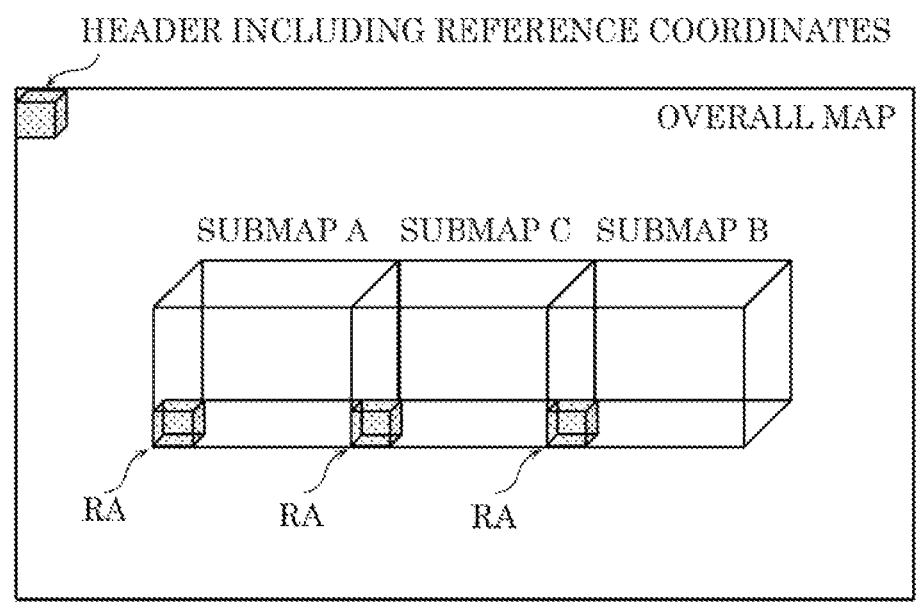
FIG. 46 is a diagram showing an example structure of a bitstream of an encoded three-dimensional map according to Embodiment 8.

FIG. 46 is a diagram showing an example structure of a bitstream of encoded three-dimensional map 1513. The three-dimensional map is divided into a plurality of submaps and each submap is encoded. Each submap is appended with a random-access (RA) header including subcoordinate information. The subcoordinate information is used for improving encoding efficiency of the submap. This subcoordinate information indicates subcoordinates of the submap. The subcoordinates are coordinates of the submap having reference coordinates as reference. Note that the three-dimensional map including the plurality of submaps is referred to as an overall map. Coordinates that are a reference in the overall map (e.g. origin) are referred to as the reference coordinates. In other words, the subcoordinates are the coordinates of the submap in a coordinate system of the overall map. In other words, the subcoordinates indicate an offset between the coordinate system of the overall map and a coordinate system of the submap. Coordinates in the coordinate system of the overall map having the reference coordinates as reference are referred to as overall coordinates. Coordinates in the coordinate system of the submap having the subcoordinates as reference are referred to as differential coordinates.

Client 1502 transmits a message to server 1501. This message includes position information on client 1502. Controller 1512 included in server 1501 obtains a bitstream of a submap located closest to client 1502, based on the position information included in the received message. The bitstream of the submap includes the subcoordinate information and is transmitted to client 1502. Decoder 1521 included in client 1502 obtains overall coordinates of the submap having the reference coordinates as reference, using this subcoordinate information. Application 1522 included in client 1502 executes an application relating to a self-location, using the obtained overall coordinates of the submap.

The submap indicates a partial area of the overall map. The subcoordinates are the coordinates in which the submap is located in a reference coordinate space of the overall map. For example, in an overall map called A, there is submap A called AA and submap B called AB. When a vehicle wants to consult a map of AA, decoding begins from submap A. and when the vehicle wants to consult a map of AB, decoding begins from submap B. The submap here is a random-access point. To be specific, A is Osaka Prefecture. AA is Osaka City, and AB is Takatsuki City.

Each submap is transmitted along with the subcoordinate information to the client. The subcoordinate information is included in header information of each submap, a transmission packet, or the like.

The reference coordinates, which serve as a reference for the subcoordinate information of each submap, may be appended to header information of a space at a higher level than the submap, such as header information of the overall map.

The submap may be formed by one space (SPC). The submap may also be formed by a plurality of SPCs.

The submap may include a Group of Spaces (GOS). The submap may be formed by a world. For example, in a case where there are a plurality of objects in the submap, the submap is formed by a plurality of SPCs when assigning the plurality of objects to separate SPCs. The submap is formed by one SPC when assigning the plurality of objects to one SPC.

Figure 47:
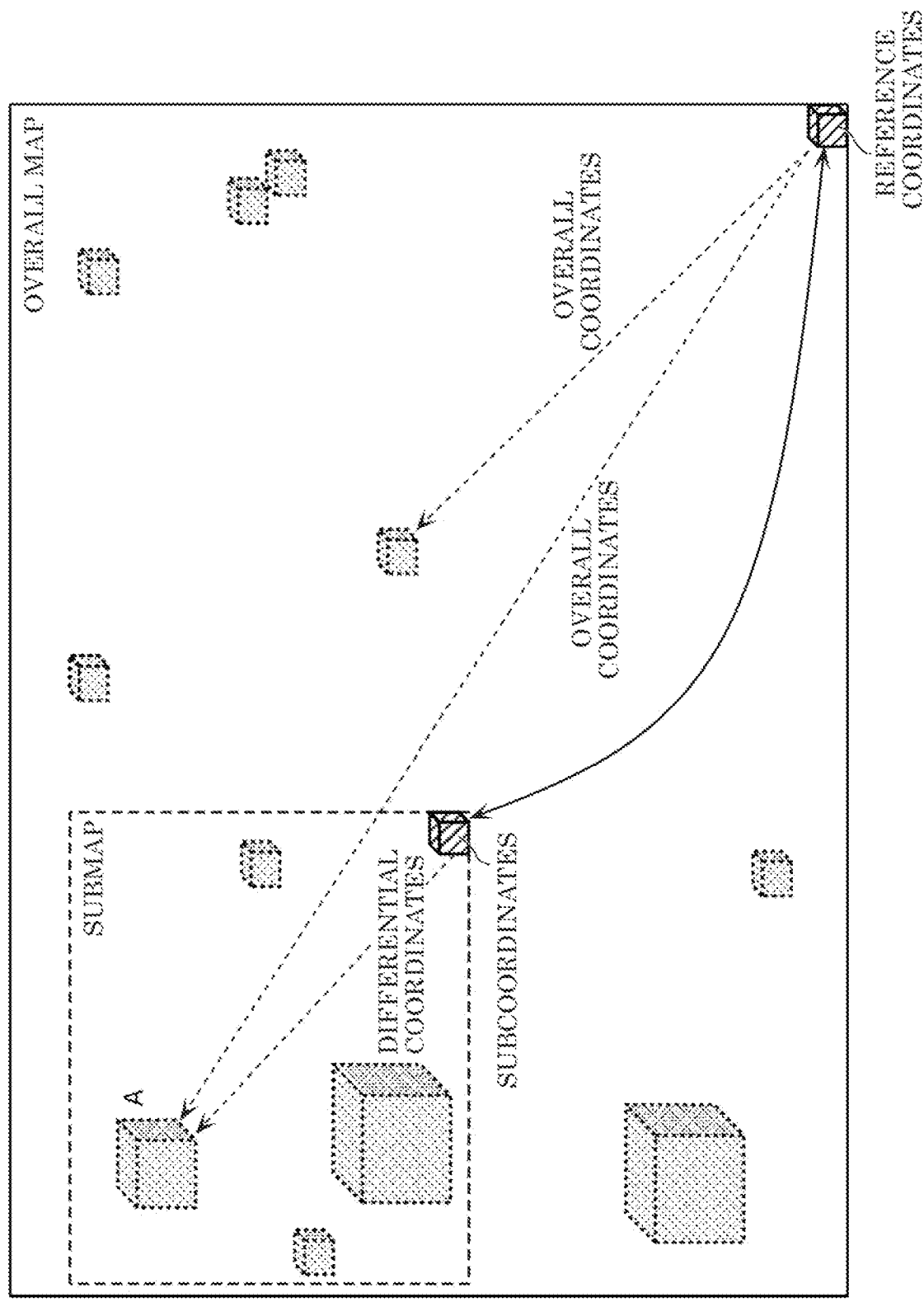
FIG. 47 is a diagram for describing an advantageous effect on encoding efficiency according to Embodiment 8.

An advantageous effect on encoding efficiency when using the subcoordinate information will be described next. FIG. 47 is a diagram for describing this advantageous effect. For example, a high bit count is necessary in order to encode three-dimensional point A, which is located far from the reference coordinates, shown in FIG. 47. A distance between the subcoordinates and three-dimensional point A is shorter than a distance between the reference coordinates and three-dimensional point A. As such, it is possible to improve encoding efficiency by encoding coordinates of three-dimensional point A having the subcoordinates as reference more than when encoding the coordinates of three-dimensional point A having the reference coordinates as reference. The bitstream of the submap includes the subcoordinate information. By transmitting the bitstream of the submap and the reference coordinates to a decoding end (client), it is possible to restore the overall coordinates of the submap in the decoder end.

Figure 48:
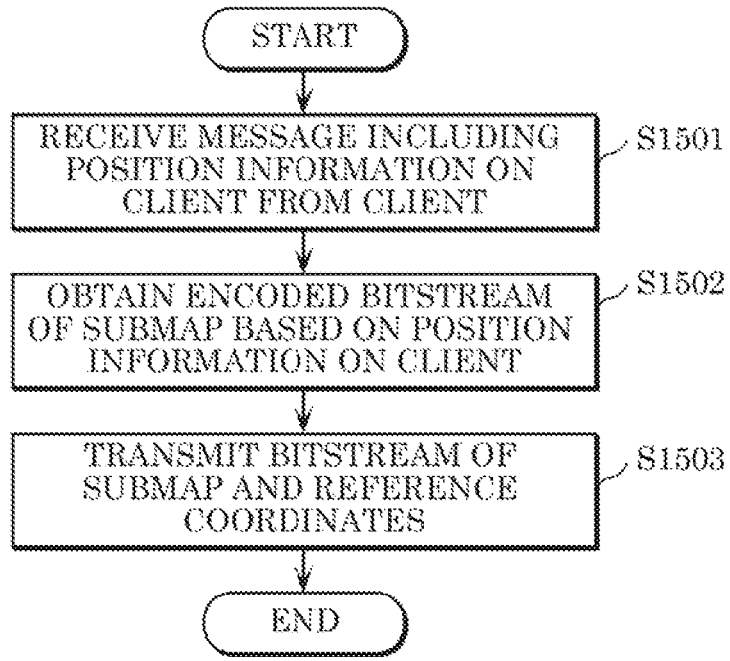
FIG. 48 is a flowchart of processes performed by a server according to Embodiment 8.

FIG. 48 is a flowchart of processes performed by server 1501, which is a transmission end of the submap.

Server 1501 first receives a message including position information on client 1502 from client 1502 (S1501). Controller 1512 obtains an encoded bitstream of the submap based on the position information on the client from storage 1511 (S1502). Server 1501 then transmits the encoded bitstream of the submap and the reference coordinates to client 1502 (S1503).

Figure 49:
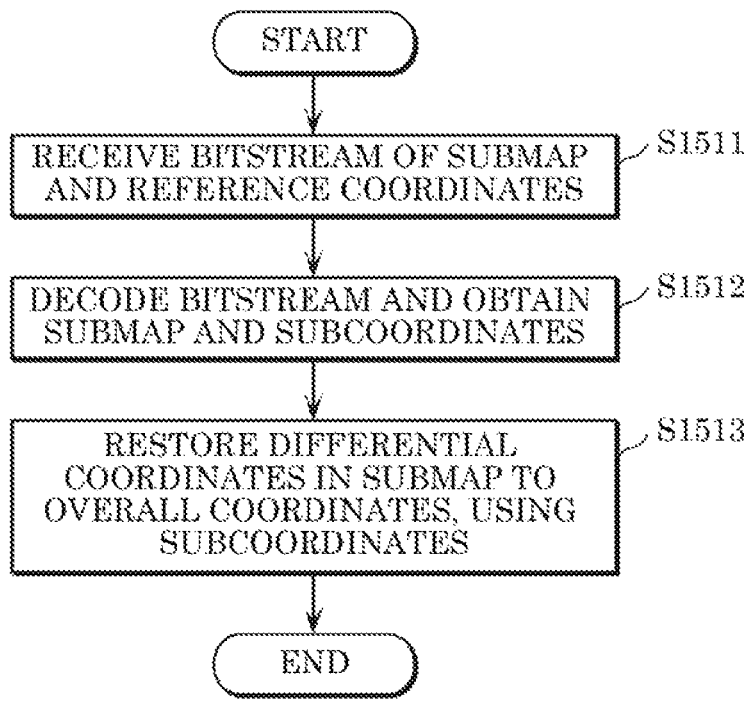
FIG. 49 is a flowchart of processes performed by a client according to Embodiment 8.

FIG. 49 is a flowchart of processes performed by client 1502, which is a receiver end of the submap.

Client 1502 first receives the encoded bitstream of the submap and the reference coordinates transmitted from server 1501 (S1511). Client 1502 next obtains the subcoordinate information of the submap by decoding the encoded bitstream (S1512). Client 1502 next restores the differential coordinates in the submap to the overall coordinates, using the reference coordinates and the subcoordinates (S1513).

An example syntax of information relating to the submap will be described next. In the encoding of the submap, the three-dimensional data encoding device calculates the differential coordinates by subtracting the subcoordinates from the coordinates of each point cloud (three-dimensional points). The three-dimensional data encoding device then encodes the differential coordinates into the bitstream as a value of each point cloud. The encoding device encodes the subcoordinate information indicating the subcoordinates as the header information of the bitstream. This enables the three-dimensional data decoding device to obtain overall coordinates of each point cloud. For example, the three-dimensional data encoding device is included in server 1501 and the three-dimensional data decoding device is included in client 1502.

FIG. 50 is a diagram showing an example syntax of the submap. NumOfPoint shown in FIG. 50 indicates a total number of point clouds included in the submap. sub_coordinate_x, sub_coordinate_y, and sub_coordinate_z are the subcoordinate information. sub_coordinate_x indicates an x-coordinate of the subcoordinates. sub_coordinate_y indicates a y-coordinate of the subcoordinates. sub_coordinate_z indicates a z-coordinate of the subcoordinates.

diff_x[i], diff_y[i], and diff_z[i] are differential coordinates of an i-th point cloud in the submap. diff_x[i] is a differential value between an x-coordinate of the i-th point cloud and the x-coordinate of the subcoordinates in the submap. diff_y[i] is a differential value between a y-coordinate of the i-th point cloud and the y-coordinate of the subcoordinates in the submap. diff_z[i] is a differential value between a z-coordinate of the i-th point cloud and the z-coordinate of the subcoordinates in the submap.

The three-dimensional data decoding device decodes point_cloud[i]_x, point_cloud[i]_y and point_cloud[i]_z, which are overall coordinates of the i-th point cloud, using the expression below. point_cloud[i]_x is an x-coordinate of the overall coordinates of the i-th point cloud. point_cloud[i]_y is a y-coordinate of the overall coordinates of the i-th point cloud. point_cloud[i]_z is a z-coordinate of the overall coordinates of the i-th point cloud.

point_cloud[i]_x=sub_coordinate_x+diff_x[i]

point_cloud[i]_y=sub_coordinate_y+diff_y[i]

point_cloud[i]_z=sub_coordinate_z+diff_z[i]

Figure 51:
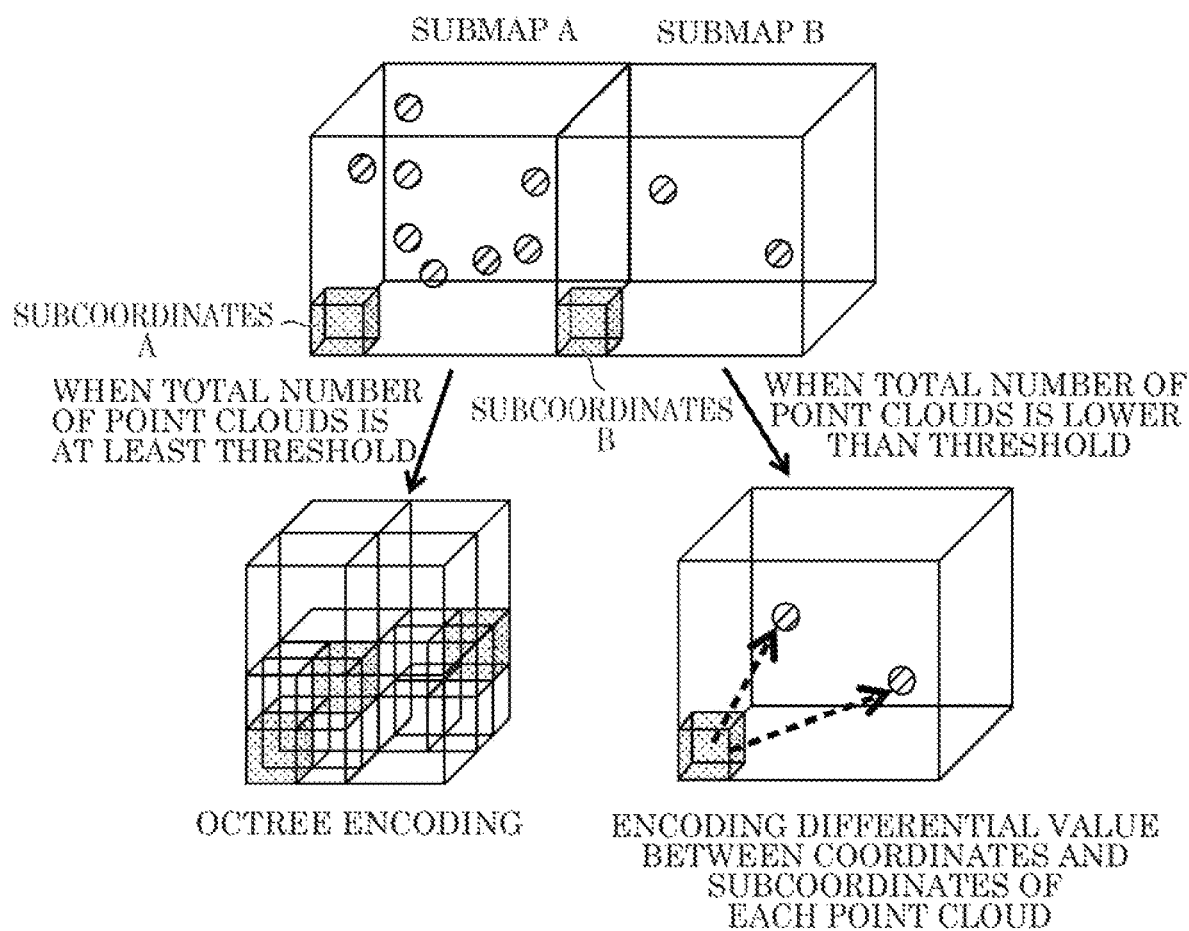
FIG. 51 is a diagram schematically showing a switching process of an encoding type according to Embodiment 8.

A switching process for applying octree encoding will be described next. The three-dimensional data encoding device selects, when encoding the submap, whether to encode each point cloud using an octree representation (hereinafter, referred to as octree encoding) or to encode the differential values from the subcoordinates (hereinafter, referred to as non-octree encoding). FIG. 51 is a diagram schematically showing this operation. For example, the three-dimensional data encoding device applies octree encoding to the submap, when the total number of point clouds in the submap is at least a predetermined threshold. The three-dimensional data encoding device applies non-octree encoding to the submap, when the total number of point clouds in the submap is lower than the predetermined threshold. This enables the three-dimensional data encoding device to improve encoding efficiency, since it is possible to appropriately select whether to use octree encoding or non-octree encoding, in accordance with a shape and density of objects included in the submap.

The three-dimensional data encoding device appends, to a header and the like of the submap, information indicating whether octree encoding or non-octree encoding has been applied to the submap (hereinafter, referred to as octree encoding application information). This enables the three-dimensional data decoding device to identify whether the bitstream is obtained by octree encoding the submap or non-octree encoding the submap.

The three-dimensional data encoding device may calculate encoding efficiency when applying octree encoding and encoding efficiency when applying non-octree encoding to the same point cloud, and apply an encoding method whose encoding efficiency is better to the submap.

FIG. 52 is a diagram showing an example syntax of the submap when performing this switching. coding_type shown in FIG. 52 is information indicating the encoding type and is the above octree encoding application information. coding_type=00 indicates that octree encoding has been applied. coding_type=01 indicates that non-octree encoding has been applied. coding_type=10 or 11 indicates that an encoding method and the like other than the above encoding methods has been applied.

When the encoding type is non-octree encoding (non_octree), the submap includes NumOfPoint and the subcoordinate information (sub_coordinate_x, sub_coordinate_y, and sub_coordinate_z).

When the encoding type is octree encoding (octree), the submap includes octree_info. octree_info is information necessary to the octree encoding and includes, for example, depth information.

When the encoding type is non-octree encoding (non_octree), the submap includes the differential coordinates (diff_x[i], diff_y[i], and diff_z[i]).

When the encoding type is octree encoding (octree), the submap includes octree_data which is encoded data relating to the octree encoding.

Note that an example has been described here in which an xyz coordinate system is used as the coordinate system of the point cloud, but a polar coordinate system may also be used.

Figure 53:
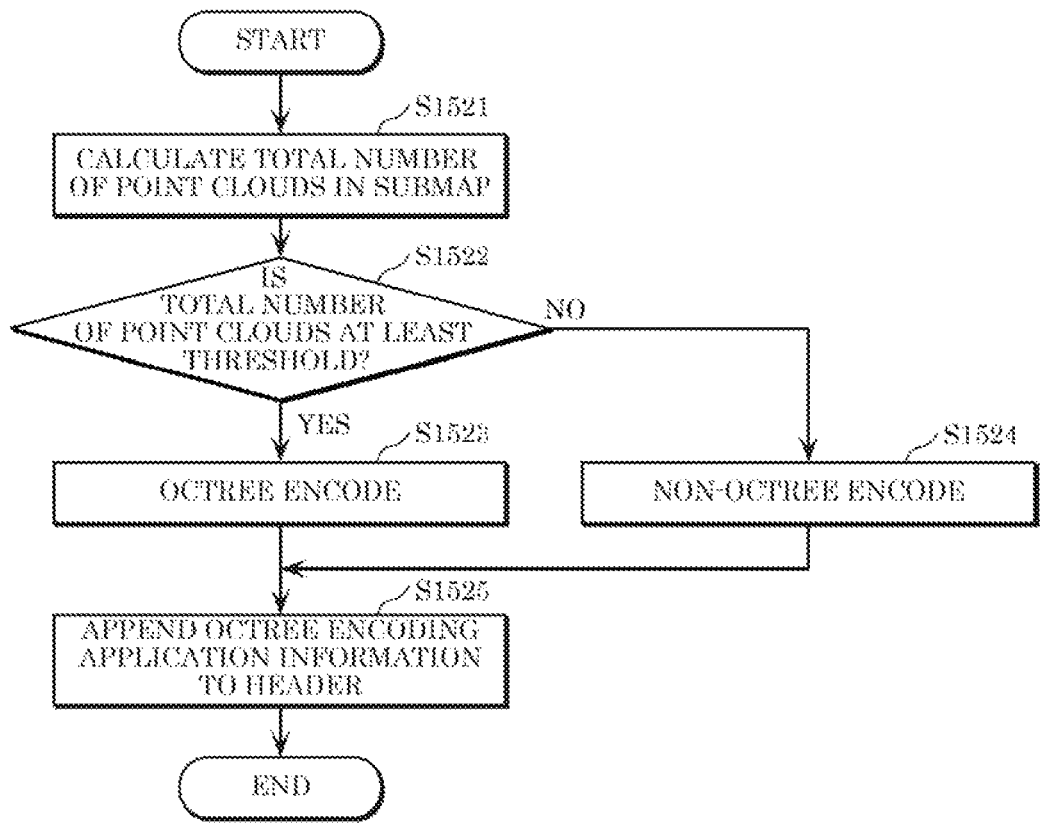
FIG. 53 is a flowchart of a three-dimensional data encoding process according to Embodiment 8.

FIG. 53 is a flowchart of a three-dimensional data encoding process performed by the three-dimensional data encoding device. Three-dimensional data encoding device first calculates a total number of point clouds in a current submap, which is the submap to be processed (S1521). The three-dimensional data encoding device next determines whether when the calculated total number of point clouds is at least a predetermined threshold (S1522).

When the total number of point clouds is at least the predetermined threshold (YES in S1522), the three-dimensional data encoding device applies octree encoding to the current submap (S1523). The three-dimensional data encoding device appends, to a header of the bitstream, octree encoding application information indicating that octree encoding has been applied to the current submap (S1525).

In contrast, when the total number of point clouds is lower than the predetermined threshold (NO in S1522), the three-dimensional data encoding device applies non-octree encoding to the current submap (S1524). The three-dimensional data encoding device appends, to the header of the bitstream, octree encoding application information indicating that non-octree encoding has been applied to the current submap (S1525).

Figure 54:
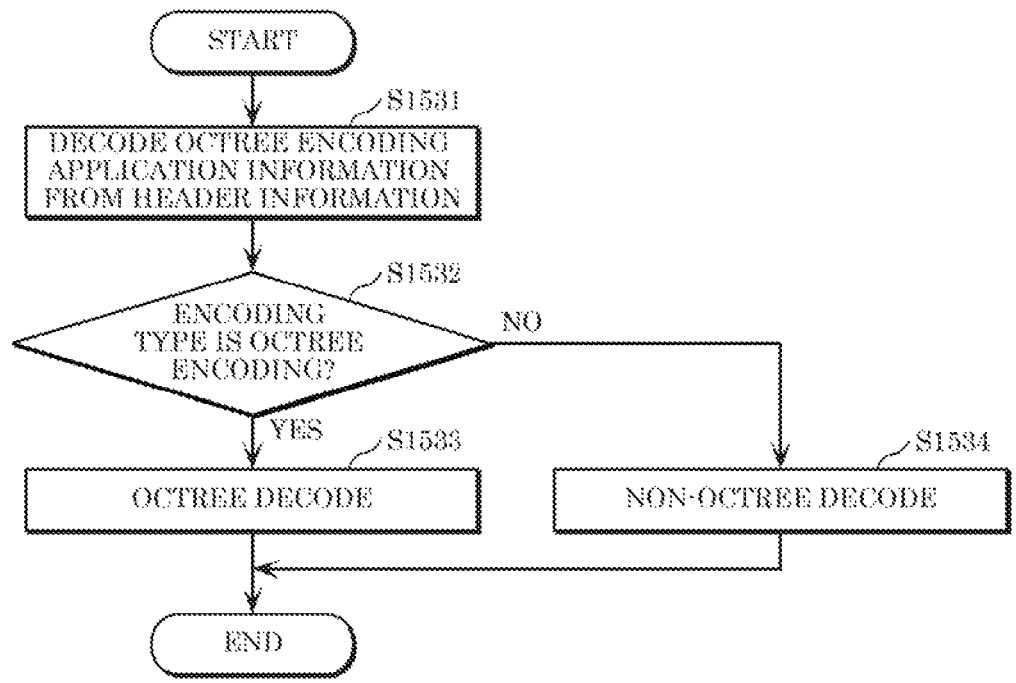
FIG. 54 is a flowchart of a three-dimensional data decoding process according to Embodiment 8.

FIG. 54 is a flowchart of a three-dimensional data decoding process performed by the three-dimensional data decoding device. The three-dimensional data decoding device first decodes the octree encoding application information from the header of the bitstream (S1531). The three-dimensional data decoding device next determines whether the encoding type applied to the current submap is octree encoding, based on the decoded octree encoding application information (S1532).

When the octree encoding application information indicates that the encoding type is octree encoding (YES in S1532), the three-dimensional data decoding device decodes the current submap through octree decoding (S1533). In contrast, when the octree encoding application information indicates that the encoding type is non-octree encoding (NO in S1532), the three-dimensional data decoding device decodes the current submap through non-octree decoding (S1534).

Figure 55:
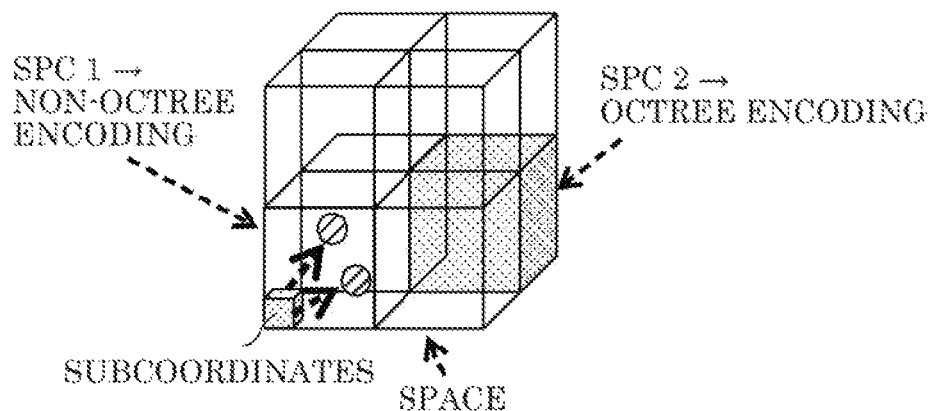
FIG. 55 is a diagram schematically showing an operation of a variation of the switching process of the encoding type according to Embodiment 8.
Figure 56:
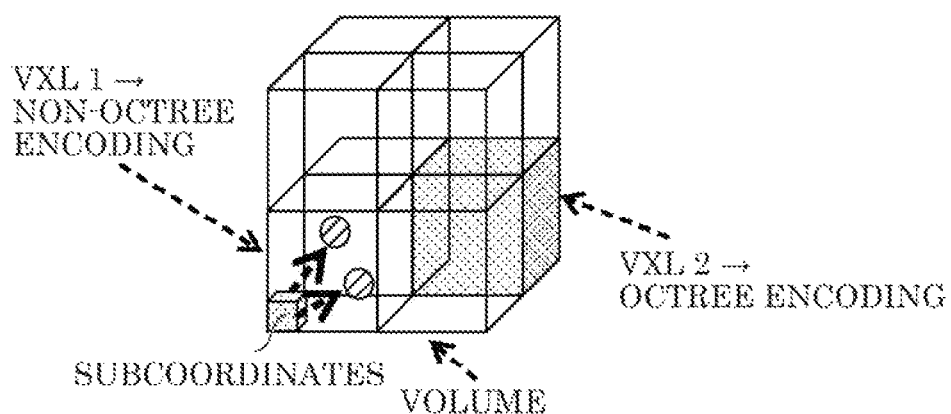
FIG. 56 is a diagram schematically showing an operation of a variation of the switching process of the encoding type according to Embodiment 8.
Figure 57:
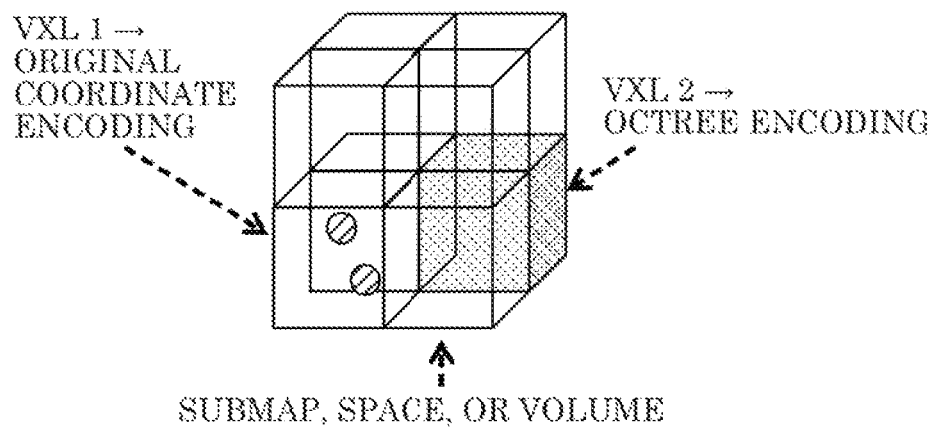
FIG. 57 is a diagram schematically showing an operation of a variation of the switching process of the encoding type according to Embodiment 8.

Hereinafter, variations of the present embodiment will be described. FIG. 55 to FIG. 57 are diagrams schematically showing operations of variations of the switching process of the encoding type.

As illustrated in FIG. 55, the three-dimensional data encoding device may select whether to apply octree encoding or non-octree encoding per space. In this case, the three-dimensional data encoding device appends the octree encoding application information to a header of the space. This enables the three-dimensional data decoding device to determine whether octree encoding has been applied per space. In this case, the three-dimensional data encoding device sets subcoordinates per space, and encodes a differential value, which is a value of the subcoordinates subtracted from coordinates of each point cloud in the space.

This enables the three-dimensional data encoding device to improve encoding efficiency, since it is possible to appropriately select whether to apply octree encoding, in accordance with a shape of objects or the total number of point clouds in the space.

As illustrated in FIG. 56, the three-dimensional data encoding device may select whether to apply octree encoding or non-octree encoding per volume. In this case, the three-dimensional data encoding device appends the octree encoding application information to a header of the volume. This enables the three-dimensional data decoding device to determine whether octree encoding has been applied per volume. In this case, the three-dimensional data encoding device sets subcoordinates per volume, and encodes a differential value, which is a value of the subcoordinates subtracted from coordinates of each point cloud in the volume.

This enables the three-dimensional data encoding device to improve encoding efficiency, since it is possible to appropriately select whether to apply octree encoding, in accordance with a shape of objects or the total number of point clouds in the volume.

In the above description, an example has been shown in which the difference, which is the subcoordinates of each point cloud subtracted from the coordinates of each point cloud, is encoded as the non-octree encoding, but is not limited thereto, and any other type of encoding method other than the octree encoding may be used. For example, as illustrated in FIG. 57, the three-dimensional data encoding device may not only encode the difference from the subcoordinates as the non-octree encoding, but also use a method in which a value of the point cloud in the submap, the space, or the volume itself is encoded (hereinafter, referred to as original coordinate encoding).

In this case, the three-dimensional data encoding device stores, in the header, information indicating that original coordinate encoding has been applied to a current space (submap, space, or volume). This enables the three-dimensional data decoding device to determine whether original coordinate encoding has been applied to the current space.

When applying original coordinate encoding, the three-dimensional data encoding device may perform the encoding without applying quantization and arithmetic encoding to original coordinates. The three-dimensional data encoding device may encode the original coordinates using a predetermined fixed bit length. This enables three-dimensional data encoding device to generate a stream with a fixed bit length at a certain time.

In the above description, an example has been shown in which the difference, which is the subcoordinates of each point cloud subtracted from the coordinates of each point cloud, is encoded as the non-octree encoding, but is not limited thereto.

Figure 58:
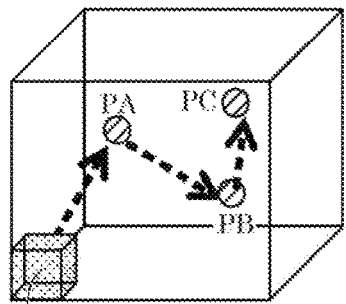
FIG. 58 is a diagram schematically showing an operation of a variation of a calculation process of a differential value according to Embodiment 8.

For example, the three-dimensional data encoding device may sequentially encode a differential value between the coordinates of each point cloud. FIG. 58 is a diagram for describing an operation in this case. For example, in the example shown in FIG. 58, the three-dimensional data encoding device encodes a differential value between coordinates of point cloud PA and predicted coordinates, using the subcoordinates as the predicted coordinates, when encoding point cloud PA. The three-dimensional data encoding device encodes a differential value between point cloud PB and predicted coordinates, using the coordinates of point cloud PA as the predicted coordinates, when encoding point cloud PB. The three-dimensional data encoding device encodes a differential value between point cloud PC and predicted coordinates, using the coordinates of point cloud PB as the predicted coordinates, when encoding point cloud PC. In this manner, the three-dimensional data encoding device may set a scan order to a plurality of point clouds, and encode a differential value between coordinates of a current point cloud to be processed and coordinates of a point cloud immediately before the current point cloud in the scan order.

Figure 59:
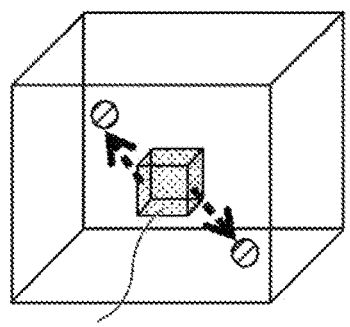
FIG. 59 is a diagram schematically showing an operation of a variation of the calculation process of the differential value according to Embodiment 8.
Figure 60:
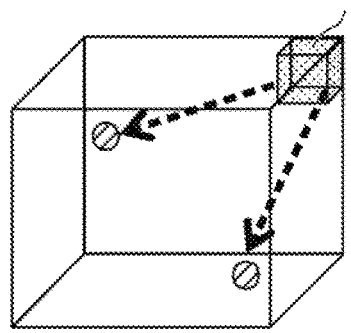
FIG. 60 is a diagram schematically showing an operation of a variation of the calculation process of the differential value according to Embodiment 8.
Figure 61:
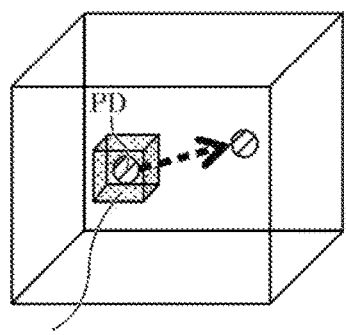
FIG. 61 is a diagram schematically showing an operation of a variation of the calculation process of the differential value according to Embodiment 8.

In the above description, the subcoordinates are coordinates in the lower left front corner of the submap, but a location of the subcoordinates is not limited thereto. FIG. 59 to FIG. 61 are diagrams showing other examples of the location of the subcoordinates. The location of the subcoordinates may be set to any coordinates in the current space (submap, space, or volume). In other words, the subcoordinates may be, as stated above, coordinates in the lower left front corner of the current space. As illustrated in FIG. 59, the subcoordinates may be coordinates in a center of the current space. As illustrated in FIG. 60, the subcoordinates may be coordinates in an upper right rear corner of the current space. The subcoordinates are not limited to being coordinates in the lower left front corner or the upper right rear corner of the current space, but may also be coordinates in any corner of the current space.

The location of the subcoordinates may be the same as coordinates of a certain point cloud in the current space (submap, space, or volume). For example, in the example shown in FIG. 61, the coordinates of the subcoordinates coincide with coordinates of point cloud PD.

In the present embodiment, an example has been shown that switches between applying octree encoding or non-octree encoding, but is not necessarily limited thereto. For example, the three-dimensional data encoding device may switch between applying a tree structure other than an octree or a non-tree structure other than the tree-structure. For example, the other tree structure is a k-d tree in which splitting is performed using perpendicular planes on one coordinate axis. Note that any other method may be used as the other tree structure.

In the present embodiment, an example has been shown in which coordinate information included in a point cloud is encoded, but is not necessarily limited thereto. The three-dimensional data encoding device may encode, for example, color information, a three-dimensional feature quantity, or a feature quantity of visible light using the same method as for the coordinate information. For example, the three-dimensional data encoding device may set an average value of the color information included in each point cloud in the submap to subcolor information, and encode a difference between the color information and the subcolor information of each point cloud.

In the present embodiment, an example has been shown in which an encoding method (octree encoding or non-octree encoding) with good encoding efficiency is selected in accordance with a total number of point clouds and the like, but is not necessarily limited thereto. For example, the three-dimensional data encoding device, which is a server end, may store a bitstream of a point cloud encoded through octree encoding, a bitstream of a point cloud encoded through non-octree encoding, and a bitstream of a point cloud encoded through both methods, and switch the bitstream to be transmitted to the three-dimensional data decoding device, in accordance with a transmission environment or a processing power of the three-dimensional data decoding device.

FIG. 62 is a diagram showing an example syntax of a volume when applying octree encoding. The syntax shown in FIG. 62 is basically the same as the syntax shown in FIG. 52, but differs in that each piece of information is information in units of volumes. To be specific, NumOfPoint indicates a total number of point clouds included in the volume. sub_coordinate_x, sub_coordinate_y and sub_coordinate_z are the subcoordinate information of the volume.

diff_x[i], diff_y[i], and diff_z[i] are differential coordinates of an i-th point cloud in the volume. diff_x[i] is a differential value between an x-coordinate of the i-th point cloud and the x-coordinate of the subcoordinates in the volume. diff_y[i] is a differential value between a y-coordinate of the i-th point cloud and the y-coordinate of the subcoordinates in the volume. diff_z[i] is a differential value between a z-coordinate of the i-th point cloud and the z-coordinate of the subcoordinates in the volume.

Note that when it is possible to calculate a relative position of the volume in the space, the three-dimensional data encoding device does not need to include the subcoordinate information in a header of the volume. In other words, the three-dimensional data encoding device may calculate the relative position of the volume in the space without including the subcoordinate information in the header, and use the calculated position as the subcoordinates of each volume.

As stated above, the three-dimensional data encoding device according to the present embodiment determines whether to encode, using an octree structure, a current space unit among a plurality of space units (e.g. submaps, spaces, or volumes) included in three-dimensional data (e.g. S1522 in FIG. 53). For example, the three-dimensional data encoding device determines that the current space unit is to be encoded using the octree structure, when a total number of the three-dimensional points included in the current space unit is higher than a predetermined threshold. The three-dimensional data encoding device determines that the current space unit is not to be encoded using the octree structure, when the total number of the three-dimensional points included in the current space unit is lower than or equal to the predetermined threshold.

When it is determined that the current space unit is to be encoded using the octree structure (YES in S1522), the three-dimensional data encoding device encodes the current space unit using the octree structure (S1523). When it is determined that the current space unit is not to be encoded using the octree structure (NO in S1522), the three-dimensional data encoding device encodes the current space unit using a different method that is not the octree structure (S1524). For example, in the different method, the three-dimensional data encoding device encodes coordinates of three-dimensional points included in the current space unit. To be specific, in the different method, the three-dimensional data encoding device encodes a difference between reference coordinates of the current space unit and the coordinates of the three-dimensional points included in the current space unit.

The three-dimensional data encoding device next appends, to a bitstream, information that indicates whether the current space unit has been encoded using the octree structure (S1525).

This enables the three-dimensional data encoding device to improve encoding efficiency since it is possible to reduce the amount of data of the encoded signal.

For example, the three-dimensional data encoding device includes a processor and memory, the processor using the memory to perform the above processes.

The three-dimensional data decoding device according to the present embodiment decodes, from a bitstream, information that indicates whether to decode, using an octree structure, a current space unit among a plurality of space units (e.g. submaps, spaces, or volumes) included in three-dimensional data (e.g. S1531 in FIG. 54). When the information indicates that the current space unit is to be decoded using the octree structure (YES in S1532), the three-dimensional data decoding device decodes the current space unit using the octree structure (S1533).

When the information indicates not to decode the current space unit using the octree structure (NO in S1532), the three-dimensional data decoding device decodes the current space unit using a different method that is not the octree structure (S1534). For example, in the different method, the three-dimensional data decoding device decodes coordinates of three-dimensional points included in the current space unit. To be specific, in the different method, the three-dimensional data decoding device decodes a difference between reference coordinates of the current space unit and the coordinates of the three-dimensional points included in the current space unit.

This enables the three-dimensional data decoding device to improve encoding efficiency since it is possible to reduce the amount of data of the encoded signal.

For example, three-dimensional data decoding device includes a processor and memory. The processor uses the memory to perform the above processes.

Embodiment 9

Figure 63:
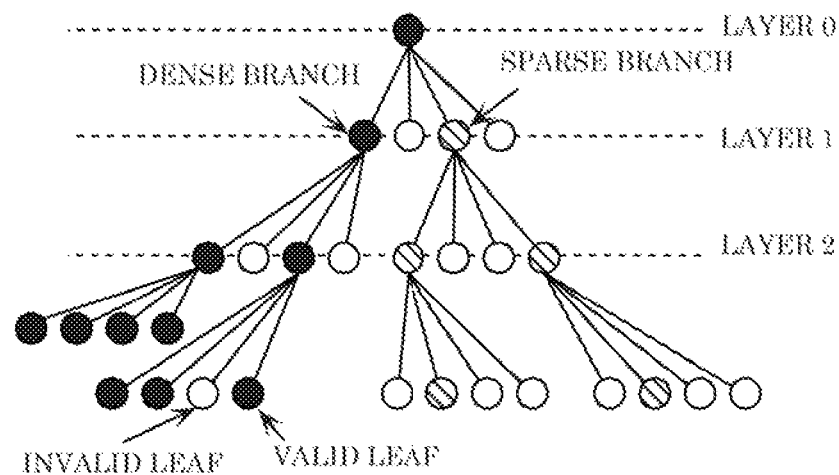
FIG. 63 is a diagram illustrating an example of a tree structure according to Embodiment 9.

In the present embodiment, another example of the method of encoding a tree structure such as an octree structure will be described. FIG. 63 is a diagram illustrating an example of a tree structure according to the present embodiment. Specifically FIG. 63 shows an example of a quadtree structure.

A leaf including a three-dimensional point is referred to as a valid leaf, and a leaf including no three-dimensional point is referred to as an invalid leaf. A branch having the number of valid leaves greater than or equal to a threshold value is referred to as a dense branch. A branch having the number of valid leaves less than the threshold value is referred to as a sparse branch.

A three-dimensional data encoding device calculates the number of three-dimensional points (i.e., the number of valid leaves) included in each branch in a layer of a tree structure. FIG. 63 shows an example in which a threshold value is 5. In this example, two branches are present in layer 1. Since the left branch includes seven three-dimensional points, the left branch is determined as a dense branch. Since the right branch includes two three-dimensional points, the right branch is determined as a sparse branch.

Figure 64:
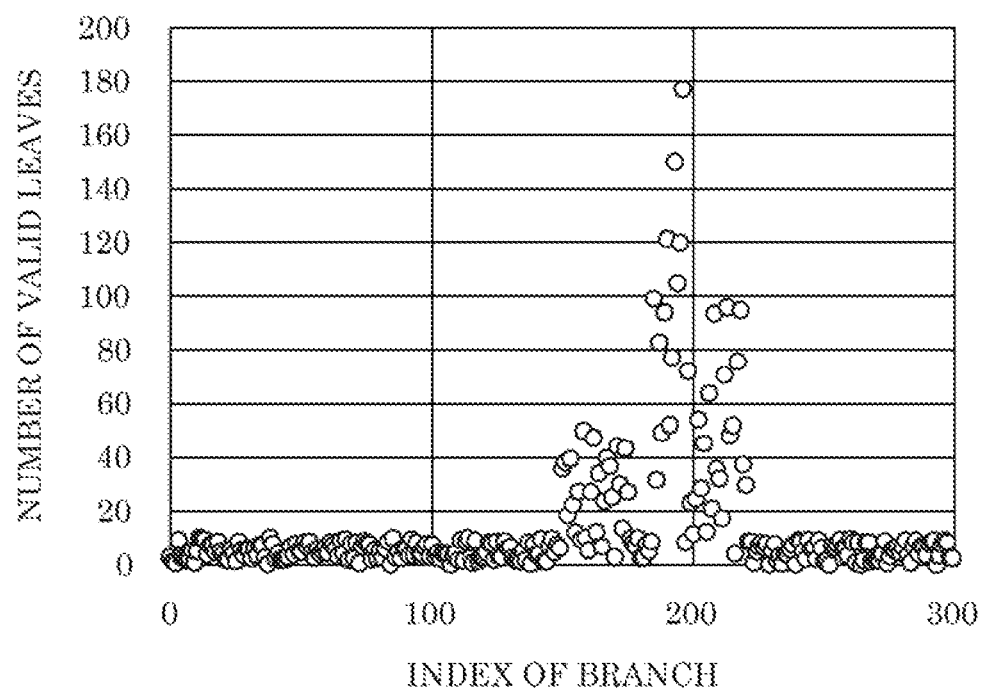
FIG. 64 is a graph showing an example of the number of valid leaves of each branch according to Embodiment 9.

FIG. 64 is a graph showing an example of the number of valid leaves (3D points) of each branch in layer 5. The horizontal axis of FIG. 64 indicates an index that is an identification number of the branch in layer 5. As clearly shown in FIG. 64, specific branches include many three-dimensional points, compared to other branches. Occupancy encoding is more effective for such dense branches than for sparse branches.

Figure 65:
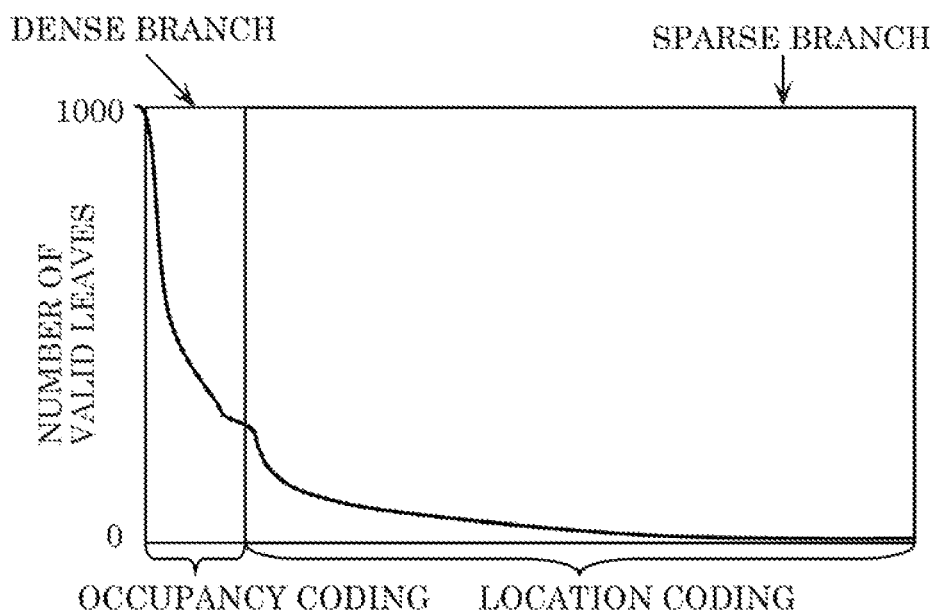
FIG. 65 is a diagram illustrating an application example of encoding schemes according to Embodiment 9.

The following describes how occupancy encoding and location encoding are applied. FIG. 65 is a diagram illustrating a relationship between encoding schemes to be applied and the number of three-dimensional points (the number of valid leaves) included in each branch in layer 5. As illustrated in FIG. 65, the three-dimensional data encoding device applies the occupancy encoding to dense branches, and applies the location encoding to sparse branches. As a result, it is possible to improve the coding efficiency.

Figure 66:
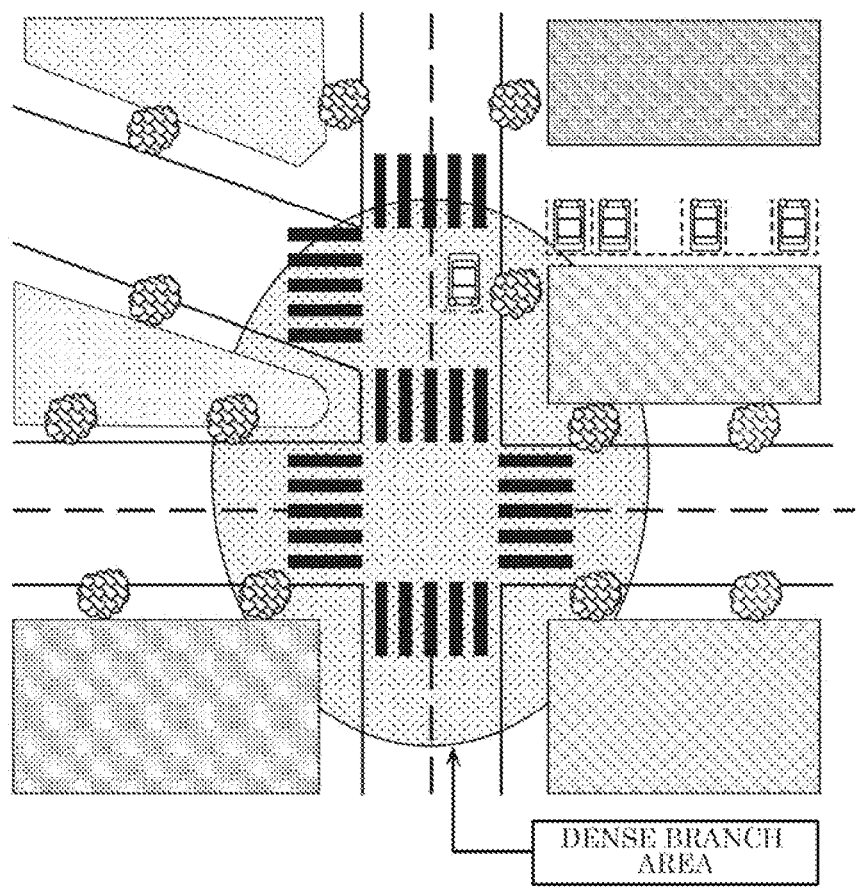
FIG. 66 is a diagram illustrating an example of a dense branch area according to Embodiment 9.

FIG. 66 is a diagram illustrating an example of a dense branch area in LiDAR data. As illustrated in FIG. 66, a three-dimensional point density calculated from the number of three-dimensional points included in each branch varies from area to area.

Separating dense three-dimensional points (branch) and sparse three-dimensional points (branch) brings the following advantage. A three-dimensional point density is higher with a decreasing distance to a LiDAR sensor. Consequently separating branches in accordance with sparseness and denseness enables division in a distance direction. Such division is effective for specific applications. Using a method other than the occupancy encoding is effective for sparse branches.

In the present embodiment, the three-dimensional data encoding device separates an inputted three-dimensional point cloud into two or more three-dimensional point sub-clouds, and applies a different encoding method to each of the two or more three-dimensional point sub-clouds.

Figure 67:
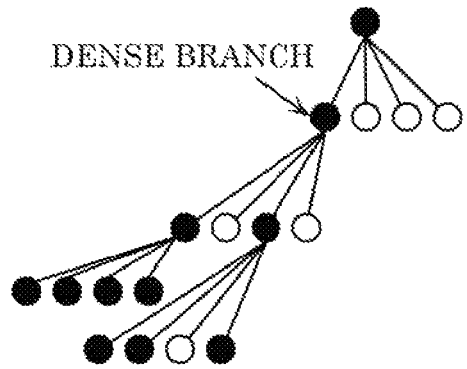
FIG. 67 is a diagram illustrating an example of a dense three-dimensional point cloud according to Embodiment 9.
Figure 68:
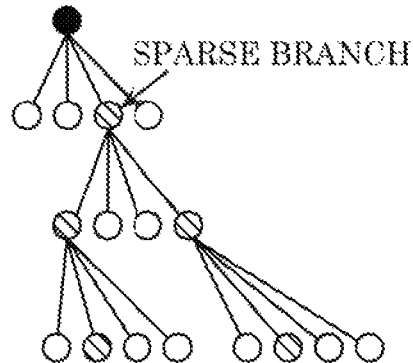
FIG. 68 is a diagram illustrating an example of a sparse three-dimensional point cloud according to Embodiment 9.

For example, the three-dimensional data encoding device separates an inputted three-dimensional point cloud into three-dimensional point sub-cloud A (dense three-dimensional point cloud: dense cloud) including a dense branch, and three-dimensional point sub-cloud B (sparse three-dimensional point cloud: sparse cloud). FIG. 67 is a diagram illustrating an example of three-dimensional point sub-cloud A (dense three-dimensional point cloud) including a dense branch which is separated from the tree structure illustrated in FIG. 63. FIG. 68 is a diagram illustrating an example of three-dimensional point sub-cloud B (sparse three-dimensional point cloud) including a sparse branch which is separated from the tree structure illustrated in FIG. 63.

Next, the three-dimensional data encoding device encodes three-dimensional point sub-cloud A using the occupancy encoding, and encodes three-dimensional point sub-cloud B using the location encoding.

It should be noted that although the example has been described above in which different encoding schemes (the occupancy encoding and the location encoding) are applied as different encoding methods, for example, the three-dimensional data encoding device may apply the same encoding scheme to three-dimensional point sub-cloud A and three-dimensional point sub-cloud B, and may use different parameters in encoding three-dimensional point sub-cloud A and three-dimensional point sub-cloud B.

Figure 69:
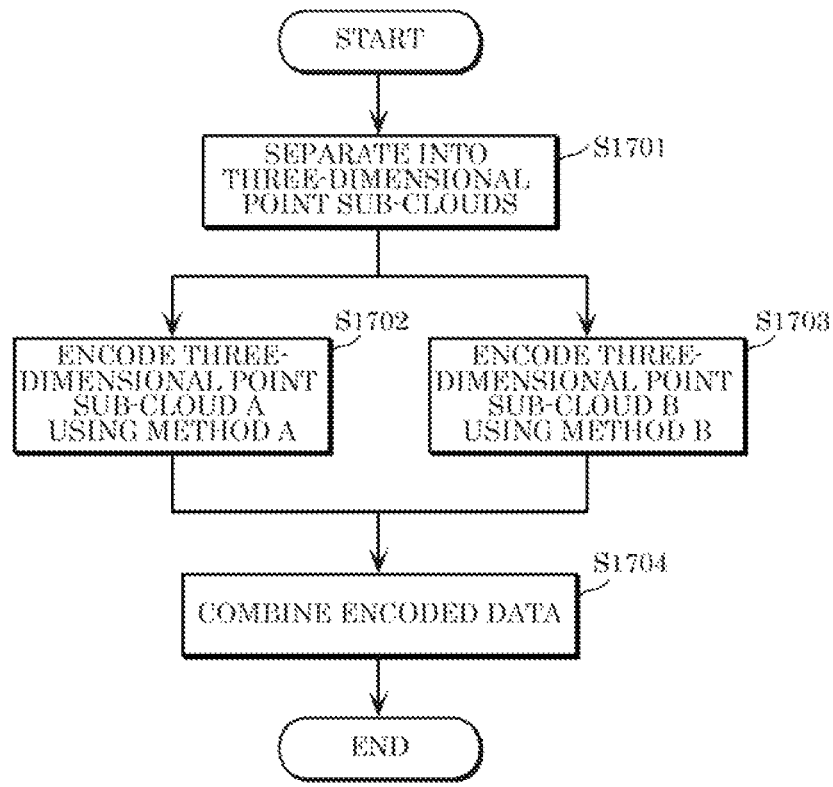
FIG. 69 is a flowchart of an encoding process according to Embodiment 9.

The following describes a procedure for a three-dimensional data encoding process performed by the three-dimensional data encoding device. FIG. 69 is a flowchart of a three-dimensional data encoding process performed by the three-dimensional data encoding device according to the present embodiment.

First, the three-dimensional data encoding device separates an inputted three-dimensional point cloud into three-dimensional point sub-clouds (S1701). The three-dimensional data encoding device may perform this separation automatically or based on information inputted by a user. For example, the user may specify a range of three-dimensional point sub-clouds. As for an example of automatic separation, for example, when input data is LiDAR data, the three-dimensional data encoding device performs the separation using distance information indicating a distance to each point cloud. Specifically, the three-dimensional data encoding device separates point clouds within a certain range from a measurement point, and point clouds outside the certain range. In addition, the three-dimensional data encoding device may perform the separation using information indicating, for example, important areas and unimportant areas.

Next, the three-dimensional data encoding device generates encoded data (encoded bitstream) by encoding three-dimensional point sub-cloud A using method A (S1702). Besides, the three-dimensional data encoding device generates encoded data by encoding three-dimensional point sub-cloud B using method B (S1703). It should be noted that the three-dimensional data encoding device may encode three-dimensional point sub-cloud B using method A. In this case, the three-dimensional data encoding device encodes three-dimensional point sub-cloud B using a parameter different from an encoding parameter used in encoding three-dimensional point sub-cloud A. For example, this parameter may be a quantization parameter. For example, the three-dimensional data encoding device encodes three-dimensional point sub-cloud B using a quantization parameter greater than a quantization parameter used in encoding three-dimensional point sub-cloud A. In this case, the three-dimensional data encoding device may append information indicating a quantization parameter used in encoding each of three-dimensional point sub-clouds, to a header of encoded data of the three-dimensional point sub-cloud.

Then, the three-dimensional data encoding device generates a bitstream by combining the encoded data obtained in step S1702 and the encoded data obtained in step S1703 (S1704).

Moreover, the three-dimensional data encoding device may encode, as header information of the bitstream, information for decoding each three-dimensional point sub-cloud. For example, the three-dimensional data encoding device may encode information as described below.

The header information may include information indicating the number of encoded three-dimensional sub-points. In this example, this information indicates 2.

The header information may include information indicating the number of three-dimensional points included in each three-dimensional point sub-cloud, and encoding methods. In this example, this information indicates the number of three-dimensional points included in three-dimensional point sub-cloud A, the encoding method (method A) applied to three-dimensional point sub-cloud A, the number of three-dimensional points included in three-dimensional point sub-cloud B, and the encoding method (method B) applied to three-dimensional point sub-cloud B.

The header information may include information for identifying the start position or end position of encoded data of each three-dimensional point sub-cloud.

Moreover, the three-dimensional data encoding device may encode three-dimensional point sub-cloud A and three-dimensional point sub-cloud B in parallel. Alternatively, the three-dimensional data encoding device may encode three-dimensional point sub-cloud A and three-dimensional point sub-cloud B in sequence.

A method of separation into three-dimensional point sub-clouds is not limited to the above method. For example, the three-dimensional data encoding device changes a separation method, performs encoding using each of separation methods, and calculates the coding efficiency of encoded data obtained using each separation method. Subsequently, the three-dimensional data encoding device selects a separation method having the highest coding efficiency from the separation methods. For example, the three-dimensional data encoding device may (i) separate three-dimensional point clouds in each of layers, (ii) calculate coding efficiency in each of the cases, (iii) select a separation method (i.e., a layer in which separation is performed) having the highest coding efficiency from separation methods, (iv) generate three-dimensional point sub-clouds using the selected separation method, and (v) perform encoding.

Moreover, when combining encoded data, the three-dimensional data encoding device may place encoding information of a more important three-dimensional point sub-cloud in a position closer to the head of a bitstream.

Since this enables a three-dimensional data decoding device to obtain important information by only decoding the head of the bitstream, the three-dimensional data decoding device can obtain the important information quickly.

Figure 70:
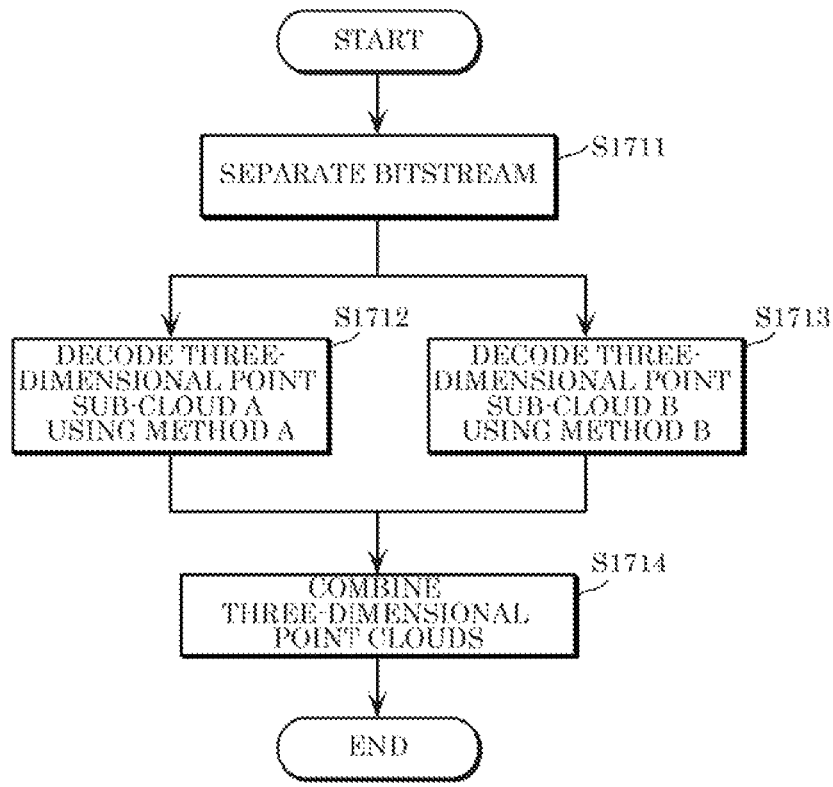
FIG. 70 is a flowchart of a decoding process according to Embodiment 9.

The following describes a procedure for a three-dimensional data decoding process performed by the three-dimensional data decoding device. FIG. 70 is a flowchart of a three-dimensional data decoding process performed by the three-dimensional data decoding device according to the present embodiment.

First, for example, the three-dimensional data decoding device obtains a bitstream generated by the above three-dimensional data encoding device. Next, the three-dimensional data decoding device separates, from the obtained bitstream, encoded data of three-dimensional point sub-cloud A and encoded data of three-dimensional point sub-cloud B (S1711). Specifically, the three-dimensional data decoding device decodes, from header information of the bitstream, information for decoding each three-dimensional point sub-cloud, and separates encoded data of each three-dimensional point sub-cloud using the information.

Then, the three-dimensional data decoding device obtains three-dimensional point sub-cloud A by decoding the encoded data of three-dimensional point sub-cloud A using method A (S1712). In addition, the three-dimensional data decoding device obtains three-dimensional point sub-cloud B by decoding the encoded data of three-dimensional point sub-cloud B using method B (S1713). After that, the three-dimensional data decoding device combines three-dimensional point sub-cloud A and three-dimensional point sub-cloud B (S1714).

It should be noted that the three-dimensional data decoding device may decode three-dimensional point sub-cloud A and three-dimensional point sub-cloud B in parallel. Alternatively, the three-dimensional data decoding device may decode three-dimensional point sub-cloud A and three-dimensional point sub-cloud B in sequence.

Moreover, the three-dimensional data decoding device may decode a necessary three-dimensional point sub-cloud. For example, the three-dimensional data decoding device may decode three-dimensional point sub-cloud A and need not decode three-dimensional point sub-cloud B. For example, when three-dimensional point sub-cloud A is a three-dimensional point cloud included in an important area of LiDAR data, the three-dimensional data decoding device decodes the three-dimensional point cloud included in the important area. Self-location estimation etc. in a vehicle or the like is performed using the three-dimensional point cloud included in the important area.

Figure 71:
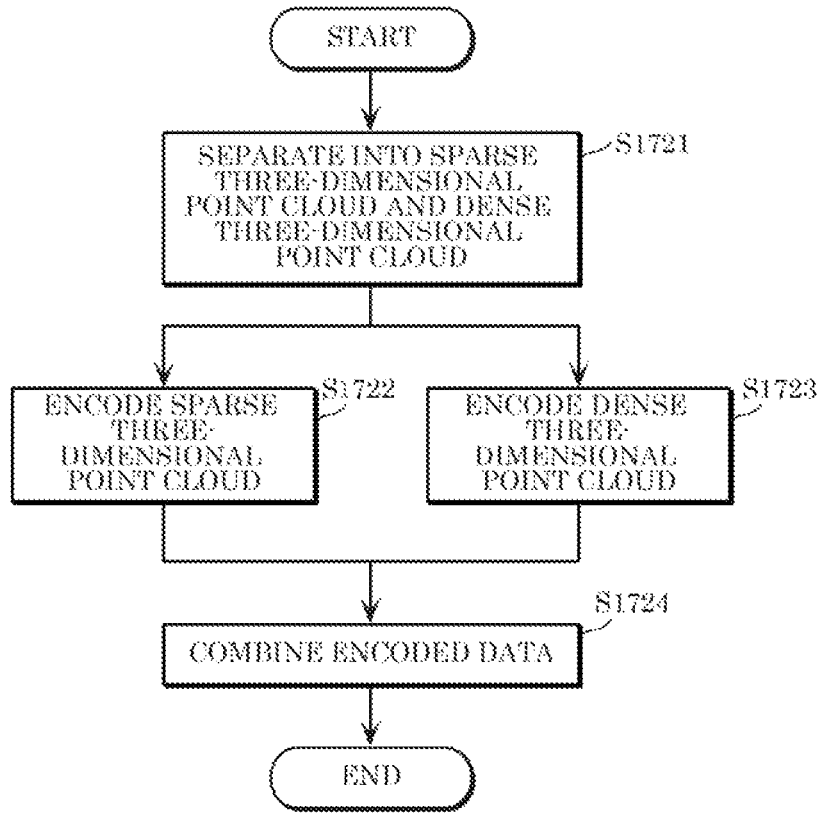
FIG. 71 is a flowchart of an encoding process according to Embodiment 9.

The following describes a specific example of an encoding process according to the present embodiment. FIG. 71 is a flowchart of a three-dimensional data encoding process performed by the three-dimensional data encoding device according to the present embodiment.

First, the three-dimensional data encoding device separates inputted three-dimensional points into a sparse three-dimensional point cloud and a dense three-dimensional point cloud (S1721). Specifically, the three-dimensional data encoding device counts the number of valid leaves of a branch in a layer of an octree structure. The three-dimensional data encoding device sets each branch as a dense branch or a sparse branch in accordance with the number of valid leaves of the branch. Subsequently, the three-dimensional data encoding device generates a three-dimensional point sub-cloud (a dense three-dimensional point cloud) obtained by gathering dense branches, and a three-dimensional point sub-cloud (a sparse three-dimensional point cloud) obtained by gathering sparse branches.

Next, the three-dimensional data encoding device generates encoded data by encoding the sparse three-dimensional point cloud (S1722). For example, the three-dimensional data encoding device encodes a sparse three-dimensional point cloud using the location encoding.

Furthermore, the three-dimensional data encoding device generates encoded data by encoding the dense three-dimensional point cloud (S1723). For example, the three-dimensional data encoding device encodes a dense three-dimensional point cloud using the occupancy encoding.

Then, the three-dimensional data encoding device generates a bitstream by combining the encoded data of the sparse three-dimensional point cloud obtained in step S1722 and the encoded data of the dense three-dimensional point cloud obtained in step S1723 (S1724).

Moreover, the three-dimensional data encoding device may encode, as header information of the bitstream, information for decoding the sparse three-dimensional point cloud and the dense three-dimensional point cloud. For example, the three-dimensional data encoding device may encode information as described below.

The header information may include information indicating the number of encoded three-dimensional point sub-clouds. In this example, this information indicates 2.

The header information may include information indicating the number of three-dimensional points included in each three-dimensional point sub-cloud, and encoding methods. In this example, this information indicates the number of three-dimensional points included in the sparse three-dimensional point cloud, the encoding method (location encoding) applied to the sparse three-dimensional point cloud, the number of three-dimensional points included in the dense three-dimensional point cloud, and the encoding method (occupancy encoding) applied to the dense three-dimensional point cloud.

The header information may include information for identifying the start position or end position of encoded data of each three-dimensional point sub-cloud. In this example, this information indicates at least one of the start position and end position of the encoded data of the sparse three-dimensional point cloud or the start position and end position of the encoded data of the dense three-dimensional point cloud.

Moreover, the three-dimensional data encoding device may encode the sparse three-dimensional point cloud and the dense three-dimensional point cloud in parallel. Alternatively, the three-dimensional data encoding device may encode the sparse three-dimensional point cloud and the dense three-dimensional point cloud in sequence.

Figure 72:
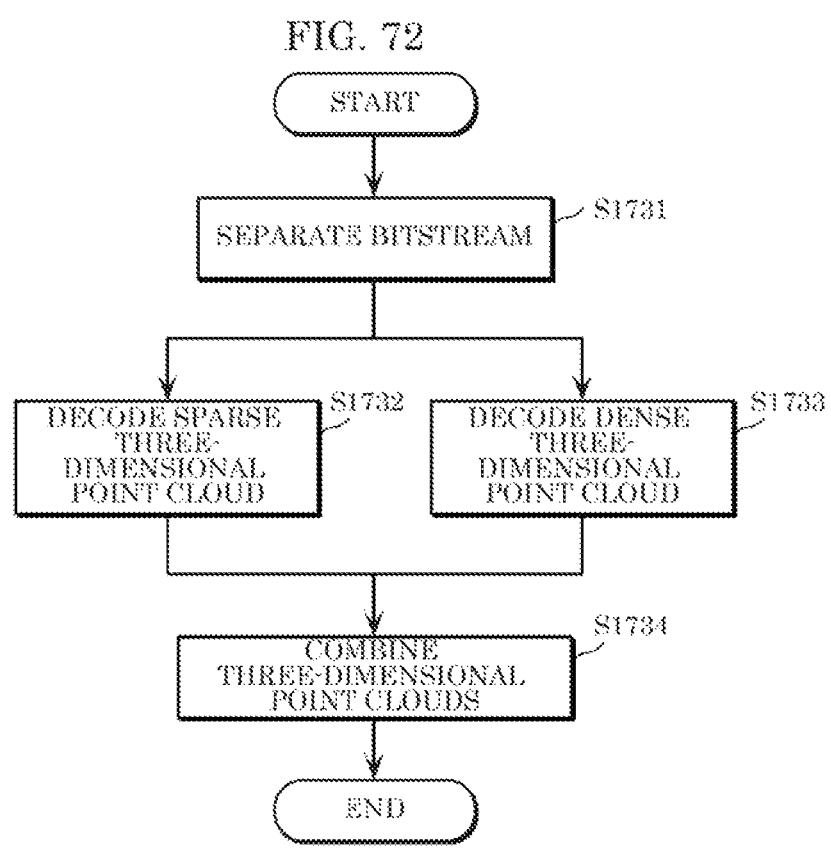
FIG. 72 is a flowchart of a decoding process according to Embodiment 9.

The following describes a specific example of a three-dimensional data decoding process. FIG. 72 is a flowchart of a three-dimensional data decoding process performed by the three-dimensional data decoding device according to the present embodiment.

First, for example, the three-dimensional data decoding device obtains a bitstream generated by the above three-dimensional data encoding device. Next, the three-dimensional data decoding device separates, from the obtained bitstream, encoded data of a sparse three-dimensional point cloud and encoded data of a dense three-dimensional point cloud (S1731). Specifically, the three-dimensional data decoding device decodes, from header information of the bitstream, information for decoding each three-dimensional point sub-cloud, and separates encoded data of each three-dimensional point sub-cloud using the information. In this example, the three-dimensional data decoding device separates, from the bitstream, the encoded data of the sparse three-dimensional point cloud and the encoded data of the dense three-dimensional point cloud using the header information.

Then, the three-dimensional data decoding device obtains the sparse three-dimensional point cloud by decoding the encoded data of the sparse three-dimensional point cloud (S1732). For example, the three-dimensional data decoding device decodes the sparse three-dimensional point cloud using location decoding for decoding encoded data obtained as a result of the location encoding.

In addition, the three-dimensional data decoding device obtains the dense three-dimensional point cloud by decoding the encoded data of the dense three-dimensional point cloud (S1733). For example, the three-dimensional data decoding device decodes the dense three-dimensional point cloud using occupancy decoding for decoding encoded data obtained as a result of the occupancy encoding.

After that, the three-dimensional data decoding device combines the sparse three-dimensional point cloud obtained in step S1732 and the dense three-dimensional point cloud obtained in step S1733 (S1734).

It should be noted that the three-dimensional data decoding device may decode the sparse three-dimensional point cloud and the dense three-dimensional point cloud in parallel. Alternatively, the three-dimensional data decoding device may decode the sparse three-dimensional point cloud and the dense three-dimensional point cloud in sequence.

Moreover, the three-dimensional data decoding device may decode part of necessary three-dimensional point sub-clouds. For example, the three-dimensional data decoding device may decode a dense three-dimensional point cloud and need not decode a sparse three-dimensional point cloud. For example, when a dense three-dimensional point cloud is a three-dimensional point cloud included in an important area of LiDAR data, the three-dimensional data decoding device decodes the three-dimensional point cloud included in the important area. Self-location estimation etc. in a vehicle or the like is performed using the three-dimensional point cloud included in the important area.

Figure 73:
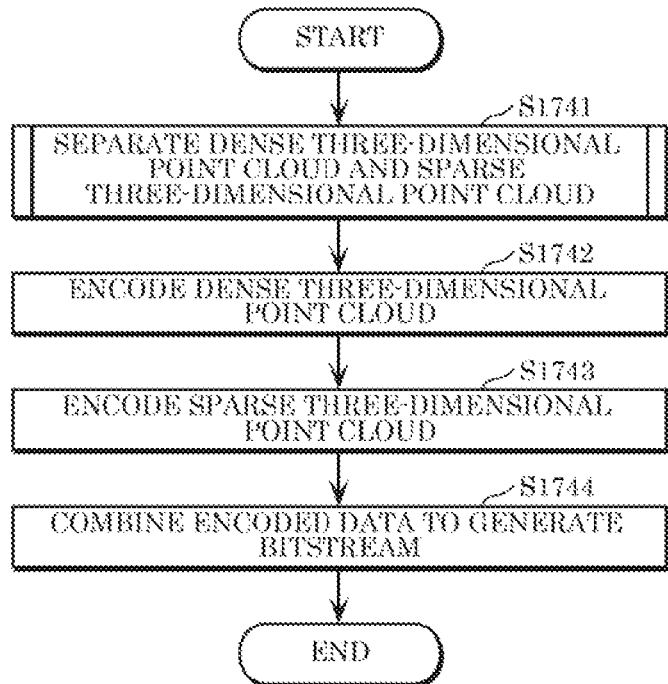
FIG. 73 is a flowchart of an encoding process according to Embodiment 9.

FIG. 73 is a flowchart of an encoding process according to the present embodiment. First, the three-dimensional data encoding separates an inputted three-dimensional point cloud into a sparse three-dimensional point cloud and a dense three-dimensional point cloud (S1741).

Next, the three-dimensional data encoding device generates encoded data by encoding the dense three-dimensional point cloud (S1742). Then, the three-dimensional data encoding device generates encoded data by encoding the sparse three-dimensional point cloud (S1743). Finally, the three-dimensional data encoding device generates a bitstream by combining the encoded data of the sparse three-dimensional point cloud obtained in step S1742 and the encoded data of the dense three-dimensional point cloud obtained in step S1743 (S1744).

Figure 74:
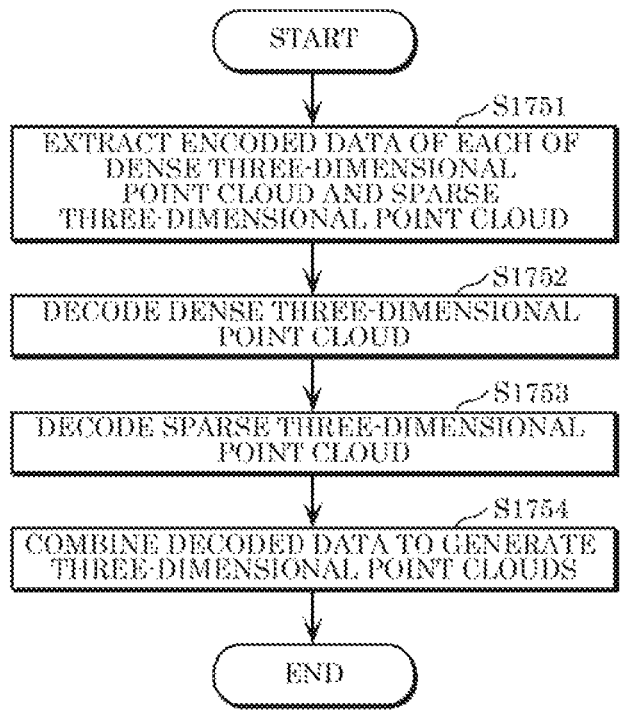
FIG. 74 is a flowchart of a decoding process according to Embodiment 9.

FIG. 74 is a flowchart of a decoding process according to the present embodiment. First, the three-dimensional data decoding device extracts, from a bitstream, encoded data of a sparse three-dimensional point cloud and encoded data of a dense three-dimensional (S1751). Next, the three-dimensional data decoding device obtains decoded data of the dense three-dimensional point cloud by decoding the encoded data of the dense three-dimensional point cloud (S1752). Then, the three-dimensional data decoding device obtains decoded data of the sparse three-dimensional point cloud by decoding the encoded data of the sparse three-dimensional point cloud (S1753). Finally, the three-dimensional data decoding device generates a three-dimensional point cloud by combining the decoded data of the dense three-dimensional point cloud obtained in step S1752 and the decoded data of the sparse three-dimensional point cloud obtained in step S1753 (S1754).

It should be noted that the three-dimensional data encoding device and the three-dimensional data decoding device may encode and decode any one of a dense three-dimensional point cloud and a sparse three-dimensional point cloud first. In addition, encoding processes or decoding processes may be performed in parallel using processors etc.

Moreover, the three-dimensional data encoding device may encode one of a dense three-dimensional point cloud and a sparse three-dimensional point cloud. For example, when a dense three-dimensional point cloud includes important information, the three-dimensional data encoding device extracts the dense three-dimensional point cloud and a sparse three-dimensional point cloud from an inputted three-dimensional point cloud, and encode the dense three-dimensional point cloud but does not encode the sparse three-dimensional point cloud. This enables the three-dimensional data encoding device to append the important information to a stream while reducing an amount of bit. For example, when, between a server and a client, the client sends to the server a transmission request for three-dimensional point cloud information about the surroundings of the client, the server encodes important information about the surroundings of the client as a dense three-dimensional point cloud and transmits the encoded important information to the client. This enables the server to transmit the information requested by the client while reducing a network bandwidth.

Moreover, the three-dimensional data decoding device may decode one of a dense three-dimensional point cloud and a sparse three-dimensional point cloud. For example, when a dense three-dimensional point cloud includes important information, the three-dimensional data decoding device decodes the dense three-dimensional point cloud but does not decode a sparse three-dimensional point cloud. This enables the three-dimensional data decoding device to obtain necessary information while reducing a processing load of the decoding process.

Figure 75:
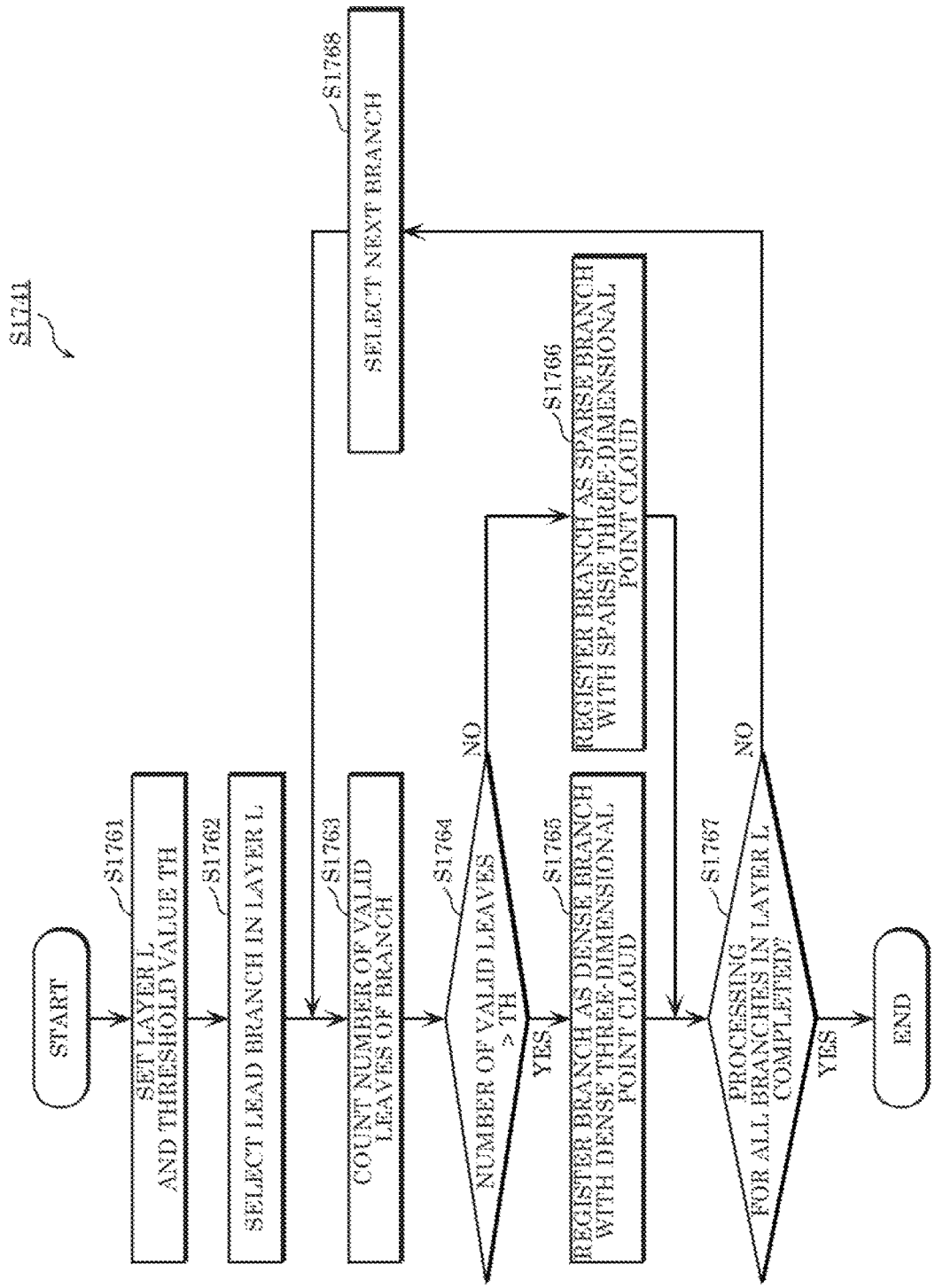
FIG. 75 is a flowchart of a process of separating three-dimensional points according to Embodiment 9.

FIG. 75 is a flowchart of the process of separating three-dimensional points (S1741) illustrated in FIG. 73. First, the three-dimensional data encoding device sets layer L and threshold value TH (S1761). It should be noted that the three-dimensional data encoding device may append information indicating set layer L and threshold value TH, to a bitstream. In other words, the three-dimensional data encoding device may generate a bitstream including information indicating set layer L and threshold value TH.

Next, the three-dimensional data encoding device moves a target position from a root of an octree to a lead branch in layer L. In other words, the three-dimensional data encoding device selects the lead branch in layer L as a current branch (S1762).

Then, the three-dimensional data encoding device counts the number of valid leaves of the current branch inlayer L (S1763). When the number of the valid leaves of the current branch is greater than threshold value TH (YES in S1764), the three-dimensional data encoding device registers the current branch as a dense branch with a dense three-dimensional point cloud (S1765). In contrast, when the number of the valid leaves of the current branch is less than threshold value TH (NO in S1764), the three-dimensional data encoding device registers the current branch as a sparse branch with a sparse three-dimensional point cloud (S1766).

When processing of all branches in layer L is not completed (NO in S1767), the three-dimensional data encoding device moves the target position to the next branch in layer L. In other words, the three-dimensional data encoding device selects the next branch in layer L as a current branch (S1768). And then, the three-dimensional data encoding device performs step S1763 and the subsequent steps on the selected next current branch.

The above-described process is repeated until the processing of all the branches in layer L is completed (YES in S1767).

It should be noted that although layer L and threshold value TH are preset in the above description, the present embodiment is not necessarily limited to this. For example, the three-dimensional data encoding device sets different combinations of layer L and threshold value TH, generates a dense three-dimensional point cloud and a sparse three-dimensional point cloud using each of the combinations, and encodes the dense three-dimensional point cloud and the sparse three-dimensional point cloud. The three-dimensional data encoding device finally encodes the dense three-dimensional point cloud and the sparse three-dimensional point cloud using, among the combinations, a combination of layer L and threshold value TH having the highest coding efficiency for encoded data generated. This makes it possible to improve the coding efficiency. Moreover, for example, the three-dimensional data encoding device may calculate layer L and threshold value TH. For example, the three-dimensional data encoding device may set, to layer L, a value half as much as the maximum value of layers included in a tree structure. Furthermore, the three-dimensional data encoding device may set, to threshold value TH, a value half as much as a total number of three-dimensional points included in the tree structure.

In the above description, the example has been shown in which the inputted three-dimensional point cloud is separated into two types of three-dimensional point cloud, that is, the dense three-dimensional point cloud and the sparse three-dimensional point cloud. The three-dimensional data encoding device, however, may separate the inputted three-dimensional point cloud into at least three types of three-dimensional point cloud. For example, when the number of valid leaves of a current branch is greater than or equal to first threshold value TH1, the three-dimensional data encoding device classifies the current branch into a first dense three-dimensional point cloud, and when the number of the valid leaves of the current branch is less than first threshold value TH1 and greater than or equal to second threshold value TH2, the three-dimensional data encoding device classifies the current branch into a second dense three-dimensional point cloud. When the number of the valid leaves of the current branch is less than second threshold value TH2 and greater than or equal to third threshold value TH3, the three-dimensional data encoding device classifies the current branch into a first sparse three-dimensional point cloud, and when the number of the valid leaves of the current branch is less than third threshold value TH3, the three-dimensional data encoding device classifies the current branch into a second sparse three-dimensional point cloud.

Hereinafter, a description is given of a syntax example of encoded data of a three-dimensional point cloud according to this embodiment. FIG. 76 is a diagram illustrating the syntax example. For example, pc_header( ) is header information of a plurality of three-dimensional points which have been input.

In FIG. 76, num_sub_pc indicates the number of three-dimensional point sub-clouds. In addition, numPoint[i] indicates the number of three-dimensional points included in an ith three-dimensional point sub-cloud. In addition, coding_type[i] is coding type information indicating a coding type (encoding method) applied to the ith three-dimensional point sub-cloud. For example, coding_type=00 indicates that location encoding has been applied. On the other hand, coding_type=01 indicates that occupancy encoding has been applied. In addition, coding_type=10 or coding_type=11 indicates that another encoding method has been applied.

In addition, data_sub_cloud( ) is encoded data of the ith three-dimensional point sub-cloud. In addition, coding_type_00_data is encoded data to which the coding type indicated by coding_type=00 such as location encoding has been applied. In addition, coding_type_01_data is encoded data to which the coding type indicated by coding_type=01 such as occupancy encoding has been applied.

In addition, end_of_data is end information indicating the end of encoded data. For example, a fixed bit string which is not used for encoded data is assigned to end_of_data. Accordingly, the three-dimensional data decoding device is capable of skipping a decoding process of the encoded data which does not need to be decoded, by, for example, searching a bitstream for the bit string of data with end_of_data.

It is to be noted that the three-dimensional data encoding device may entropy-encode the encoded data generated using the above-described method. For example, the three-dimensional data encoding device binarizes each value and performs arithmetic coding on the binarized value.

In addition, although an example of a quadtree structure or an octree structure has been indicated in this embodiment, the above method may be applied to an N-ary tree structure (N is an integer of 2 or larger) such as a binary tree, hexadecatree, or another ary structure.

Variations

As illustrated in each of FIGS. 68 and 69, a tree structure including dense branches and an upper layer relative to each dense branch (that is, a tree structure from the root of the whole tree structure to the root of the dense branch) has been encoded, and a tree structure including sparse branches and an upper layer relative to each sparse branch (that is, a tree structure from the root of the whole tree structure to the root of the sparse branch) has been encoded. In this variation, the three-dimensional data encoding device separates dense branches and sparse branches, and encodes the dense branches and sparse branches separately. In other words, the tree structure to be encoded does not include any tree structure in the upper layer. For example, the three-dimensional data encoding device applies occupancy encoding to dense branches, and applies location encoding to sparse branches.

FIG. 77 is a diagram illustrating an example of dense branches separated from the tree structure illustrated in FIG. 63. FIG. 78 is a diagram illustrating an example of sparse branches separated from the tree structure illustrated in FIG. 63. In this variation, the tree structure illustrated in each of FIGS. 77 and 78 is encoded.

Furthermore, the three-dimensional data encoding device encodes information indicating the positions of the branches instead of encoding the tree structure in the upper layer. For example, the information indicates the position of the root of each branch.

For example, the three-dimensional data encoding device encodes, as the encoded data of the dense branch, layer information indicating the layer in which the dense branch has been generated and branch information indicating what number branch in the layer the dense branch is. In this way, the three-dimensional data decoding device is capable of decoding the layer information and the branch information from a bitstream, and recognizing which three-dimensional point cloud of what number branch in which layer the decoded dense branch is, using the layer information and the branch information. Likewise, the three-dimensional data encoding device encodes, as the encoded data of the sparse branch, layer information indicating the layer in which the dense branch has been generated and branch information indicating what number branch in the layer the sparse branch is present.

In this way the three-dimensional data decoding device is capable of decoding the layer information and the branch information from a bitstream, and recognizing which three-dimensional point cloud of what number branch in which layer the decoded sparse branch is, using the layer information and the branch information. In this way, it is possible to reduce overhead resulting from encoding of information about the upper layer relative to each of the dense branch and the sparse branch. Thus, it is possible to increase encoding efficiency.

It is to be noted that the branch information may indicate a value assigned to each branch in the layer indicated by the layer information. In addition, the branch information may indicate a value assigned to each node starting from the root of an octree. In this case, the layer information does not always need to be encoded. In addition, the three-dimensional data encoding device may generate dense branches and sparse branches.

Figure 79:
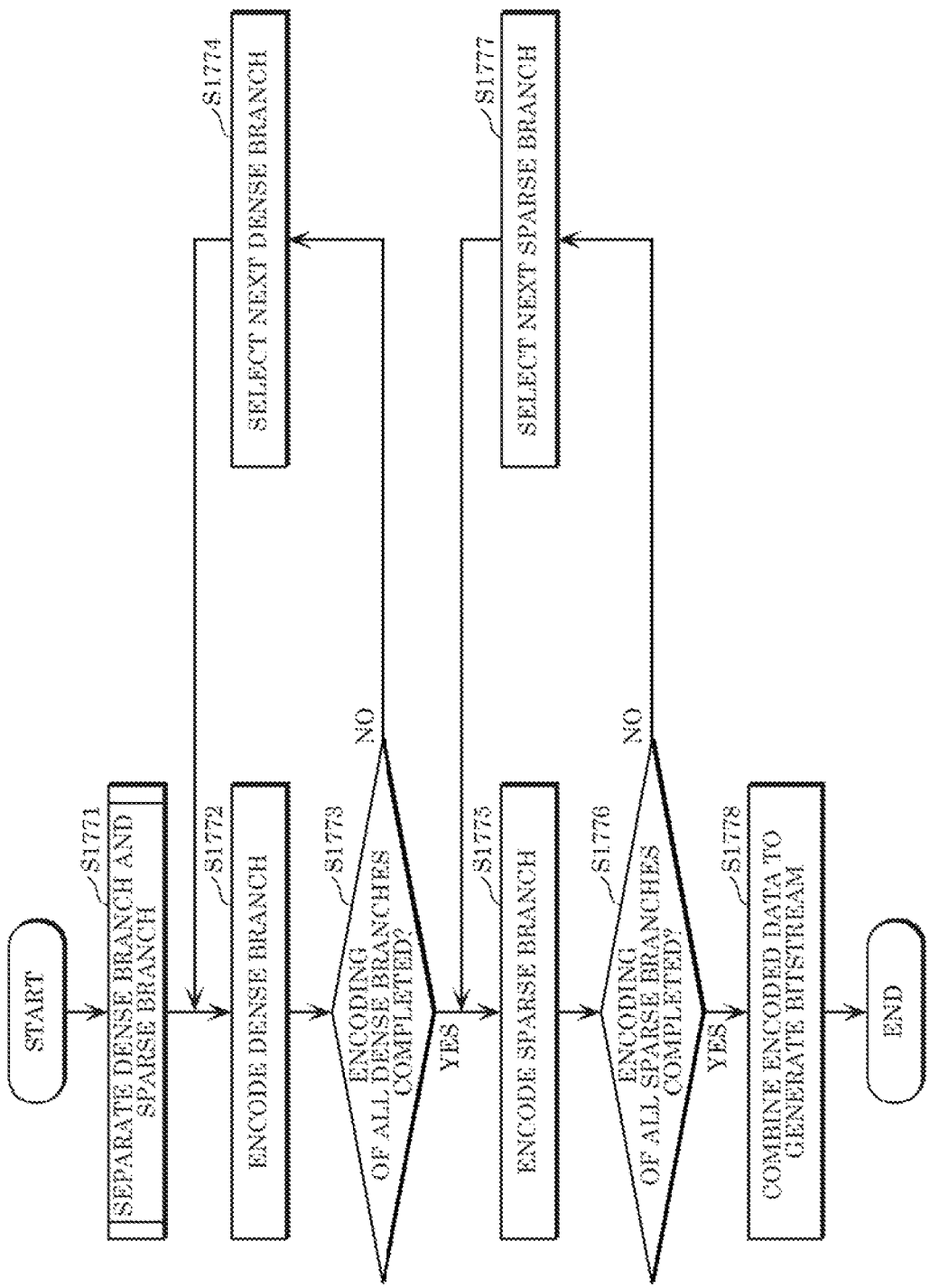
FIG. 79 is a flowchart of an encoding process according to a variation of Embodiment 9.
Figure 80:
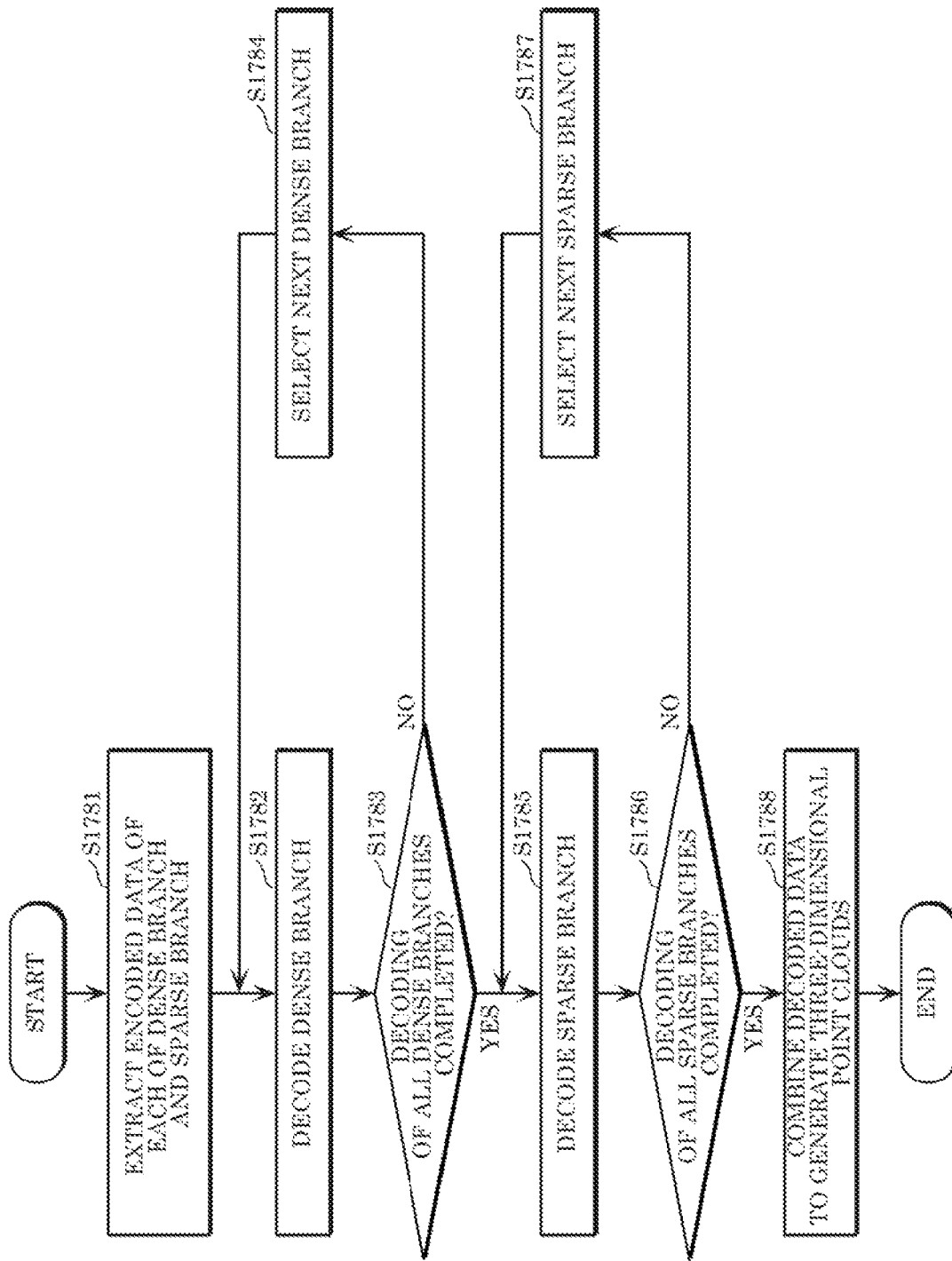
FIG. 80 is a flowchart of a decoding process according to the variation of Embodiment 9.

FIG. 79 is a flowchart of an encoding process in this variation. First, the three-dimensional data encoding device generates one or more sparse branches and one or more dense branches from a three-dimensional point cloud which has been input (S1771).

Next, the three-dimensional data encoding device encodes the dense branches to generate encoded data (S1772). Next, the three-dimensional data encoding device determines whether encoding of all of the dense branches generated in Step S1771 has been completed (S1773).

In the case where encoding of all the dense branches has not been completed (No in S1773), the three-dimensional data encoding device selects a next dense branch (S1774), and encodes the selected dense branch to generate encoded data (S1772).

In the opposite case where encoding of all the dense branches has been completed (No in S1773), the three-dimensional data encoding device encodes the sparse branch to generate encoded data (S1775). Next, the three-dimensional encoding device determines whether encoding of all of the sparse branches generated in Step S1771 has been completed (S1776).

In the case where encoding of all the sparse branches has not been completed (No in S1776), the three-dimensional data encoding device selects a next sparse branch (S1777), and encodes the selected sparse branch to generate encoded data (S1775).

In the opposite case where encoding of all the sparse branches has been completed (Yes in S1776), the three-dimensional data encoding device combines encoded data generated in Step S1772 and encoded data generated in S1775 to generate a bitstream (S1778).

FIG. 79 is a flowchart of a decoding process in this variation. First, the three-dimensional data decoding device extracts, from a bitstream, one or more coded data of one or more dense branches and one or more encoded data of one or more sparse branches (S1781). Next, the three-dimensional data decoding device decodes the encoded data of the dense branches to obtain decoded data of the dense branches.

Next, the three-dimensional data decoding device determines whether decoding of the encoded data of all the dense branches extracted in Step S1781 has been completed (S1783). In the case where the decoding of the encoded data of all the dense branches has not been completed (No in S1783), the three-dimensional data decoding device selects encoded data of a next dense branch (S1784), and decodes the encoded data of the selected dense branch to obtain decoded data of the dense branch (S1782).

In the opposite case where decoding of the encoded data of all the dense branches has been completed (Yes in S1783), the three-dimensional data decoding device decodes the encoded data of the sparse branch to obtain decoded data of the sparse branch (S1785).

Next, the three-dimensional data decoding device determines whether decoding of all the sparse branches extracted in Step S1781 has been completed (S1786). In the case where decoding of the encoded data of all the sparse branches has not been completed (No in S1786), the three-dimensional data decoding device selects the encoded data of a next sparse branch (S1787), and decodes the encoded data of the selected sparse branch to obtain decoded data of the sparse branch (S1785).

In the opposite case where decoding of the encoded data of all the sparse branches has been completed (Yes in S1786), the three-dimensional data decoding device combines the decoded data generated in Step S1782 and the decoded data generated in Step S1785 to generate a three-dimensional point cloud (S1788).

It is to be noted that the three-dimensional data encoding device and the three-dimensional data decoding device may encode and decode either dense branches or sparse branches first. In addition, a plurality of processors, etc. may perform encoding processes and decoding processes in parallel.

In addition, the three-dimensional encoding device may encode either dense branches or sparse branches. In addition, the three-dimensional data encoding device may encode a part of dense branches. For example, when one or more particular dense branches include important information, the three-dimensional data encoding device extracts dense branches and sparse branches from a three-dimensional point cloud which has been input. The three-dimensional encoding device then encodes the one or more dense branches including the important information, and does not encode the other dense branches and the sparse branches. In this way the three-dimensional data encoding device is capable of adding the important information to a stream while reducing the amount of bits. For example, when, between a server and a client, the client transmits to the server, a transmission request for three-dimensional point cloud information about the surroundings of the client, the server encodes important information about the surroundings of the client as a dense branch, and transmits the encoded important information to the client. This enables the server to transmit the information requested by the client while reducing a required network bandwidth.

In addition, the three-dimensional data decoding device may decode either dense branches or sparse branches. In addition, the three-dimensional data decoding device may decode a part of dense branches. For example, when one or more particular dense branches include important information, the three-dimensional data decoding device decodes the one or more dense branches, and does not decode the other dense branches and the sparse branches. In this way, the three-dimensional data decoding device is capable of obtaining necessary information while reducing a processing load in a decoding process.

Figure 81:
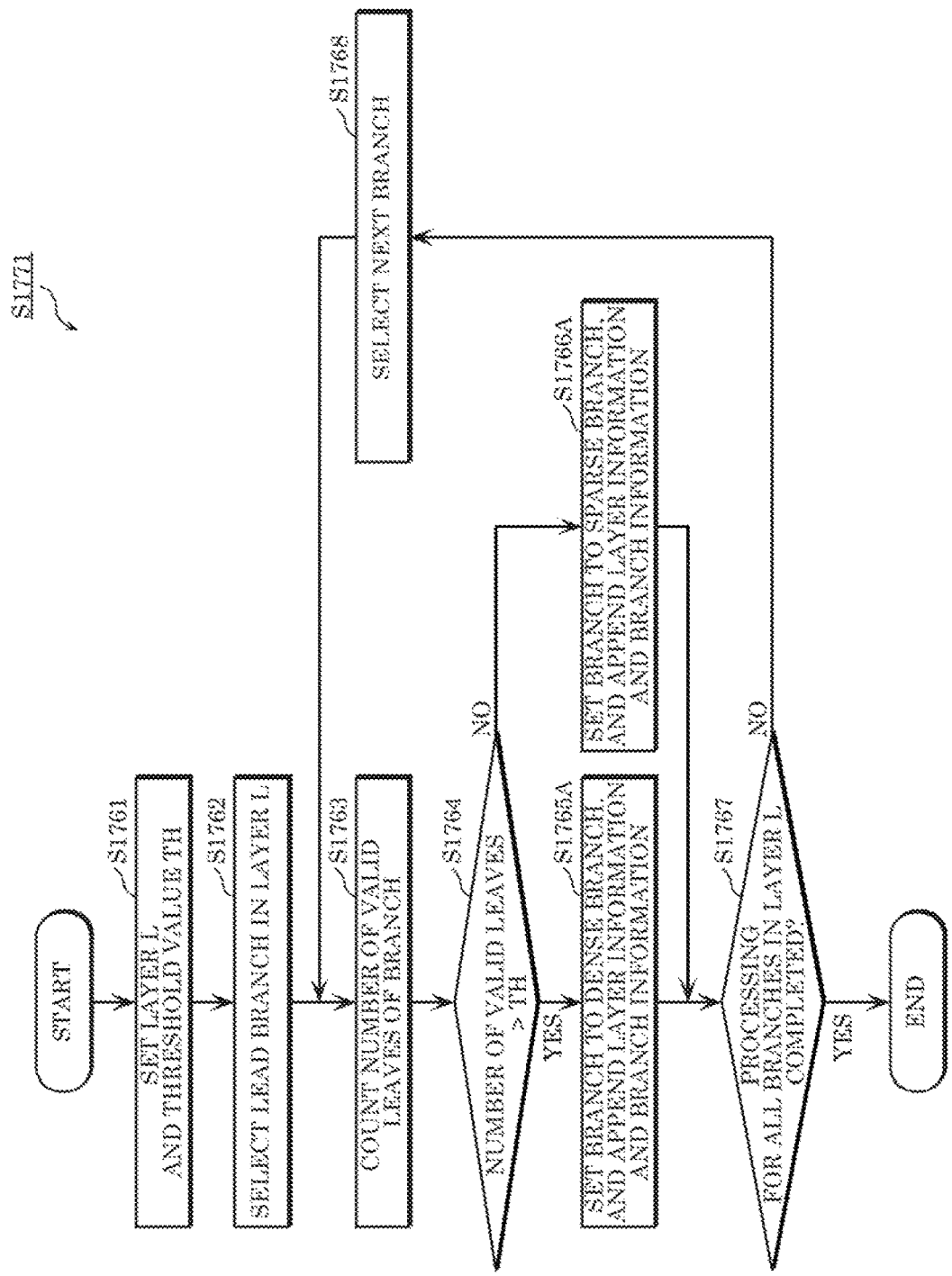
FIG. 81 is a flowchart of a process of separating three-dimensional points according to the variation of Embodiment 9.

FIG. 81 is a flowchart of a process of separating the three-dimensional points illustrated in FIG. 79 (S1771). First, the three-dimensional data encoding device sets layer L and threshold value TH (S1761). It is to be noted that the three-dimensional data encoding device may add, to a bitstream, layer L and threshold value TH which have been set.

Next, the three-dimensional data encoding device selects the leading branch in layer L as a current branch to be processed (S1762). Next, the three-dimensional data encoding device counts the number of valid leaves in the current branch in layer L (S1763). In the case where the number of valid leaves in the current branch is larger than threshold value TH (Yes in S1764), the three-dimensional data encoding device sets the current branch to a dense branch, and adds layer information and branch information regarding the dense branch to a bitstream (S1765A). In the opposite case where the number of valid leaves in the current branch is smaller than or equal to threshold value TH (No in S1764), the three-dimensional data encoding device sets the current branch to a sparse branch, and adds layer information and branch information regarding the sparse branch to the bitstream (S1766A).

When the processing of all the branches in layer L has not been completed (No in S1767), the three-dimensional data encoding device selects a next branch in layer L as a current branch to be processed (S1768). The three-dimensional data encoding device then performs processes starting with the process in Step S1763. The processing is repeated until the processing of all the branches in layer L is completed (Yes in S1767).

It is to be noted that although layer L and threshold value TH are preset in the above description, the present disclosure is not necessarily limited to this. For example, the three-dimensional data encoding device sets different combinations of layer L and threshold value TH, generates a dense branch and a sparse branch using each of the combinations, and encodes each of the dense branch and the sparse branch. The three-dimensional data encoding device finally encodes the dense branch and the sparse branch using, among the combinations, a combination of layer L and threshold value TH having the highest coding efficiency for encoded data generated. In this way, it is possible to increase the encoding efficiency. In addition, for example, the three-dimensional data encoding device may calculate layer L and threshold value TH. For example, the three-dimensional data encoding device may set, to layer L, a value half as much as the maximum value of layers included in a tree structure. In addition, the three-dimensional data encoding device may set, to threshold value TH, a value which is the half of a total number of three-dimensional points included in a tree structure.

Hereinafter, a description is given of a syntax example of encoded data of a three-dimensional point cloud according to this variation. FIG. 82 is a diagram illustrating the syntax example. In the syntax example indicated in FIG. 82, layer_id[i] which is layer information and branch_id[i] which is branch information are added, compared to the syntax example indicated in FIG. 76.

Here, layer_id[i] indicates a layer number of a layer to which an ith three-dimensional point sub-cloud belongs. In addition, branch_id[i] indicates a branch number in layer_id [i] of the ith three-dimensional point sub-cloud.

For example, layer_id[i] and branch_id[i] are layer information and branch information indicating the position in an octree. For example, layer_id[i]=2 and branch_id[i]=5 indicate that an ith branch is a fifth branch in layer 2.

It should be noted that the three-dimensional data encoding device may entropy encode the encoded data generated by the above-described method. For example, the three-dimensional data encoding device binarizes each value and performs arithmetic coding on the binarized value.

Although the example of the quadtree structure or the octree structure has been shown in the present embodiment, the present embodiment is not necessarily limited to this. The above-described method may be applied to an N-ary (N is an integer greater than or equal to 2) tree, such as a binary tree and a hexadecatree, or another tree structure.

Figure 83:
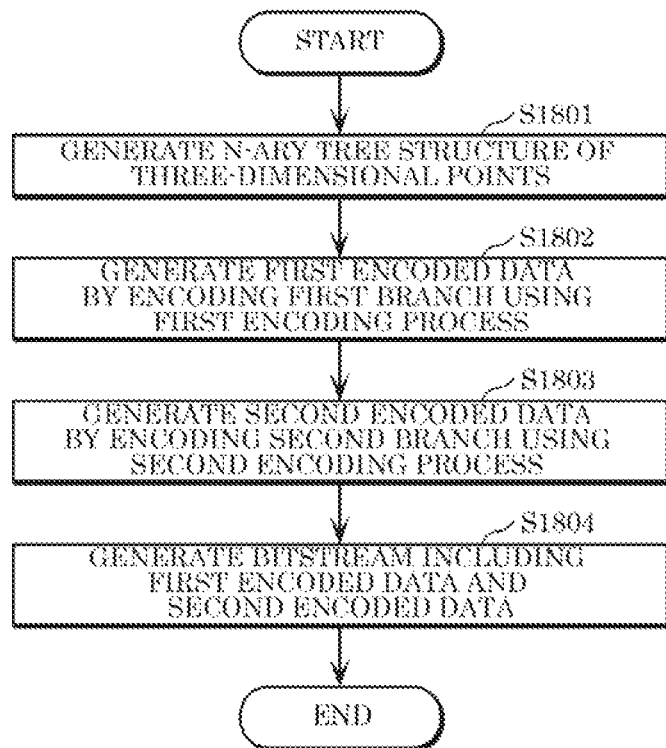
FIG. 83 is a flowchart of an encoding process according to Embodiment 9.

As stated above, the three-dimensional data encoding device according to the present embodiment performs the process illustrated in FIG. 83.

First, the three-dimensional data encoding device generates an N-ary (N is an integer greater than or equal to 2) tree structure of three-dimensional points included in three-dimensional data (S1801).

Next, the three-dimensional data encoding device generates first encoded data by encoding, using a first encoding process, a first branch having, as a root, a first node included in a first layer that is one of layers included in the N-ary tree structure (S1802).

In addition, the three-dimensional data encoding device generates second encoded data by encoding, using a second encoding process different from the first encoding process, a second branch having, as a root, a second node that is included in the first layer and different from the first node (S1803).

Then, the three-dimensional data encoding device generates a bitstream including the first encoded data and the second encoded data (S1804).

Since this enables the three-dimensional data encoding device to apply an encoding process suitable for each branch included in the N-ary tree structure, it is possible to improve the coding efficiency.

For example, the number of three-dimensional points included in the first branch is less than a predetermined threshold value, and the number of three-dimensional points included in the second branch is greater than the threshold value. In other words, when the number of three-dimensional points included in a current branch is less than a threshold value, the three-dimensional data encoding device sets the current branch as the first branch, and when the number of three-dimensional points included in the current branch is greater than the threshold value, the three-dimensional data encoding device sets the current branch as the second branch.

For example, the first encoded data includes first information indicating that a first N-ary tree structure of first three-dimensional points included in the first branch is expressed using a first formula. The second encoded data includes second information indicating that a second N-ary tree structure of second three-dimensional points included in the second branch is expressed using a second formula. In other words, the first encoding process and the second encoding process differ in encoding scheme.

For example, the location encoding is used in the first encoding process, and the occupancy encoding is used in the second encoding process. In other words, the first information includes pieces of three-dimensional point information each of which is associated with a corresponding one of the first three-dimensional points. Each of the pieces of three-dimensional point information includes an index associated with each of layers in the first N-ary tree structure. Each of the indexes indicates, among N sub-blocks belonging to a corresponding one of the layers, a sub-block to which a corresponding one of the first three-dimensional points belongs. The second information includes pieces of 1-bit information each of which is associated with a corresponding one of sub-blocks belonging to layers in the second N-ary tree structure, and indicates whether a three-dimensional point is present in the corresponding sub-block.

For example, a quantization parameter used in the second encoding process is different from a quantization parameter used in the first encoding process. In other words, the first encoding process and the second encoding process are identical in encoding scheme, but differ in parameter for use.

For example, as illustrated in FIG. 67 and FIG. 68, in the encoding of the first branch, the three-dimensional data encoding device encodes, using the first encoding process, the tree structure including the first branch and the tree structure from the root of the N-ary tree structure to the first node, and in the encoding of the second branch, the three-dimensional data encoding device encodes, using the second encoding process, the tree structure including the second branch and the tree structure from the root of the N-ary tree structure to the second node.

For example, the first encoded data includes encoded data of the first branch, and third information indicating a position of the first node in the N-ary tree structure. The second encoded data includes encoded data of the second branch, and fourth information indicating a position of the second node in the N-ary tree structure.

For example, the third information includes information (layer information) indicating the first layer, and information (branch information) indicating which one of nodes included in the first layer the first node is. The fourth information includes the information (layer information) indicating the first layer, and information (branch information) indicating which one of nodes included in the first layer the second node is.

For example, the first encoded data includes information (numPoint) indicating the number of three-dimensional points included in the first branch, and the second encoded data includes information (numPoint) indicating the number of three-dimensional points included in the second branch.

For example, the three-dimensional data encoding device includes a processor and memory, and the processor performs the above process using the memory.

Figure 84:
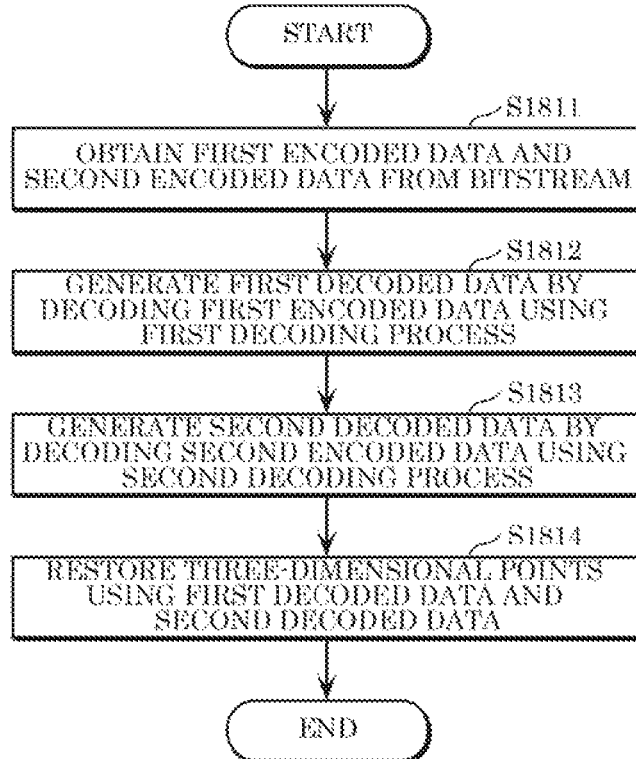
FIG. 84 is a flowchart of a decoding process according to Embodiment 9.

The three-dimensional data decoding device according to the present embodiment performs the process illustrated in FIG. 84.

First, the three-dimensional data decoding device obtains, from a bitstream, first encoded data obtained by encoding a first branch having, as a root, a first node included in a first layer that is one of layers included in an N-ary (N is an integer greater than or equal to 2) tree structure of three-dimensional points, and second encoded data obtained by encoding a second branch having, as a root, a second node that is included in the first layer and different from the first node (S1811).

Next, the three-dimensional data decoding device generates first decoded data of the first branch by decoding the first encoded data using a first decoding process (S1812).

In addition, the three-dimensional data decoding device generates second decoded data of the second branch by decoding the second encoded data using a second decoding process different from the first decoding process (S1813).

Then, the three-dimensional data decoding device restores three-dimensional points using the first decoded data and the second decoded data (S1814). For example, these three-dimensional points include three-dimensional points indicated by the first decoded data, and three-dimensional points indicated by the second decoded data.

This enables the three-dimensional data decoding device to decode the bitstream for which the coding efficiency is improved.

For example, the number of three-dimensional points included in the first branch is less than a predetermined threshold value, and the number of three-dimensional points included in the second branch is greater than the threshold value.

For example, the first encoded data includes first information indicating that a first N-ary tree structure of first three-dimensional points included in the first branch is expressed using a first formula. The second encoded data includes second information indicating that a second N-ary tree structure of second three-dimensional points included in the second branch is expressed using a second formula. In other words, the first decoding process and the second decoding process differ in encoding scheme (decoding scheme).

For example, the location encoding is used for the first encoded data, and the occupancy encoding is used for the second encoded data. In other words, the first information includes pieces of three-dimensional point information each of which is associated with a corresponding one of the first three-dimensional points. Each of the pieces of three-dimensional point information includes an index associated with each of layers in the first N-ary tree structure. Each of the indexes indicates, among N sub-blocks belonging to a corresponding one of the layers, a sub-block to which a corresponding one of the first three-dimensional points belongs. The second information includes pieces of 1-bit information each of which is associated with a corresponding one of sub-blocks belonging to layers in the second N-ary tree structure, and indicates whether a three-dimensional point is present in the corresponding sub-block.

For example, a quantization parameter used in the second decoding process is different from a quantization parameter used in the first decoding process. In other words, the first decoding process and the second decoding process are identical in encoding scheme (decoding scheme), but differ in parameter for use.

For example, as illustrated in FIG. 67 and FIG. 68, in the decoding of the first branch, the three-dimensional data decoding device decodes, using the first decoding process, the tree structure including the first branch and the tree structure from the root of the N-ary tree structure to the first node, and in the decoding of the second branch, the three-dimensional data decoding device decodes, using the second decoding process, the tree structure including the second branch and the tree structure from the root of the N-ary tree structure to the second node.

For example, the first encoded data includes encoded data of the first branch, and third information indicating a position of the first node in the N-ary tree structure. The second encoded data includes encoded data of the second branch, and fourth information indicating a position of the second node in the N-ary tree structure.

For example, the third information includes information (layer information) indicating the first layer, and information (branch information) indicating which one of nodes included in the first layer the first node is. The fourth information includes the information (layer information) indicating the first layer, and information (branch information) indicating which one of nodes included in the first layer the second node is.

For example, the first encoded data includes information (numPoint) indicating the number of three-dimensional points included in the first branch, and the second encoded data includes information (numPoint) indicating the number of three-dimensional points included in the second branch.

For example, the three-dimensional data decoding device includes a processor and memory, and the processor performs the above process using the memory.

Embodiment 10

In the present embodiment, a method of controlling reference when an occupancy code is encoded will be described. It should be noted that although the following mainly describes an operation of a three-dimensional data encoding device, a three-dimensional data decoding device may perform the same process.

Figure 85:
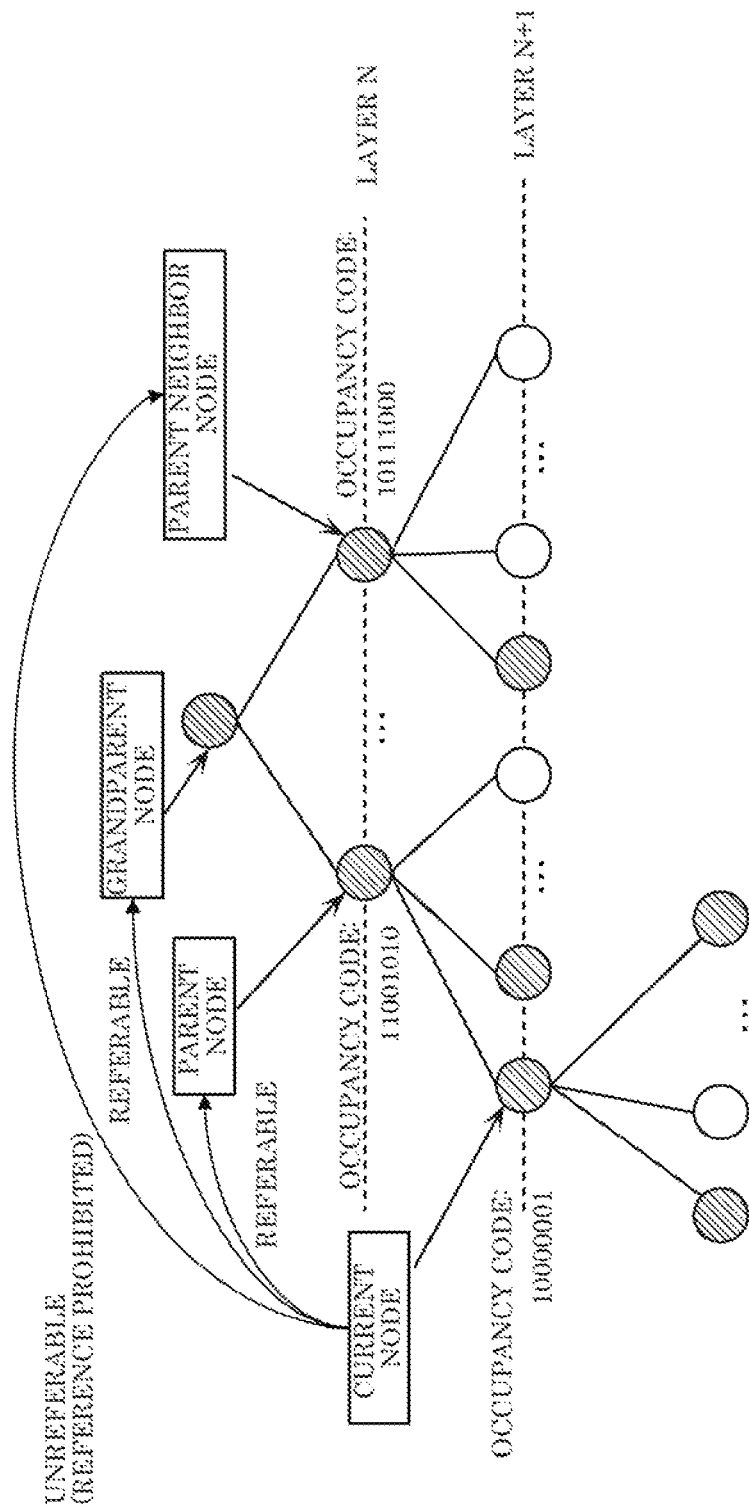
FIG. 85 is a diagram illustrating a reference relationship in an octree structure according to Embodiment 10.
Figure 86:
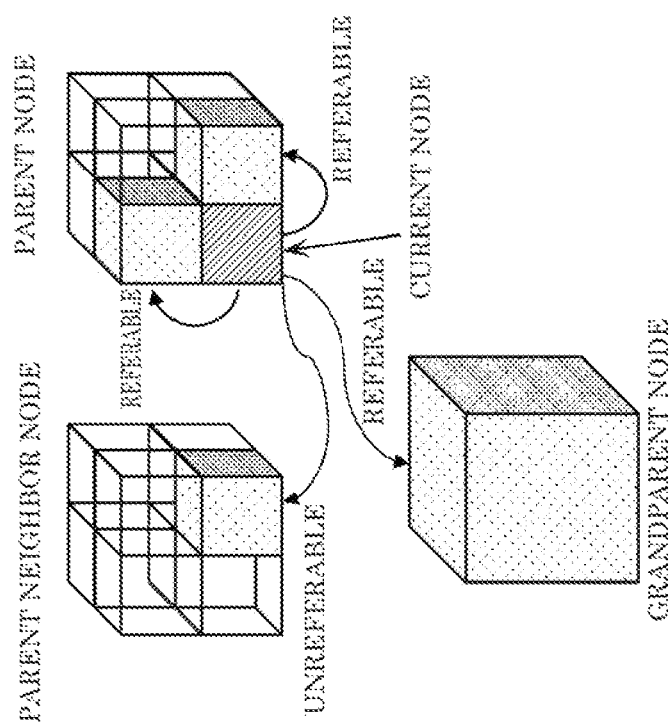
FIG. 86 is a diagram illustrating a reference relationship in a spatial region according to Embodiment 10.

FIG. 85 and FIG. 86 each are a diagram illustrating a reference relationship according to the present embodiment. Specifically. FIG. 85 is a diagram illustrating a reference relationship in an octree structure, and FIG. 86 is a diagram illustrating a reference relationship in a spatial region.

In the present embodiment, when the three-dimensional data encoding device encodes encoding information of a current node to be encoded (hereinafter referred to as a current node), the three-dimensional data encoding device refers to encoding information of each node in a parent node to which the current node belongs. In this regard, however, the three-dimensional encoding device does not refer to encoding information of each node in another node (hereinafter referred to as a parent neighbor node) that is in the same layer as the parent node. In other words, the three-dimensional data encoding device disables or prohibits reference to a parent neighbor node.

It should be noted that the three-dimensional data encoding device may permit reference to encoding information of a parent node (hereinafter also referred to as a grandparent node) of the parent node. In other words, the three-dimensional data encoding device may encode the encoding information of the current node by reference to the encoding information of each of the grandparent node and the parent node to which the current node belongs.

Here, encoding information is, for example, an occupancy code. When the three-dimensional data encoding device encodes the occupancy code of the current node, the three-dimensional data encoding device refers to information (hereinafter referred to as occupancy information) indicating whether a point cloud is included in each node in the parent node to which the current node belongs. To put it in another way, when the three-dimensional data encoding device encodes the occupancy code of the current node, the three-dimensional data encoding device refers to an occupancy code of the parent node. On the other hand, the three-dimensional data encoding device does not refer to occupancy information of each node in a parent neighbor node. In other words, the three-dimensional data encoding device does not refer to an occupancy code of the parent neighbor node. Moreover, the three-dimensional data encoding device may refer to occupancy information of each node in the grandparent node. In other words, the three-dimensional data encoding device may refer to the occupancy information of each of the parent node and the parent neighbor node.

For example, when the three-dimensional data encoding device encodes the occupancy code of the current node, the three-dimensional data encoding device selects a coding table to be used for entropy encoding of the occupancy code of the current node, using the occupancy code of the grandparent node or the parent node to which the current node belongs. It should be noted that the details will be described later. At this time, the three-dimensional data encoding device need not refer to the occupancy code of the parent neighbor node. Since this enables the three-dimensional data encoding device to, when encoding the occupancy code of the current node, appropriately select a coding table according to information of the occupancy code of the parent node or the grandparent node, the three-dimensional data encoding device can improve the coding efficiency. Moreover, by not referring to the parent neighbor node, the three-dimensional data encoding device can suppress a process of checking the information of the parent neighbor node and reduce a memory capacity for storing the information. Furthermore, scanning the occupancy code of each node of the octree in a depth-first order makes encoding easy.

Figures 87, 88, 89:
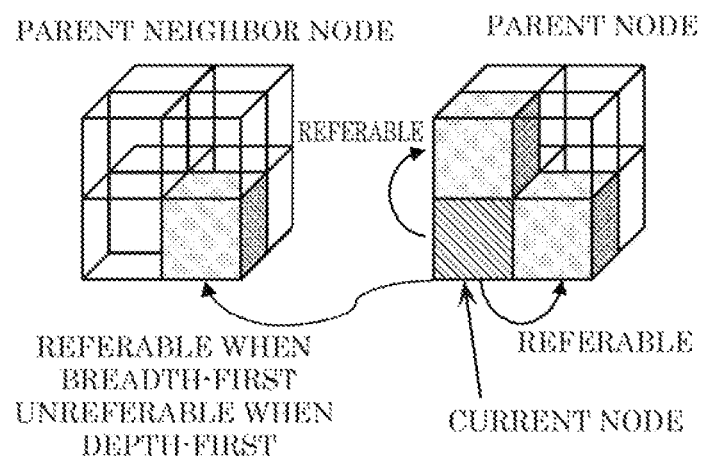
FIG. 87 is a diagram illustrating a reference relationship in a spatial region according to Variation 1 of Embodiment 10.
FIG. 88 is a diagram illustrating an example of a syntax of header information according to Variation 1 of Embodiment 10.
FIG. 89 is a diagram illustrating an example of a syntax of header information according to Variation 1 of Embodiment 10.

Hereinafter, Variation 1 of the embodiment is described. FIG. 87 is a diagram indicating reference relationships in this variation. In the above embodiment, the three-dimensional data encoding device does not refer to an occupancy code of a parent neighbor node. However, whether or not the three-dimensional data encoding device refers to an occupancy code of a parent neighbor node may be switched according to a particular condition.

For example, in the case where the three-dimensional data encoding device performs encoding while scanning an octree in a width-prioritized manner, the three-dimensional data encoding device encodes an occupancy code of a current node with reference to occupancy information of the node in the parent neighbor node. In the opposite case where the three-dimensional data encoding device performs encoding while scanning an octree in a depth-prioritized manner, the three-dimensional data encoding device prohibits reference to the occupancy information of the node in the parent neighbor node. In this way, it is possible to increase the encoding efficiency and reduce the processing load by switching to an appropriate referable node according to the scan order (encoding order) of the node in the octree.

It is to be noted that the three-dimensional data encoding device may add, to a header of a bitstream, information indicating whether an octree has been encoded in a width-prioritized manner or in a depth-prioritized manner. FIG. 88 is a diagram indicating a syntax example of the header information in this case. In FIG. 88, octree_scan_order is an encoding order information (encoding order flag) indicating an encoding order of an octree. For example, when octree_scan_order is 0, 0 indicates that the width is prioritized, and when octree_scan_order is 1, 1 indicates that the depth is prioritized. In this way, the three-dimensional data decoding device can recognize which one of the width and depth has been prioritized in the encoding of the bitstream with reference to octree_scan_order, and thus can decode the bitstream appropriately.

In addition, the three-dimensional data encoding device may add information indicating whether reference to the parent neighbor node is prohibited to the header information of the bitstream. FIG. 89 is a diagram indicating a syntax example of the header information in this case. Here, limit_refer_flag is a prohibition switch information (prohibition switch flag) indicating whether reference to a parent neighbor node is prohibited. For example, when limit_refer_flag is 1, 1 indicates that reference to the parent neighbor node is prohibited, and when limit_refer_flag is 0, 0 indicates that there is no reference restriction (reference to the parent neighbor node is allowed).

In other words, the three-dimensional data encoding device determines whether to prohibit reference to the parent neighbor node, and switches between prohibition and allowance of the reference to the parent neighbor node based on the result of the determination. In addition, the three-dimensional data encoding device generates a bitstream including prohibition switch information indicating whether to prohibit the reference to the parent neighbor node. The prohibition switch information indicates the result of the determination.

In addition, the three-dimensional data decoding device obtains, from the bitstream, the prohibition switch information indicating whether to prohibit the reference to the parent neighbor node, and switches between prohibition and allowance of the reference to the parent neighbor node based on the prohibition switch information.

In this way, the three-dimensional data encoding device is capable of generating the bitstream by controlling reference to the parent neighbor node. In addition, the three-dimensional data decoding device is capable of obtaining, from the header of the bitstream, the information indicating whether reference to the parent neighbor node is prohibited.

In this embodiment, the example of the process of encoding the occupancy code has been described as the example of the encoding process in which reference to the parent neighbor node is prohibited. However, examples are not limited to the example of the process of encoding the occupancy code. For example, a similar method is applicable also at the time of encoding other information of a node in an octree. For example, the method according to this embodiment may be applied at the time of encoding of attribute information such as a color, a normal vector, a reflectance added to the node. In addition, a similar method is applicable even at the time of encoding an encoding table or a predicted value.

Figure 90:
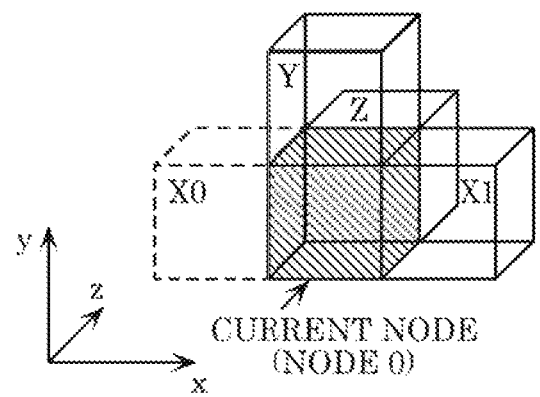
FIG. 90 is a diagram illustrating an example of neighboring reference nodes according to Variation 2 of Embodiment 10.

Next, Variation 2 of the embodiment is described. Although the example in which three reference neighboring nodes are used has been indicated in the above description, four or more reference neighboring nodes may be used. FIG. 90 is a diagram indicating an example of a current node and a reference neighboring node.

For example, the three-dimensional data encoding device calculates an encoding table used when entropy encoding an occupancy code of a current node illustrated in FIG. 90, according to the expression below for instance.

$$\text{CodingTable} = (\text{Flag}X0 << 3) + (\text{Flag}X1 << 2) + (\text{Flag}Y << 1) + (\text{Flag}Z)$$

Here, CodingTable indicates the encoding table for the occupancy code of the current node, and has a value ranging from 0 to 15. FlagXN is occupancy information of neighboring node XN (N=0 . . . 1). FlagXN indicates 1 in the case where neighboring node XN includes a point cloud (is occupied), and indicates 0 in the opposite case. FlagY is occupancy information of neighboring node Y. FlagY indicates 1 in the case where neighboring node Y includes a point cloud (is occupied), and indicates 0 in the opposite case. FlagZ is occupancy information of neighboring node Z. FlagZ indicates 1 in the case where neighboring node Z includes a point cloud (is occupied), and indicates 0 in the opposite case.

At this time, when a neighboring node such as neighboring node X0 in FIG. 90 is unreferrable (prohibited from being referred to), the three-dimensional data encoding device may use a fixed value that is for example 1 (occupied) or 0 (not occupied) as a substitute value.

Figure 91:
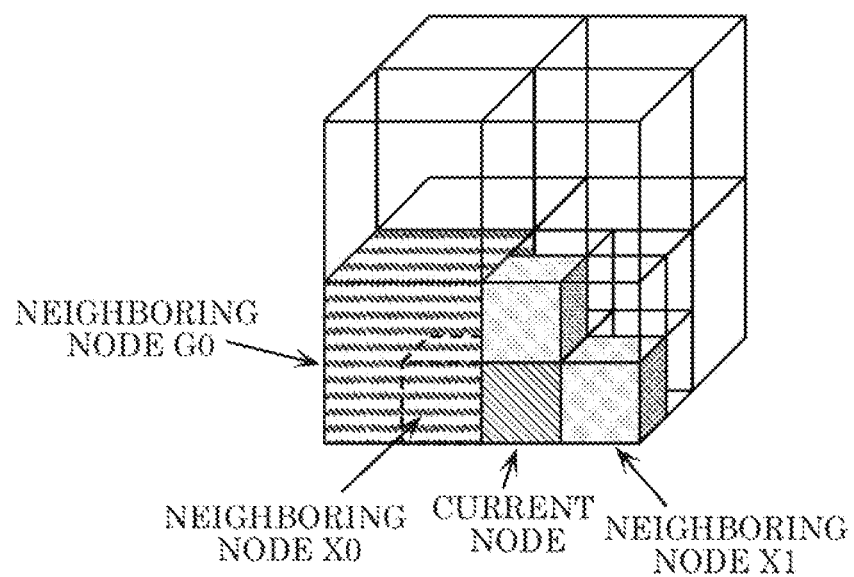
FIG. 91 is a diagram illustrating an example of a current node and neighboring nodes according to Variation 2 of Embodiment 10.

FIG. 91 is a diagram indicating an example of a current node and a reference neighboring node. As illustrated in FIG. 91, when the neighboring node is unreferrable (prohibited from being referred to), it is possible to calculate occupancy information of the neighboring node with reference to an occupancy code of a grandparent node of the current node. For example, the three-dimensional data encoding device may calculate FlagX0 using occupancy information of neighboring node G0 instead of neighboring node X0 illustrated in FIG. 91, and determine a value in an encoding table using calculated FlagX0. It is to be noted that neighboring node G0 illustrated in FIG. 91 is a neighboring node occupancy or unoccupancy of which can be determined using the occupancy code of the grandparent node. Neighboring node X1 is a neighboring node occupancy or unoccupancy of which can be determined using the occupancy code of the parent node.

Figure 92:
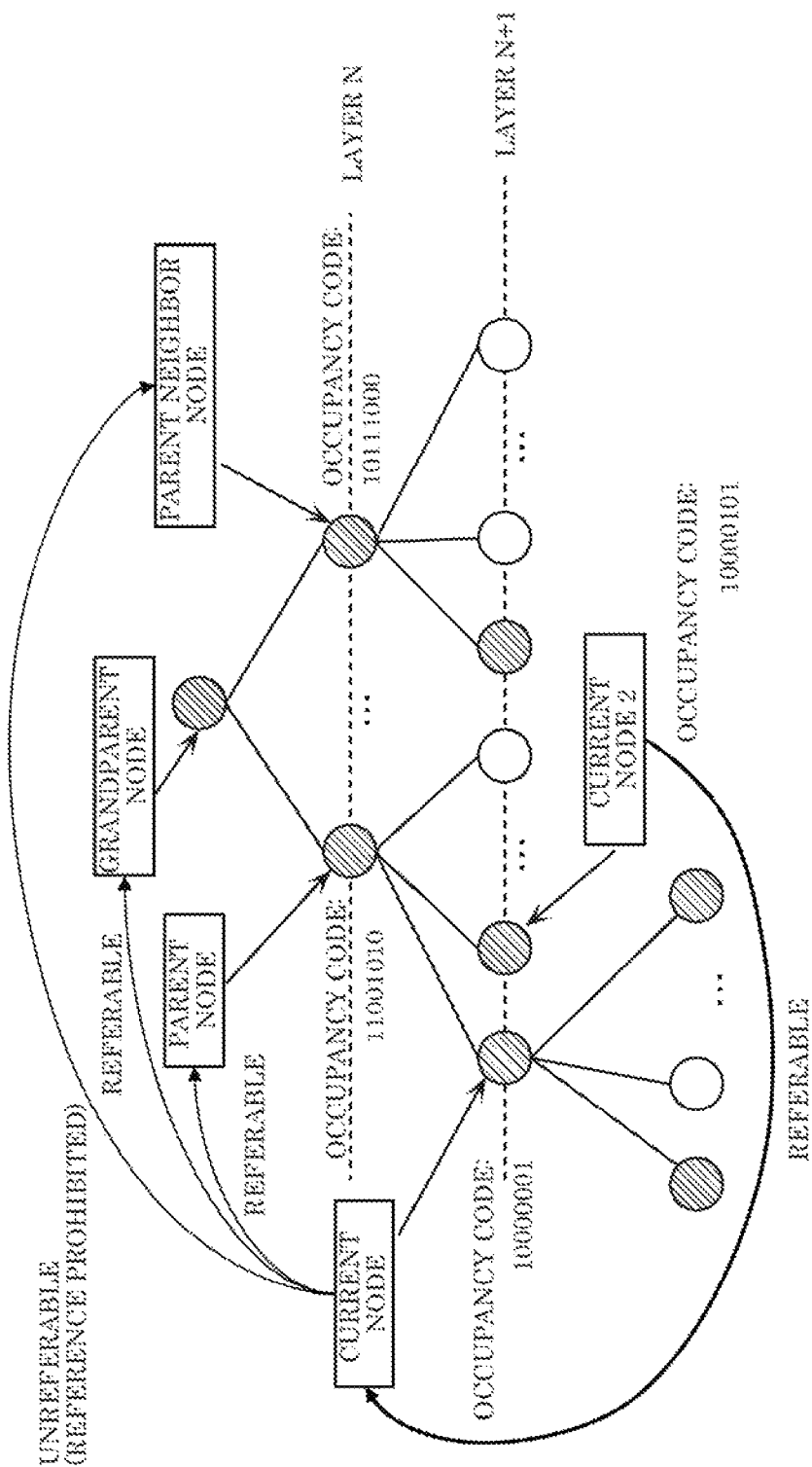
FIG. 92 is a diagram illustrating a reference relationship in an octree structure according to Variation 3 of Embodiment 10.
Figure 93:
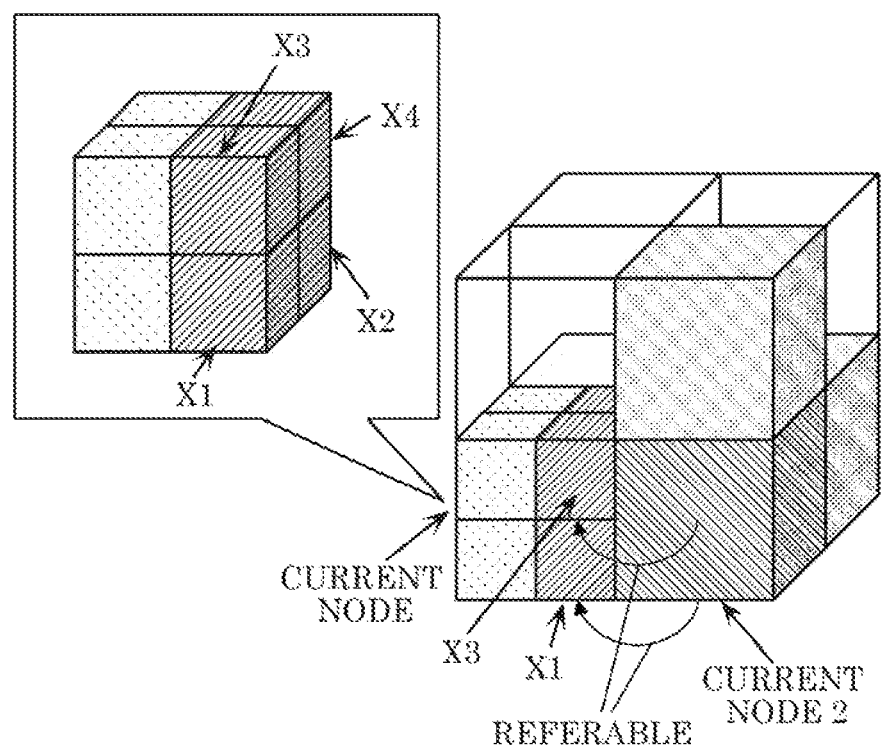
FIG. 93 is a diagram illustrating a reference relationship in a spatial region according to Variation 3 of Embodiment 10.

Hereinafter, Variation 3 of the embodiment is described. FIGS. 92 and 93 are diagrams illustrating reference relationships in this variation. FIG. 92 is a diagram illustrating the reference relationships in an octree, and FIG. 93 is a diagram illustrating the reference relationships in a spatial region.

In this variation, when the three-dimensional data encoding device encodes encoding information of a current node to be encoded (hereinafter referred to as current node 2), the three-dimensional data encoding device refers to encoding information of each node in a parent node to which current node 2 belongs. In other words, the three-dimensional data encoding device allows reference to information (for example, occupancy information) of a child node of a first node whose parent node is identical to the parent node of the current node among a plurality of neighboring nodes. For example, when the three-dimensional data encoding device encodes an occupancy code of current node 2 illustrated in FIG. 92, the three-dimensional data encoding device refers to an occupancy code of a node present in the parent node to which current node 2 belongs. The node is, for example, the current node illustrated in FIG. 92. The occupancy code of the current node illustrated in FIG. 92 represents, for example, whether each node in the current node neighboring current node 2 is occupied, as illustrated in FIG. 93. Thus, the three-dimensional data encoding device is capable of selecting an encoding table for the occupancy code of current node 2 in accordance with a more particular shape of the current node, and thus is capable of increasing the encoding efficiency.

The three-dimensional data encoding device may calculate an encoding table used when entropy encoding the occupancy code of current node 2, according to the expression below for instance.

CodingTable=(Flag$X1 \ll 5$)+(Flag$X2 \ll 4$)+
(Flag$X3 \ll 3$)+(Flag$X4 \ll 2$)+(Flag$Y \ll 1$)+(FlagZ)

Here, CodingTable indicates the encoding table for the occupancy code of current node 2, and has a value ranging from 0 to 63. FlagXN is occupancy information of neighboring node XN (N=1 . . . 4). FlagXN indicates 1 in the case where neighboring node XN includes a point cloud (is occupied), and indicates 0 in the opposite case. FlagY is occupancy information of neighboring node Y. FlagY indicates 1 in the case where neighboring node Y includes a point cloud (is occupied), and indicates 0 in the opposite case. FlagZ is occupancy information of neighboring node Z. FlagZ indicates 1 in the case where neighboring node Z includes a point cloud (is occupied), and indicates 0 in the opposite case.

It should be noted that the three-dimensional data encoding device may change a method of calculating a coding table, according to a node position of current node 2 in the parent node.

When reference to a parent neighbor node is not prohibited, the three-dimensional data encoding device may refer to encoding information of each node in the parent neighbor node. For example, when the reference to the parent neighbor node is not prohibited, reference to information (e.g., occupancy information) of a child node of a third node having a different parent node from that of a current node. In the example illustrated in FIG. 91, for example, the three-dimensional data encoding device obtains occupancy information of a child node of neighboring node X0 by reference to an occupancy code of neighboring node X0 having a different parent node from that of the current node. The three-dimensional data encoding device selects a coding table to be used for entropy encoding of an occupancy code of the current node, based on the obtained occupancy information of the child node of neighboring node X0.

As stated above, the three-dimensional data encoding device according to the present embodiment encodes information (e.g., an occupancy code) of a current node included in an N-ary tree structure of three-dimensional points included in three-dimensional data, where N is an integer greater than or equal to 2. As illustrated in FIG. 85 and FIG. 86, in the encoding, the three-dimensional data encoding device permits reference to information (e.g., occupancy information) of a first node included in neighboring nodes spatially neighboring the current node, and prohibits reference to information of a second node included in the neighboring nodes, the first node having a same parent node as the current node, the second node having a different parent node from the parent node of the current node. To put it another way, in the encoding, the three-dimensional data encoding device permits reference to information (e.g., an occupancy code) of the parent node, and prohibits reference to information (e.g., an occupancy code) of another node (a parent neighbor node) in the same layer as the parent node.

With this, the three-dimensional data encoding device can improve coding efficiency by reference to the information of the first node included in the neighboring nodes spatially neighboring the current node, the first node having the same parent node as the current node. Besides, the three-dimensional data encoding device can reduce a processing amount by not reference to the information of the second node included in the neighboring nodes, the second node having a different parent node from the parent node of the current node. In this manner, the three-dimensional data encoding device can not only improve the coding efficiency but also reduce the processing amount.

For example, the three-dimensional data encoding device further determines whether to prohibit the reference to the information of the second node. In the encoding, the three-dimensional data encoding device selects whether to prohibit or permit the reference to the information of the second node, based on a result of the determining. Moreover, the three-dimensional data encoding device generates a bit stream including prohibition switch information (e.g., limit_refer_flag shown in FIG. 89) that indicates the result of the determining and indicates whether to prohibit the reference to the information of the second node.

With this, the three-dimensional data encoding device can select whether to prohibit the reference to the information of the second node. In addition, a three-dimensional data decoding device can appropriately perform a decoding process using the prohibition switch information.

For example, the information of the current node is information (e.g., an occupancy code) that indicates whether a three-dimensional point is present in each of child nodes belonging to the current node. The information of the first node is information (the occupancy information of the first node) that indicates whether a three-dimensional point is present in the first node. The information of the second node is information (the occupancy information of the second node) that indicates whether a three-dimensional point is present in the second node.

For example, in the encoding, the three-dimensional data encoding device selects a coding table based on whether the three-dimensional point is present in the first node, and entropy encodes the information (e.g., the occupancy code) of the current node using the coding table selected.

For example, as illustrated in FIG. 92 and FIG. 93, in the encoding, the three-dimensional data encoding device permits reference to information (e.g., occupancy information) of a child node of the first node, the child node being included in the neighboring nodes.

With this, since the three-dimensional data encoding device enables reference to more detailed information of a neighboring node, the three-dimensional data encoding device can improve the coding efficiency.

For example, in the encoding, the three-dimensional data encoding device selects a neighboring node to be referred to from the neighboring nodes according to a spatial position of the current node in the parent node.

With this, the three-dimensional data encoding device can refer to an appropriate neighboring node according to the spatial position of the current node in the parent node.

For example, the three-dimensional data encoding device includes a processor and memory, and the processor performs the above process using the memory.

The three-dimensional data decoding device according to the present embodiment decodes information (e.g., an occupancy code) of a current node included in an N-ary tree structure of three-dimensional points included in three-dimensional data, where N is an integer greater than or equal to 2. As illustrated in FIG. 85 and FIG. 86, in the decoding, the three-dimensional data decoding device permits reference to information (e.g., occupancy information) of a first node included in neighboring nodes spatially neighboring the current node, and prohibits reference to information of a second node included in the neighboring nodes, the first node having a same parent node as the current node, the second node having a different parent node from the parent node of the current node. To put it another way, in the decoding, the three-dimensional data decoding device permits reference to information (e.g., an occupancy code) of the parent node, and prohibits reference to information (e.g., an occupancy code) of another node (a parent neighbor node) in the same layer as the parent node.

With this, the three-dimensional data decoding device can improve coding efficiency by reference to the information of the first node included in the neighboring nodes spatially neighboring the current node, the first node having the same parent node as the current node. Besides, the three-dimensional data decoding device can reduce a processing amount by not reference to the information of the second node included in the neighboring nodes, the second node having a different parent node from the parent node of the current node. In this manner, the three-dimensional data decoding device can not only improve the coding efficiency but also reduce the processing amount.

For example, the three-dimensional data decoding device further obtains, from a bitstream, prohibition switch information (e.g., limit_refer_flag shown in FIG. 89) indicating whether to prohibit the reference to the information of the second node. In the decoding, the three-dimensional data decoding device selects whether to prohibit or permit the reference to the information of the second node, based on the prohibition switch information.

With this, the three-dimensional data decoding device can appropriately perform a decoding process using the prohibition switch information.

For example, the information of the current node is information (e.g., an occupancy code) that indicates whether a three-dimensional point is present in each of child nodes belonging to the current node. The information of the first node is information (the occupancy information of the first node) that indicates whether a three-dimensional point is present in the first node. The information of the second node is information (the occupancy information of the second node) that indicates whether a three-dimensional point is present in the second node.

For example, in the decoding, the three-dimensional data encoding device selects a coding table based on whether the three-dimensional point is present in the first node, and entropy decodes the information (e.g., the occupancy code) of the current node using the coding table selected.

For example, as illustrated in FIG. 92 and FIG. 93, in the decoding, the three-dimensional data decoding device permits reference to information (e.g., occupancy information) of a child node of the first node, the child node being included in the neighboring nodes.

With this, since the three-dimensional data decoding device enables reference to more detailed information of a neighboring node, the three-dimensional data decoding device can improve the coding efficiency.

For example, in the decoding, the three-dimensional data decoding device selects a neighboring node to be referred to from the neighboring nodes according to a spatial position of the current node in the parent node.

With this, the three-dimensional data decoding device can refer to an appropriate neighboring node according to the spatial position of the current node in the parent node.

For example, the three-dimensional data decoding device includes a processor and memory, and the processor performs the above process using the memory.

Embodiment 11

In the present embodiment, a three-dimensional data encoding device separates an inputted three-dimensional point cloud into two or more three-dimensional point sub-clouds, and encodes each of the three-dimensional point sub-clouds so that the three-dimensional point sub-clouds have no dependency relationship with each other. Accordingly the three-dimensional data encoding device can encode the three-dimensional point sub-clouds in parallel. For example, the three-dimensional data encoding device separates an inputted three-dimensional point cloud into three-dimensional point sub-cloud A and three-dimensional point sub-cloud B, and encodes three-dimensional point sub-cloud A and three-dimensional point sub-cloud B in parallel.

It should be noted that when, for example, the three-dimensional data encoding device performs encoding using an octree structure, the three-dimensional data encoding device encodes, in parallel, eight child nodes resulting from octree division performed as a method of separation. For example, the three-dimensional data encoding device encodes, in parallel, tree structures each having a corresponding one of child nodes as a root.

It should be noted that the three-dimensional data encoding device need not always encode three-dimensional point sub-clouds in parallel, and may encode three-dimensional point sub-clouds sequentially so that the three-dimensional point sub-clouds have no dependency relationship with each other. Moreover, the method of the present embodiment may be applied not only to an octree but also to an N-ary tree such as a quadtree or a hexadecatree, where N is an integer greater than or equal to 2. In addition, the three-dimensional data encoding device may perform division using attribute information such as a color, degree of reflection, or normal vector of a point cloud. Additionally, as described using FIG. 67, FIG. 68, etc. in Embodiment 9, the three-dimensional data encoding device may perform division based on a difference in density of point clouds.

The three-dimensional data encoding device may also combine encoded data of encoded three-dimensional point sub-clouds with a bitstream. At this time, the three-dimensional data encoding device may include, in the header etc. of the bitstream, the start position of each encoded data of a corresponding one of the encoded three-dimensional point sub-clouds. For example, the three-dimensional data encoding device may include, in the header etc., addresses (bit positions or byte counts etc.) from the head of the bitstream. As a result, a three-dimensional data decoding device can identify the start position of each encoded data of the corresponding one of the three-dimensional point sub-clouds by decoding the head of the bitstream. Additionally, since the three-dimensional data decoding device can decode the encoded data of the three-dimensional point sub-clouds in parallel, the three-dimensional data decoding device can reduce the processing time.

It should be noted that the three-dimensional data encoding device may append, to the header of a bitstream, a flag indicating that three-dimensional point sub-clouds have been encoded so that the three-dimensional point sub-clouds have no dependency relationship with each other or that three-dimensional point sub-clouds have been encoded in parallel. In consequence, the three-dimensional data decoding device can determine whether encoded data of the three-dimensional point clouds are decodable in parallel, by decoding the header.

Here, that three-dimensional point sub-clouds have no dependency relationship with each other means, for example, that coding tables (probability tables etc. to be used for entropy encoding) for encoding occupancy codes or leaf information etc. of three-dimensional point sub-clouds are held independently of the three-dimensional point sub-clouds. For example, the three-dimensional data encoding device uses a different coding table for each of three-dimensional point sub-cloud A and three-dimensional point sub-cloud B so that three-dimensional point sub-cloud A and three-dimensional point sub-cloud B have no dependency relationship with each other. Alternatively, when the three-dimensional data encoding device processes three-dimensional point sub-cloud A and three-dimensional point sub-cloud B sequentially, the three-dimensional data encoding device initializes coding tables after encoding three-dimensional point sub-cloud A and before encoding three-dimensional point sub-cloud B so that three-dimensional point sub-cloud A and three-dimensional point sub-cloud B have no dependency relationship with each other. As stated above, by holding the coding tables for the three-dimensional point sub-clouds independently of each other or initializing the coding tables before encoding, the three-dimensional data encoding device can encode the three-dimensional point sub-clouds so that the three-dimensional point sub-clouds have no dependency relationship with each other. In addition, by holding coding tables (decoding tables) for three-dimensional point sub-clouds independently of each other or initializing the coding tables before decoding the three-dimensional point sub-clouds, the three-dimensional data decoding device can decode the three-dimensional point sub-clouds appropriately in a similar manner.

Moreover, that three-dimensional point sub-clouds have no dependency relationship with each other means, for example, that reference between three-dimensional point sub-clouds is prohibited when occupancy codes or leaf information etc. of nodes of the three-dimensional point sub-clouds are encoded. For example, when the three-dimensional data encoding device encodes an occupancy code of a current node to be encoded, the three-dimensional data encoding device performs encoding using information of a neighboring node in an octree. In this case, when the neighboring node is included in another three-dimensional point sub-cloud, the three-dimensional data encoding device encodes the current node without referring to the neighboring node. Specifically, the three-dimensional data encoding device may perform encoding assuming that the neighboring node is not present, or the three-dimensional data encoding device may encode the current node under the condition that although the neighboring node is present, the neighboring node is included in the other three-dimensional point sub-cloud.

Likewise, for example, when the three-dimensional data decoding device decodes occupancy codes or leaf information etc. of nodes of three-dimensional point sub-clouds, the three-dimensional data decoding device prohibits reference between the three-dimensional point sub-clouds. For example, when the three-dimensional data decoding device decodes an occupancy code of a current node to be decoded, the three-dimensional data decoding device performs decoding using information of a neighboring node in an octree. In this case, when the neighboring node is included in another three-dimensional point sub-cloud, the three-dimensional data decoding device decodes the current node without referring to the neighboring node. Specifically the three-dimensional data decoding device may perform decoding assuming that the neighboring node is not present, or the three-dimensional data decoding device may decode the current node under the condition that although the neighboring node is present, the neighboring node is included in the other three-dimensional point sub-cloud.

Furthermore, when the three-dimensional data encoding device encodes pieces of three-dimensional position information and pieces of attribute information (e.g., a color, a degree of reflection, or a normal vector) of three-dimensional point sub-clouds, the three-dimensional data encoding device may encode one of the pieces of three-dimensional position information and the pieces of attribute information so that the one of the pieces of three-dimensional position information and the pieces of attribute information have no dependency relationship with each other, and may encode the other of the pieces of three-dimensional position information and the pieces of attribute information so that the other of the pieces of three-dimensional position information and the pieces of attribute information have a dependency relationship with each other. For example, the three-dimensional data encoding device may encode pieces of three-dimensional position information so that the pieces of three-dimensional position information have no dependency relationship with each other, and may encode pieces of attribute information so that the pieces of attribute information have a dependency relationship with each other. Accordingly, the three-dimensional data encoding device reduces the processing time by encoding the pieces of three-dimensional position information in parallel, and reduces the code amount by encoding the pieces of attribute information sequentially. It should be noted that the three-dimensional data encoding device may append, to a header, both information indicating whether the pieces of three-dimensional position information have been encoded so that the pieces of three-dimensional position information have no dependency relationship with each other, and information indicating whether the pieces of attribute information have been encoded so that the pieces of attribute information have no dependency relationship with each other. As a result, by decoding the header, the three-dimensional data decoding device can determine whether the pieces of three-dimensional position information are decodable so that the pieces of three-dimensional position information have no dependency relationship with each other and whether the pieces of attribute information are decodable so that the pieces of attribute information have no dependency relationship with each other. For this reason, when there is no dependency relationship, the three-dimensional data decoding device can perform parallel decoding. For example, when pieces of three-dimensional position information are encoded so that the pieces of three-dimensional position information have no dependency relationship with each other, and pieces of attribute information are encoded so that the pieces of attribute information have a dependency relationship with each other, the three-dimensional data decoding device reduces the processing time by decoding the pieces of three-dimensional position information in parallel, and decodes the pieces of attribute information sequentially.

Figure 94:
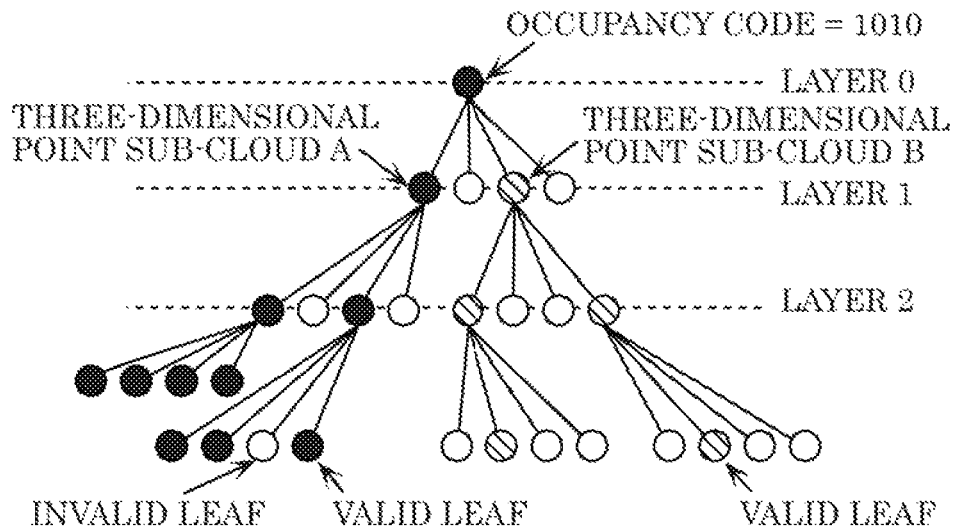
FIG. 94 is a diagram illustrating an example of a tree structure according to Embodiment 11.
Figure 95:
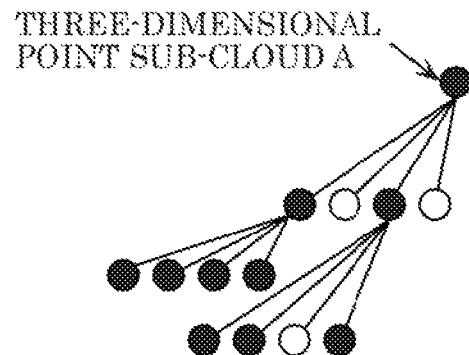
FIG. 95 is a diagram illustrating an example of a three-dimensional point sub-cloud according to Embodiment 11.
Figure 96:
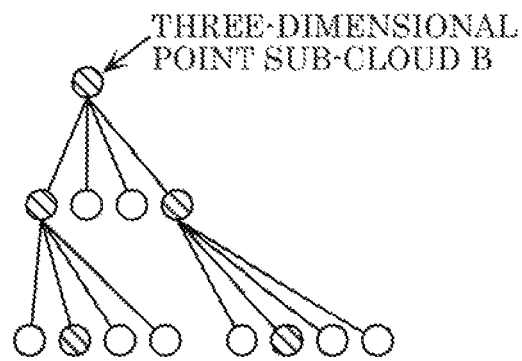
FIG. 96 is a diagram illustrating an example of a three-dimensional point sub-cloud according to Embodiment 11.

FIG. 94 is a diagram illustrating an example of a tree structure. It should be noted that although FIG. 94 shows an example of a quadtree, other tree structures such as an octree may be used. The three-dimensional data encoding device divides the tree structure shown in FIG. 94 into, for example, three-dimensional point sub-cloud A shown in FIG. 95 and three-dimensional point sub-cloud B shown in FIG. 96. It should be noted that in this example, division is performed at valid nodes in layer 1. In other words, at most four three-dimensional point sub-clouds are generated for the quadtree, and at most eight three-dimensional point sub-clouds are generated for the octree. The three-dimensional data encoding device may also perform division using attribute information or information such as point cloud density.

The three-dimensional data encoding device performs encoding so that three-dimensional point sub-cloud A and three-dimensional point sub-cloud B have no dependency relationship with each other. For example, the three-dimensional data encoding device selects, for each three-dimensional point sub-cloud, a coding table to be used for entropy encoding an occupancy code. Alternatively, the three-dimensional data encoding device initializes coding tables before encoding each of three-dimensional point sub-clouds. Alternatively, when a neighboring node is included in a different three-dimensional point sub-cloud, the three-dimensional data encoding device prohibits reference to the neighboring node at the time of calculating neighboring information of a node.

Figure 97:
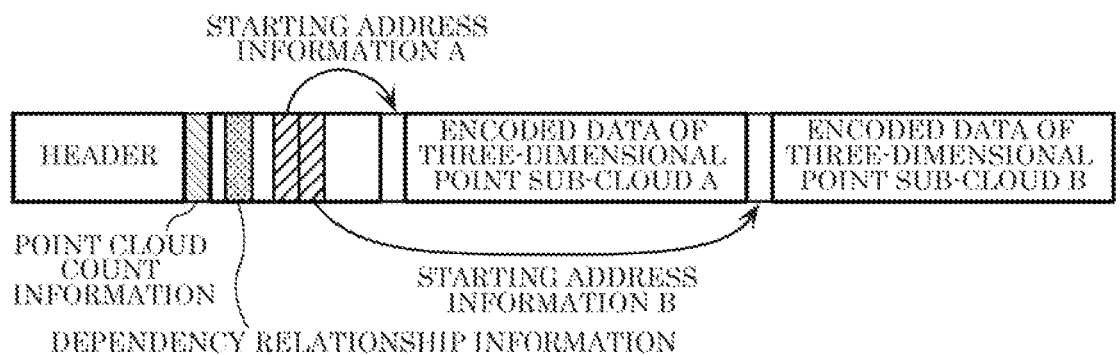
FIG. 97 is a diagram illustrating a structural example of a bitstream according to Embodiment 11.

FIG. 97 is a diagram illustrating a structural example of a bitstream according to the present embodiment. As illustrated in FIG. 97, the bitstream includes a header, encoded data of three-dimensional point sub-cloud A. and encoded data of three-dimensional point sub-cloud B. The header includes point cloud count information, dependency relationship information, starting address information A. and starting address information B.

The point cloud count information indicates the number of three-dimensional point sub-clouds included in the bitstream. It should be noted that an occupancy code may indicate, as point cloud count information, the number of three-dimensional point sub-clouds. For example, in the example shown in FIG. 94, the occupancy code "1010" in layer 0 is used, and the number of "1" included in the occupancy code indicates the number of three-dimensional point sub-clouds.

The dependency relationship information indicates whether the three-dimensional point sub-clouds have been encoded so that the three-dimensional point sub-clouds have no dependency relationship with each other. For example, the three-dimensional data decoding device determines whether to decode the three-dimensional point sub-clouds in parallel, based on the dependency relationship information.

Starting address information A indicates the starting address of the encoded data of three-dimensional point sub-cloud A. Starting address information B indicates the starting address of the encoded data of three-dimensional point sub-cloud B.

Hereinafter, the effect of parallel encoding will be described. It is possible to reduce a processing time by dividing geometry information (three-dimensional position information) or attribute information in octree data of a three-dimensional point cloud (a point cloud) and performing parallel encoding. It is possible to achieve parallel encoding when a node is independent of other nodes in a layer of a parent node. In other words, there is a need not to refer to a neighboring parent node. There is a need to satisfy this condition for all of child nodes and grandchild nodes.

Figure 98:
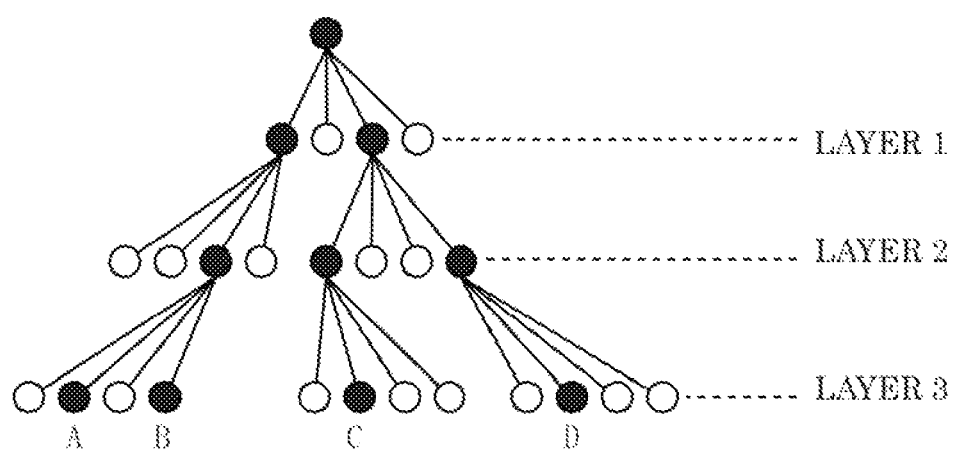
FIG. 98 is a diagram illustrating an example of a tree structure according to Embodiment 11.

FIG. 98 is a diagram illustrating an example of a tree structure. In the example shown in FIG. 98, when depth-first encoding is performed, node A is independent of node C in layer 1. Node C is independent of node D in layer 2. Node A is independent of node B in layer 3.

The three-dimensional data encoding device selects a parallel encoding method from two types of parallel encoding methods, using independent information of each node, based on a type of hardware, user settings, algorithm, or data adaptability, etc.

The two types are full parallel encoding and incremental parallel encoding.

To begin with, full parallel encoding will be described. In parallel processing or parallel programming, since it is necessary to process lots of data simultaneously, processing is very slow.

The number of nodes processable in parallel is determined using the number of processing units (PUs) included in a graphics processing unit (GPU), the number of cores included in a CPU, or the number of threads in software implementation.

Here, the number of nodes included in an octree is generally greater than the number of available PUs. The three-dimensional data encoding device determines whether the number of nodes included in a layer is an optimal number corresponding to the number of available PUs, using information indicating the number of encoded nodes included in the layer; and starts full parallel encoding immediately when the number of the nodes included in the layer reaches the optimal number. It should be noted that a breadth-first or depth-first process can be used in parallel processing.

The three-dimensional data encoding device may store, in the header of a bitstream, information indicating nodes (a layer) for which a parallel encoding process has been started. As a result, the three-dimensional data decoding device can perform a parallel decoding process if necessary, using the information. It should be noted that information indicating nodes for which a parallel encoding process has been started may be in any format, and location encoding may be used, for example.

Moreover, the three-dimensional data encoding device prepares a coding table (a probability table) for each of nodes (three-dimensional point sub-clouds) on which parallel encoding is to be performed. This coding table is initialized to an initial value or a value different for each node. For example, a value different for each node is a value based on an occupancy code of a parent node. Full parallel encoding has the advantage of only having to initialize the GPU once.

Figure 99:
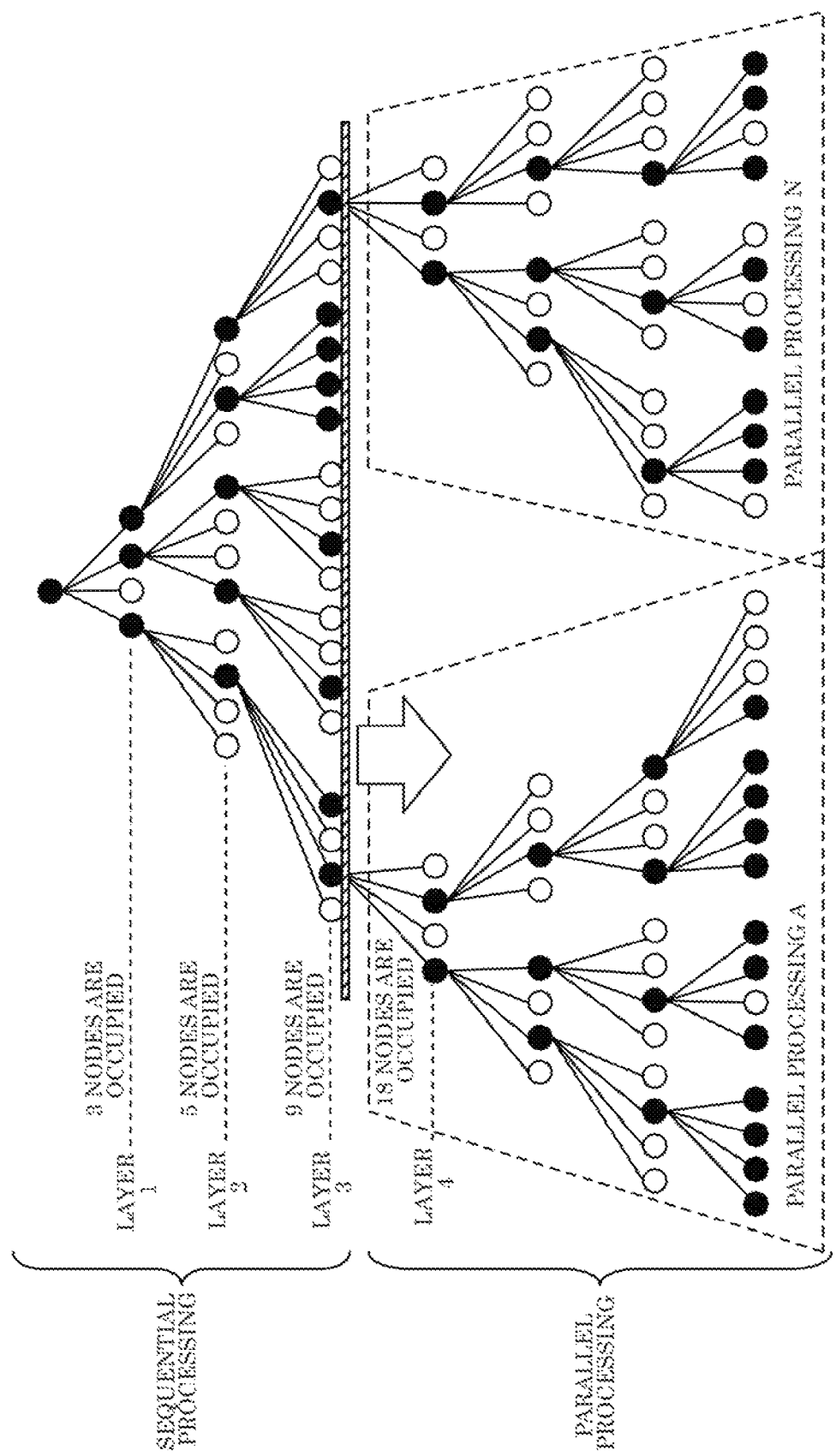
FIG. 99 is a diagram for illustrating full parallel encoding according to Embodiment 11 and shows an example of a tree structure.
Figure 100:
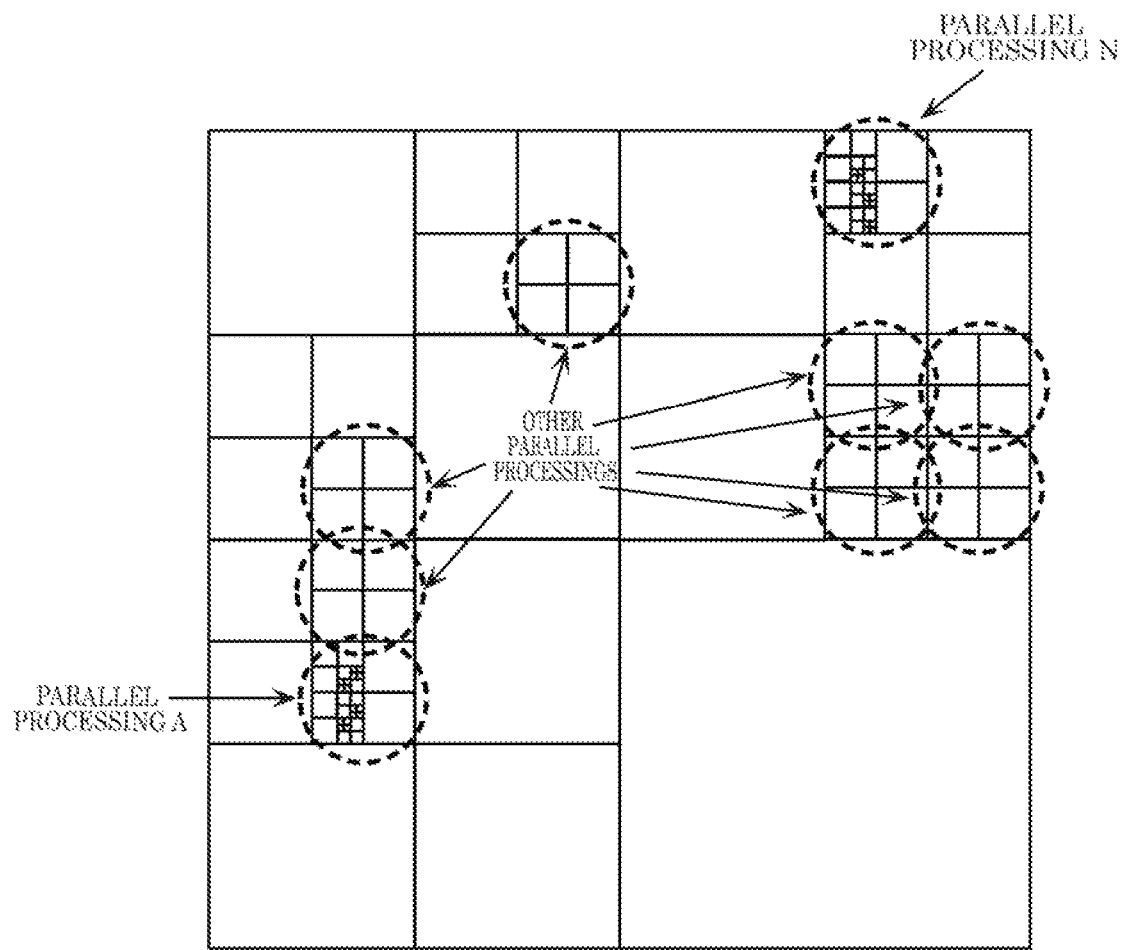
FIG. 100 is a diagram spatially illustrating three-dimensional point sub-clouds to be processed in parallel according to Embodiment 11.

FIG. 99 is a diagram for illustrating full parallel encoding and shows an example of a tree structure. FIG. 100 is a diagram spatially illustrating three-dimensional point sub-clouds to be processed in parallel. The three-dimensional data encoding device starts parallel processing immediately when the number of nodes correlated with the number of PUs or threads reaches an optimal number.

In the example shown in FIG. 99, in layer 3, the number of occupied nodes included in the layer is 9 and exceeds an optimal number. Accordingly, the three-dimensional data encoding device divides three-dimensional points (nodes) in layers below layer 3 into three-dimensional point sub-clouds each having a corresponding one of the occupied nodes in layer 3 as a root, and processes the three-dimensional point sub-clouds in parallel. For example, nine three-dimensional point sub-clouds are generated in the example shown in FIG. 99.

The three-dimensional data encoding device may encode layer information indicating a layer in which parallel processing has been started. The three-dimensional data encoding device may also encode information indicating the number of occupied nodes (9 in the example shown in FIG. 99) when parallel processing is started.

Moreover, for example, the three-dimensional data encoding device may perform encoding while prohibiting three-dimensional point sub-clouds from referring to each other. Furthermore, for example, the three-dimensional data encoding device initializes coding tables (probability tables etc.) to be used for entropy encoding before the three-dimensional data encoding device encodes three-dimensional point sub-clouds.

Figure 101:
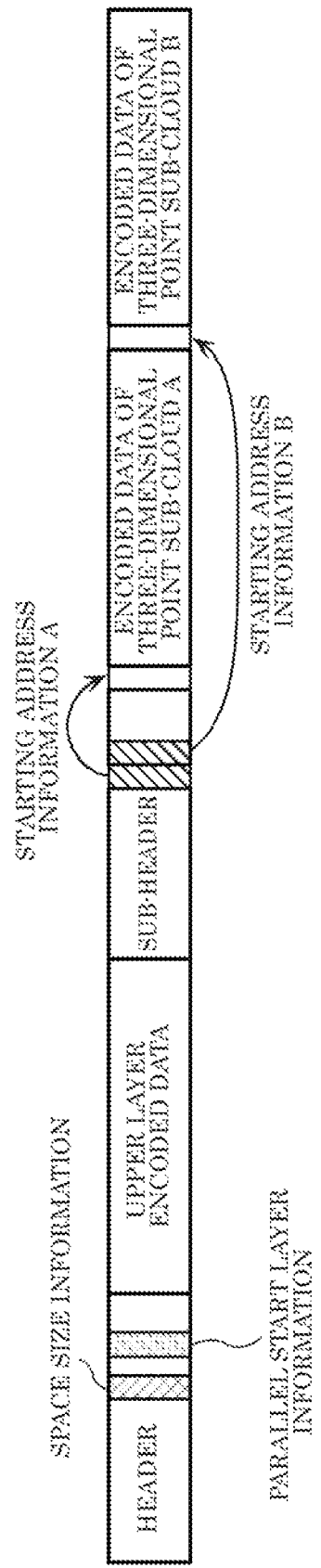
FIG. 101 is a diagram illustrating a structural example of a bitstream according to Embodiment 11.

FIG. 101 is a diagram illustrating a structural example of a bitstream according to the present embodiment. As illustrated in FIG. 101, the bitstream includes a header, upper layer encoded data, a sub-header, encoded data of three-dimensional point sub-cloud A, and encoded data of three-dimensional point sub-cloud B.

The header includes space size information and parallel start layer information. The space size information indicates the first three-dimensional space obtained by dividing a three-dimensional point cloud into an octree. For example, the space size information indicates the maximum coordinates (x, y, z) of the first three-dimensional space.

The parallel start layer information indicates a parallel start layer that is a layer in which parallel processing can be started. Here, the parallel start layer information indicates, for example, layer N.

The upper layer encoded data is encoded data up to layer N before parallel processing is started, and is node information up to layer N. For example, the upper layer encoded data includes occupancy codes of nodes up to layer N.

The sub-header includes information required to decode any layer following layer N. For example, the sub-header indicates the starting address etc. of encoded data of each three-dimensional point sub-cloud. In the example shown in FIG. 101, the sub-header includes starting address information A and starting address information B. Starting address information A indicates the starting address of the encoded data of three-dimensional point sub-cloud A. Starting address information B indicates the starting address of the encoded data of three-dimensional point sub-cloud B.

It should be noted that the three-dimensional data encoding device may store starting address information A and starting address information B into the header. As a result, the three-dimensional data decoding device can decode the encoded data of the three-dimensional point sub-clouds in parallel before the upper layer encoded data. In this case, the sub-header may include information indicating a space of each three-dimensional point sub-cloud. This information indicates the maximum coordinates (x, y, z) of the space of the three-dimensional point sub-cloud.

Figure 102:
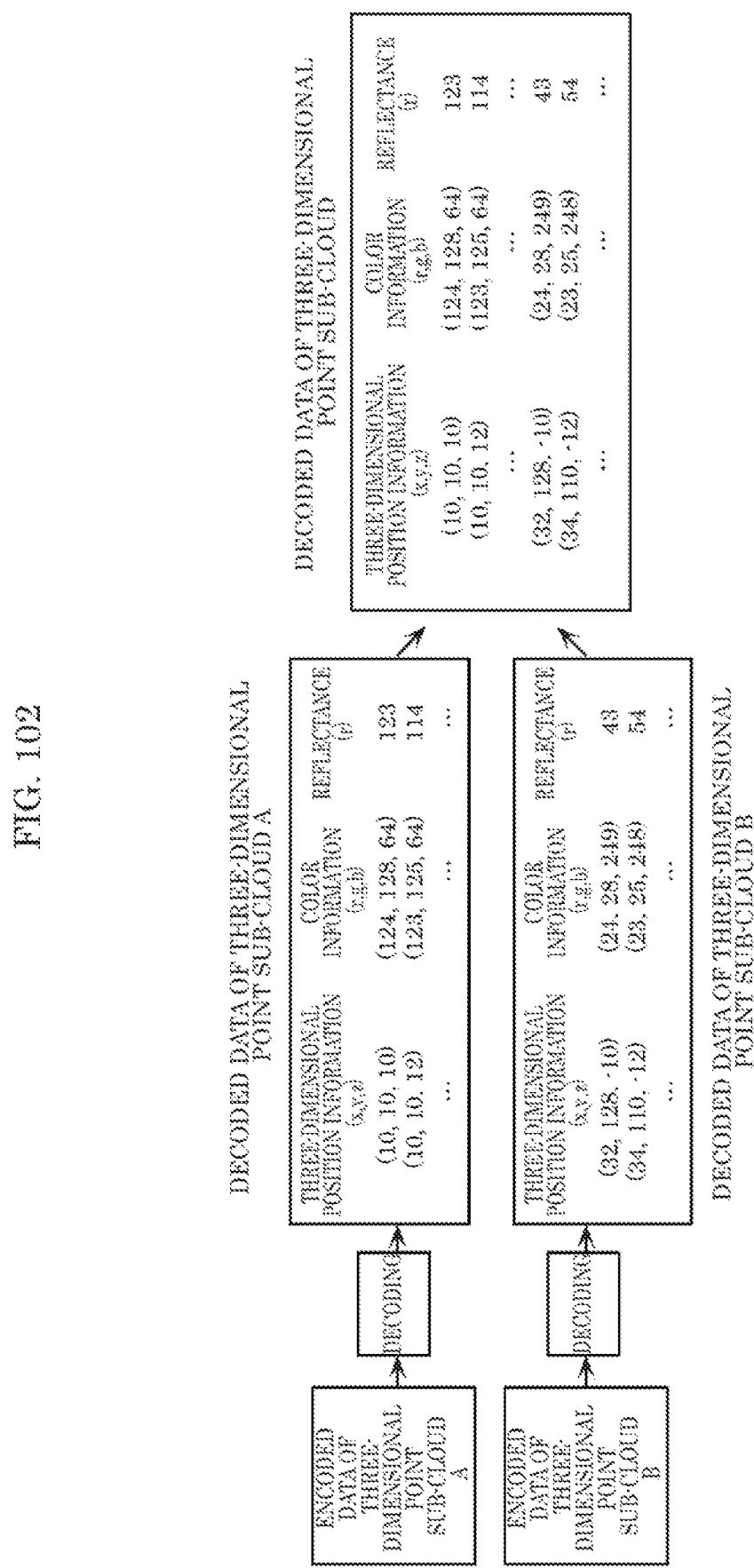
FIG. 102 is a diagram for illustrating a parallel decoding process according to Embodiment 11.

FIG. 102 is a diagram for illustrating a parallel decoding process. As illustrated in FIG. 102, the three-dimensional data decoding device decodes encoded data of three-dimensional point sub-cloud A and encoded data of three-dimensional point sub-cloud B in parallel, and generates decoded data of three-dimensional point sub-cloud A and decoded data of three-dimensional point sub-cloud B. Next, the three-dimensional data decoding device integrates the generated decoded data of three-dimensional point sub-cloud A and the generated decoded data of three-dimensional point sub-cloud B, and generates decoded data of a three-dimensional point cloud. In this manner, the three-dimensional data decoding device integrates pieces of three-dimensional position information and attribute information (color information, a degree of reflection, etc.) included in decoded data of three-dimensional point sub-clouds. In addition, the three-dimensional data decoding device may output integrated data as one file.

It should be noted that the three-dimensional data decoding device need not always decode all three-dimensional point sub-clouds, and may decode necessary three-dimensional point sub-clouds selectively. For example, when the three-dimensional data decoding device is a mobile device such as an in-vehicle device, the three-dimensional data decoding device may decode, among three-dimensional point sub-clouds, three-dimensional point sub-clouds in an area close to the current position obtained by a GPS etc.

Moreover, the three-dimensional data encoding device may store, into a sub-header, information indicating the priority order of three-dimensional point sub-clouds. In this case, the three-dimensional data decoding device performs parallel decoding while preferentially giving computing resources such as a CPU to three-dimensional point sub-clouds having a higher priority, according to the priority order indicated by the information included in the sub-header. Accordingly the three-dimensional data decoding device can efficiently decode three-dimensional point sub-clouds including an area important for the three-dimensional data decoding device.

Figure 103:
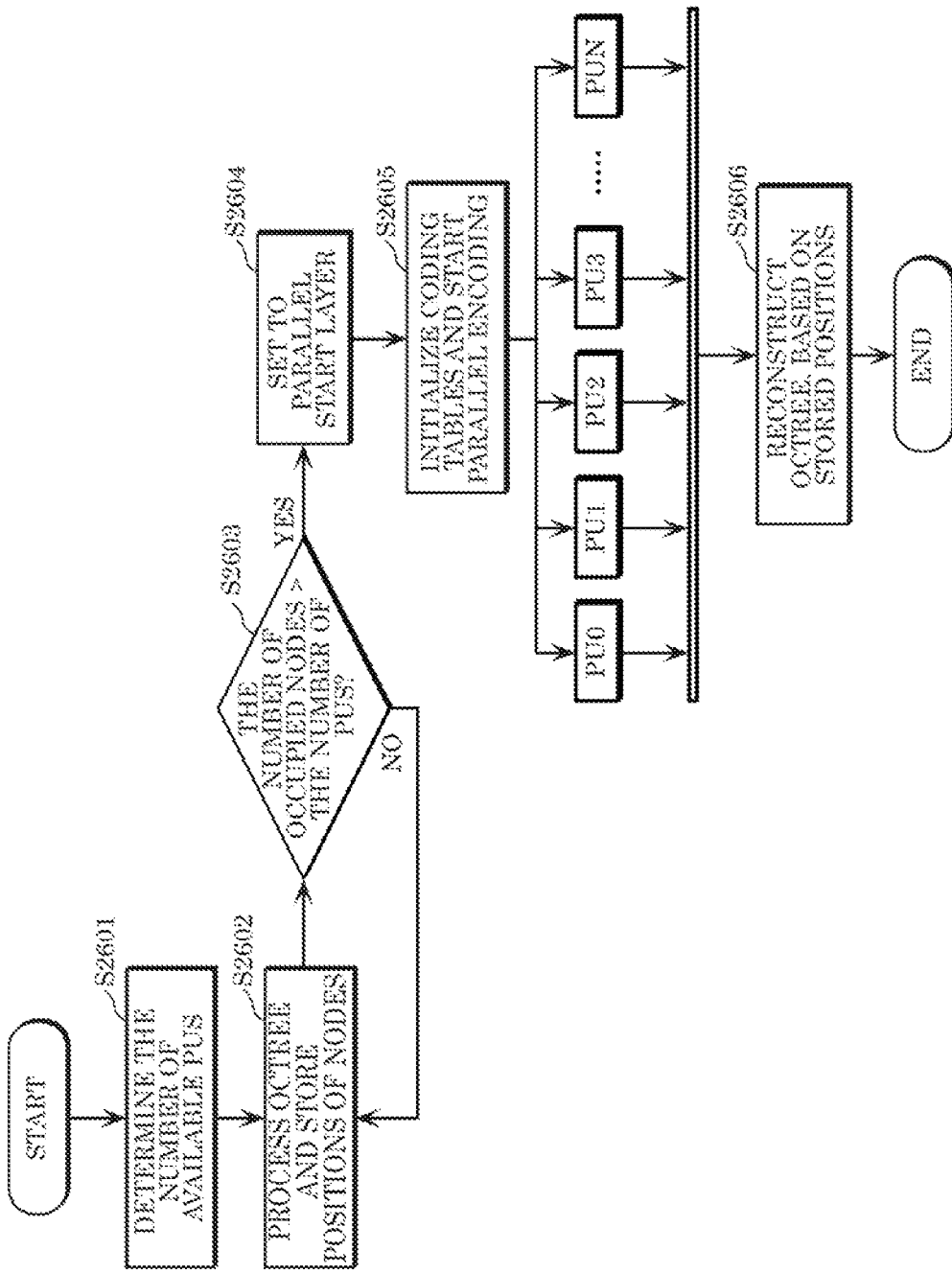
FIG. 103 is a diagram schematically illustrating a procedure of a full parallel encoding process according to Embodiment 11.

FIG. 103 is a diagram schematically illustrating a procedure of a full parallel encoding process. First, the three-dimensional data encoding device determines the number of available PUs (S2601). Next, the three-dimensional data encoding device processes an octree and stores positions of nodes (S2602). Then, the three-dimensional data encoding device determines whether the number of occupied nodes is greater than the number of PUs (S2603).

When the number of the occupied nodes is less than the number of the PUs (NO in S2603), the three-dimensional data encoding device performs step S2602 on the next node. When the number of the occupied nodes is greater than the number of the PUs (YES in S2603), the three-dimensional data encoding device sets a current layer to a parallel start layer that is a layer in which parallel processing is to be started (S2604).

After that, the three-dimensional data encoding device initializes coding tables and starts parallel encoding (S2605). After the completion of parallel encoding, the three-dimensional data encoding device reconstructs an octree, based on the positions stored in step S2602 (S2606).

It should be noted that the three-dimensional data encoding device may append, to the header of the bitstream, parallel start layer information indicating a parallel start layer in which parallel encoding is to be started. As a result, by decoding the header, the three-dimensional data decoding device can determine from which layer parallel decoding is possible.

It should be noted that from which layer parallel processing is to be started may be predetermined. Moreover, parallel start layer information indicating a layer in which parallel processing is to be started is not appended to a bitstream, and a layer in which parallel processing is to be started may be specified by standards etc. For example, the three-dimensional data encoding device appends a flag indicating whether to perform parallel processing to a bitstream. When the flag is ON, the three-dimensional data decoding device may start parallel processing from the first layer; and when the flag is OFF, the three-dimensional data decoding device may perform sequential processing.

Figure 104:
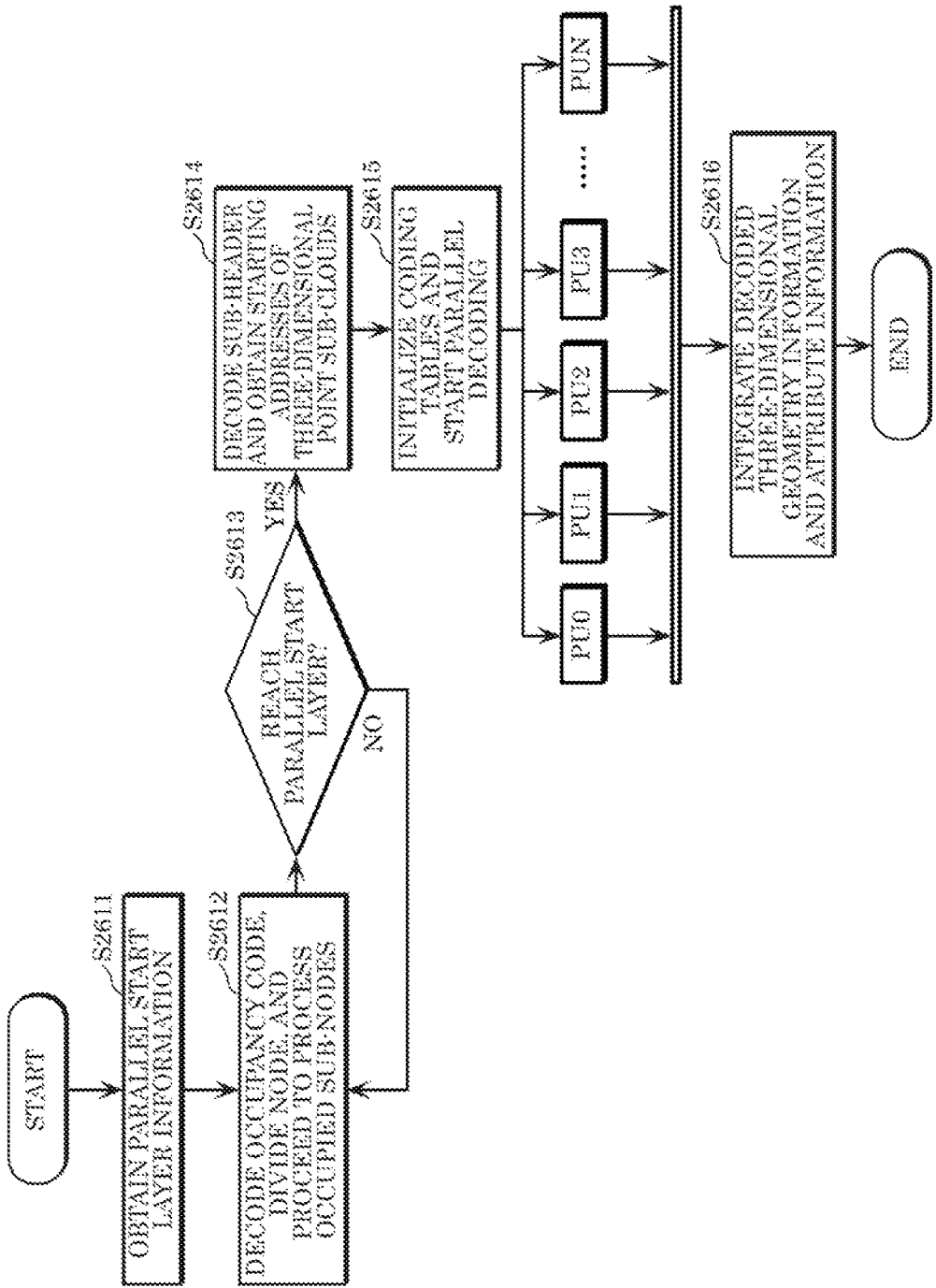
FIG. 104 is a diagram schematically illustrating a procedure of a full parallel decoding process according to Embodiment 11.

FIG. 104 is a diagram schematically illustrating a procedure of a full parallel decoding process. First, by decoding a header, the three-dimensional data decoding device obtains parallel start layer information indicating layer N that is processable in parallel (S2611). Next, the three-dimensional data decoding device decodes an occupancy code, divides a current node into eight, and proceeds to process sub-nodes in an occupancy state (S2612).

Then, the three-dimensional data decoding device determines whether a current layer has reached parallel start layer N (S2613). When the current layer has not reached parallel start layer N (NO in S2613), the three-dimensional data decoding device performs step S2612 on the next node. When the current layer has reached parallel start layer N (YES in S2613), the three-dimensional data decoding device decodes a sub-header and obtains starting addresses of three-dimensional point sub-clouds (S2614).

After that, the three-dimensional data decoding device initializes coding tables and starts parallel decoding of the three-dimensional point sub-clouds (S2615). After the completion of parallel decoding, the three-dimensional data decoding device integrates pieces of three-dimensional position information and attribute information of the decoded three-dimensional point sub-clouds (S2616).

For example, the three-dimensional data decoding device decodes parallel start layer information from the header of a bitstream. Accordingly, the three-dimensional data decoding device can determine from which layer parallel decoding is possible.

It should be noted that parallel start layer information indicating a layer in which parallel processing is to be started is not appended to a bitstream, and a layer in which parallel processing is to be started may be specified by standards etc. For example, the three-dimensional data encoding device appends a flag indicating whether to perform parallel processing to a bitstream. When the flag is ON, the three-dimensional data decoding device may start parallel processing from the first layer; and when the flag is OFF the three-dimensional data decoding device may perform sequential processing.

Figure 105:
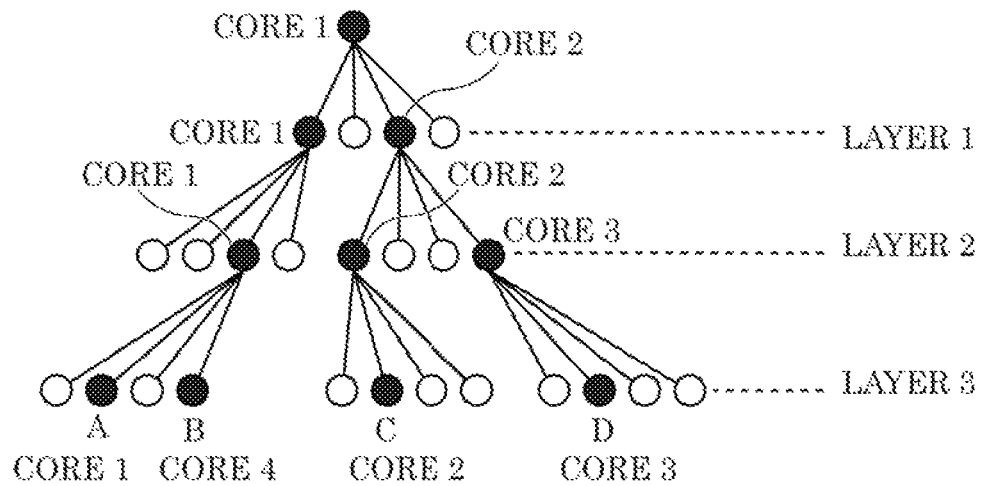
FIG. 105 is a diagram for illustrating incremental parallel encoding according to Embodiment 11 and shows an example of a tree structure.
Figure 106:
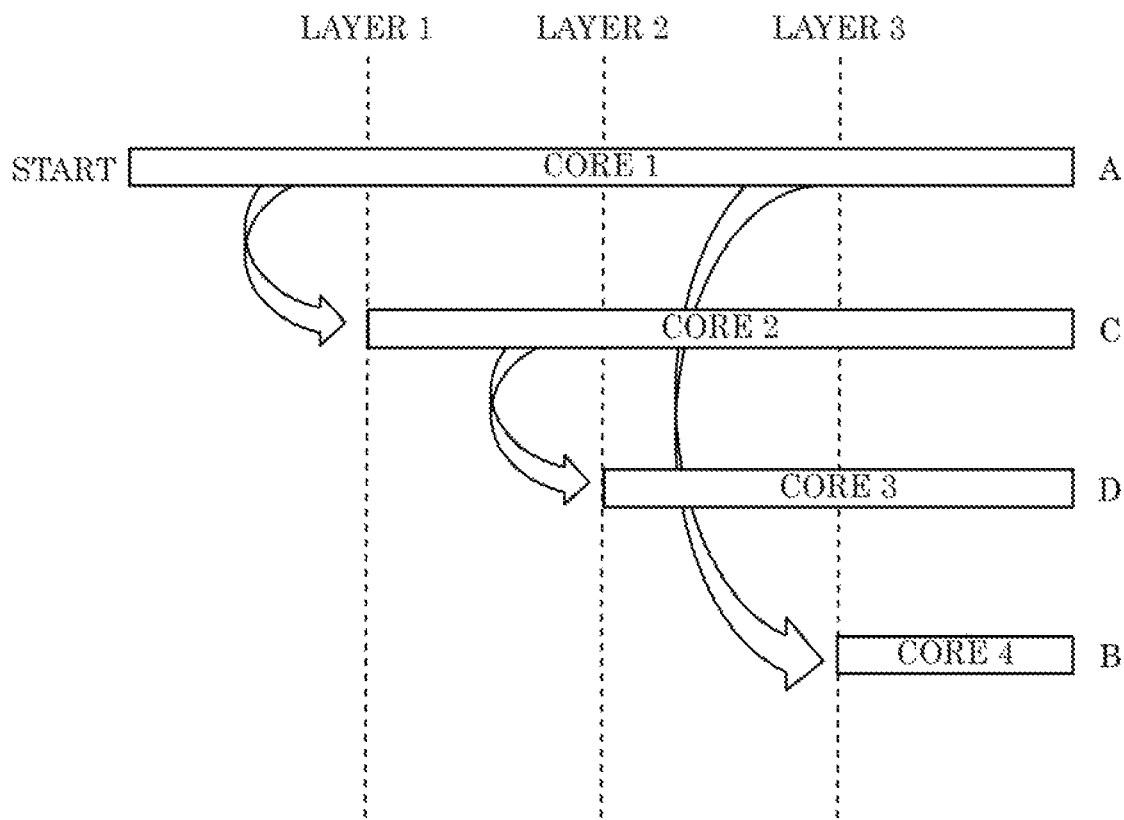
FIG. 106 is a diagram indicating operations of cores in incremental parallel encoding according to Embodiment 11.

The following describes incremental parallel encoding. FIG. 105 and FIG. 106 each are a diagram for illustrating incremental parallel encoding. FIG. 105 is a diagram illustrating parallel processing in a tree structure, and FIG. 106 is a diagram illustrating time-series changes in parallel processing.

In incremental parallel encoding, when there is an available PU in the case where a parent node is divided into one or more child nodes, the number of parallel processes is sequentially increased. In addition, each time a new node requiring an additional PU is found, a coding table is set to a predetermined table.

In an example shown in FIG. 105, core 1 starts processing in the top (root). In layer 1, core 2 is used for processing the right node and core 1 processes the left node. In layer 2, core 1 continues to process the left node. In layer 3, core 1 processes node A and core 4 processes newly found core B. Moreover, core 2 continues to process the left node in layer 2 after processing the right node in layer 1, and processes node C in layer 3. Furthermore, core 3 is added and processes the right node and node D in layer 3.

It should be noted that the three-dimensional data encoding device may add a flag indicating whether it is necessary to initialize a coding table for entropy encoding in each node. As a result, the three-dimensional data decoding device can determine that next child nodes of a node for which the flag indicates the necessity of initialization are processable in parallel.

Figure 107:
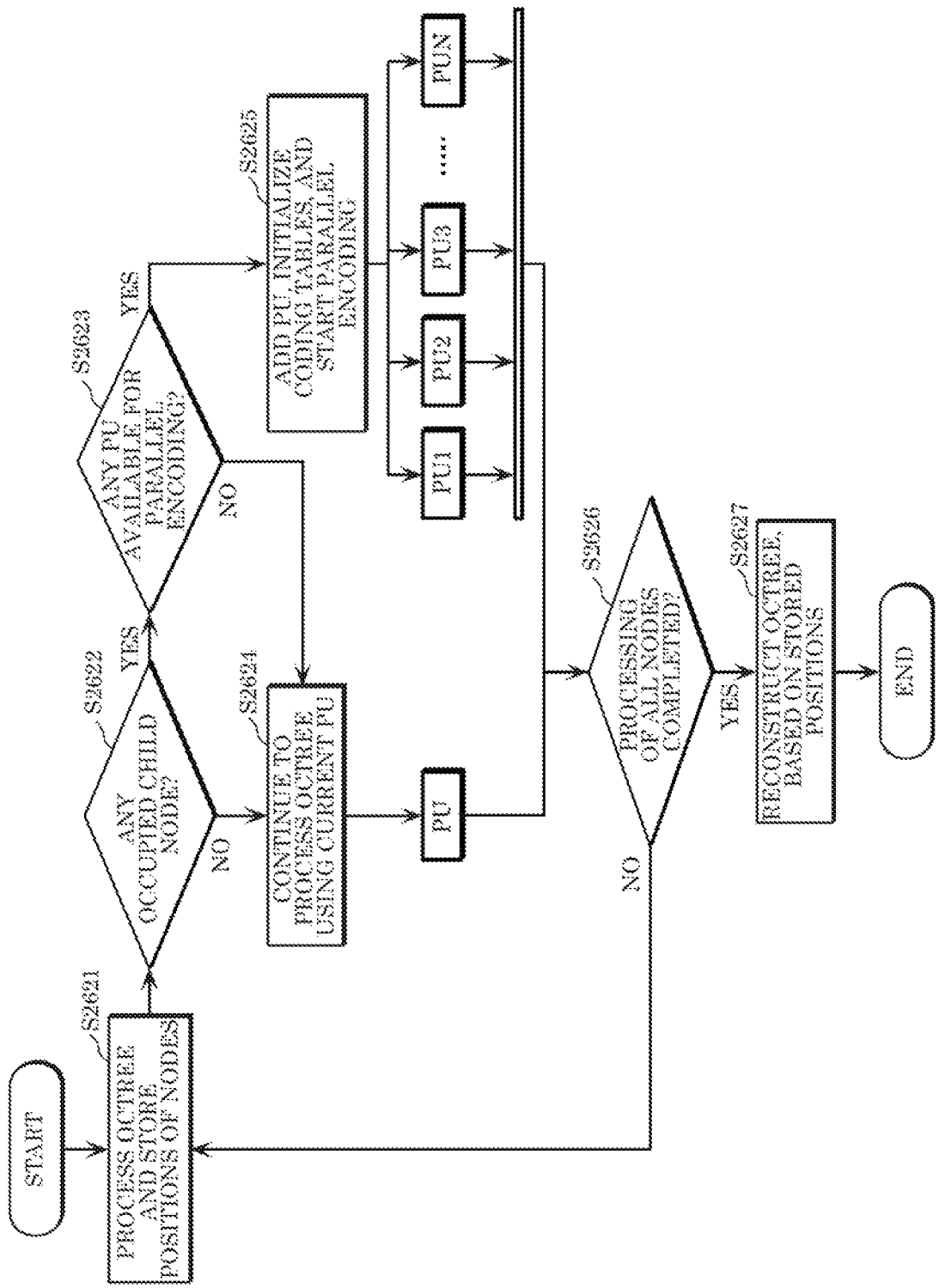
FIG. 107 is a diagram schematically illustrating a procedure of an incremental parallel encoding process according to Embodiment 11.

FIG. 107 is a diagram schematically illustrating a procedure of an incremental parallel encoding process. First, the three-dimensional data encoding device processes an octree and stores positions of nodes (S2621). Next, the three-dimensional data encoding device determines whether a current node includes occupied child nodes that are child nodes in an occupancy state (S2622). When the current node includes the occupied child nodes (YES in S2613), the three-dimensional data encoding device determines whether there is a PU available for parallel encoding (S2623).

When the current node includes no occupied child nodes (NO in S2613) or there is no PU available for parallel encoding (NO in S2623), the three-dimensional data encoding device continues to process the octree using a PU currently in use (S2624). For example, in an initial state, the three-dimensional data encoding device continues processing using one PU in an initial state. Moreover, the expression "when the current node includes no occupied child nodes" includes a case in which the current node does not include any occupied node and a case in which the current node includes one occupied child node.

In contrast, when there is a PU available for parallel encoding (YES in S2623), the three-dimensional data encoding device adds a new PU to PUs to be used, initializes coding tables, and starts parallel processing (S2625).

When processing of all nodes is not completed (NO in S2626), the three-dimensional data encoding device performs step S2621 on the next node. When processing of all nodes is completed (YES in S2626), the three-dimensional data encoding device reconstructs an octree, based on the positions stored in step S2602 (S2627).

In such incremental parallel encoding, when the current node includes occupied nodes and there is an available PU, parallel processing is started immediately. Accordingly, since a PU can be assigned to the next processing when the PU completes processing in a short time, ideal processing load balancing is achievable.

On the other hand, each time parallel processing is requested, initialization is required. Additionally, since PUs do not always complete processing by the next processing in an up-down or left-right processing order, a mechanism for synchronizing all of nodes and child nodes in each layer is required so as to write back data. In other words, since above-mentioned full parallel encoding requires no such processing, full parallel encoding produces the effect of reducing the amount of processing.

As stated above, in the present embodiment, original three-dimensional points are divided into branches processable in parallel. In an octree, for example, eight branches processable in parallel are generated for nodes. In addition, a new parameter indicating from which layer of the octree a branch processable in parallel starts is defined.

When a transition to processing of the next branch processable in parallel is made, a coding table for entropy encoding is reset. Alternatively, a different coding table is used for each of branches processable in parallel.

For example, reference to nodes included in different branches processable in parallel, such as information of neighboring nodes, is prohibited.

Modes relating to parallel processing are defined. For example, mode 0 is a mode for performing no parallel processing. Mode 1 is a mode for performing parallel processing of geometry information (structure information). In this mode, regarding attribute information, reference to other branches processable in parallel is permitted. Mode 2 is a mode for performing parallel processing of geometry information and attribute information. In other words, regarding both the geometry information and the attribute information, reference to other branches processable in parallel is prohibited.

The starting address of data of each of branches processable in parallel is encoded into a header such as a slice header.

The three-dimensional data decoding device may process, in parallel, all branches processable in parallel or may process, in parallel, part of branches processable in parallel.

As described above, the three-dimensional data encoding device according to this embodiment performs the process illustrated in FIG. 108. First, the three-dimensional data encoding device divides an N-ary tree structure (N being an integer greater than or equal to 2) of three-dimensional points included in three-dimensional data, into a first branch (first three-dimensional point sub-cloud) and a second branch (second three-dimensional point sub-cloud) (S2631). Next, the three-dimensional data encoding device encodes the first branch and the second branch so that the first branch and the second branch are decodable independently of each other (S2632). Stated differently, the three-dimensional data encoding device encodes the first branch and the second branch so that the first branch and the second branch have no dependency relationship with each other. For example, the three-dimensional data encoding device encodes the first branch and the second branch in parallel.

For example, the root of the first branch is a first node included in a first layer in the N-ary tree structure, and the root of the second branch is a second node included in the first layer and different from the first node. In other words, the first branch and the second branch belong to the same layer.

For example, the three-dimensional data encoding device encodes information (parallel start layer information) indicating the first layer. Specifically, the three-dimensional data encoding device generates a bitstream including information (parallel start layer information) indicating the first layer.

For example, the three-dimensional data encoding device entropy encodes the first branch and the second branch using different coding tables.

For example, after entropy encoding the first branch, the three-dimensional data encoding device initializes the coding table before entropy encoding the second branch.

For example, the three-dimensional data encoding device prohibits reference to the second branch in the encoding of the first branch, and prohibits reference to the first branch in the encoding of the second branch.

For example, the three-dimensional data encoding device encodes pieces of geometry information of first three-dimensional points included in the first branch and pieces of geometry information of second three-dimensional points included in the second branch so that the pieces of geometry information of the first three-dimensional points and the pieces of geometry information of the second three-dimensional points are decodable independently of each other, and encodes pieces of attribute information of the first three-dimensional points and pieces of attribute information of the second three-dimensional points so that the pieces of attribute information of the first three-dimensional points and the pieces of attribute information of the second three-dimensional points are decodable independently of each other. In other words, the three-dimensional data encoding device encodes both the pieces of geometry information and the pieces of attribute information so that the pieces of geometry information have no dependency relationship with each other and the pieces of attribute information have no dependency relationship with each other.

For example, the three-dimensional data encoding device encodes one of (1) pieces of geometry information of first three-dimensional points included in the first branch and pieces of geometry information of second three-dimensional points included in the second branch and (2) pieces of attribute information of the first three-dimensional points and pieces of attribute information of the second three-dimensional points so that the one of (1) the pieces of geometry information of the first three-dimensional points and the pieces of geometry information of the second three-dimensional points and (2) the pieces of attribute information of the first three-dimensional points and the pieces of attribute information of the second three-dimensional points are decodable independently of each other, and encodes the other of (1) the pieces of geometry information of the first three-dimensional points and the pieces of geometry information of the second three-dimensional points and (2) the pieces of attribute information of the first three-dimensional points and the pieces of attribute information of the second three-dimensional points so that the other of (1) the pieces of geometry information of the first three-dimensional points and the pieces of geometry information of the second three-dimensional points and (2) the pieces of attribute information of the first three-dimensional points and the pieces of attribute information of the second three-dimensional points have a dependency relationship with each other. In other words, the three-dimensional data encoding device encodes one of the pieces of geometry information and the pieces of attribute information so that the one of the pieces of geometry information and the pieces of attribute information have no dependency relationship with each other; and encodes the other of the pieces of geometry information and the pieces of attribute information so that the other of the pieces of geometry information and the pieces of attribute information have a dependency relationship with each other. It should be noted that the expression "have a dependency relationship with each other" means, for example, entropy encoding the first branch and the second branch using the same coding table, not initializing the coding table before the second branch is entropy encoded after the first branch is entropy encoded, permitting reference to the second branch in the encoding of the first branch, or permitting reference to the first branch in the encoding of the second branch.

For example, the three-dimensional data encoding device encodes a flag indicating whether the first branch and the second branch have been encoded so that the first branch and the second branch are decodable independently of each other. In other words, the three-dimensional data encoding device generates a bitstream including the flag indicating whether the first branch and the second branch have been encoded so that the first branch and the second branch are decodable independently of each other.

For example, the three-dimensional data encoding device includes a processor and memory, and the processor performs the above process using the memory.

The three-dimensional data decoding device according to this embodiment performs the process illustrated in FIG. 109. First, the three-dimensional data decoding device obtains first encoded data and second encoded data generated by encoding a first branch and a second branch included in an N-ary tree structure (N being an integer greater than or equal to 2) of three-dimensional points included in three-dimensional data, so that the first branch and the second branch are decodable independently of each other (S2641). For example, the three-dimensional data decoding device obtains first encoded data and second encoded data from a bitstream. Next, the three-dimensional decoding device decodes the first branch and the second branch by decoding each of the first encoded data and the second encoded data (S2642). For example, the three-dimensional data decoding device decodes first encoded data and second encoded data in parallel.

For example, the root of the first branch is a first node included in a first layer in the N-ary tree structure, and the root of the second branch is a second node included in the first layer and different from the first node. In other words, the first branch and the second branch belong to the same layer.

For example, the three-dimensional data decoding device decodes information (parallel start layer information) indicating the first layer. For example, the three-dimensional data decoding device obtains the information (parallel start layer information) indicating the first layer from the bitstream.

For example, the three-dimensional data decoding device entropy decodes the first branch and the second branch using different tables.

For example, after entropy decoding the first branch, the three-dimensional data decoding device initializes the coding table before entropy decoding the second branch.

For example, the three-dimensional data decoding device does not refer to the second branch in the decoding of the first branch, and does not refer to the first branch in the decoding of the second branch.

For example, the first encoded data includes first encoded geometry data and first encoded attribute data, the first encoded geometry data being generated by encoding pieces of geometry information of first three-dimensional points included in the first branch, the first encoded attribute data being generated by encoding pieces of attribute information of the first three-dimensional points. The second encoded data includes second encoded geometry data and second encoded attribute data, the second encoded geometry data being generated by encoding pieces of geometry information of second three-dimensional points included in the second branch, the second encoded attribute data being generated by encoding pieces of attribute information of the second three-dimensional points. The first encoded geometry data and the second encoded geometry data are generated so that the first encoded geometry data and the second encoded geometry data are decodable independently of each other, and the first encoded attribute data and the second encoded attribute data are generated so that the first encoded attribute data and the second encoded attribute data are decodable independently of each other. In other words, the three-dimensional data encoding device generates the first encoded data and the second encoded data by encoding both the pieces of geometry information and the pieces of attribute information so that the pieces of geometry information have no dependency relationship with each other and the piece of attribute information have no dependency relationship with each other.

For example, the first encoded data and the second encoded data are generated by encoding one of (1) pieces of geometry information of first three-dimensional points included in the first branch and pieces of geometry information of second three-dimensional points included in the second branch and (2) pieces of attribute information of the first three-dimensional points included in the first branch and pieces of attribute information of the second three-dimensional points included in the second branch so that the one of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch are decodable independently of each other. The three-dimensional data decoding device restores, by decoding the first encoded data and the second encoded data, the one of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch. The three-dimensional data decoding device further obtains third encoded data and fourth encoded data generated by encoding the other of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch so that the other of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch have a dependency relationship with each other. The three-dimensional data decoding device restores, by decoding the third encoded data and the fourth encoded data, the other of (1) the pieces of geometry information of the first three-dimensional points included in the first branch and the pieces of geometry information of the second three-dimensional points included in the second branch and (2) the pieces of attribute information of the first three-dimensional points included in the first branch and the pieces of attribute information of the second three-dimensional points included in the second branch. In other words, the three-dimensional data encoding device encodes one of the pieces of geometry information and the pieces of attribute information so that the one of the pieces of geometry information and the pieces of attribute information have no dependency relationship with each other; and encodes the other of the pieces of geometry information and the pieces of attribute information so that the other of the pieces of geometry information and the pieces of attribute information have a dependency relationship with each other. For example, when two encoded data have a dependency relationship with each other, the three-dimensional data decoding device entropy decodes the two encoded data using the same coding table, does not initialize the coding table after entropy decoding one of the two encoded data and before entropy decoding the other of the two encoded data, or refers to the other of the two encoded data in decoding of the one of the two encoded data.

For example, the three-dimensional data decoding device decodes a flag indicating whether the first branch and the second branch have been encoded so that the first branch and the second branch are decodable independently of each other. For example, the three-dimensional data decoding device obtains, from a bitstream, the flag indicating whether the first branch and the second branch have been encoded so that the first branch and the second branch are decodable independently of each other. For example, when the flag indicates that the first branch and the second branch have been encoded so that the first branch and the second branch are decodable independently of each other, the three-dimensional data decoding device decodes the first encoded data and the second encoded data in parallel; and when the flag does not indicate that the first branch and the second branch have been encoded so that the first branch and the second branch are decodable independently of each other, the three-dimensional data decoding device decodes the first encoded data and the second encoded data sequentially.

For example, the three-dimensional data decoding device includes a processor and memory, and the processor performs the above-described process using the memory.

Embodiment 12

A bitstream of encoded three-dimensional points (point cloud) requires a large-capacity storage or cache because its data size becomes big. Furthermore, since the bitstream becomes complex, high-performance hardware becomes necessary. Furthermore, by dispersion of a bitstream, a plurality of point cloud compression (PCC) bitstreams are required.

On the other hand, a user does not necessarily need all the information of the bitstream of three-dimensional points at all times, and there are instances where some PCC bitstreams or a combined bitstream including a plurality of components of bitstreams are required. Therefore, a method of obtaining information of three-dimensional points effectively and in parallel is desired.

Figure 110:
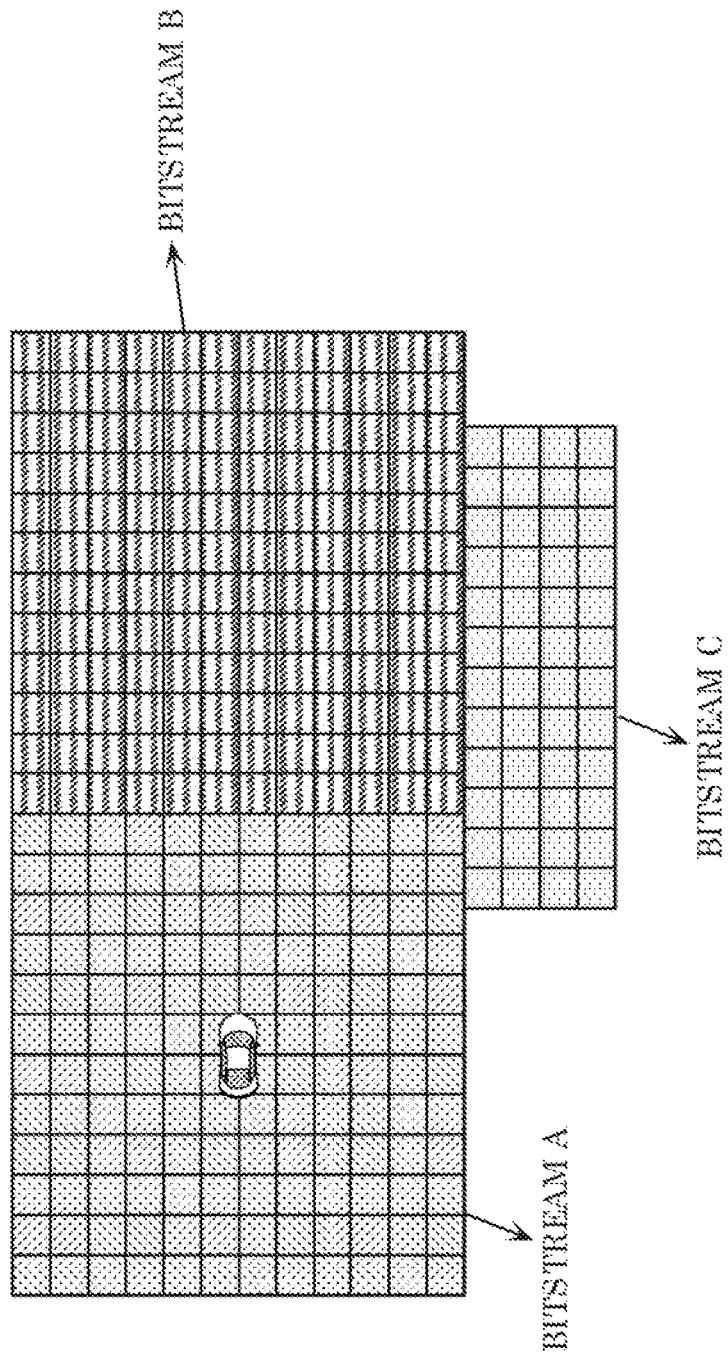
FIG. 110 is a diagram schematically illustrating an operation in which a car accesses bitstreams according to Embodiment 12.

FIG. 110 is a diagram schematically illustrating an operation in the case where a car having GPS coordinates accesses bitstreams of three-dimensional points in order to obtain plan view map information. For example, as illustrated in FIG. 110, bitstream A is a PCC bitstream of three-dimensional points of regions in the surroundings the vehicle, and bitstream B and bitstream C are PCC bitstreams of three-dimensional points of neighboring regions. Furthermore, each bitstream indicates a plan view state in block form.

In this embodiment, tile division is used as a method of dividing a bitstream of three-dimensional points into small regions. Tiles are divided regions obtained by dividing a bitstream of three-dimensional points into different block regions, based on user description.

Tiles have multiple levels from a root node. Furthermore, tiles having different levels may have different sizes that are variable. Furthermore, tiles may be independent of each other.

The three-dimensional data encoding device may encode one or a plurality of tile levels, and the three-dimensional data decoding device may decode one or more tile levels needed in an application, from among the one or a plurality of tile levels.

Figure 111:
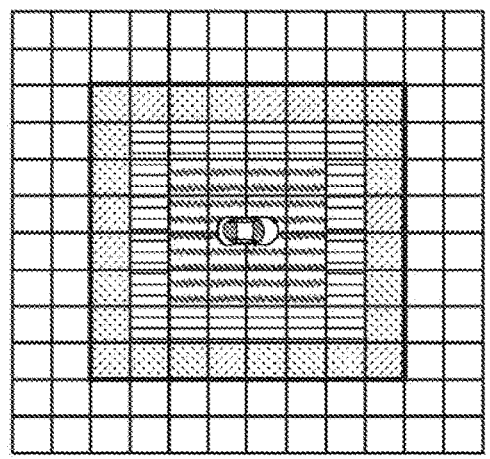
FIG. 111 is a diagram illustrating an example of tile division according to Embodiment 12.
Figure 112:
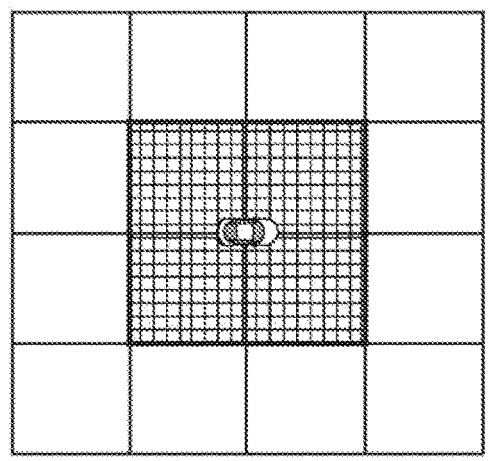
FIG. 112 is a diagram illustrating an example of tile division according to Embodiment 12.
Figure 113:
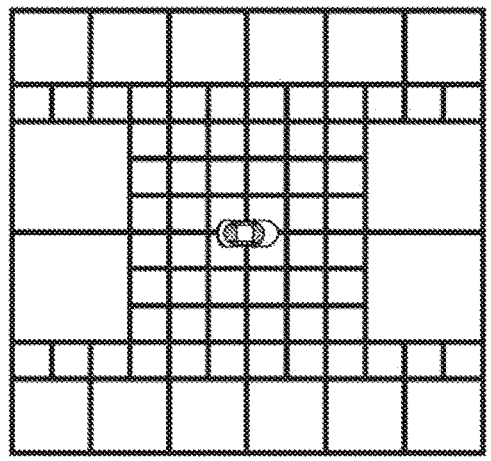
FIG. 113 is a diagram illustrating an example of tile division according to Embodiment 12.

FIG. 111 is a diagram illustrating in plan view a single PCC bitstream that is divided into small tiles. FIG. 112 is a diagram illustrating in plan view a single PCC bitstream that is divided into large tiles. FIG. 113 is a diagram illustrating in plan view a single PCC bitstream that is divided into tiles of multiple sizes.

In this manner, the three-dimensional data encoding device may encode the same region using small tile division (FIG. 111) and using large tile division (FIG. 112). For example, the three-dimensional data encoding device switches between transmitting a result of small tile division and a result of large tile division, one a per region basis, according to a request from the three-dimensional data decoding device. Alternatively, the three-dimensional data encoding device may transmit both results to the three-dimensional data decoding device, and the three-dimensional data decoding device may switch which between the result of small tile division and the result of large tile division to use, according to the car's state (for example, speed or place, etc.), and so on.

Hereinafter, complex tile division which uses multiple tile sizes will be described. The three-dimensional data encoding device may encode tiles of multiple sizes into a bitstream. For example, in the example illustrated in FIG. 113, when the car is traveling, the surrounding conditions change at different speeds. For example, the change in a region that is far from the car or a region ahead or behind the car is slower than a change in a region to the side of the car. In this manner, encoding efficiency can be improved by applying a large tile size for a region in which change is slow.

Figure 114:
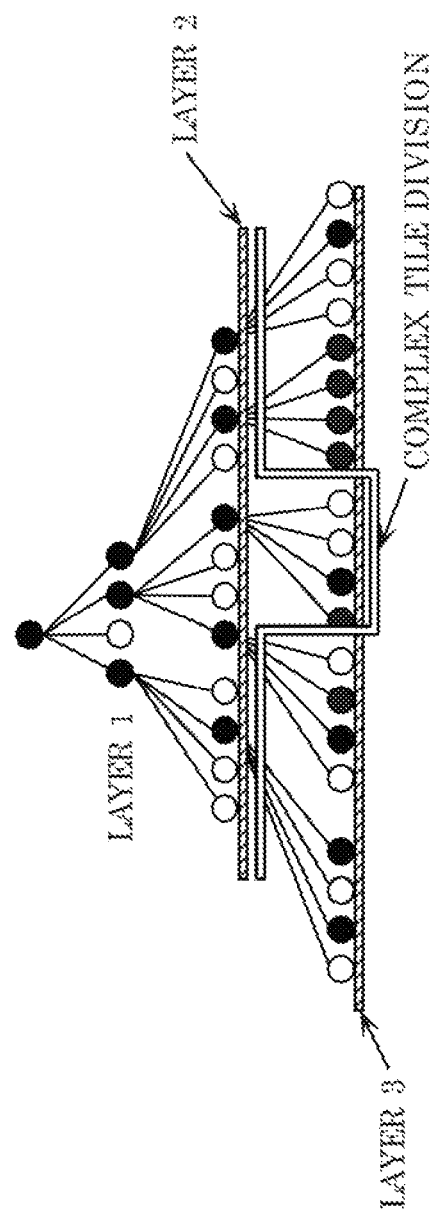
FIG. 114 is a diagram illustrating an example of tile division in a tree structure according to Embodiment 12.

FIG. 114 is a diagram illustrating an example of tile division in a quadtree. In the example illustrated in FIG. 114, part of the tiles are of layer 2 level and another part of the tiles are of layer 3 level.

Figure 115:
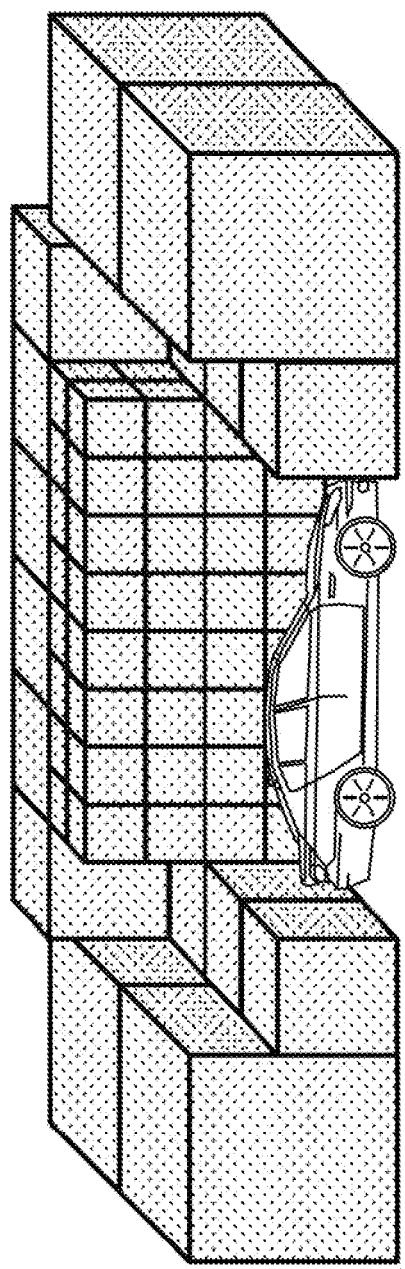
FIG. 115 is a diagram illustrating an example of three-dimensional tile division according to Embodiment 12.

It should be noted that although two-dimensional (plan view) tile division is described above, the same method can also be applied to three-dimensional tile division. FIG. 115 is a diagram illustrating an example of three-dimensional tile division. It should be noted that in FIG. 115, only a part of the tiles is shown for the sake of simplicity.

Tiles that are ahead and far from the car which is the traveling direction of the car are set to a large size because the probability that reading will be needed is high. Tiles to the side of the car are set to a small size because the probability that the car will go in that direction is low.

Furthermore, in the same manner as the examples illustrated in FIG. 111 and FIG. 112, tiles of a fixed size may also be used in three-dimensional tile division.

Furthermore, for the same region on the map, encoded data generated using tiles of a large size and encoded data generated using tiles of a small size may be stored in a server or an external storage device. If the car is traveling to that region, data of large tiles is transmitted to the car since the data of that region will be required anyway. Furthermore, for a region in a direction that is not the traveling direction of the car, data of small tiles is transmitted to the car since the car will need only part of the data of that region.

Furthermore, by using tiles, spatial random accessibility can be improved. The three-dimensional data decoding device (provided in the car, for example) can decode the read (loaded) tiles in parallel depending on the encoding scheme thereof. Furthermore, the three-dimensional data decoding device can control and keep the required memory size (for example, 3×3 tiles) during travel.

Figure 116:
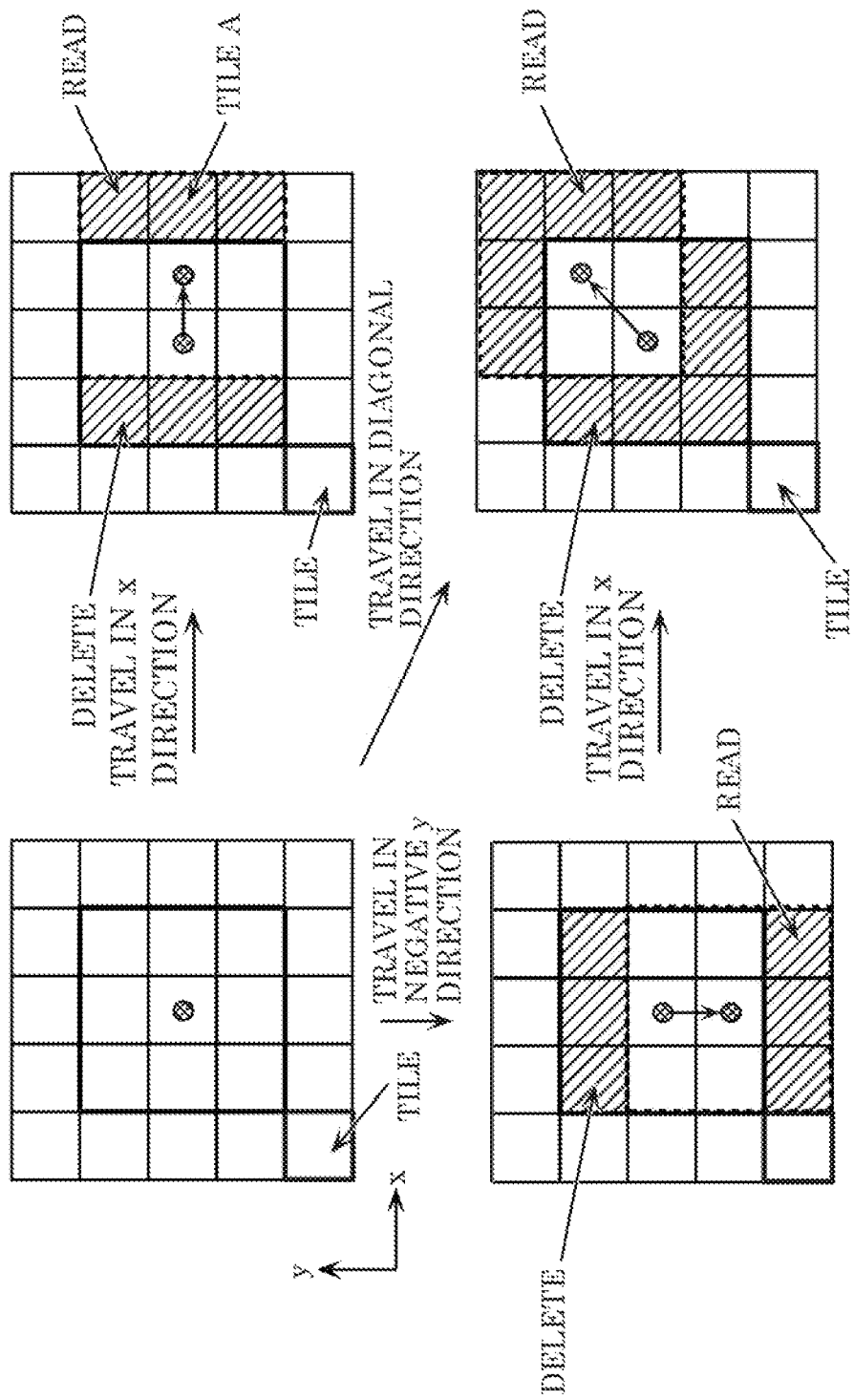
FIG. 116 is a diagram illustrating tiles read during travelling of the car according to Embodiment 12.

FIG. 116 is a diagram illustrating an example of tiles that are read during traveling of the car. As illustrated in FIG. 116, when the car is traveling in the x direction, the car reads (loads) into the memory the data of three tiles in the traveling direction (x direction), and deletes from the memory the data of three tiles in the direction opposite to the traveling direction (i.e., the negative x direction).

It should be noted that the three-dimensional data decoding device may decode the read tiles in parallel. Furthermore, the three-dimensional data decoding device may determine a priority for the read tiles, and decode the tiles in the order of priority. For example, the three-dimensional data decoding device may preferentially decode a tile (for example tile A illustrated in FIG. 116) of a region that is near in the traveling direction of the car.

In the same manner, when the car is traveling in the negative y direction, the car reads (loads) into the memory the data of three tiles in the traveling direction (i.e., the negative y direction), and deletes from the memory the data of three tiles in the direction opposite to the traveling direction (i.e., the y direction).

Furthermore, when the car is traveling in a diagonal direction (i.e., the oblique right-upward direction in the figure), the car again reads (loads) into the memory the data of five tiles in the traveling direction, and deletes from the memory the data of five times in the direction opposite to the traveling direction.

In this manner, data of 3×3 tiles is stored in the memory at all times, and thus the memory size can be limited to data of 3×3 tiles.

Figure 117:
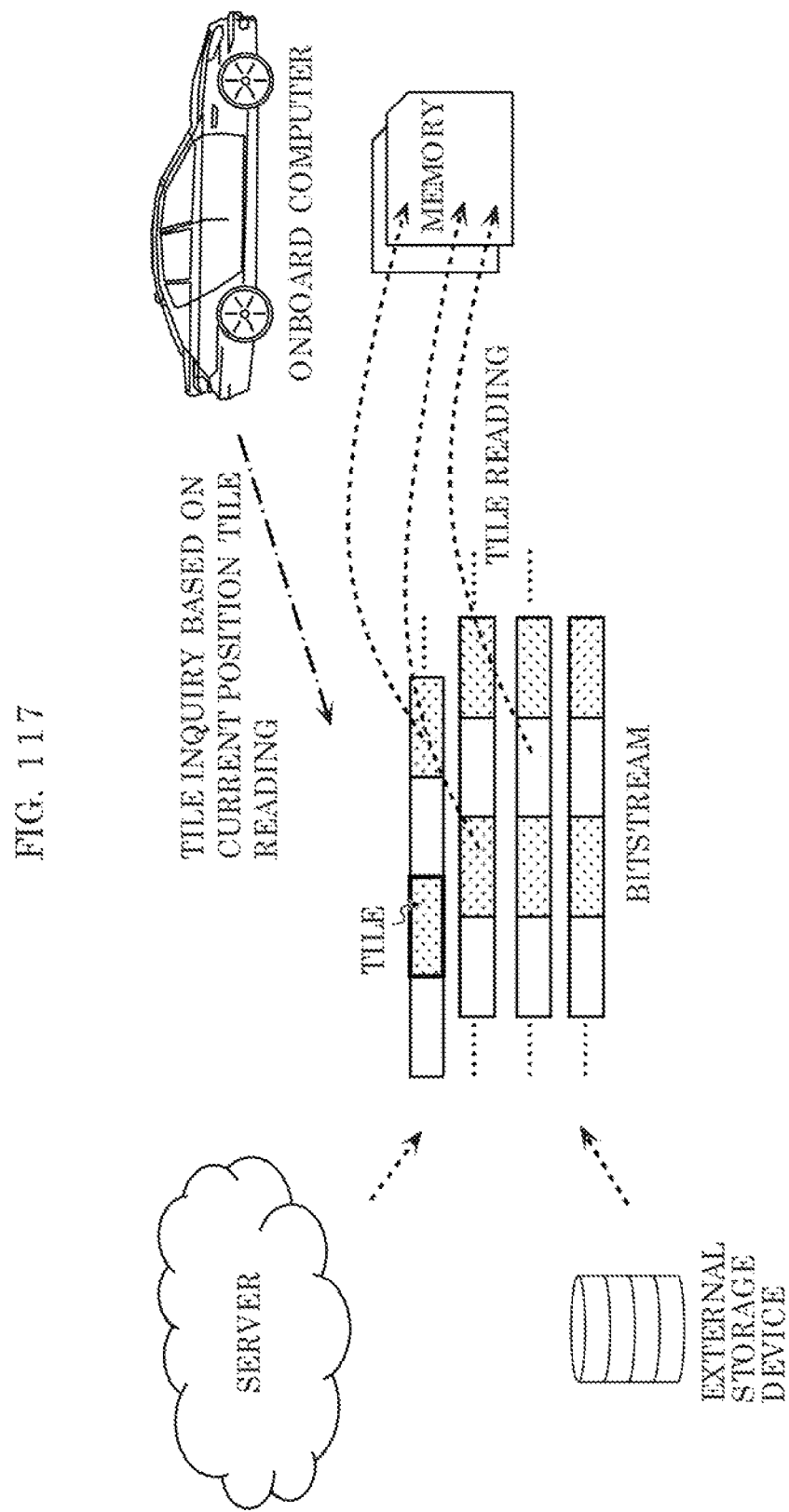
FIG. 117 is a diagram illustrating a configuration example of a system according to Embodiment 12.

FIG. 117 is a diagram illustrating a configuration example of the system according to this embodiment. The system includes a server or external storage device (the three-dimensional data encoding device) and an onboard computer (the three-dimensional data decoding device) provided in a car, or the like.

The server or external storage device stores the whole three-dimensional map. According to a request from the onboard computer, the desired tiles are is read into the memory included in the onboard computer and decoded. For example, the onboard computer requests the server or external storage device for tiles of a region that is in accordance with the current position of the car.

Figure 118:
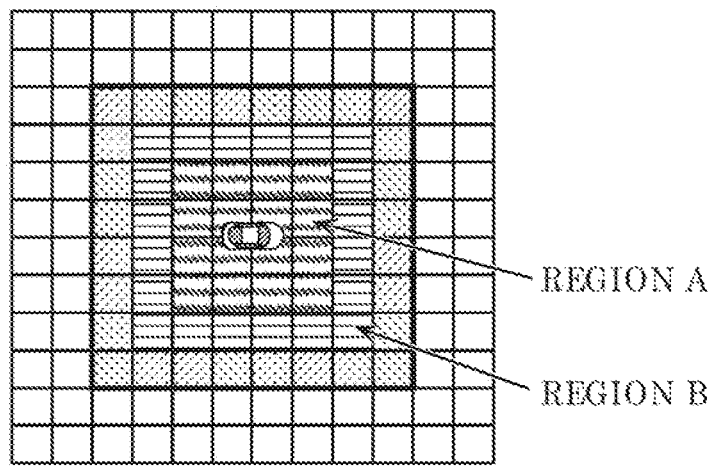
FIG. 118 is a diagram illustrating tile regions to be obtained by the car according to Embodiment 12.
Figure 119:
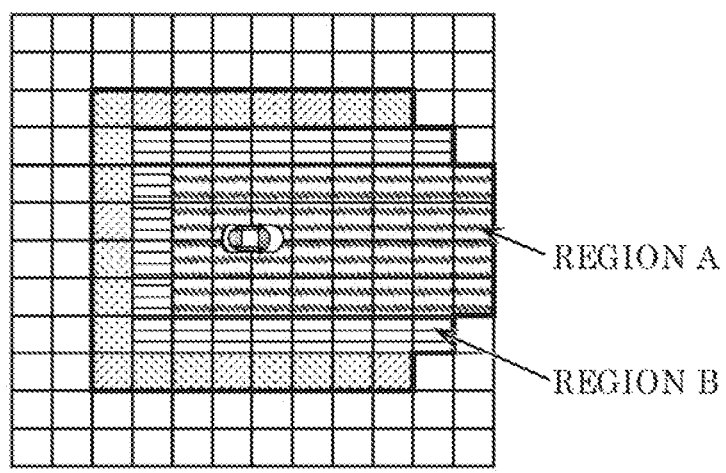

Next, an example of the use of a tile will be described. FIG. 118 and FIG. 119 are diagrams showing examples of the regions of tiles to be obtained by the car. For example, when the car is traveling on an expressway traveling speed is fast, and thus information of tiles in front needs to be decoded quickly. Therefore, obtaining the needed information with less amount of data is desirable. For this reason, for example, the car obtains the tiles of region A.

On the other hand, when the car is traveling in a city area, the car obtains the information of both region A and region B so that the driver can get more information on surrounding conditions. Furthermore, when the car is traveling off-road or on a road that is unfamiliar to the driver, the car may obtain data of a wider range such as 8×8 tiles, for example, in order to obtain more data.

Furthermore, as another example, in order that the processing load of the decoding process does not become too great, the tiles to be decoded may be selected according to the traveling speed of the car. For example, when the car is traveling at high speed on an expressway, information of tiles in front needs to be refreshed quickly. On the other hand, regions to the side of the car are of low importance. Therefore, the car selects and decodes the tiles in the rectangular region ahead. On the other hand, when the car is traveling at low speed, less front tiles are required. Therefore, the region of the front tiles that is obtained becomes narrower compared to during high speed travel. Furthermore, when the car stops at an intersection, or the like, the surrounding tiles in all directions are of equal importance. Therefore, the car obtains tiles in all directions.

Furthermore, as described using FIG. 115, the size of the tiles in region A and region B may be changed according to the traveling direction and speed of the car.

Next, slices will be described. Tiles are classified into slices to utilize the semantic information in the three-dimensional spaces. A slice is a group into which tiles are classified based on semantic information (attribute information) in the three-dimensional spaces. In other words, each tile belongs to any one of a plurality of slices. The information of the slice to which a tile belongs is encoded in the header or sub-header of the encoded bitstream of three-dimensional points.

For example, for a car that is currently traveling, the route to a destination is almost fixed, and thus some roads on the map will not be used. Therefore, these roads are negligible. Furthermore, the appearance of trees changes day by day. Therefore, compared to buildings and roads, the importance of trees is low.

Figure 120:
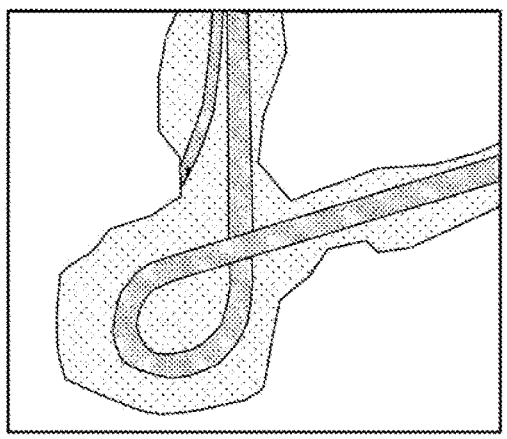
Figure 121:
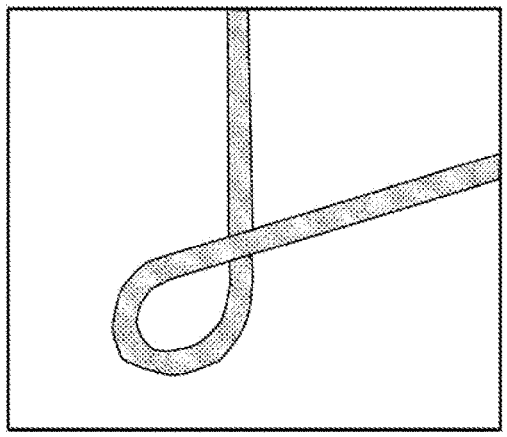
Figure 122:
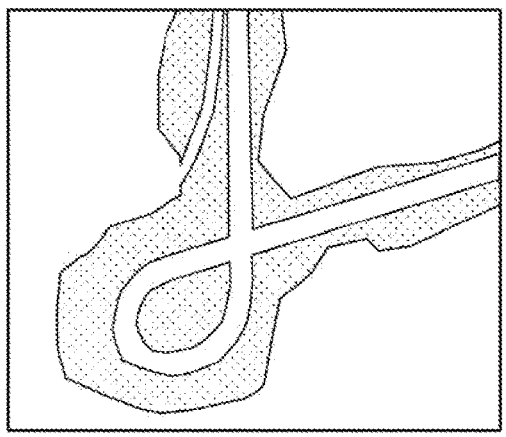
Figure 123:
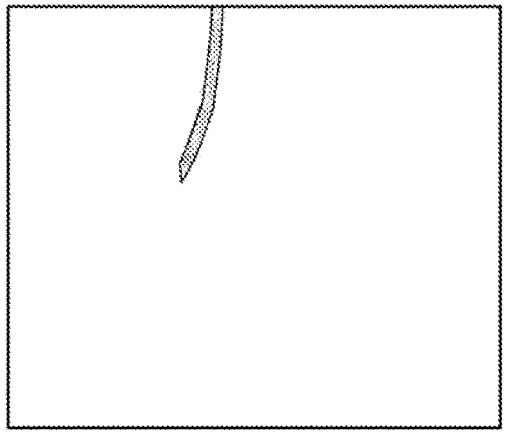

FIG. 120 is a diagram illustrating one example of three-dimensional data (three-dimensional points). FIG. 121 to FIG. 123 are diagrams illustrating an example of data of three slices obtained by dividing the three-dimensional data illustrated in FIG. 120. The slice illustrated in FIG. 121 contains three-dimensional data of an expressway. The slice illustrated in FIG. 122 contains three-dimensional data of trees. The slice illustrated in FIG. 123 contains three-dimensional data of minor roads.

Furthermore, as a slice dividing method, it is possible to use attributes (color, reflectance, normal vector, or a related object), and so on, of a tile or point cloud included in a tile. Furthermore, slices may be set for each of targeted applications such as classifying a tile including a point cloud used in self-location estimation by the a vehicle as slice A, classifying a tile including a point cloud to be displayed on a navigation screen as slice B, and so on. Furthermore, when setting slices according to the intended use in a three-dimensional map, slices may be set based on region information (in Japan, prefecture, municipality, etc.) to which the point cloud or tile belongs.

Figure 124:
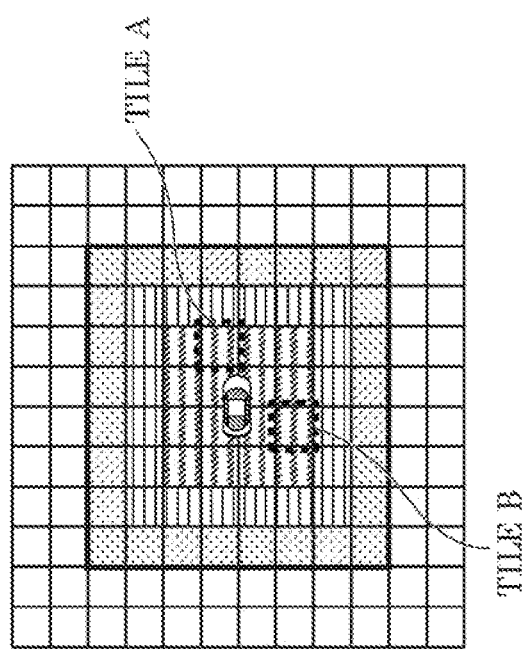
Figure 125:
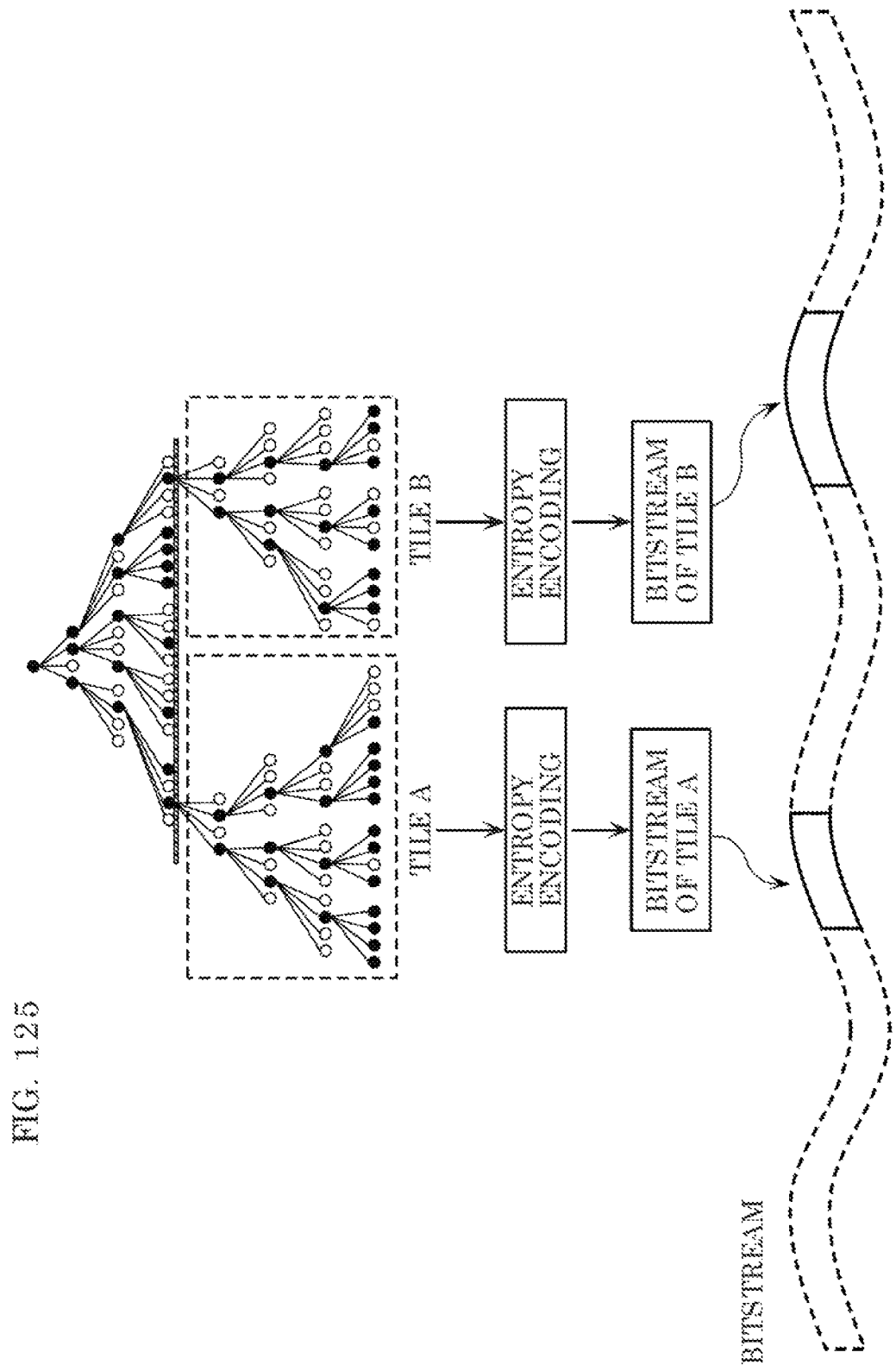

Next, an example of tiles in an octree will be described. FIG. 124 is a diagram illustrating an example of tiles. FIG. 125 is a diagram illustrating an example of tiles from an octree.

For example, each tile and each slice can be encoded independently and decoded independently. In the encoding and the decoding, each tile and each slice contains a sub-octree, in relation to the full octree. For example, the three-dimensional data encoding device and the three-dimensional data decoding device initialize a coding table on a per tile basis.

Furthermore, decoded tiles or slices may be used immediately in an application without waiting for other tiles or slices to be decoded.

Furthermore, the data of tiles or slices are located in a bitstream in a certain order. For example, the order could indicate the priority of data in an application.

For example, as illustrated in FIG. 125, each of tile A and tile B is entropy encoded, and the bitstream of tile A and the bitstream of tile B that are generated are included in the entire bitstream.

Figure 126:
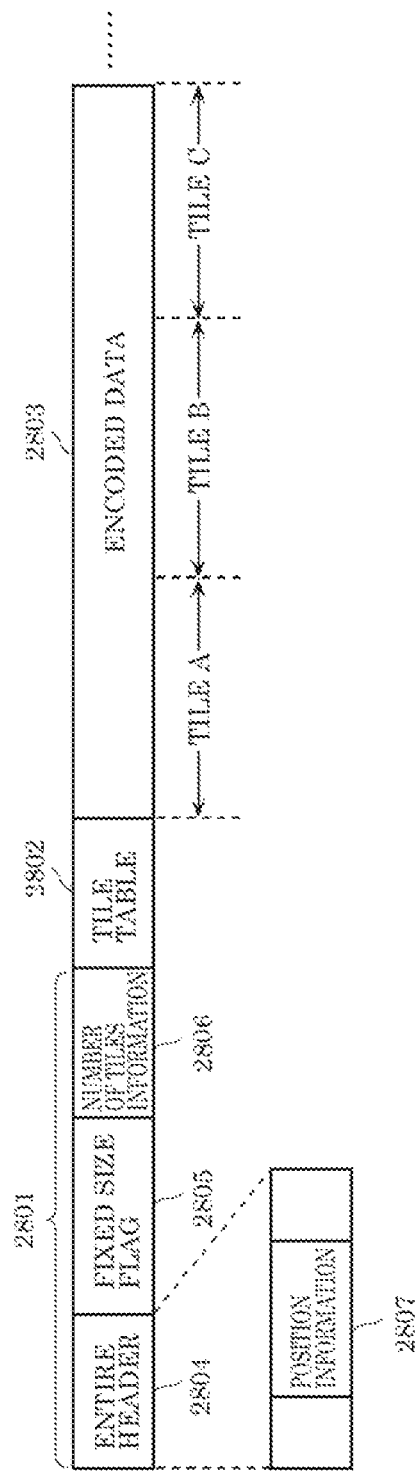

Hereinafter, a configuration example of a bitstream according to this embodiment will be described. FIG. 126 is a diagram illustrating an example of a bitstream obtained by entropy encoding a plurality of tiles. As illustrated in FIG. 126, the bitstream includes common header 2801 which is header information (a first header) common to the tiles, tile table 2802, and encoded data 2803.

Common header 2801 includes entire header 2804, fixed size flag 2805, and number of tiles information 2806. Entire header 2804 is a header for the full tree structure and includes location information 2807 indicating the location of the full tree structure. Specifically, location information 2807 is information which identifies the location of the full tree structure or the location of a three-dimensional space (bounding box) corresponding to the tree structure. For example, location information 2807 indicates a location (for example, coordinates) of an arbitrary node in the full tree structure or an arbitrary point included in the three-dimensional space corresponding to the tree structure. For example, location information 2807 indicates the location of a root of a tree structure. For example, location information 2807 may indicate coordinates of the root of the tree structure which have a reference point based on world coordinates. Furthermore, the entire header may include information indicating the number of three-dimensional points included in the full tree structure, etc.

Fixed size flag 2805 is a flag indicating whether the size of a tile is to be made fixed. Specifically, fixed size flag 2805 indicates whether to make the sizes of the plurality of tiles the same. For example, Fixed size flag=0 indicates that the tile size is not to be made fixed, Fixed size flag=1 indicates that the tile size is to be made fixed.

Number of tiles information 2806 is information indicating the number of tiles, and is to be used in analyzing tile table 2802. It should be noted that number of tiles information 2806 may be included in tile table 2802. Tile table 2802 includes information of the plurality of tiles.

Encoded table 2803 includes encoded data of the respective tiles. The encoded data of the respective tiles are, for example, independent.

Figure 127:
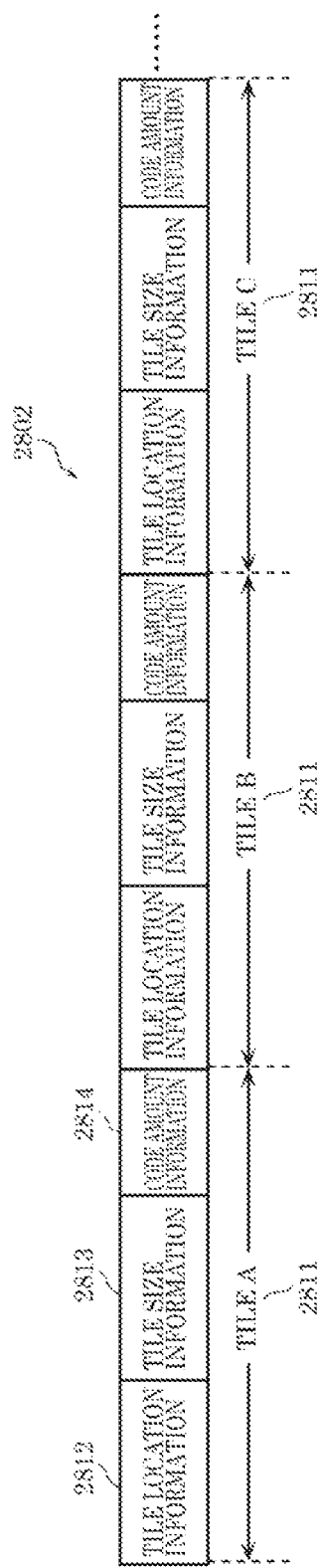

FIG. 127 is a diagram indicating a configuration example of tile table 2802 in the case where Fixed size flag=0 (not to be made fixed). Tile table 2802 includes tile information 2811 which is header information (second header) for each tile. Specifically, a plurality of tile information 2811 correspond on a one-to-on basis to the plurality of tiles.

Tile information 2811 includes tile location information 2812, tile size information 2813, and code amount information 2814. Tile location information 2812 indicates the location of a tile. For example, tile location information 2812 indicates the location of a root of the tile. For example, tile location information 2812 may indicate coordinates having a reference point based on world coordinates. It should be noted that in this case, since the three-dimensional data decoding device can use the coordinates of decoded three-dimensional points as is, the processing amount can be reduced. Alternatively, tile location information 2812 may indicate the error between the location (coordinates) of the full tree structure indicated by location information 2807 and the location (coordinates) of the tile.

Tile size information 2813 indicates the size of the tile. It should be noted that the size of the tile may be indicated by the size in each of the x, y, and z directions, for example, or may be indicated by the size of one side under the premise that the sizes of x, y, and z are equal. Furthermore, the size of the tile corresponds to a layer (level) of the tree structure as previously described. Therefore, the size of the tile may be represented by the layer (level).

Code amount information 2814 indicates the code amount (bit size) of the encoded data of the corresponding tile.

Furthermore, the three-dimensional data decoding device may calculate the starting position (start bit) of encoded data of each tile in the bitstream, by referring to code amount information 2814 of each tile included in tile table 2802. For example, the three-dimensional data decoding device calculates the starting position of tile C illustrated in FIG. 126, by adding the code amount of tile A and the code amount of tile B. Furthermore, the starting position of the encoded data of each tile in the bitstream may be stored in tile table 2802. Accordingly, the three-dimensional data decoding device can know the starting position of the encoded data of each tile in the bitstream by referring to tile table 2802, and thus can obtain and quickly decode the encoded data of a required tile. It should be noted that code amount information 2814 may indicate the ending position of the encoded data in the bitstream.

Figure 128:
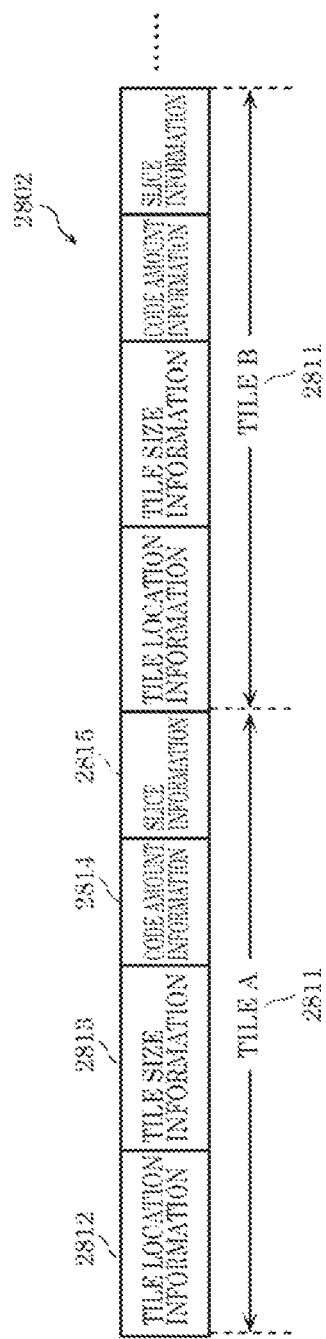

FIG. 128 is a diagram indicating another configuration example of tile table 2802 in the case where Fixed size flag=0 (not to be made fixed). Tile information 2811 illustrated in FIG. 128 includes slice information 2815 in addition to tile information 2811 illustrated in FIG. 127. Slice information 2815 indicates information (semantic information) of the slice related to the tile. Specifically, slice information 2815 indicates the slice to which the tile belongs. This information, although dependent on the application used, indicates, for example, color, an object attribute, the distance to the vehicle, the three-dimensional point density, and so on.

Figure 129:
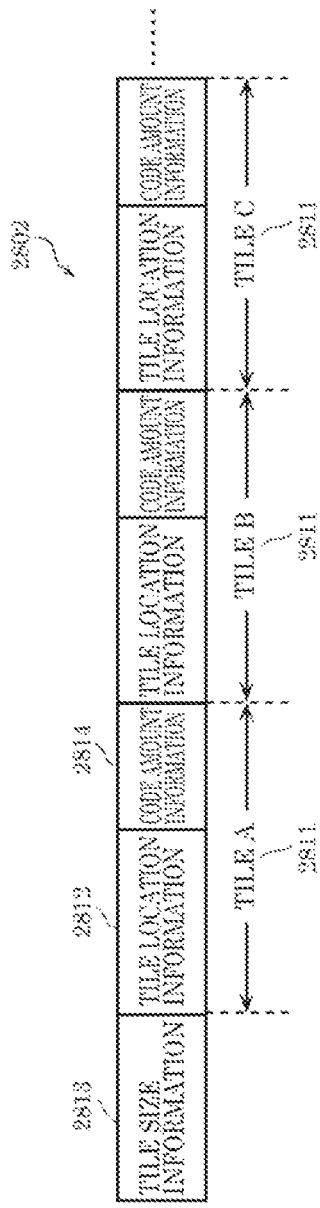

FIG. 129 is a diagram illustrating a configuration example of tile table 2802 in the case where Fixed size flag=1 (to be made fixed). In this case, tile size information 2813 is included, not in tile information 2811 of each tile, but in tile table 2802 as information common to the plurality of tiles. In other words, tiles size information 2813 is included in the first header that is common to the plurality of tiles.

Figure 130:
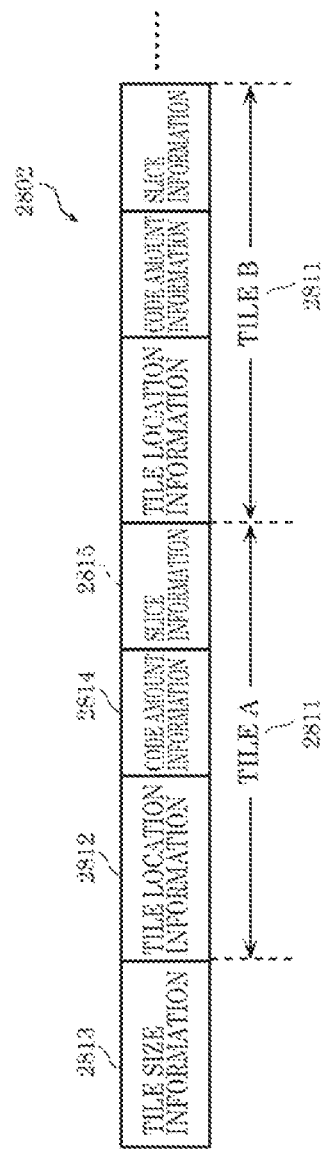

FIG. 130 is a diagram illustrating another configuration example of tile table 2802 in the case where Fixed size flag=1 (to be made fixed). In the same manner as the example illustrated in FIG. 128, tile information 2811 may be included in slice information 2815.

Hereinafter, the operation of the three-dimensional data decoding device will be described. When the car that includes the three-dimensional data decoding device is connected to a map server, the following operation is performed. The car that includes the three-dimensional data decoding device transmits a tile transmission request to the map server, according to the current rough location of the car and a request from an application. The map server refers to the tile table, selects tiles that match the request, generates a new bitstream that includes encoded data of the selected tiles, and transmits the bitstream to the car. The car refers to a tile table included in the received bitstream, and obtains information of the respective tiles. The car restores three-dimensional points by decoding the bitstreams of the tiles using the three-dimensional location of the root of each tile indicated in the information.

It should be noted that the car may be offline and an external storage device may be used in place of the map server. In this case, the following operation is performed. The car determines the best tiles from a local tile table, according to the current rough location of the car and application requirements. The car refers to the tile table included in a bitstream, and obtains information of the respective tiles. The car restores three-dimensional points by decoding the bitstreams of the plurality of tiles using the three-dimensional location of the root of each tile indicated in the information.

It should be noted that the three-dimensional data encoding device may store the identification number (slice_id) of the slice in slice information 2815. Accordingly, the three-dimensional data decoding device can obtain the information of the tile having the required slice_id from tile table 2802, and perform processing such as decoding the tile having the required slice_id, etc.

The three-dimensional data encoding device may encode common header 2801 (or entire header 2804), tile table 2802, and encoded data 2803 of the respective tiles as separate network abstraction layer (NAL) units. Specifically, the three-dimensional data encoding device may generate a stream including the plurality of second headers of the plurality of tiles, as a stream that is independent of the encoded data of the plurality of tiles. Accordingly, for example, the server (the three-dimensional data encoding device) transmits the NAL unit of tile table 2802 to the client (the three-dimensional data decoding device) first. The client decodes tile table 2802 and determines the required tile, and makes a transmission request for the required tile to the server. The server transmits the NAL unit of the requested tile to the client, according to the request by the client.

For example, tile location information 2812 may indicate coordinates having a reference point based on certain world coordinates. Accordingly, the three-dimensional data encoding device can quickly know which location's three-dimensional information, having a reference point based on world coordinates, the point cloud included in each tile is. Furthermore, tile location information 2812 may indicate relative coordinates from coordinates indicated by location information 2807 included in entire header 2804. In this case, the three-dimensional data decoding device may calculate the coordinates having reference points based on world coordinates of each tile, by adding the relative coordinates indicated by tile location information 2812 to the coordinates indicated by location information 2807. Accordingly, since the size of the value of tile location information 2812 can be suppressed, the size of tile table 2802 can be reduced.

Hereinafter, the operation of the three-dimensional data encoding device and the operation of the three-dimensional data decoding device will be described. FIG. 131 is a flowchart of the three-dimensional data encoding process by the three-dimensional data encoding device according to this embodiment.

First, the three-dimensional data encoding device sets the bounding box including the input three-dimensional points (S2801). Next, the three-dimensional data encoding device divides the bounding box into eight child nodes (S2802).

Next, the three-dimensional data encoding device generates the occupancy code of each child node that includes a three-dimensional point, among the eight child nodes (S2803). Next, the three-dimensional data encoding device determines whether the level (tree structure layer) of the current node has reached the target tile level (S2804). Here, the target tile level is the level (tree structure layer) at which tile division is to be performed.

When the level of the current node has not reached the target tile level (No in S2804), the three-dimensional data encoding device divides each of the child nodes into eight grandchild nodes (S2805), and performs the processing from step S2803 onward on each of the grandchild nodes.

When the level of the current node has reached the target tile level (Yes in S2804), the three-dimensional data encoding device stores the current node location and tile level (tile size) in the tile table (S2806).

Next, the three-dimensional data encoding device divides each of the child nodes into eight grandchild nodes (S2807). Next, the three-dimensional data encoding device repeats the process of generating an occupancy code until nodes cannot be divided (S2808). Next, the three-dimensional data encoding device encodes the occupancy code of each tile (S2809).

Lastly the three-dimensional data encoding device combines the generated encoded bitstreams (encoded data) of the tiles (S2810). Furthermore, the three-dimensional data encoding device adds the tile table, and so on, to the header information of the bitstream.

Here, the tile size (tile level) is stored in tile table 2802. Therefore, the three-dimensional data decoding device can obtain the size of the bounding box of the subtree of each tile, using this tile size. Furthermore, the three-dimensional data decoding device can calculate the size of the bounding box of the full tree structure, using the size of the bounding box of the subtree.

It should be noted that the three-dimensional data encoding device may store the size of the bounding box of each tile in tile table 2802. Accordingly, the three-dimensional data decoding device can obtain the size of the bounding box of each tile by referring to tile table 2802.

FIG. 132 is a flowchart of the three-dimensional data decoding process by the three-dimensional data decoding device according to this embodiment.

First, the three-dimensional data decoding device sets the bounding box including the three-dimensional points to be output, using the header information included in the bitstream (S2821). Next, the three-dimensional data decoding device sets the root location of each tile (subtree) using the header information included in the bitstream (S2822).

Next, the three-dimensional data decoding device divides the bounding box into eight child nodes (S2823). Next, the three-dimensional data decoding device decodes the occupancy code of each node, and divides the node into eight child nodes based on the decoded occupancy code. Furthermore, the three-dimensional data decoding device repeats this process until the node of each tile (subtree) cannot be divided (S2824).

Lastly, the three-dimensional data decoding device combines the decoded three-dimensional points of the tiles (S2825).

FIG. 133 is a block diagram illustrating the structure of three-dimensional data encoding device 2820 according to this embodiment. Three-dimensional data encoding device 2820 includes octree generator 2821, tile divider 2822, a plurality of entropy encoders 2823, and bitstream generator 2824.

The target tile level is input to three-dimensional data encoding device 2820. Three-dimensional data encoding device 2820 stores the occupancy code of each tile after the processing has reached the target tile level, and generates the encoded data of each tile by separately encoding the occupancy codes of the tiles.

Octree generator 2821 sets the bounding box, and divides the bounding box into eight child nodes. Furthermore, octree generator 2821 repeats this division process until the processing reaches the target tile level.

Tile divider 2822 sets the tile. Specifically, when the above-described processing has reached the target tile level, tile divider 2822 sets the plurality of tiles having the level as a root.

Entropy encoders 2823 separately encode the tiles. Bitstream generator 2824 generates a bitstream by combining the encoded data obtained by encoding the tiles.

FIG. 134 is a block diagram illustrating the structure of three-dimensional data decoding device 2830 according to this embodiment. Three-dimensional data decoding device 2830 includes octree generator 2831, bitstream divider 2832, a plurality of entropy decoders 2833, and three-dimensional point combiner 2834.

Octree generator 2831 sets the bounding box, and divides the bounding box into eight child nodes. Furthermore, octree generator 2831 repeats this division process until the processing reaches the target tile level.

Bitstream divider 2832 divides the bitstream into the encoded data of each tile, using the header information included in the bitstream.

Entropy decoders 2833 separately decode the plurality of tiles. Three-dimensional point combiner 2834 combines the decoded three-dimensional points of the plurality of tiles. It should be noted that there are instances where decoded three-dimensional points are used directly in an application. In such a case, this combining process is skipped.

As described above, the three-dimensional data encoding device according to this embodiment performs the process illustrated in FIG. 135. The three-dimensional data encoding device generates a bitstream by encoding subspaces (for example, tiles) included in a current space (for example, a bounding box) including three-dimensional points. In the generating of the bitstream, the three-dimensional data encoding device stores, in a first header (for example, common header 2801 or entire header 2804) which is common to the subspaces and included in the bitstream (S2831), first information (for example, location information 2807) indicating first coordinates which are coordinates of the current space, and stores, in a second header (for example, tile information 2811) which is provided on a subspace basis and included in the bitstream, second information (for example, tile location information 2812) indicating a difference between second coordinates which are coordinates of the corresponding subspace and the first coordinates (S2832).

Accordingly, since information indicating the difference between the first coordinates and the second coordinates is stored as second information, the code amount of the bitstream can be reduced.

It should be noted that at least part of the first header and the second headers may be included in a single header (syntax). For example, as illustrated in FIG. 129, tile size information 2913 (first header) which is information common to the subspaces and tile information 2811 (second header) which is information provided on a subspace basis may be stored in tile table 2802. Furthermore, the first header may include at least part of common header 2801 and part of tile table 2802.

For example, part of a first subspace and part of a second subspace included in the subspaces may overlap. For example, as illustrated in FIG. 111, FIG. 112, and FIG. 113, different tile division may be used on the same region.

For example, in the generating of the bitstream, the three-dimensional data encoding device stores third information (for example, tile size information 2813 in FIG. 127) indicating the size of the corresponding subspace in the second header (for example, tile information 2811 in FIG. 127).

For example, in the generating of the bitstream, the three-dimensional data encoding device stores third information (tile information 2813 in FIG. 129) indicating sizes of the subspaces, in the first header.

For example, in the generating of the bitstream, the three-dimensional data encoding device stores fourth information (number of tiles information 2806) indicating the number of the subspaces, in the first header (for example, common header 2801 or tile table 2802).

For example, in the generating of the bitstream, the three-dimensional data encoding device generates a stream including the second headers of the subspaces as a stream that is independent of the encoded data of the subspaces. For example, the second headers of the subspaces and the encoded data of the subspaces are encoded as separate NAL units.

Accordingly, for example, the three-dimensional data decoding device can determine a required subspace by referring to the stream including the second headers, and selectively obtain the encoded data of the required subspace.

For example, the three-dimensional data encoding device includes a processor and memory, and the processor performs the above described process using the memory.

Furthermore, the three-dimensional data decoding device according to this embodiment performs the process illustrated in FIG. 136. The three-dimensional data decoding device decodes a bitstream obtained by encoding subspaces included in a current space including three-dimensional points. In the decoding of the bitstream, the three-dimensional data decoding device decodes, from a first header (for example, common header 2801 or entire header 2804) which is common to the subspaces and included in the bitstream (S2841), first information (for example, location information 2807) indicating first coordinates which are coordinates of the current space, and decodes, from a second header (for example, tile information 2811) which is provided on a subspace basis and included in the bitstream, second information (for example, tile location information 2812) indicating a difference between second coordinates which are coordinates of the corresponding subspace and the first coordinates (S2842). For example, the three-dimensional data decoding device calculates the second coordinates by adding the error indicated in the second information to the first coordinates indicated in the first information.

Accordingly, since information indicating the difference between the first coordinates and the second coordinates is stored as second information, the code amount of the bitstream can be reduced.

For example, a first subspace and a second subspace included in the subspaces may partially overlap. For example, as illustrated in FIG. 111, FIG. 112, and FIG. 113, different tile division may be used on the same region.

For example, in the decoding of the bitstream, the three-dimensional data decoding device decodes third information (for example, tile size information 2813 in FIG. 127) indicating the size of the corresponding subspace, from the second header (for example, tile information 2811 in FIG. 127).

For example, in the decoding of the bitstream, the three-dimensional data decoding device decodes third information (tile size information 2813 in FIG. 129) indicating sizes of the subspaces, from the first header.

For example, in the decoding of the bitstream, the three-dimensional data decoding device decodes fourth information (number of tiles information 2806) indicating the number of the subspaces, from the first header (for example, common header 2801).

For example, a stream including the second headers of the subspaces is generated as a stream that is independent of the encoded data of the subspaces. For example, the second headers of the subspaces and the encoded data of the subspaces are encoded as separate NAL units. For example, the three-dimensional data decoding device determine a required subspace by referring to the stream including the second headers, and selectively obtains the encoded data of the required subspace.

For example, the three-dimensional data decoding device includes a processor and memory, and the processor performs the above-described process using the memory.

Embodiment 13

Due to hardware restrictions such as a transfer speed, input and output performances, a memory use rate, CPU performances, it is difficult to decode a whole large-scale three-dimensional map (point cloud map), and download the decoded data into a system. To address this matter, this embodiment uses a method of encoding, into a bitstream, a large-scale three-dimensional map as a plurality of slices or tiles. In this way, it is possible to reduce hardware requirements in a three-dimensional data decoding device, and to enable real-time decoding processes in an embedded system or a mobile terminal.

The processes of encoding and decoding slices and tiles have been described above. However, in order to perform the above methods, both of formats for point cloud compression (PCC) encoding and formats for PCC decoding need to be modified irreversibly.

This embodiment uses supplemental enhancement information (SEI) for encoding slices and tiles. In this way, it is possible to perform processes of encoding and decoding slices and tiles without modifying formats.

In this embodiment, in PCC encoding, the three-dimensional data encoding device generates data of a tile or a slice and SEI including attribute information (metadata) and data access information about the tile or slice, and encodes the SEI together with the data.

In addition, in PCC decoding, the three-dimensional data encoding device identifies the tile or the slice which is necessary for decoding and a data access position of the tile or slice, based on the SEI including the attribute information and the data access information about the tile or the slice. In this way, the three-dimensional data encoding device performs a high-speed parallel decoding using the tile or the slice.

It is to be noted that one of or both of the tile and the slice may be used.

Hereinafter, an example of dividing a slice or a tile is described. For example, in a three-dimensional data decoding device in a car which runs at 60 km/hr, hardware is required to have a processing performance of 16.67 m/s. In addition, the data of a tunnel having a length of approximately 2.2 km in a city area is used as a test stream. In order to decode the test stream in real time, the test stream needs to be decoded in 132 seconds. In addition, 2-GB memory is necessary to store decoded point cloud information.

When the bitstream is encoded as 20 slices or tiles, the three-dimensional data decoding device can decode one of the 20 slices or tiles. In this case, required actual time can be reduced to 6.5 seconds, and required memory capacity can be reduced to 100 MB. FIG. 137 is a diagram indicating examples of a memory capacity, required actual time, current decoding time, and a distance in each of a case in which the whole map is not divided into slices or tiles and a case in which the whole map is divided into slices or tiles.

FIG. 138 is a diagram illustrating an example of tile or slice division. For example, the division is performed using clustering by a fixed number of point cloud data. In this method, all of tiles includes a fixed number of point cloud data, and thus there is no vacant tile. This method has an advantage of being able to equalize tiles and processing loads. On the other hand, the method requires further computation and information in order to perform data clustering and determine the world coordinates of each tile.

Alternatively, another method of effectively dividing a point cloud data may be used instead of slice or tile division based on the number of point cloud data or a bit count for each slice or tile. This method is also referred to as non-uniform division. In this method, clustering is performed on positionally close point cloud data so as to prevent or minimize an overlap of spaces and provide coordinate relationships between clusters at the same time.

Point cloud data clustering methods include a plurality of methods such as a method of sorting the counts in octree division, hierarchical clustering, clustering based on the center of gravity (k-means clustering), clustering based on a distribution, clustering based on density.

The method of storing the counts in octree division is one of easy-to-mount methods. In this method, point cloud data are sorted, and counted. When the number of point cloud data reaches a fixed value, groups generated so far are then classified into one cluster. FIG. 139 is a diagram indicating an example in this method. For example, in the example indicated in FIG. 139, area numbers of the respective point cloud data are input. Here, area numbers are, for example, eight node numbers in an octree. In addition, point cloud data having the same number are extracted by sorting, and, for example, the point cloud data having the same number are assigned to one slice or tile.

Next, another example of slice or tile division is described. A method using a top-view two-dimensional map is used as the method of slice or tile division. The three-dimensional data encoding device performs partitioning according to a minimum value and a maximum value for the sizes of bounding boxes, based on the number of tiles which have been input by a user.

The method provides an advantage of being able to arrange spaces of point cloud data without performing additional computation in the three-dimensional data encoding device. However, there is a possibility that many areas do not include any point cloud depending on the density of point clouds.

FIG. 140 is a diagram indicating an example in this method. As illustrated in FIG. 140, a point cloud data space is divided into a plurality of bounding boxes having the same size.

Next, a SEI structure is described. The three-dimensional data encoding device introduces additional information so as to allow the three dimensional data decoding device to decode slice or tile information. For example, the three-dimensional data encoding device may introduce SEI for PCC. SEI can be used in both the three-dimensional data encoding device and the three-dimensional data decoding device.

In addition, the three-dimensional data decoding device which does not support a SEI decoding process is capable of decoding a bitstream which includes a SEI message. On the other hand, the three-dimensional data decoding device which supports a SEI decoding process is capable of decoding a bitstream which does not include a SEI message.

FIG. 141 is a diagram illustrating a structural example of a bitstream including SEI for PCC. FIG. 142 is a diagram indicating an example of information included in SEI for a tile or a slice. FIG. 143 is a diagram indicating a syntax example of Tile_Slice_information_SEI (SEI).

This SEI is included in a header of a bitstream, for instance. In other words, this SEI is included in control information common to encoded data of a plurality of tiles or slices. As illustrated in each of FIGS. 142 and 143, this SEI includes a tile index (Tile idx) or a slice index (Slice idx), area information (Area information), a memory offset (pointer) (Memory offset pointer), and global position information (Global position information). In addition, this SEI may include other information related to encoding or decoding of a tile or a slice. In addition, SEI includes the above information for each tile index or slice index. It is to be noted that SEI may include at least a part of the above information.

The tile index is an identifier for identifying one of a plurality of tiles. Values of different tile indexes are assigned respectively to the plurality of tiles. The slice index is an identifier for identifying one of a plurality of tiles. Values of different slice indexes are assigned respectively to the plurality of slices. In addition, the header of the encoded data of each tile or each slice is added with a tile index or a slice index of the tile or the slice corresponding to the encoded data.

The area information is information indicating a spatial range (area) of the tile or the slice. For example, the area information includes size information indicating the size of the tile or the slice. The memory offset is information which indicates a position (address) in memory in which the encoded data of the tile or the slice is stored and indicates a position (address) of the encoded data of the tile or the slice in a bitstream. The global position information is information indicating a global position (for example, world coordinates (latitude and longitude, etc.) of the tile or the slice.

In addition, the three-dimensional data encoding device performs a bite alignment process, etc. of each tile or each slice.

It is to be noted that usage of SEI is not limited to encoding of a slice or a tile, and SEI may be optionally used for other information to be encoded into a bitstream.

In addition, the three-dimensional data encoding device may provides a tile or a slice with a kind of attribute information (such as the area information, address information (memory offset), and position information (global position information), etc.), or may associate a tile or a slice with a plurality of kinds of attribute information. In addition, the three-dimensional data encoding device may associate a plurality of tiles or a plurality of slices with a kind of attribute information. In addition, when tiles and slices are co-used, the three-dimensional data encoding device may add attribute information for each of the tiles and the slices to a bitstream. In addition, for example, the three-dimensional data encoding device may generate first attribute information which is area information and second attribute information indicating a relationship between the first area information and the second area information, and may store the first attribute information and the second attribute information into SEI.

In addition, as indicated in FIG. 143, SEI may include attribute information (area information, address information, and position information) of the tile or the slice. For example, an attribute information number may be defined, and SEI may include a tile index or a slice index corresponding to the attribute information number.

Next, an example of a hardware structure of a three-dimensional data decoding device is described. FIG. 144 is a diagram illustrating the structural example of the hardware of the three-dimensional data decoding device. As illustrated in FIG. 144, the three-dimensional data decoding device includes inputter 4501, localizer 4502, memory manager 4503, decoder 4504, memory 4505, and display 4506.

Inputter 4501 inputs and outputs data from and to an external device via a network such as wireless communication. In addition, inputter 4501 inputs and outputs data from and to storage such as a Solid State Drive (SSD), a hard disk drive (HDD), and a memory module.

Localizer 4502 is a Global Positioning System (GPS), a wheel direction detector, a gyroscope sensor, or the like. Localizer 4502 is a module which detects the position, speed, etc. of a mobile object, or the like on which a three-dimensional encoding device is mounted.

Memory manager 4503 manages memory 4505. Memory manager 4503 obtains information from localizer 4502, reads a stream of a related slice or tile with reference to SEI using the obtained information, and loads the read stream into decoder 4504.

Decoder 4504 decodes the stream of the slice or the tile, and stores the obtained three-dimensional data into memory 4505. Memory 4505 stores the three-dimensional data of the slice or the tile.

Display 4506 displays an image or a video based on the three-dimensional data which is stored in memory 4505.

Next, an operation of accessing a slice or a tile is described. A PCC stream is divided, and the information is stored into SEI. In this way, the three-dimensional data decoding device is capable of easily making access on an area-by-area basis. Memory manager 4503 determines a necessary area (an encoded slice or tile) based on the information from localizer 4502 (such as a GPS) and a traveling direction, etc. of the mobile object on which the three-dimensional data decoding device is mounted, and obtains data of the necessary area from memory 4505.

Into SEI, a related global position or a relative position related to a map is encoded as area information. Each of FIGS. 145 and 146 is a diagram illustrating an example of an operation of accessing a slice or a tile. In this example, a current position of a target in which a three-dimensional data decoding device is mounted is identified as being area M. In addition, the target travels leftward as illustrated in FIGS. 145 and 146. In this case, areas F, K, and P are not available (not loaded), and thus data of these areas are read out from memory 4505 by memory manager 4503 in order to decode the data of these areas. The other areas are not related to the traveling direction, and thus do not need to be decoded.

Using the above method, it is possible to reduce the decoding time and also reduce the memory capacity required in hardware.

Next, a test example of a process of decoding a slice or a tile is described. Hereinafter, a test of SEI in decoding of a point cloud data bitstream is described. Each of FIGS. 147 and 148 is a diagram illustrating a test operation of SEI.

The point cloud data bitstream for the test is generated by dividing original point cloud data having a PLY format and encoding the divided point cloud data individually. A plurality of bitstreams obtained are combined to generate one file (a combined stream). In addition, the one file is transmitted together with a text format indicating the file size of each bitstream.

Decoder 4504 is modified so as to load and decode a part of a stream using the information from memory manager 4503. A plurality of observations enables observation of an upper limit for decoding time with a small overhead.

Hereinafter, descriptions are given of an operation performed by the three-dimensional data encoding device and an operation performed by the three-dimensional data decoding device. FIG. 149 is a flowchart of a three-dimensional data encoding process performed by the three-dimensional data encoding device according to this embodiment.

First, the three-dimensional data encoding device sets a bounding box including a three-dimensional point which has been input, based on a user setting in response to a request for a tile or a slice (S4501). Next, the three-dimensional data encoding device divides the bounding box into eight child nodes (S4502).

Next, the three-dimensional data encoding device generates an occupancy code of each of child nodes in which a three-dimensional points is included among the eight child nodes (S4503). Next, the three-dimensional data encoding device determines whether the level (a layer in a tree structure) of a current node to be processed has reached a target tile level (S4504). Here, the target tile level is a level (a layer in a tree structure) in which tile division is performed.

In the case where the level of the current node has not reached the target tile level (No in S4504), the three-dimensional data encoding device divides each node into eight grandchild nodes (S4505), and performs processes in Step S4503 and the following steps onto each grandchild node.

In the case where the level of the current node has reached the target tile level (Yes in S4504), the three-dimensional data encoding device stores a current node position and a tile level (or a tile size) into a tile table (S4506).

Next, the three-dimensional data encoding device divides each child node into eight grandchild nodes (S4507). Next, the three-dimensional data encoding device repeats a process of generating an occupancy code until a node cannot be divided (S4508). Next, the three-dimensional data encoding device encodes the occupancy node of each tile (S4509).

Next, the three-dimensional data encoding device combines generated encoded bitstreams (encoded data) of a plurality of tiles (S4510). In addition, the three-dimensional data encoding device adds the information indicating the size of each encoded bitstream (encoded data), a tile table, etc. into header information of the bitstream. In addition, the three-dimensional data encoding device adds the identifier of the tile or the slice (the tile index or the slice index) corresponding to the encoded bitstream (encoded data) into the header information of the encoded bitstream.

Here, the tile size (tile level) is stored into the tile table. Thus, the three-dimensional data decoding device is capable of obtaining the size of the bounding box of a sub-tree in each tile, using the tile size. In addition, the three-dimensional data decoding device is capable of calculating the size of the bounding box of the whole tree structure, using the size of the bounding box of the sub-tree.

It is to be noted that the three-dimensional data encoding device may store the size of the bounding box of each tile into the tile table. In this way, the three-dimensional data decoding device is capable of obtaining the size of the bounding box of each tile with reference to the tile table.

Lastly the three-dimensional data decoding device adds SEI to the bitstream (S4511). As described above, SEI includes a list indicating the relationship between attribute information (area information, address information, position information, etc.) of each tile or each slice and an identifier (the tile index or the slice index). It is to be noted that the tile table may be included in SEI.

FIG. 150 is a flowchart of a three-dimensional data decoding process performed by the three-dimensional data decoding device according to this embodiment.

First, memory manager 4503 sets information about a tile or a slice which is obtained from SEI (a SEI header) (S4521). Next, the three-dimensional data decoding device accesses the tile or the slice related to the SEI (SEI header) with reference to the SEI (S4522).

For example, as indicated in FIGS. 145 and 146, memory manager 4503 determines the position of the tile or the slice to be obtained, based on a current position and a traveling direction of the three-dimensional data decoding device. Alternatively, memory manager 4503 determines the position of the tile or the slice to be obtained, based on user settings. Next, memory manager 4503 determines the identifier of the tile or the slice at the determined position with reference to a list of attribute information and the identifier (tile index or slice index) included in the SEI. Next, memory manager 4503 obtains each encoded bitstream added with a determined identifier as a current encoded bitstream to be decoded, with reference to header information of the encoded bitstream.

Next, the three-dimensional data decoding device sets a bounding box including a three-dimensional point to be output, using the header information included in the bitstream (S4523). Next, the three-dimensional data decoding device sets a root position of each tile (subtree) using the header information included in the bitstream (S4524).

Next, the three-dimensional data decoding device divides the bounding box into eight child nodes (S4525). Next, the three-dimensional data decoding device decodes an occupancy code of each node, and divides the node into eight child nodes based on the decoded occupancy code. In addition, the three-dimensional data decoding device repeats the process until the node of each tile (subtree) cannot be divided (S4526).

Lastly, the three-dimensional data decoding device combines three-dimensional points of a plurality of tiles decoded.

FIG. 151 is a block diagram illustrating a configuration of three-dimensional data encoding device 4510 according to this embodiment. Three-dimensional data encoding device 4510 includes octree generator 4511, tile divider 4512, a plurality of entropy encoders 4513, bitstream generator 4514, and SEI processor 4515.

A target tile level is input to three-dimensional data encoding device 4510. After the target tile level is reached through division processes, three-dimensional data encoding device 4510 stores an occupancy code of each of the plurality of tiles, and generates encoded data of the tile by encoding the occupancy code of the tile individually.

Octree generator 4511 sets a bounding box, and divides the bounding box into eight child nodes. In addition, octree generator 4511 repeats the division process until the target level is reached through division processes. In addition, the obtained information is analyzed and transmitted to SEI processor 4515.

Tile divider 4512 sets tiles. Specifically, when the target level is reached through division processes, tile divider 4512 sets a plurality of tiles having the level as a root.

The plurality of entropy encoders 4513 encodes the plurality of tiles individually. Bitstream generator 4514 generates a bitstream by combining encoded data of the plurality of tiles.

SEI processor 4515 generates SEI, and writes the generated SEI into a bitstream.

FIG. 152 is a block diagram illustrating a configuration of three-dimensional data decoding device 4520 according to this embodiment. Three-dimensional data decoding device 4520 includes SEI processor 4521, octree generator 4522, bitstream divider 4523, a plurality of entropy decoders 4524, and three-dimensional point combiner 4525.

SEI processor 4521 determines data to be read out and processed, with reference to SEI. In addition, the determination result is transmitted to bitstream divider 4523.

Octree generator 4522 sets a bounding box, and divides the bounding box into eight child nodes. In addition, octree generator 4522 repeats the division process until the target level is reached through division processes.

Bitstream divider 4523 divides the bitstream into encoded data of each of the tiles, using the header information included in the bitstream. In addition, bitstream divider 4523 transmits the encoded data of each tile to be decoded, based on the information from SEI processor 4521 to a corresponding one of the plurality of entropy decoders 4524.

The plurality of entropy decoders 4524 encode the plurality of tiles individually. Three-dimensional point combiner 4525 combines the decoded three-dimensional points of the plurality of tiles. It is to be noted that the decoded three-dimensional points may be used directly in an application. In such a case, this combination process is skipped.

It is to be noted that attribute information (an identifier, area information, address information, position information, etc.) of a tile or a slice may be stored in other control information instead of SEI. For example, the attribute information may be stored in control information indicating the overall structure of PCC data, or may be stored in control information for each tile or each slice.

In addition, when the three-dimensional data encoding device (three-dimensional data transmitting device) transmits the PCC data to another device, the three-dimensional data encoding device may convert control information such as SEI into control information unique to a protocol supported by the system and present the converted control information.

For example, when the three-dimensional data encoding device converts PCC data including attribute information into an ISO Base Media File Format (ISOBM), the three-dimensional data encoding device may store SEI in an "mdat box" together with the PCC data, or may store SEI in a "track box" in which control information related to a stream is described. In other words, the three-dimensional data encoding device may store the control information in a table for random access. In addition, when the three-dimensional data encoding device packetizes PCC data and transmits packets of PCC data, the three-dimensional data encoding device may store SEI in packet headers. In this way, attribute information can be obtained in a layer of the system, which makes it easier to access the attribute information, and the tile data or the slice data, and thus makes it possible to accelerate the access.

It is to be noted that, in the configuration of the three-dimensional data decoding device illustrated in FIG. 144, memory manager 4505 may determine, in advance, whether information which is necessary for a decoding process is present in memory 4505, and if the information necessary for the decoding process is absent, memory manager 450 may obtain the information necessary for the decoding process from storage or via a network.

When the three-dimensional data decoding device obtains PCC data from storage or via a network using Pull in a protocol such as the MPEG-DASH, memory manager 4503 may identify attribute information of data necessary for a decoding process based on information obtained from localizer 4502 or the like, request the tile or the slice including the identified attribute information, and obtain the necessary data (PCC stream). A tile or a slice including attribute information may be identified by a storage or network side, or may be identified by memory manager 4503. For example, memory manager 4503 may obtain SEI from all PCC data in advance, and identify a tile or a slice based on the information.

When all PCC data have been transmitted from the storage or via the network using Push in the UDP protocol, or the like, memory manager 4503 may obtain desired data by identifying the attribute information of data necessary for a decoding process and a tile or a slice, based on information obtained from localizer 4502, or the like, and by filtering a plurality of tiles or slices to obtain a desired tile or a slice from the PCC data transmitted.

In addition, when obtaining data, the three-dimensional data encoding device may determine whether desired data is present, whether real-time processing is possible based on a data size, etc., or a communication state, etc. When the three-dimensional data encoding device determines that it is difficult to obtain the data based on the determination result, the three-dimensional data encoding device may select and obtain another slice or tile whose priority or data amount is different from that of the data.

In addition, the three-dimensional data decoding device may transmit information from localizer 4502, or the like to a cloud server, and the cloud server may determine necessary information based on the information.

As described above, the three-dimensional data encoding device according to this embodiment performs the process illustrated in FIG. 153. The three-dimensional data encoding device encodes a plurality of subspaces (such as tiles or slices) included in a current space in which a plurality of three-dimensional points are included, to generate a bitstream including a plurality of encoded data corresponding respectively to the plurality of subspaces.

When generating the bitstream, the three-dimensional data encoding device stores, into first control information (such as SEI) included in the bitstream and common to a plurality of encoded data, a list of information (such as position information or size information) about the plurality of subspaces each of which is associated with an identifier (such as a tile index or a slice index) assigned to the subspace (S4531). The three-dimensional data encoding device stores the identifier assigned to the subspace corresponding to each encoded data into a header (such as a tile header or a slice header) of the encoded data (S4532).

In this way, the three-dimensional data decoding device is capable of obtaining desired encoded data with reference to (i) the list of information which is stored in the first control information and is about the plurality of subspaces respectively associated with the identifiers each stored in the header of the corresponding one of the plurality of encoded data and (ii) the plurality of identifiers, when decoding the bitstream generated by the three-dimensional data encoding device. Accordingly, it is possible to reduce the amount of processing performed by the three-dimensional data decoding device.

For example, the first control information is disposed ahead of the plurality of encoded data in the bitstream.

For example, the list includes position information (for example, a global position or a relative position) of each of the plurality of subspaces. For example, the list includes size information of each of the plurality of subspaces.

For example, the three-dimensional data encoding device converts the first control information into second control information in accordance with a protocol supported by a transmission destination of a bitstream.

In this way, the three-dimensional data encoding method enables conversion of control information in accordance with the protocol supported by the transmission destination of the bitstream.

For example, the second control information is a table for making random access in accordance with the protocol. For example, the second control information is an mdat box or a track box in ISO Base Media File Format (ISOBMFF).

For example, the three-dimensional data encoding device includes a processor and memory, and the processor performs the above processes using the memory.

In addition, the three-dimensional data decoding device according to this embodiment performs the processes illustrated in FIG. 154. First, the three-dimensional data decoding device decodes a bitstream including a plurality of encoded data corresponding to a plurality of subspaces (such as tiles or slices) which are included in a current space including a plurality of three-dimensional points and obtained by encoding the plurality of subspaces.

When decoding the bitstream, the three-dimensional data decoding device determines a current subspace to be decoded among the plurality of subspaces (S4541). The three-dimensional data decoding device obtains encoded data of the current subspace using (i) a list of information about the plurality of subspaces (for example, position information or size information) respectively associated with a plurality of identifiers (for example, tile indexes or slice indexes), and (ii) the plurality of identifiers. The list of information is included in first control information (for example, SEI) common to the plurality of encoded data. The first control information is included in the bitstream Each of the plurality of identifiers is included in a header (for example, a tile header or a slice header) of corresponding encoded data included in the plurality of encoded data and being assigned to the subspace corresponding to the corresponding encoded data (S4542).

In this way, the three-dimensional data decoding method is capable obtaining desired encoded data, with reference to the list of information about the plurality of subspaces respectively associated with the plurality of identifiers stored in the first control and the plurality of identifier each stored in the header of the corresponding one of the plurality of encoded data. Accordingly it is possible to reduce the amount of processing performed by the three-dimensional data decoding device.

For example, the first control information is disposed ahead of the plurality of encoded data in the bitstream.

For example, the list includes position information (for example, a global position or a relative position) of each of the plurality of subspaces. For example, the list includes size information of each of the plurality of subspaces.

For example, the three-dimensional data decoding device includes a processor and memory, and the processor performs the above-described process using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
    generating a bitstream by encoding a plurality of subspaces included in a current space in which a plurality of three-dimensional points are included, the bitstream including a plurality of encoded data respectively corresponding to the plurality of subspaces,
    wherein in the generating of the bitstream:
    a list of information about the plurality of subspaces is stored in first control information included in the bitstream, the plurality of subspaces being respectively associated with a plurality of identifiers assigned to the plurality of subspaces, the first control information being common to the plurality of encoded data; and
    each of the plurality of identifiers assigned to the plurality of subspaces respectively corresponding to the plurality of encoded data is stored in a header of a corresponding one of the plurality of encoded data.

2. A three-dimensional data decoding method, comprising:
    decoding a bitstream including a plurality of encoded data respectively corresponding to a plurality of subspaces included in a current space in which a plurality of three-dimensional points are included, the bitstream being obtained by encoding the plurality of subspaces,
    wherein, in the decoding of the bitstream:
    a current subspace to be decoded among the plurality of subspaces is determined; and
    encoded data of the current subspace is obtained using (i) a list of information about the plurality of subspaces respectively associated with a plurality of identifiers, and (ii) the plurality of identifiers, the list of information being included in first control information common to the plurality of encoded data, the first control information being included in the bitstream, each of the plurality of identifiers being included in a header of corresponding encoded data included in the plurality of encoded data and being assigned to the subspace corresponding to the corresponding encoded data.

3. A three-dimensional data encoder which encodes a plurality of three-dimensional points each including attribute information, the three-dimensional data encoder comprising:
    processor; and
    memory,
    wherein, using the memory, the processor:
    generates a bitstream by encoding a plurality of subspaces included in a current space in which a plurality of three-dimensional points are included, the bitstream including a plurality of encoded data respectively corresponding to the plurality of subspaces; and
    when generating the bitstream:
    stores a list of information about the plurality of subspaces into first control information included in the bitstream, the plurality of subspaces being respectively associated with a plurality of identifiers assigned to the plurality of subspaces, the first control information being common to the plurality of encoded data; and
    stores each of the plurality of identifiers assigned to the plurality of subspaces respectively corresponding to the plurality of encoded data into a header of a corresponding one of the plurality of encoded data.

4. A three-dimensional data decoder which decodes a plurality of three-dimensional points each including attribute information, the three-dimensional data decoder comprising:
    processor; and
    memory,
    wherein, using the memory, the processor:
    decodes a bitstream including a plurality of encoded data respectively corresponding to a plurality of subspaces included in a current space in which a plurality of three-dimensional points are included, the bitstream being obtained by encoding the plurality of subspaces; and
    when decoding the bitstream:
    determines a current subspace to be decoded among the plurality of subspaces; and
    obtains encoded data of the current subspace using (i) a list of information about the plurality of subspaces respectively associated with a plurality of identifiers, and (ii) the plurality of identifiers, the list of information being included in first control information common to the plurality of encoded data, the first control information being included in the bitstream, each of the plurality of identifiers being included in a header of corresponding encoded data included in the plurality of encoded data and being assigned to the subspace corresponding to the corresponding encoded data.

* * * * *